US010424179B2

(12) United States Patent
Kranz

(10) Patent No.: US 10,424,179 B2
(45) Date of Patent: Sep. 24, 2019

(54) LOCALIZATION AND ACTIVATION OF ALARM OF PERSON IN DANGER

(75) Inventor: Vladimir Kranz, Prague (CZ)

(73) Assignee: ING. VLADIMIR KRANZ, Prague (CZ)

( * ) Notice: Subject to any disclaimer, the term of this patent is extended or adjusted under 35 U.S.C. 154(b) by 0 days.

(21) Appl. No.: 13/816,588

(22) PCT Filed: Aug. 18, 2011

(86) PCT No.: PCT/CZ2011/000078

§ 371 (c)(1), (2), (4) Date: May 7, 2014

(87) PCT Pub. No.: WO2012/022276

PCT Pub. Date: Feb. 23, 2012

(65) Prior Publication Data

US 2015/0279187 A1 Oct. 1, 2015

(30) Foreign Application Priority Data

Aug. 19, 2010 (CZ) .................................... 2010-629
Jul. 21, 2011 (CZ) .................................... 2011-446

(51) Int. Cl.

*G08B 21/04* (2006.01)
*G08B 25/08* (2006.01)
*G08B 25/10* (2006.01)
*H04M 1/60* (2006.01)

(52) U.S. Cl.

CPC ..... *G08B 21/0415* (2013.01); *G08B 21/0453* (2013.01); *G08B 25/08* (2013.01); *G08B 25/10* (2013.01); *H04M 1/6041* (2013.01)

(58) Field of Classification Search

CPC ............ G08B 21/0453; G08B 21/0415; G08B 25/08; G08B 25/10; H04M 1/6041
See application file for complete search history.

(56) References Cited

U.S. PATENT DOCUMENTS 5,228,449 A * 7/1993 Christ ................ A61B 5/02433 600/504
5,511,553 A * 4/1996 Segalowitz .......... A61B 5/0006 600/508
5,520,191 A * 5/1996 Karlsson .............. A61B 5/0006 600/515
5,873,369 A * 2/1999 Laniado ............... A61B 5/0002 600/300
7,301,451 B2 * 11/2007 Hastings ................ A61B 5/411 340/539.12
7,400,259 B2 * 7/2008 O'Connor ........... A61B 5/6828 340/539.12
7,985,185 B2 * 7/2011 De Voir ................. A61B 5/042 600/374
8,452,387 B2 * 5/2013 Osorio ............... A61B 5/02405 600/509

(Continued)

*Primary Examiner* — Joseph H Feild
*Assistant Examiner* — Rufus C Point

(57) ABSTRACT

Invention describes set of units able to communicate one with each other by means of cooperating software, mutually control themselves and imagine displays from other units. Invention enables by means of indicated set or individual units as well, to make remote monitoring of persons and control their location, heath condition and capacity. Also, it enables to monitored persons to check their condition on mobile unit.

43 Claims, 58 Drawing Sheets

(56) References Cited

U.S. PATENT DOCUMENTS

| | | | | | |
|---|---|---|---|---|---|
| 8,562,536 | B2 * | 10/2013 | Osorio | A61B 5/02405 | 600/483 |
| 8,641,646 | B2 * | 2/2014 | Colborn | A61B 5/0245 | 600/595 |
| 8,790,272 | B2 * | 7/2014 | Sackner | A61B 5/0205 | 600/513 |
| 8,821,418 | B2 * | 9/2014 | Meger | A61B 5/0002 | 600/595 |
| 8,961,185 | B2 * | 2/2015 | Bleich | A61B 5/0456 | 434/247 |
| 8,976,035 | B2 * | 3/2015 | Steffen | A47J 37/1295 | 340/669 |
| 9,019,100 | B2 * | 4/2015 | Sholder | G08B 21/02 | 340/539.12 |
| 2002/0032386 | A1 * | 3/2002 | Sackner | A61B 5/0205 | 600/536 |
| 2003/0055356 | A1 * | 3/2003 | Nonaka | A61B 5/024 | 600/544 |
| 2003/0130584 | A1 * | 7/2003 | Hubelbank | A61B 5/14551 | 600/500 |
| 2003/0135124 | A1 * | 7/2003 | Russell | A61B 5/02007 | 600/500 |
| 2004/0010201 | A1 * | 1/2004 | Korzinov | A61B 5/04325 | 600/518 |
| 2005/0010116 | A1 * | 1/2005 | Korhonen | A61B 5/1106 | 600/481 |
| 2006/0255955 | A1 * | 11/2006 | O'Connor | A61B 5/1118 | 340/573.1 |
| 2007/0016085 | A1 * | 1/2007 | Inukai | A61B 5/021 | 600/485 |
| 2008/0027341 | A1 * | 1/2008 | Sackner | A61B 5/0205 | 600/509 |
| 2009/0040052 | A1 * | 2/2009 | Cameron | G08B 21/0415 | 340/573.1 |
| 2017/0105637 | A1 * | 4/2017 | Akl | A61B 5/02125 | |

* cited by examiner

Figure 45:
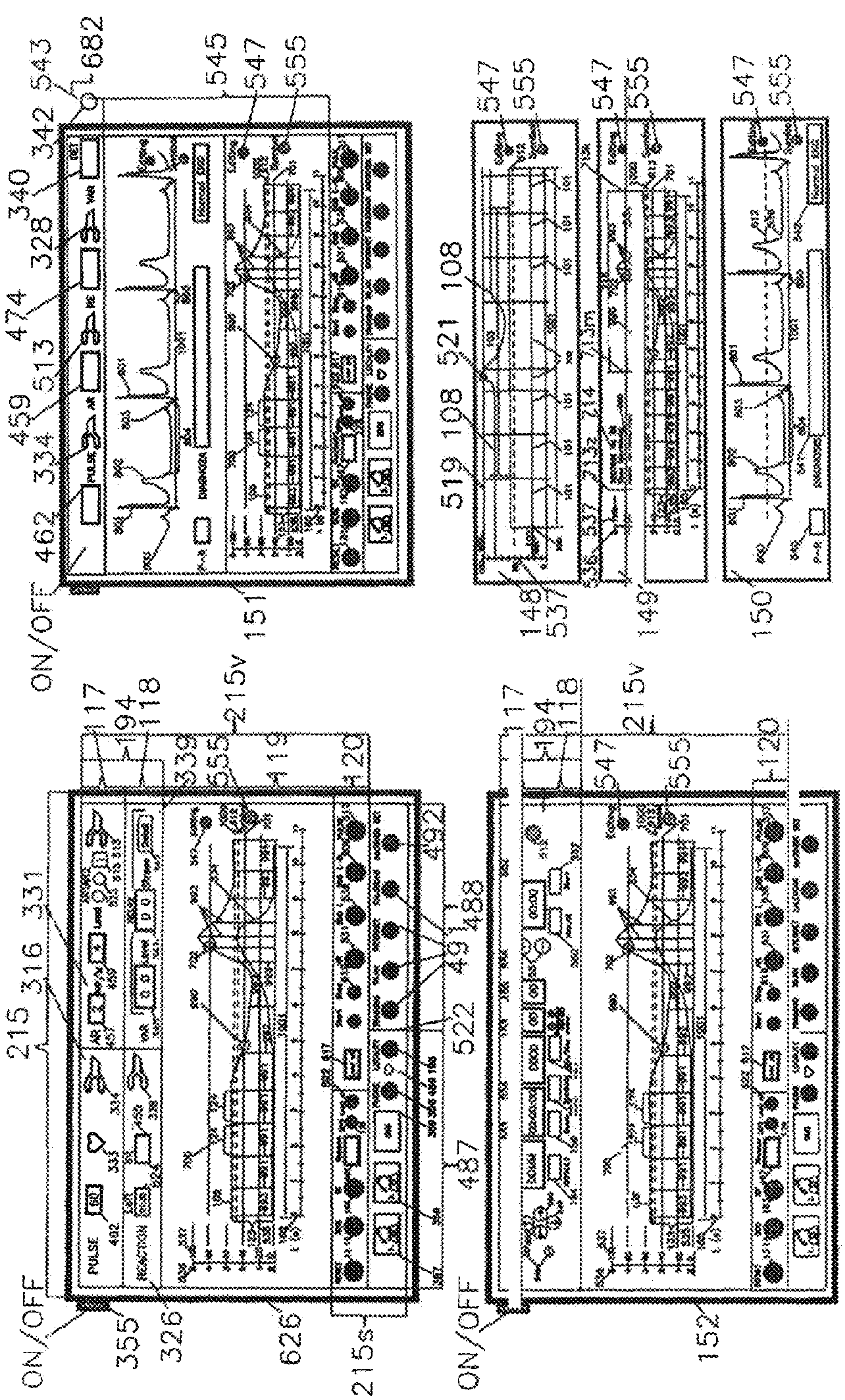
Figure 45:
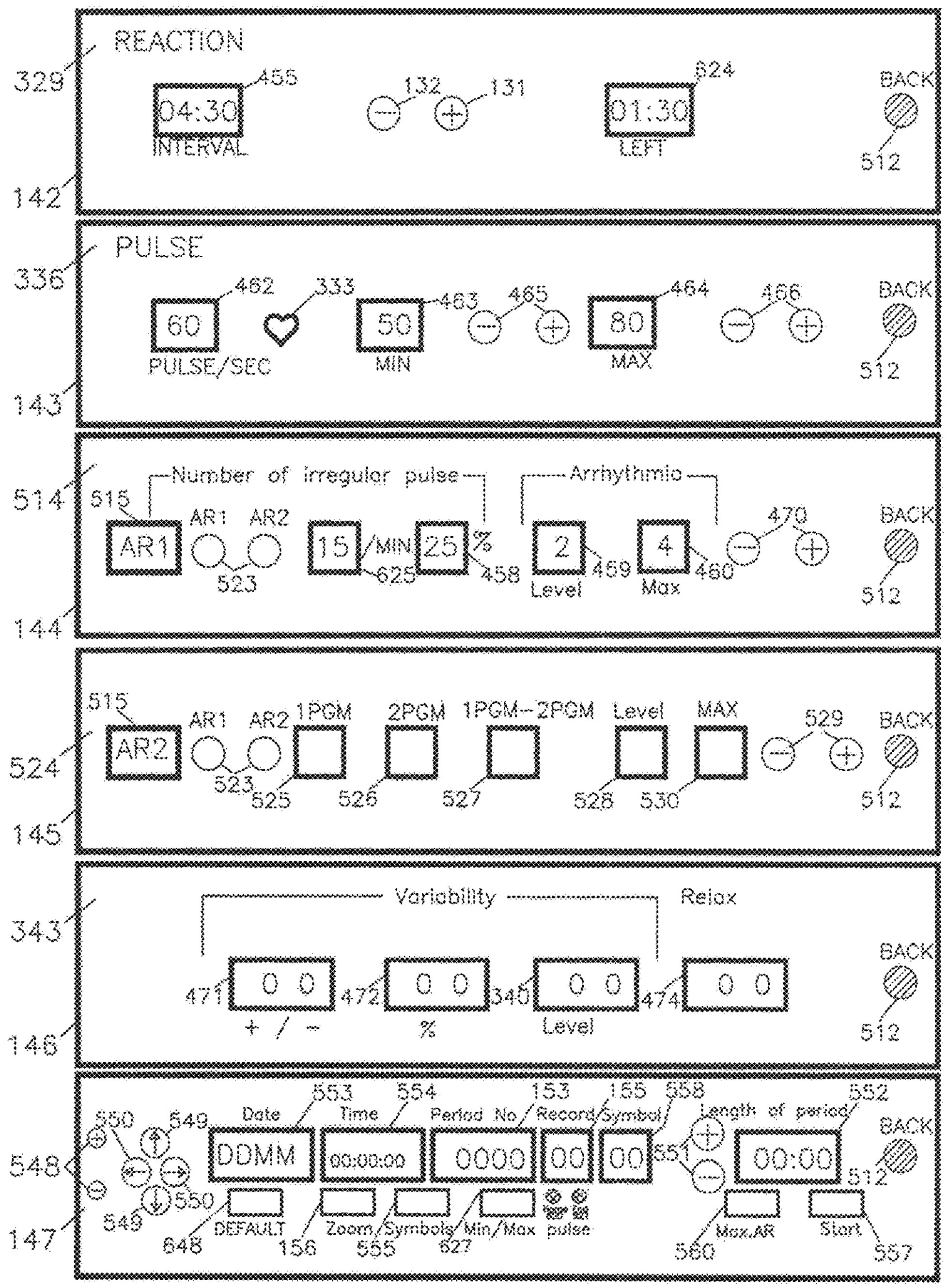

Fig.45 A1
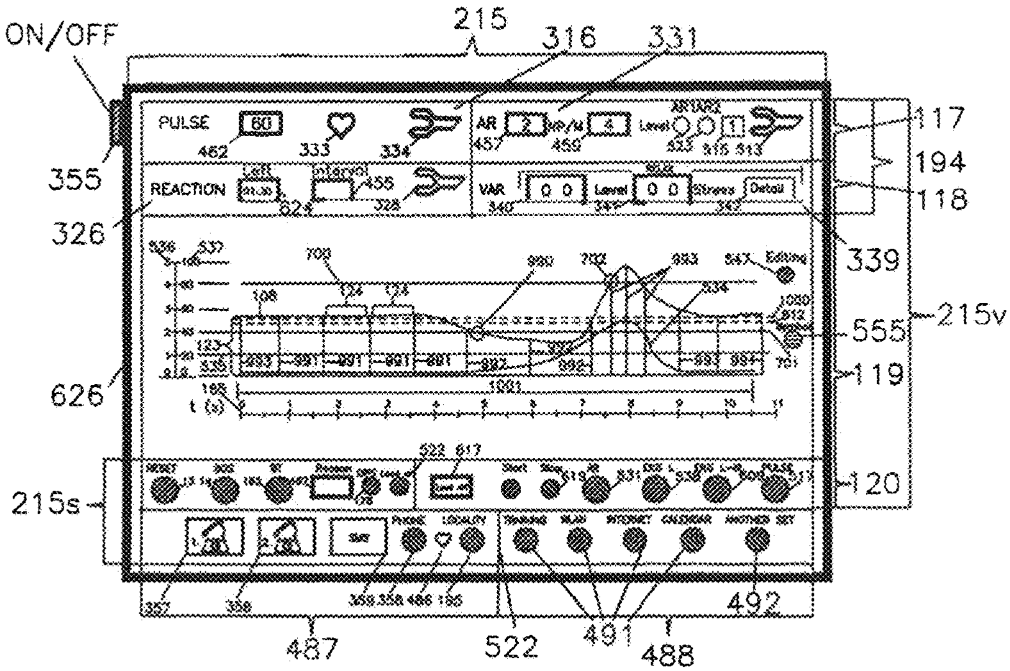
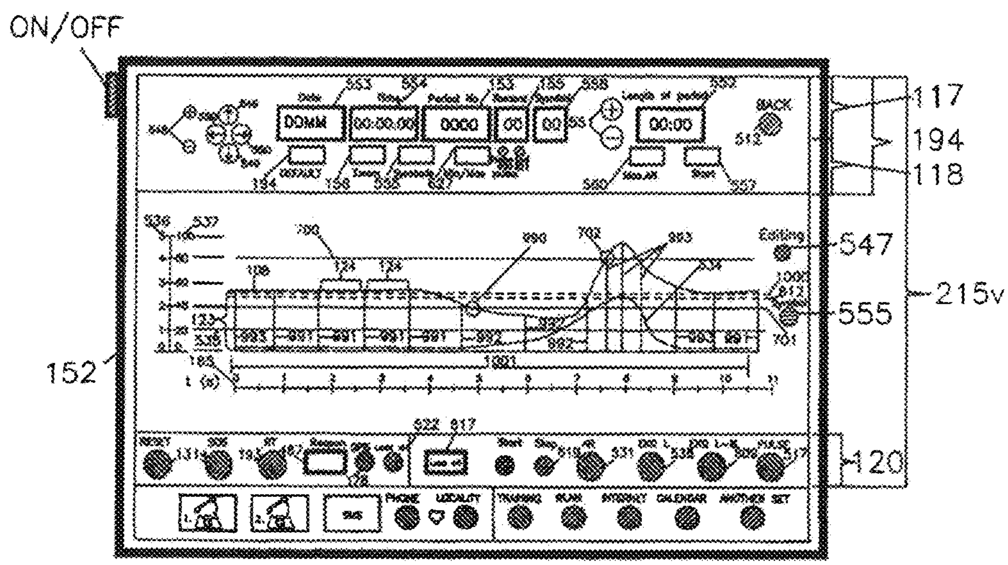

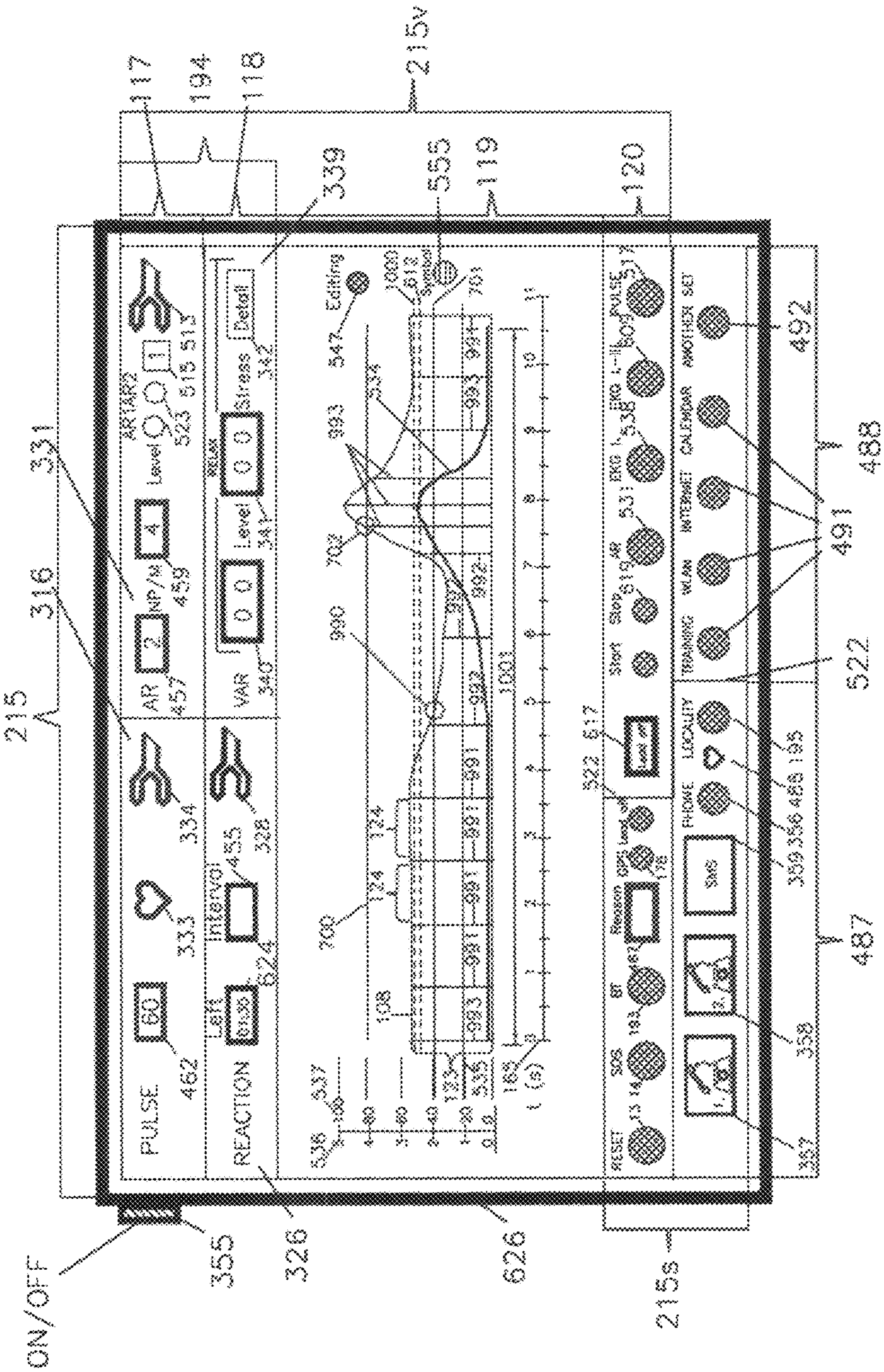
Fig.45 A1'

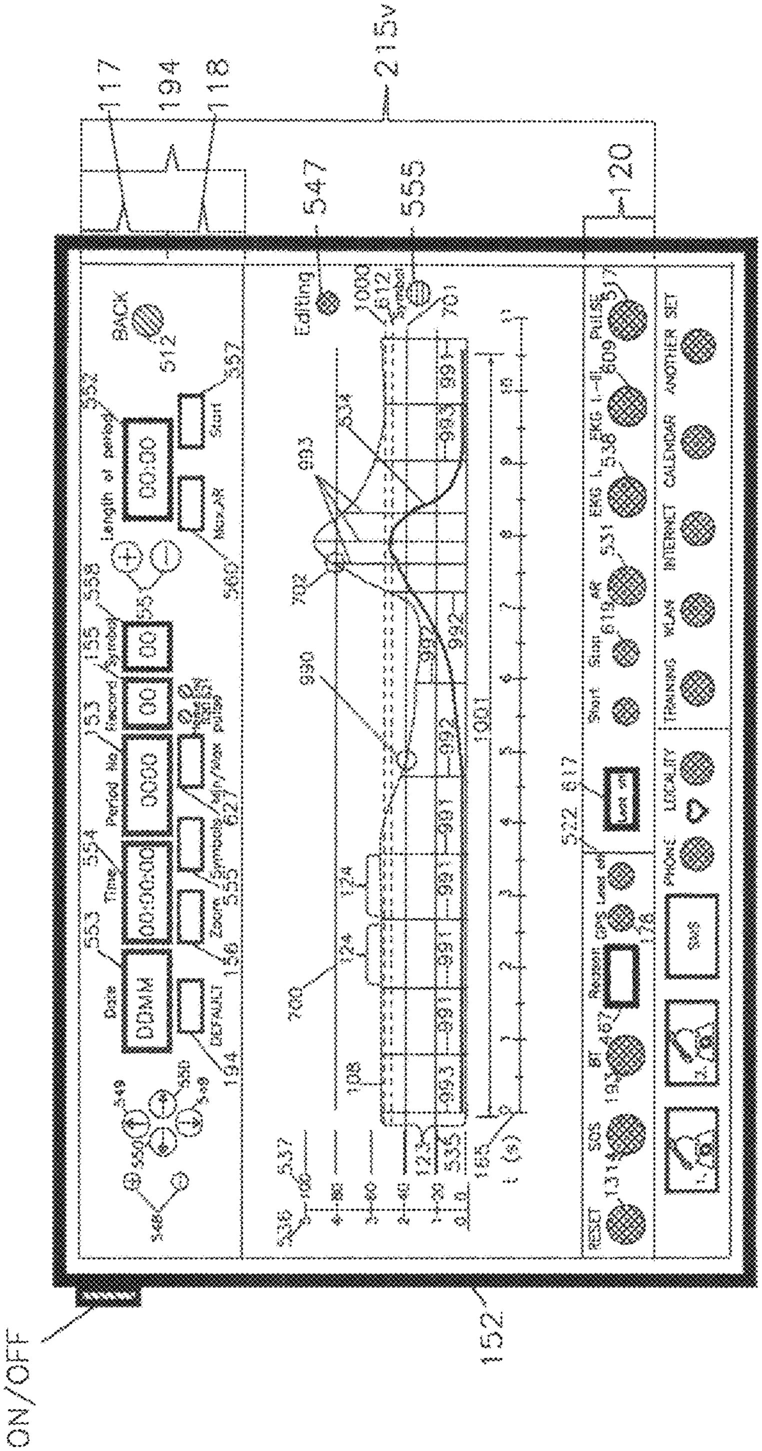
Fig.45 A1’’

Fig.45 A2
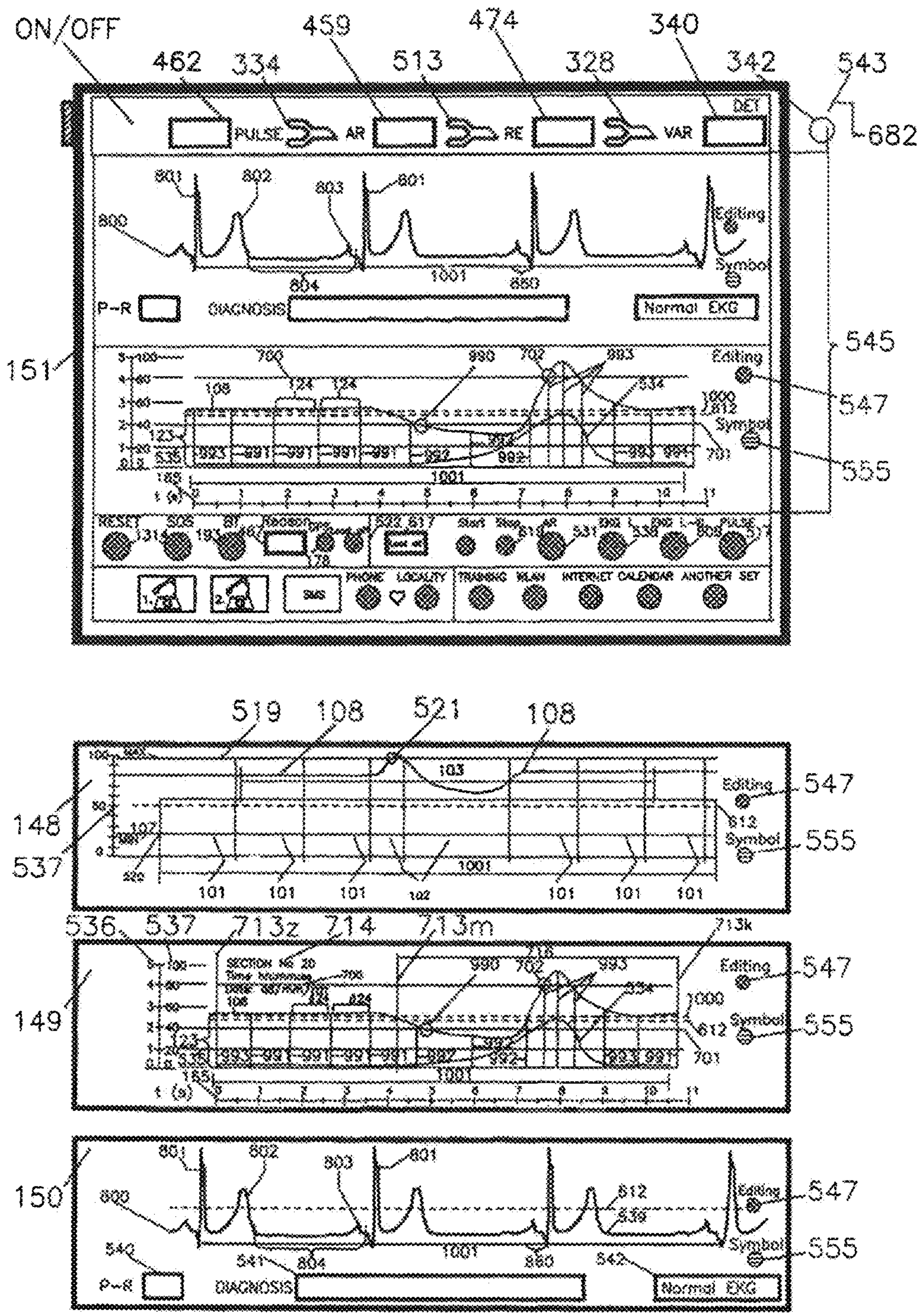

Fig.45 A2'
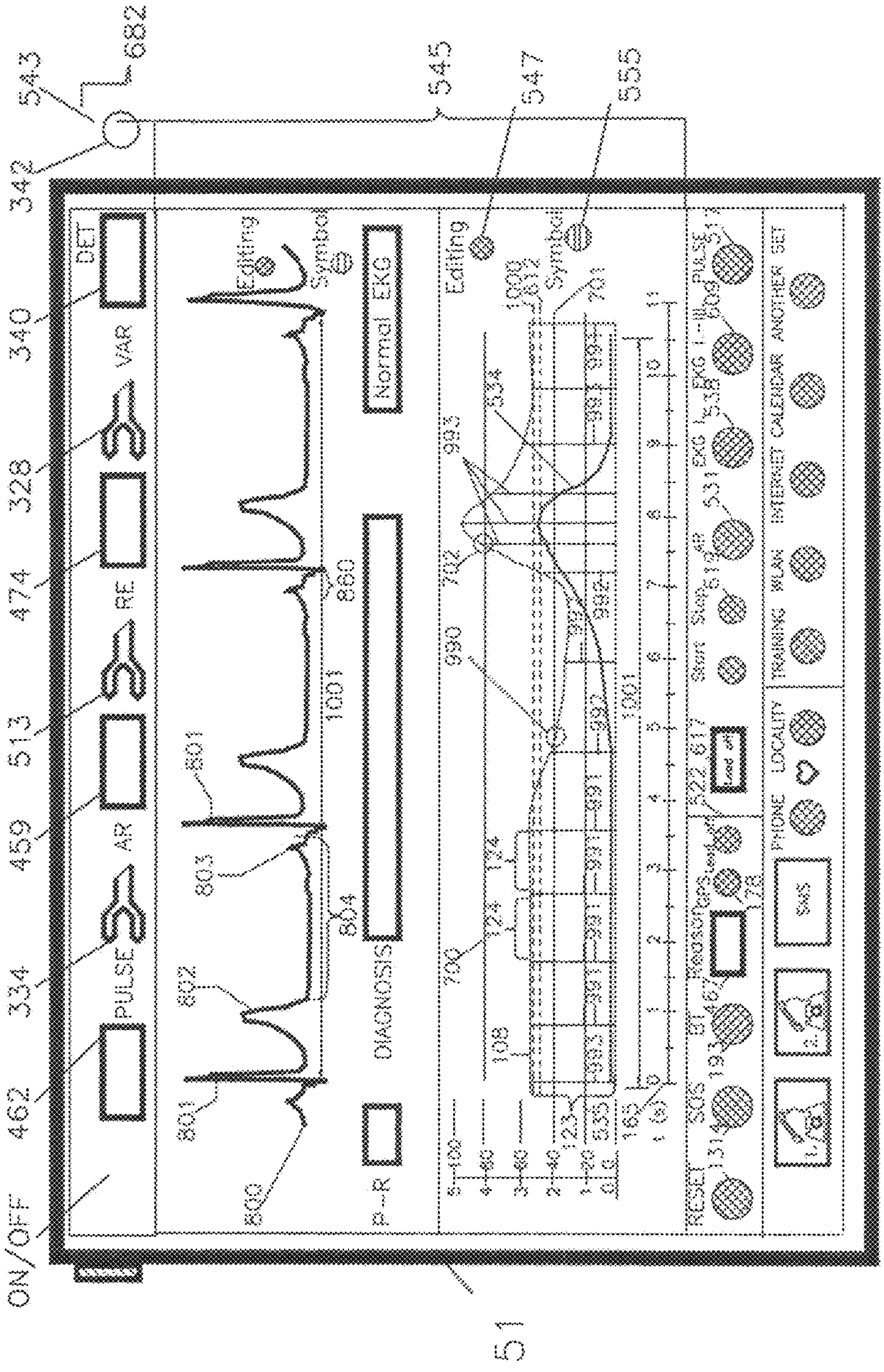

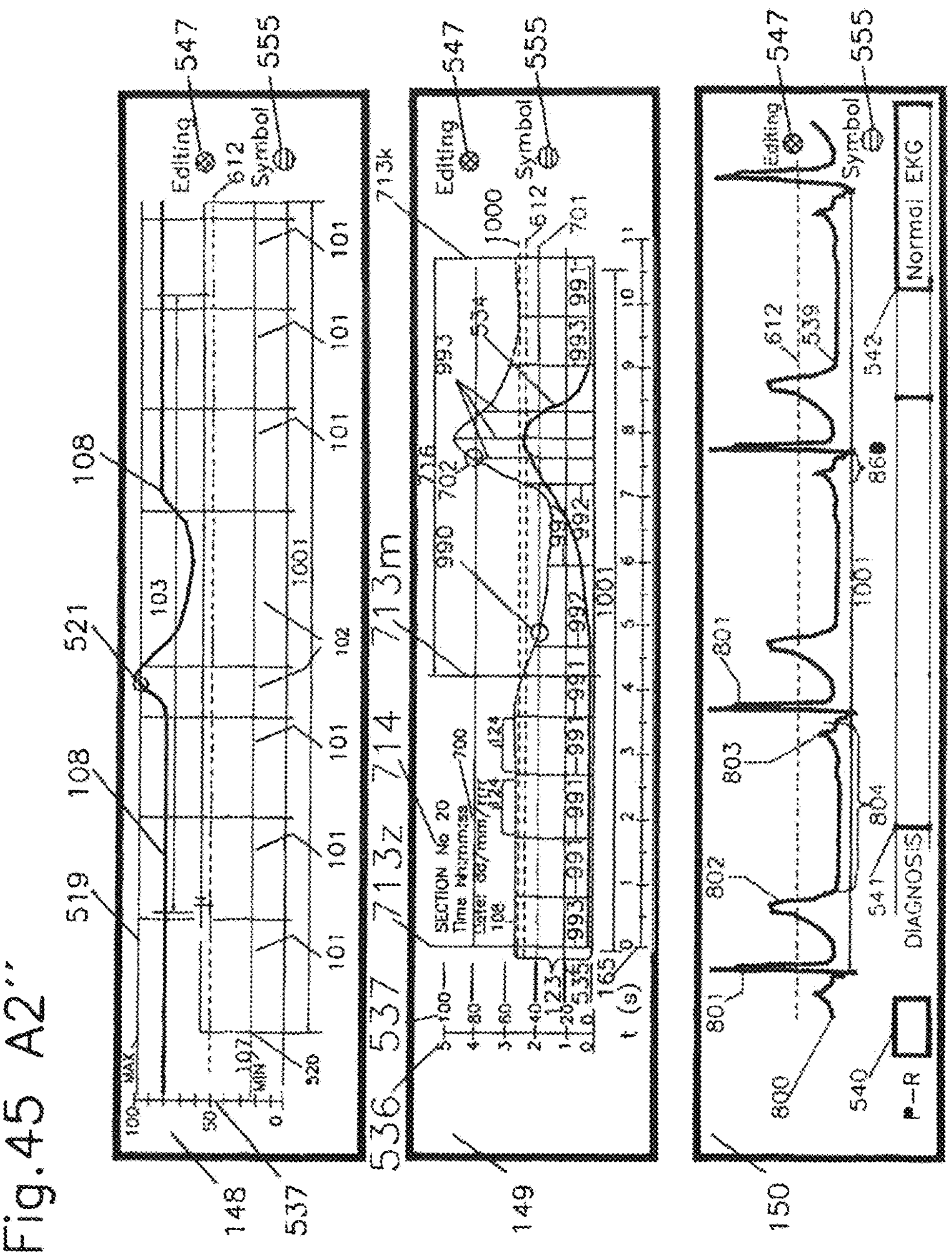
Fig.45 A2''

Fig.45 C1
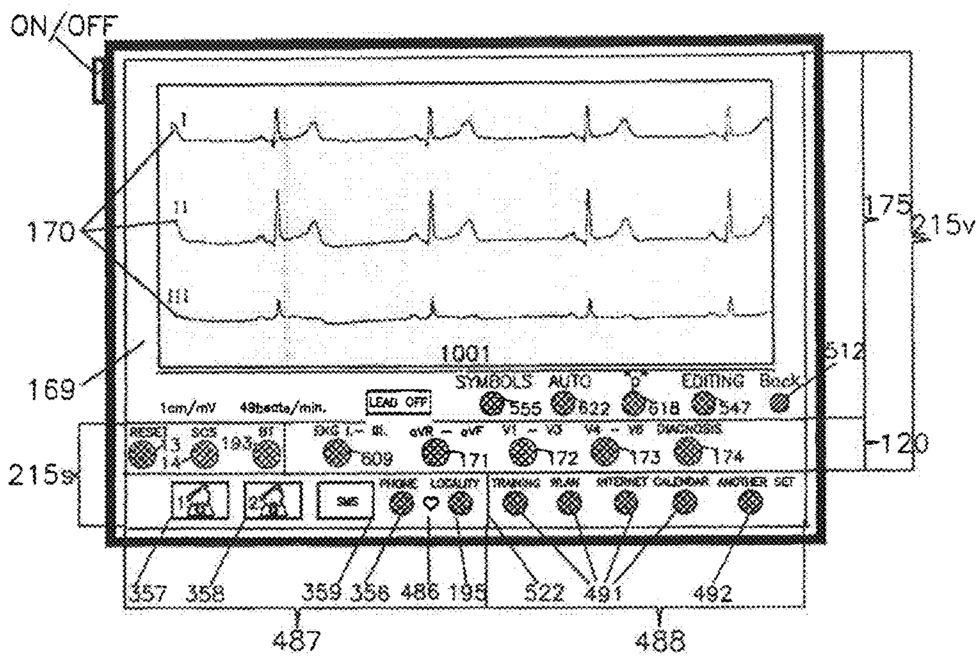
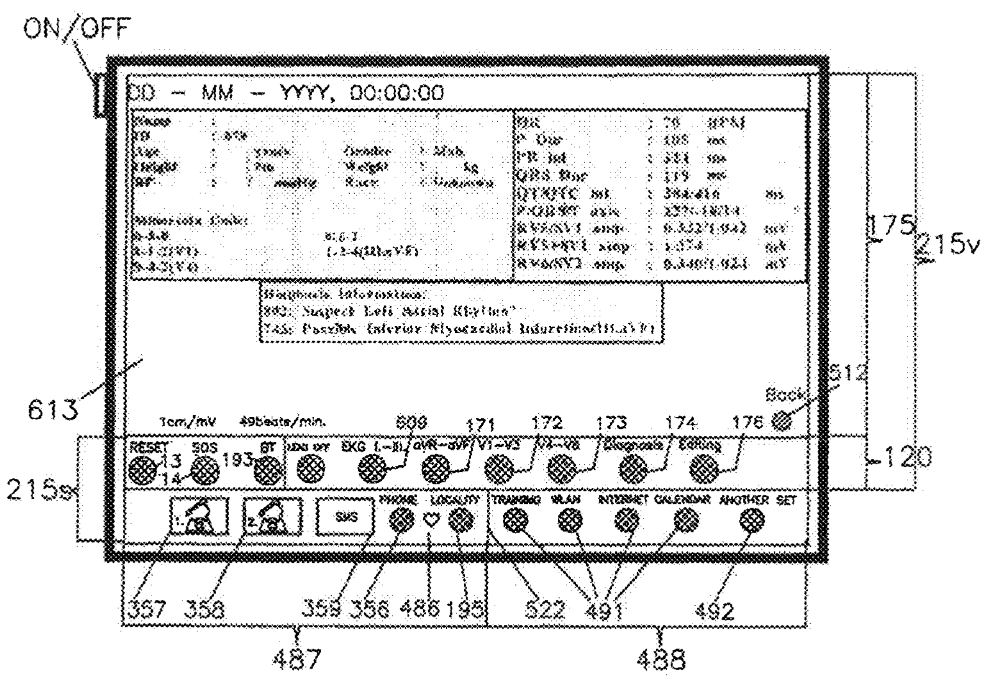

Fig.45 C1´
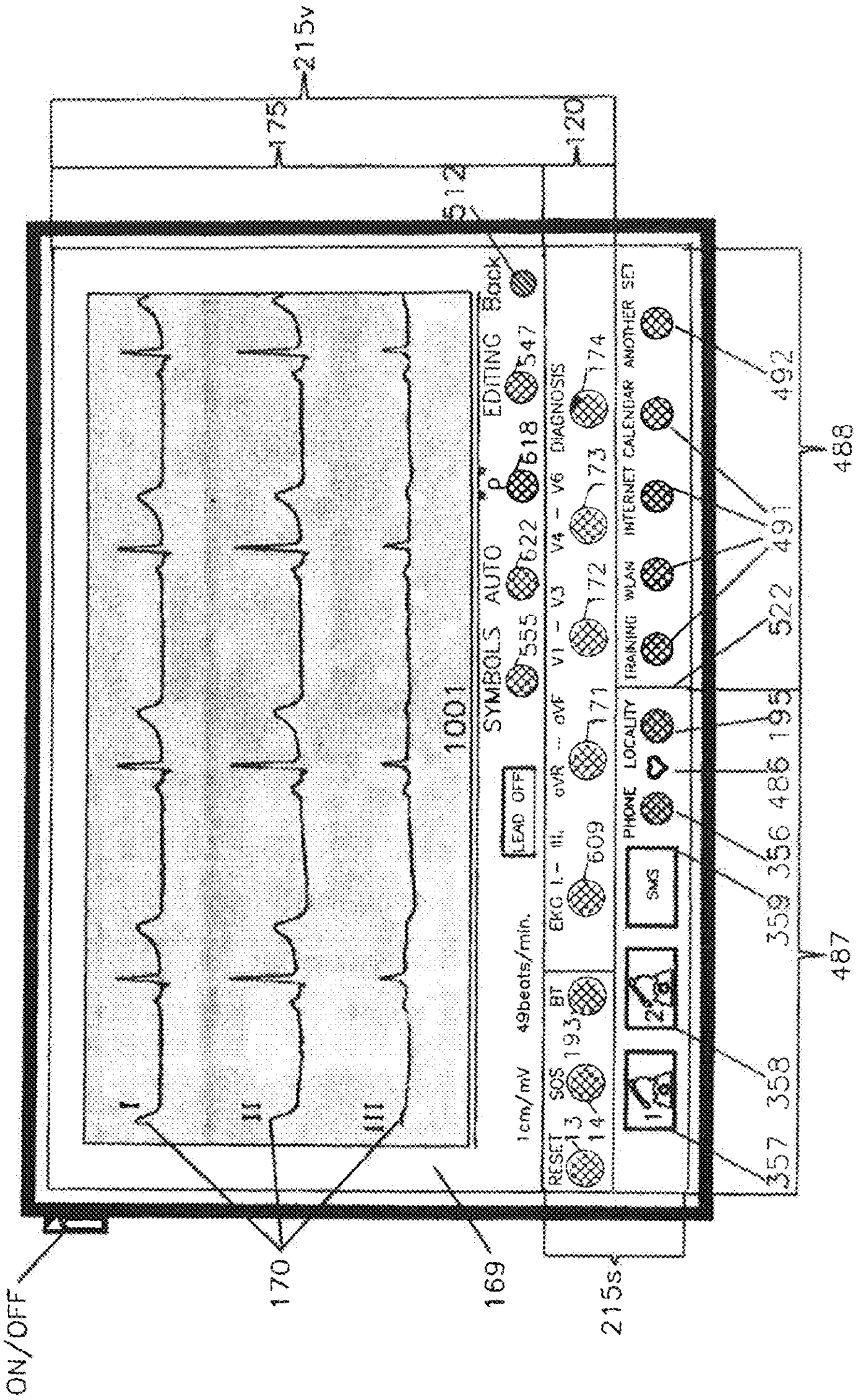

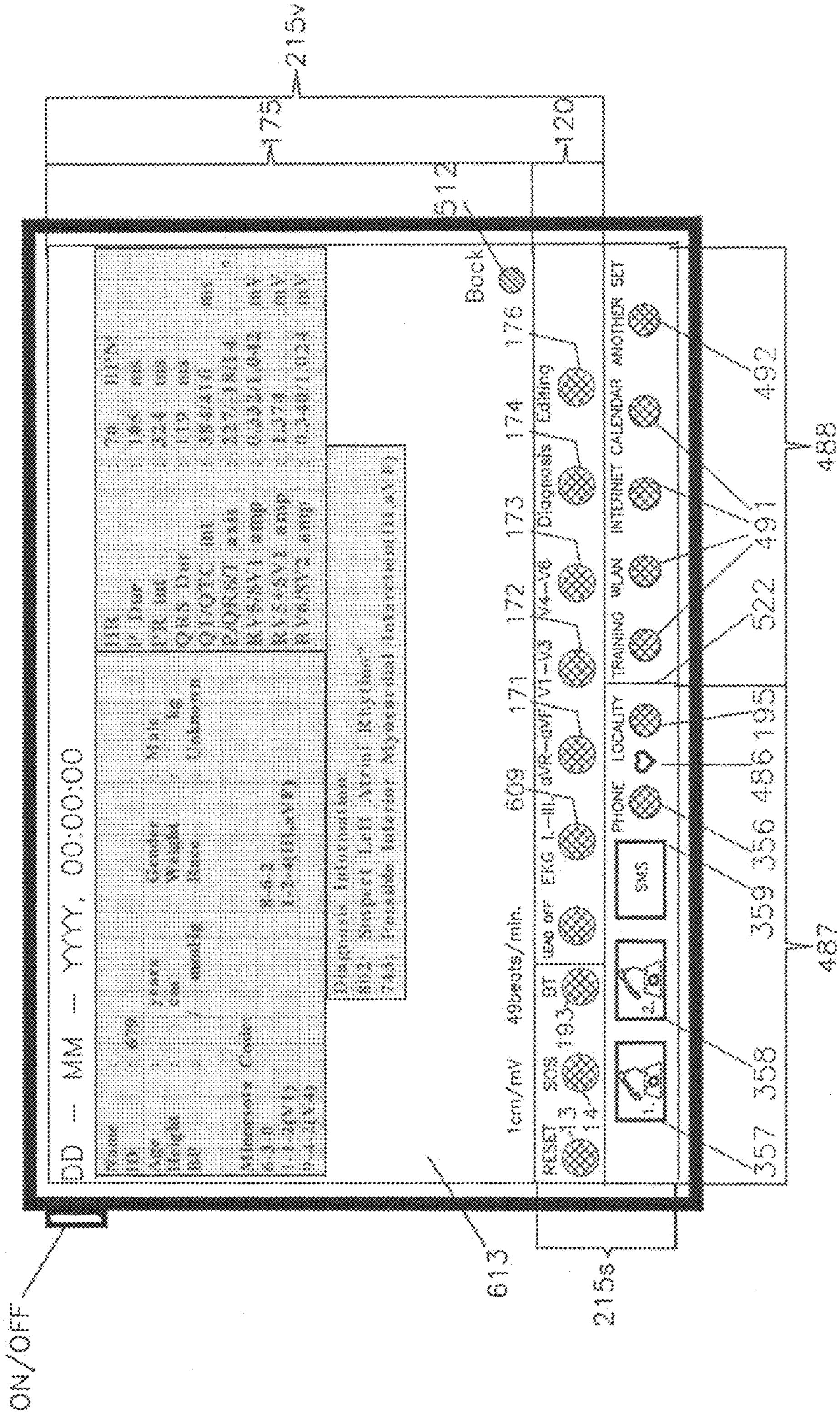
Fig.45 C1''

Fig.45 C2
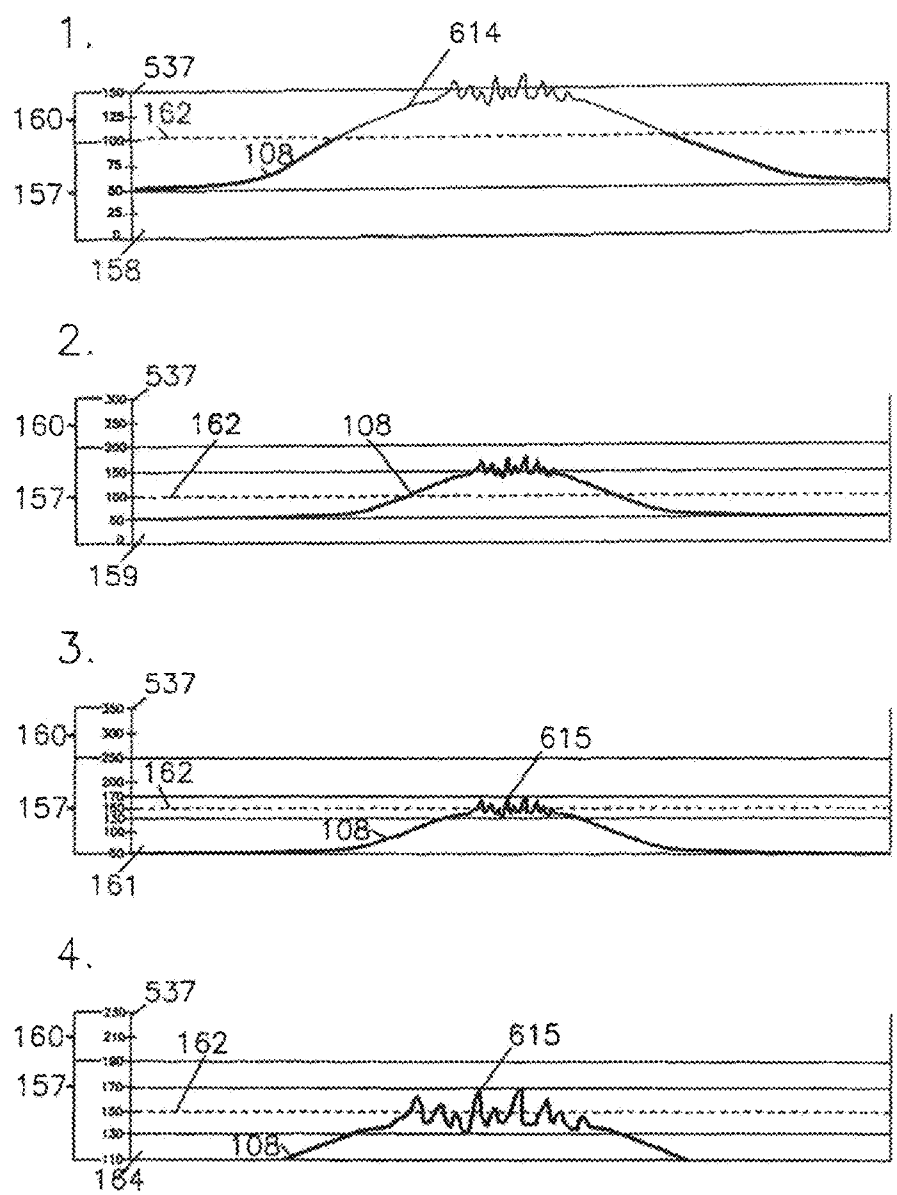

DETAIL 183

LOCALIZATION AND ACTIVATION OF ALARM OF PERSON IN DANGER

TECHNICAL FIELD

The invention concerns the activation of alarm of persons in danger, where the monitoring system will set off the alarm when the monitored persons fail to show alertness or movement, or when other monitored functions are beyond the set limits, indicating that the persons are in danger. It is possible to set the delay of the alarm activation for movement and alertness, where on a warning signal the activation of the alarm, before actually being activated, can be manually reset to confirm the normal condition, so that the delay of the alarm activation is counted again from "zero". For the monitored functions, the alarm may be reset and is repeated at a set time with the possibility to automatically state the location of the monitored person when calling in the rescuers.

Further the invention concerns the device for enabling of localization of persons in case of danger and monitoring of their condition. Device may be realized in the connection with activation of alarm for persons in danger.

BACKGROUND ART

With stationary devices, the current technology allows for setting off the alarm on the basis of monitoring persons in a room where they are usually located using a movement sensor. On the sensor, it is a technician, not a user—the monitored person—who sets a time period within which the system must record the movement of the monitored person, or it will set off the alarm, which is transmitted to the surveillance centre. The drawback is that unless the monitored person moves within the preset time period, the alarm will go off without the monitored person being able to stop it. For that reason, the monitoring times are preset at relatively long periods of 10 to 12 hours. After such a long time during which the monitored person may become incapacitated, particularly if this happens at the beginning of the monitored time, it takes hours before the alarm is set off, possibly causing help to come too late. To prevent frequent alarms, the time for setting off the alarm cannot be preset at a shorter interval. Moreover, each adjustment requires an intervention by a technician, which is costly and prevents the monitored person to reset, and therefore to stop, the alarm before the technician is being called in, which poses a burden on the surveillance centre as it must check every alarm. Only a sensor is used for monitoring movement, indicating an overall movement of the monitored person, which in certain cases may not be sufficiently precise and may lead to a failure. Before any action the surveillance centre staff may contact the monitored person to check whether the person is incapacitated.

To this end, it uses a speaker phone, which is automatically activated at incoming call from the surveillance centre. If there are more rooms on the premises of the monitored person, these phones must be placed in all rooms to ensure connection, which is costly. Also the monitoring movement sensors must be placed in all rooms to be monitored. The monitoring system which monitors persons for movement and therefore activity is stationary under current technology, which means that it cannot be used by monitored persons outside the premises where it is installed. However, it is also outside the monitored premises that a monitored person may be incapacitated. The current devices do not monitor a normal reaction of the monitored person, but only the person's movement. The movement itself, for instance during a fit accompanied by compulsive movement or a movement of a person that does not have control over himself/herself due to mental indisposition, may not mean that the monitored person is in full possession of his/her senses and not in danger. Nor do the current devices monitor the heart rate or other functions that inform of the health condition of the monitored person and provide an automatic alert in the event that any values exceed the preset limits, it means when an emergency occurs. With stationary device, the surveillance centre cannot connect to the monitoring system on its own initiative to check health functions, particularly to check the degree of danger. If mobile devices, such as mobile phones or other transmitters such as transceivers, are used, they only serve to continuously or periodically transmit various pieces of health information rather than to notify of a state of emergency, which is not assessed at the location of the monitored person. In particular, there is no alarm or automatic data transmission if the monitored functions exceed certain limits and the monitored person is in danger. In addition, mobile phone systems totally lack the above-mentioned functions to monitor movement and confirm normal reactions and other states of the monitored person with assessment at the location of the monitored person and automated alarm indicating the state of emergency; they also lack the option of setting the alarm delay or resetting the system before the alarm is actually set off. Current mobile phones used to emit emergency signal when the monitored person is in danger allow sending the exact location established through the GPS to the surveillance centre. The disadvantage is that the GPS only works in an open space with a direct line of sight to a sufficient number of satellites, which means that it does not work inside buildings and areas shaded by them. These drawbacks of the current state of technology are partially dealt with by patent no. PV 2010-419, applied for by its inventor. The present invention, which is being filed, addresses the drawbacks mentioned above to the extent they have not been addressed by the said patent; the drawbacks which have been addressed are now addressed in a better way and in greater detail, allowing better results. This particularly involves the test of normal reaction, the localization of the monitored person, the prompt display of health functions, for instance, on a band, adding more sensors allowing the displaying of the heart rate behaviour and the ECG graph and their evaluations, including an automated alarm when the values normal limits, as well as other aspects. The new elements of the invention are at the same time the objectives of the filed invention; the description of the invention includes descriptions of functions addressed in the previous invention, adding new elements which improve the original solution. This method has been chosen because it allows for a complete and clearer explanation of the essence of the newly filed invention; if the description of the previous invention mentioned in the application were omitted, this application would be less complete. The existing technology enables also the indication of location by using of GPS in case it is required. In patent PV 2010-629 is solved automatic indication of location and transmission of data to the surveillance centre in case of danger or indication of location by using of GPS of network of mobile operators and localization by radio transmitter upon the request. Par example, when the monitored persons are not announcing themselves and search is started, the respective person can be out of range of GPS. It means that the location cannot be identified by ringing of device, that could specify the location, by GPS. In the patent No. 2010-629 were described partly the ways and advantages of handling and imaging of device from the device placed as wrist band. These ways are completed in the patent presented now. In patent PV 2010-629 was described the set of devices for monitoring of respective person and communication, where the individual units can be used accordingly the need and can mutually managed. In this patent the use of set is substantially enlarged and ameliorated. Par example better imaging of curve of pulse, arrhythmia and ECG of monitored person is achieved and imaging of surveillance centre and monitored person described in patent PV 2010-629, as well. In the current status of technology there is not any way of fastening of ECG electrodes than by sticking.

The objective of the invention is to create a personal emergency alarm device, where the monitored person could prevent false alarms from being set off, particularly when monitoring movement of persons in the event that there is no movement and the person is not in danger; they delay cloud be preset by the monitored person. Second, to allow monitoring of normal reaction with the option of preventing the alarm and setting the alarm delay by the monitored person. Third, to create a device that would allow monitoring and communication on the entire monitored premises without having to set up phones and sensors in all rooms. Fourth, to create a device that would serve to monitor important functions, evaluate them in the location of the monitored person and set off alarm in emergency not only in the rooms of the monitored premises, but also outside it, wherever the monitored person is located. Fifth, to allow for heart rate monitoring and the monitoring of other health and other functions which may be important for the monitoring of the status of the monitored person, with an automatic alarm in the event that the function exceed the set limits; all this would be evaluated in the location of the monitored person who could prevent any false alarm. Sixth, to allow the localization any incapacitated person by other methods than GPS. The another objective of invention is the amelioration of current technical condition by creating of device that enables localization of monitored person thought it is not possible to identify by GPS the coordinates of location where is the monitored person at the moment of start of search. Further to make device that has chance to cooperate with device for alarm activation for persons in danger described in patent No. PV 2010-629. Further the amelioration of device forming set that can be additionally completed and adjust the devices accordingly requirements. Further to ameliorate test of normal reaction. Further the imaging of course of arrhythmia and its calculation and ECG for monitored person and surveillance centre. Further to create device for imaging of EGC values and pulse without sticking of electrodes.

BRIEF SUMMARY OF THE INVENTION

The disadvantages of the current technology are removed and the objective of the invention is met by the personal emergency alarm device. The function of the device basically consists in automatically reporting the readiness to send alarm to the surveillance centre with a warning signal if the movement sensors do not detect any movement of the monitored person. It also involves other sensors monitoring the health functions of the monitored person, which are conveniently evaluated at the location of the monitored person. When the set limit is exceeded, the device immediately indicates readiness to set off alarm by a warning signal of a preset length. The device also contains a reset unit which enables the monitored person to reset the alarm during the warning signal before the alarm is actually set off, or otherwise the device will set off the alarm. The delay for starting the warning signal for movement monitoring may be set by the monitored person. The delay is the time interval within which a movement must occur. Should a movement occurs, the movement and other sensors that monitor movement reset the set time interval, so that it runs again starting from zero. If no movement is detected within the set time interval, the warning signal is activated. When monitoring normal reaction, the reset of the delay for movement and other sensor alarm is conveniently switched off, so that the reset must be executed by the monitored person after the expiry of the set time interval for confirming normal reaction, regardless of whether there is any movement. The device also allows the monitoring of heart rate and other health functions. If permitted limits set for these functions are exceeded, the monitored person is conveniently notified using a warning signal, so that he/she may reset the alarm without it actually being set off. After reset when monitoring movement, the delay automatically runs again from zero for a preset period of time before activating another warning signal before alarm. If limits are exceeded when monitoring heart rate or other health functions, the warning signal is activated immediately. The alarm may be reset by the monitored person during the warning signal. If conditions for setting of the alarm do not cease after the alarm is set off, the device will activate other alarm warning using a warning signal on the expiry of a delay set by the monitored person. The delay may also be set by the surveillance centre, including exclusively, if necessary. If the reset is not activated, the alarm is set off. The option of resetting the alarm of exceeding the limit for health functions may be cancelled by the surveillance centre. The data from the sensors are concentrated in the central control unit for the purposes of evaluating the alarm. With a stationary device communicating via phone lines, the central control unit is conveniently located in the monitored space. After being evaluated, the data is conveniently forwarded to the surveillance centre on request. In the event of alarm, the data may conveniently be forwarded automatically. The important thing is that the state of emergency may be evaluated in the monitoring device on the part of the monitored person and the alarm is set off only in case of emergency, with the possibility of simultaneously forwarding the data from sensors, indicating the state of emergency. This means time savings in communication channel traffic as compared to systems with data evaluation in the surveillance centre, where data is streamed continuously or at relatively short intervals for evaluating the state of emergency. However, there are delays in declaring the state of emergency with these systems, depending on the frequency of data transmission. With devices that meet the objective of the invention, it is possible to only transmit the alarm signal rather than the complete data, which is easy from the communication point of view. The data on the condition of the monitored person may conveniently be transmitted only on request. The movement may be monitored not only using movement sensors, but also using other sensors such as shock sensors or footstep sensors worn by the monitored person to eliminate error from only one type of movement sensor.

The possibility to set a time interval for setting of alarm and reset by the monitored person enables to conveniently set a shorter alarm delay as compared to systems where the setting is done by a technician, which is costly, cannot be done immediately, does not lend the possibility of a reset by the monitored person in the event of a false alarm. The monitored person may from time to adjust the delay, for instance at a shorter interval for everyday activities and at a longer interval for sleep. A shorter alarm delay has the advantage that in the event of incapacitation, help may be called earlier that with the current system, where a longer delay is set to prevent false alarms, since no reset is possible. In the event that the monitoring system records the cause of the alarm, the monitored person may use the reset function to prevent setting off a false alarm. This will make the operation of the surveillance centre less costly, particularly if it monitors a large number of persons. Using this new technology enables the surveillance centre to only with actual rather than false alarms. Reset may conveniently be executed remotely using a wireless device, which the monitored person can operate anywhere on the monitored premises from the reset block.

Since the detection of movement by itself does not mean that the monitored person is not incapacitated, for instance during fits which elicit compulsive movement or for other reasons, it is possible to conveniently switch off the reset with movement and other sensors by the monitored person. In that case, the monitored person must react to the warning signal, which is regularly transmitted by the monitoring device, by pushing the reset button to confirm he/she is able to react normally, or else the device will set off the alarm. The time interval between warning signals is user-adjustable by the monitored person, including the option to cancel the warning signals altogether. In the latter case, when the set time limit for movement is exceeded, provided that the reset is not activated by the sensors and the health functions are outside the limit, the alarm is set off immediately. The alarm may also be switched off.

The monitored person may conveniently carry a mobile phone to communicate with the surveillance centre through a basic phone unit located on the monitored premise, so that there is no need to place speaker phones all over the premises. The monitored person may conveniently wear the movement sensor. The sensor may wirelessly be connected to the security centre on the monitored premises or the movement sensor evaluation unit, which may transmit information on the movement of the monitored person to the central control unit for evaluation. This will cut down on movement sensors on the monitored premises. The sensor worn by the monitored person detects even minor movements, such as rotations and forward bends, which would not be detected by a stationary sensor, mounted on the wall of the monitored room. Along with movement sensors, the monitoring device may involve other sensors, such as sensors to monitor heart rate, shocks, footsteps, etc.

The monitored person may wear equipment for measuring heart rate, ECG, blood pressure, breath, body temperature, oxygen in blood or other bodily functions, which are important for evaluating the state of emergency of the monitored person and his/her health condition. This data are concentrated into the unit for evaluating sensors, which is worn by the monitored person. The unit will forward the relevant data to the stationary central control unit, which is located on the monitored premises. The control unit evaluates the data for setting off the alarm, if needed, and sends it to the surveillance centre in the event of alarm automatically or only at the surveillance centre's command. The health information may conveniently be transmitted as acoustic signal through a phone line, data through a modem or over the Internet.

The device for the activation of alarm fir persons in emergency, which serves the said functions in a stationary design, where the communication with the surveillance centre is conducted via a phone line, consists of the sensor unit, the central control unit and the communication unit.

The sensor unit conveniently consists of individual sensors and units for evaluating sensors. The purpose of the sensor unit is to monitor movement or health functions, such as heart rate, ECG, body temperature, breathing, etc. The sensors are evaluated and the processed data are forwarded to the central control block for evaluation, taking into account the delay of alarm for movement and normal reaction confirmation, as well as the limits for health functions and an alarm reset from the reset unit. If the preset time or health function limits are exceeded, the central control unit sends a warning signal. Unless reset, the alarm is set of. The central control unit is the central element of the device, which is designed to meet the objective of the invention together with the other units. The communication unit ensures communication with the monitored person and sending alarm to the surveillance centre on fixed lines. The reset unit conveniently consists of a remove reset unit, which serves the monitored person to reset alarm during the warning signal.

The above-mentioned data and information on the monitored person may be transmitted as data or voice through a mobile operator network using a mobile phone that the monitored person carries with him/her. The monitoring system may be mobile, which is made possible by the fact that the monitored person has the monitoring sensors with the sensor control unit and the central control unit on him/her. Alarm or other information, if needed, is transmitted using a mobile phone, which may conveniently communicate with the surveillance centre. This makes it possible to use the monitoring device also outside the monitored premises, wherever the monitored person moves.

The monitoring device may be combined: the stationary device described above may be used on the monitored premises, while a mobile phone and sensors, worn by the monitored person, may be used outside the premises.

The mobile, the stationary or the combined device will send a signal to notify the monitored person that some of the monitored functions or time has exceeded the preset limit and, as a consequence, the state of emergency has occurred. The monitored person may prevent alarm by a reset during the warning signal. The benefit of the solution is that the surveillance centre only has to monitor the functions when an alarm is set off, rather than continuously or periodically. The functions outside limit may conveniently be transmitted to the surveillance centre simultaneously with the alarm or upon request. If a mobile phone is used for voice and data transmission, the monitored person conveniently wears all the necessary sensors and monitoring devices connected to the central control unit, which evaluates them. In addition, the monitored person is connected via Bluetooth or other medium to the said mobile phone for the transmission of alarm data to the surveillance centre. The central control unit may conveniently located in the mobile phone or, alternatively, separately from the mobile phone. The abovementioned device for alarm activation may conveniently include a GPS device, which monitors the person's movement and complement movement and other sensors, which reset the alarm delay if a change of location, and therefore a movement in space, has occurred. The delay is reset in the event that the GPS device detects a movement of the monitored person. The GPS device may also send the location of the monitored person in the event of alarm. This enables the surveillance centre to send rescue directly to the location of the monitored person. Since the GPS system only works in an open space where satellites are directly visible, the GPS data are conveniently stored in a memory to allow tracking the route of the monitored person until the GPS signal is lost to locate the person more easily. From the moment of a loss of the GPS signal, the system may regularly ask the monitored person to report his/her whereabouts. The reporting may conveniently be done orally or using a keyboard.

The recorded data are transmitted to the surveillance centre if rescuers must be sent. Locations with no GPS signal may conveniently be located by mobile operators using location from mobile signal transmitters, such as BTS, upon the request from the surveillance centre or automatically upon request from the central control unit via a mobile phone. Since location obtained in such a way may not be sufficiently precise, for a detailed location the monitored person may conveniently carry a transmitter that transmits signals, which may possibly be impulse signals to save battery energy and improve power. The transmitter is switched on automatically on alarm or on request from the surveillance centre. The rescuers may locate the transmitter using a special receiver with rotating antennas to establish the directions of the highest-intensity signal from two spots and locate the monitored person at their intersection. In indoor conditions the direction of the highest-intensity signal is conveniently located using one antenna and is followed by the rescue team when searching fir the monitored person. This will make it easier to identify the monitored person's location. Appropriate devices and sensors may be used to monitor movement, heart rate and other health functions which are vital for monitoring emergency. During emergency or upon request, the data may conveniently and automatically be sent via a mobile phone to the surveillance centre in the event that it exceeds the preset limit or take on a value associated with alarm. When using the mobile phone, it is possible to apply reset by the monitored person, to set alarm delay or to use other functions, as specified for the stationary device. The surveillance centre may, particularly on alarm activation, conveniently connect to a stationary monitoring device located in the area of the monitored person or to a mobile device worn by the person to establish the values of the monitored functions and to communicate with the monitored person. A speakerphone may be switched on by the surveillance centre of the monitored person. The described alarm activation device may include a button to set off an emergency alarm, controlled by the monitored person. The device transmits the location of the monitored person. The emergency alarm may conveniently be activated by voice. Regular heartbeat is essential for establishing the correct functioning of the heart. It is necessary to set limits of irregular heart beat. The limit is expressed as a number of beats per a unit of time during which the number of beats differing in the time of beat from the average beat is monitored, where the time interval between beats is measured. Deviating beats may be excluded from the calculation of the average length of beat. Alarm is set off when the limit is exceeded. The limits may be adjusted. It is possible to exclude any speeding up or slowing down of the heartbeat caused by more or less intensive physical exercise by evaluating the regularity of the differing number of beats per a unit of time, where the average time of the beat is calculated while setting a shorter interval. The software to establish the deviations is located in the central control unit. It controls the unit and has been designed to this end.

Is some cases, the monitoring of the regularity of heart beat is not sufficient to evaluate whether the heart function is normal. During certain arrhythmias, particularly tachycardia, the heartbeat may be relatively regular with a normal frequency, but the atrium vibrates at a high frequency, which is an undesirable condition. On the contrary, during a sinus, i.e. normal, rhythm, the heartbeat may be irregular, caused by extra-systoles or preliminary contraction.

That is why the described device can not only compare the heart rate, but using a two-lead ECG also the normal sinus behaviour of heartbeat taken as a standard, to the measured deviations, particularly in a larger number of regular waves or P-waves during tachycardia or F-waves during fibrillation, or other changes against the normal condition, which testify to atrium vibration at a faster or irregular pace. It also evaluates the disappearance of the P-wave, testifying to arrhythmia, particularly the atrium fibrillation. These and other irregularities, which may testify to a serious condition, such as myocardial infarction, will set off the alarm and transmit ECG curve upon the surveillance centre's request or automatically.

The alarm, raised by the comparison of curves or the irregularities of heartbeat mentioned above, may be switched off if the monitored person suffers from arrhythmia, which means that he/she has irregular heartbeat, or another irregularity. The monitoring of minimum and maximum heart rate is important during arrhythmia, too. When the limit is exceeded, alarm must be set off to indicate possibly life-threatening conditions. A timely detection of any deviations in curves while setting off the alarm is also important for persons with a sinus heartbeat in order to conduct a fast medical evaluation and intervention to try to remedy the defect, if needed. Based on the provided curves a medical doctor may determine whether it is a life-threatening condition and, if so, arrange for the transport of the monitored person to hospital.

The device for the activation of personal emergency alarm enables in the function menu in the control unit to set the delay, on the expiry of which a warning signal is activated. The monitored person must react to the signal to confirm normal reaction, using the reset from the reset unit, otherwise the control unit will set off the alarm, which will be sent through the communication unit to the surveillance centre. The reset may conveniently be executed also by the sensor unit, particularly the movement sensors, for instance the movement sensor, the footstep sensor, the position sensor and other sensors indicating that the monitored person is physically active and therefore not in danger. The control unit may conveniently evaluate health functions supplied from the sensor unit, such as heart rate, ECG, body temperature and other functions. The warning signal is automatically activated in the event that any of the functions exceeds the limit. The monitored person may react to the warning signal with a reset, provided that the notified alarm is evaluated as false. Otherwise the control unit will set off the notified alarm. The control unit may activate the location unit. The transmitter, which is a part of the location unit, allows to locate the position of the monitored person through locating using at least two directional antennas with a receiver. The display and control unit is conveniently equipped with a wrist display to immediately monitor the health functions by the monitored person, without the necessity to take the mobile phone, which may also be used to display the functions. Essential control elements may be located here, duplicating control functions, for instance in the control, reset and communication units for immediate control from the wrist display. These elements include, for instance, the reset button, the emergency call button, and others. The wrist display may also conveniently include elements for voice communication, such as the earphone, the microphone, or the speaker for loud communication, which be immediately used through control elements in the wrist display without having to handle the mobile phone. The difference between the stationary and the mobile devices for the activation of personal emergency alarm consists in the use of phone lines for the stationary device and a mobile phone for the mobile device. An important feature of the alarm activation device is that should the connection between individual units fail, the device automatically resets the connection and establishes it again. After several unsuccessful attempts at establishing the connection, the control unit will send a warning signal, notifying the monitored person that some health or other functions are not being monitored. The control unit may be designed as an independent unit or may conveniently be comprised in another unit, such as the communication unit, running in the background of the main program in the microprocessor, which controls, for instance, the mobile phone in the unit. The run in the background is enabled by a program compiled to this end. The main program is in charge of controlling the mobile phone. More information to the individual units: The sensor unit consists of the individual sensors, some of which are generally available on the market, while others are modified or developed for the purposes of the invention. Modified sensors include the movement sensor of the mobile device, which has been modified to be worn on apparel to detect movement. The control unit controls the other units, evaluates data, initiates sending the warning signal or setting off the alarm. It consists of a central control unit, controlled by a microprocessor. The microprocessor is controlled by a dedicated program which meets the objectives of the invention. The reset unit consists of a reset unit with a remote control of the control unit. The control buttons may conveniently be doubled, in which case the reset and the emergency call may be activated using either the control unit or the mobile phone. The display unit consists of a wristwatch with a display. It is located on a wrist strap, enabling to read quickly various data, such as heart rate and its development, either in a numerical form or using curves. Should any data exceed the limits, the warning signal may be activated. The display functions are taken care of by the microprocessor unit in the wristwatch. The display unit may be equipped with control functions to enable quick control from the wristwatch. Another advantage is that the display unit may be equipped with a voice communication feature to enable phone conversation via speakerphone. This is conveniently implemented using a remote connection between the communication unit and the display unit. The communication between the display unit and other units is conveniently implemented using a radio or Bluetooth connection. The location unit consists of a frequency transmitter with an activated control unit, which can be located with directional antennas.

Further disadvantages of current condition of technology are removed and device for localization and alarm activation of persons in danger is the objective of invention by which the data about location of monitored person, obtained by GPS are with advantage continuously transmitted in set intervals from block of localization via communication block by means of data communication 2G or 3G or the other in the network of mobile operator to the surveillance centre. They are kept there a enable at the moment of start of search to have the available route that the monitored person followed until the eventual lost of contact. In case that the monitored person is out of reach of GPS automatically with the advantage, or on the command from surveillance centre, monitored person is located by means of network of mobile operator disclosing where is located in the cover of mobile network. Target of localization is communication block which has the monitored person and is formed by mobile phone, which is the actual advantage. Coordinates of location are transmitted advantageously by means of suitable data network or by voice channels of mobile connection or firm telephone lines by modem or other media of the network of mobile operator either directly from surveillance centre or par example via communication block to the block of central control placed at the monitored person or to both of them accordingly the choice of surveillance centre. Transmission of coordinates from the network of mobile operator advantageously occurs periodically in chosen intervals. Data about locality obtained from GPS and when is available or localization by means of mobile operator as described above, are advantageously sent from communication block par example via network of mobile operator from distance by suitable data network or alternatively by voice connection, par example mobile line by modem or phone to surveillance centre. Transmission of coordinates can be done manually or orally by indication of password of monitored person, with possibility of remote handling by surveillance centre, accordingly the need.

Automatic transmission of coordinates in preset intervals is possible. The monitored persons indicate their location, par example by means of suitable data network, advantageously on command of surveillance centre individually or in regular preset intervals announced automatically, by visual or vibration signals, when GPS is not available.

Monitored person indicates her location by means of block of central control to communication block and from this point to surveillance centre par example by voice via mobile connection or after encoded via suitable data network or by text prepared on keyboard via suitable data network or by SMS message and informs surveillance centre where she is or where moves.

Monitored person, appealed to indicate her location, can advantageously select the preset locations where can let imagine on the display by means of respective buttons. On the displayed list can be the locations where the monitored person often stays, such as school, class room, shop or detail of route alongside often moves par example certain street, tube or park. From the offered possibilities which can be on the list she can select, advantageously by pressing of button one of them and after the activation by respective button the information send to the surveillance centre. It has advantage in quick manipulation without disturbing of surroundings.

In case that monitored person does not indicate her location after being appealed from surveillance centre or on the basis of respective announcing signals, surveillance centre can require the indication of location by phone. In such a case the automatic voice communication "hands free" can be advantageously activated, par example after preset number of ringing tones when the call is not received and when communication block receives call and switches on hand free communication automatic receiving of call or voice communication can be activated also by command from surveillance centre par example by means of suitable data network.

Activation of switched off ringing tones of incoming call can be filtrated by password par example when the call is repeated in set time limit after certain number of previous calls in case that they were finished after the set number of ringing tones. With advantage of device after certain number of ringing tones, call is received and orally asks the caller to indicate the password, by voice or key board, and when surveillance centre approves it as correct, switches on the ringing. This scheme of calling serves with advantage for elimination of par example unimportant calls, that came in another order and the monitored person is not disturbed par example when sleeping, by unimportant calls. Password can be in form of data for use via suitable data network.

With the advantage can be voice communication ensured by loud speaker or microphone in external voice unit placed in surveillance centre with advantage fastened on wrist band where is good audibility ensured.

Alternatively it can be ensured in external voice unit placed par example on the dress, in pocket of jacket or on lapel, with distance connection to block of central control. There load speaker is heard well and microphone can register voice of monitored person without her manipulating with central control unit per example to take off it out of clothes. External voice unit can provide with advantage "active" loud communication (hands free), i.e. duplex, or "passive" i.e. one-way communication, to surveillance centre, it means wiretap, with advantage activated by surveillance centre par example via suitable data network or monitored person by buttons or voice command with respective password registered by microphone for such a purpose activated and evaluated in central control unit. Only passive wiretap i.e. one-way do the surveillance centre is chosen with advantage in case of kidnapping for the kidnapper not to be able to know that the connection was set. Dial of mobile number of surveillance centre with activation of loud communication as well as receiving of call can be advantageously activated by blow on temperature sensor placed par example in the reach of breath. "Hands free" communication is used with the advantage by localization, emergency calls or when the monitored person is not able to receive or start call, especially in case that there is not any connection with GPS. Voice unit can contain with the advantage the control segment which enables receiving and ending of call and switch over to the loud communication that with the advantage by receiving of call is automatically switched on, on phone communication with earphone and microphone for putting to ear. Also temperature sensor can be placed inside, reacting with blowing and by it the call can be received or ended, which is the advantage when user can not receive the call manually. Par example when he is incapacitated. In voice module cam be placed camera with the advantage and form voice and visual module. Camera can scan upon the request, permanently or periodically in set intervals transport the snaps of surroundings into the surveillance centre via block of central control. Camera can indicate also the moving of monitored person showing the physical activity and moving of monitored person and reset the interval during which the monitored person should report and therefore perform the task of movement sensor, how it has been already described. External voice unit is advantageously place in such a way that the camera can shot the surroundings of monitored person, par example inserted in the pocket of jacket or shirt, with upper part of voice module tops the upper edge of pocket, so the camera placed there may shot over the edge of pocket in front of monitored person. Camera and eventually passive wiretap of surroundings is possible to be switched on by blowing or button from up side of the external voice unit without further manipulation, therefore it is not necessary to take it out the pocket, which is valid also for activation and ending of "hands free" call. For operation by means of earphone it is possible advantageously to take out the voice unit from the pocket by one grasp of left hand, activate the call by thump pressing the button, end it and put it back inside the pocket. Display is advantageously placed from upper side of voice unit and monitored person can follow it even when inserted in the pocket. In enables "touch" manipulation and handling of voice unit without taking out of pocket. Clamp placed on the bottom part of voice module enables to set up the vertical position of voice module in the pocket for good shot of camera. It is reclining, for easy insertion into the pocket and spring returns in the starting position. Loud speaker and microphone, placed on side in upper part of voice module is open to the free surroundings and enables function of "hands-free" connection. For operation with earphone is this piece placed on side of voice unit at the jacket or shirt for to get easy manipulation in order to enable its putting to the ear by one grasp, without necessity of handling of voice unit. Removable cord, for hanging on the neck is advantageously used, when there is not available any pocket for placement of voice module. The advantages of voice unit find their use although it is part of central control unit on which they will be passed. External voice unit or central operation unit, advantageously formed by mobile phone, or another unit, can be advantageously secured against forgetting to take it when leaving, when it is put aside, par example on the table, or against stealing or possible destruction in case of kidnapping. Securing is possible to do advantageously by warning signal initiated by central operation unit or another unit, in case of cut of connection with unit with which communicates by data or by means of signals. The further securing is developing of warning signal, or immediate alarm in case of opening of cover of unit without application of correct code. So the kidnapper cannot take out the battery without to cut the connection without alarm, but also cannot move away the unit so the central surveillance unit has the information not only about the actual position of GPS and position of absolved route stored in the memory, which the central operation unit sends in case of alarm together with snaps from camera, but also about the current information of running action, par example kidnapping, because central operation unit does not cease to transmit the data. Warning signal is changed to the alarm when not reset by monitored person, with advantage of password. Another securing of indicated unit with the advantage can enable the switching off unit, or release of locked keyboard, only after indication of correct password. It has advantage in the fact that kidnapper cannot switch off unit, release the battery, or move away it from monitored person without alarm, unit is always active and transmits the coordinates, snaps from camera and is monitoring the sound. With the advantage the pictures from two cameras are transmitted, placed on both sides of external voice unit, or central operation unit, because one of sides is placed in front of face during the manipulation with unit, in order to see it and one of the cameras can make his snap and send it to the surveillance centre.

In case that the monitored person is taken with kidnapper, she can for the purpose of concealment by the passive loud operation of "hands free" comment the route in secret way, by using the agreed words.

For such a purpose the monitored person can switch on the microphone by programmed password, which is stitched on in emergency status and advantageously react on the voice passwords. Password for the cheating of kidnappers advantageously has not any link with the call for help After the evaluation of password the central operation unit can send the signal of call for help after which the surveillance centre can connect itself with the advantage to the passive wiretap by means of microphone which was automatically switched on and by another password to activate the loud communication. It can be activated also by one or more blowing on the temperature sensor, accordingly the programming. After catching of password the loud speaker is switched off during starting of connection and ringing tones for not top warn kidnapper by loud operation that the connection with surveillance centre is in the stage of passive wiretap, eventually that the help is on way. For switching on the loud speaker the different password can be programmed or further number of blowing.

Transmitter in the block of localization placed on the monitored person enables her localization by radio signal even when the GPS coordinates are not available at the time of searching notwithstanding whether the searched person founds herself in terrain or in the building. For transmission of radio signal to block of localization advantageously, is used pulse transmission, when transmitter is regularly switched on for short period but higher output. This saves energy of batteries and enables to increase output—this can increased from remote surveillance centre in case of need or to switch over to non-pulse transmission for quick localization in case that there is strong receiving. The more precise localization of transmitter can be obtained from the last place of coordinates received, or indication of location by the monitored person on route of moving from portable receivers. In object moving will toward the strongest signal. For to distinguish monitored persons, is possible to code the transmitted signals. Search by means of transmitted signals is to be used in case that the localization by GSP is not available, par example when kidnapper removes the GPS unit. With the advantage more hidden transmitters are used, switched on par example from distance, having as limited as possible number of further functions for to be of miniature dimensions and can be better hidden. The transmitters can be placed with the advantage masked par example in watch, in bracelet or clothing. Similarly more hidden GPS modules with communication block can be used that can transmit not only GPS location but there is possible their localization by mobile operator. The block of localization hidden in clothing or GPS module can be secured with the advantage against removal, par example by in-contained contact magnetic sensor, whereas one part is fastened in the clothing and other on the block of localization, it means, that after removal of block of localization alarm is sent with the advantage, via block of central control or own communication unit, on impulse of magnetic sensor at remote attached part that remains in the clothing. The next securing is loss of connection with central control unit when the alarm is on. These reserve transmitters and GPS modules are advantageously switched on from distance or automatically and enable localization in case when primary device is stopped to be in operation, par example when kidnapper makes primary devise incapable. These transmitters and GPS modules are placed with the advantage on bracelets which signal the alarm via communication block GSM in case that it is undue after taking off wrist.

With the advantage is possible to place the localization unit not only in the central control unit, but externally as well and connect it with block of central control par example by bluetooth, ANT, radiofrequency analogue or digitally modulated connection, cable or by means of another media. Further advantage is possibility to place communication block par example GSM in the external unit of localization. By such a way the independence of this unit is reached and unit can individually report the GPS data without dependence on block of control and from surveillance centre is possible to switch transmitter from distance. Eventual doubling of unit of localization happens in case that the second unit is put into the operation on the top of it.

External unit of localization exchanges periodically with the advantage code with control unit and in case when is not received both units announce alarm and send GPS coordinates. By such a step it is secured that par example the kidnapper cannot remove external unit of localization or block of central control without alarm provided that he does not remove both at the same moment.

It is possible to install into the external unit of localization the different sensors, with the advantage. So par example the position sensor advantageously activates the announcement of alarm in the stage of emergency, if monitored person is in horizontal position since certain time. Such an alarm is possible to reset by monitored person. With the advantage is possible to place into the external unit of localization further sensors indicating emergency case internally or with remote connection, par example motion sensor, pace sensor, shake sensor of heart pulse and another. With the advantage the unit of localization is connected par example by Bluetooth, ANT or radiofrequency connection with camera, which can placed advantageously par example in clothing or suitable voice module for to be able to scan surroundings and transmit snaps to the surveillance centre upon the request, via block of central control. It can take over, with the advantage, majority of indicated functions and let to remain minimum number of other units in block of localization, par example transmitter, eventually GPS and communication block and reach the substantial diminution of itself that leads to the chance to hide it par example in clothing from eventual kidnappers and secure in such a way possibility of transmission in case of searching in spite of the fact that the block of central control is incapacitated.

How described in block of localization it is possible to place more units and parts because of advantage of higher functionality and disadvantage in bigger size of device and therefore problem with its hideout.

The security is increased when device for localization and activation of alarm of persons in danger in regular intervals appeals the monitored person, par example by voice acoustic signal or vibration, to send signal confirming that she is in order.

This signal can be numeric and advantageously coded whereas for stress situation it can be stipulated the special code that has advantage par example for keeping in secrecy call for help par example in case of kidnapping. Codes can be given by keyboard or voice, with the advantage. Code is evaluated by central control unit.

With the advantage the code is calculated from prescribed key, par example by multiplication of actual hour by respective number or by option even more complicated. In such a way it is possible to verify the ability of monitored person to react readily.

The delayed or wrong reaction evaluates the central control unit and sends automatically alarm to the surveillance centre. It is possible to use it not only for persons in health danger but also par example for testing of alcoholics if they are sober, consumers of drugs if they did not take in it or drivers if they are not tired and able to drive safely. After finding that the monitored persons have no normal reaction the alarm is started with the advantage not only in block of control at the monitored person but also in surveillance centre and it is possible to use block of localization for their localization and sending of help. Both in case of drivers and alcoholics and drugs consumers it is possible to realize the test of straight walking, par example on the edge of pavement on kerb periodically or when they would not pass the test of normal reaction for verification that they are not under influence of alcohol or drugs. The instruction is to go straight whereas the camera placed on monitored person is activated that scans the surroundings and enables to consider the straightness of walking. Picture is sent advantageously to the surveillance centre where is visually evaluated.

Evaluation is possible to do also automatically by block of central control by SW program comparing the deviations of walking. In case of non-accomplishment of test the alarm is announced. Camera can be placed in clothing, bracelet or put in central unit of control, with advantage containing mobile phone with camera, handed in hand in such a way that camera can scan the surroundings. With the advantage the second camera is place on the opposite side of the first camera on central control unit, therefore scans simultaneously also monitored person for confirmation that test is effected by monitored person and not anybody else.

Device for localization and activation of alarm of persons in danger with the advantage can be formed by set of blocks and central control units which communicate one with each other and mutually control themselves.

Blocks, par example of sensors or localizations, are advantageously connected to the block of central control which handles them. This can be formed by one or more central control units that communicate one with each other and mutually control themselves. One of central control unit can be chosen as primary one to which are subordinated all secondary units. Selection of unit which should be the primary one is given by SW that is handling all central control units. To this primary central control unit are brought advantageously via bluetooth, ANT, cables, analogue or digital radiofrequency connections or another communication medium, therefore whatever communication medium, not only secondary units but also another blocks, units, modules and sensors.

With advantage is possible, by SW of respective control segment to change any secondary unit into primary unit and on the contrary. In set there is advantageously programmed only one unit as prime central control one. Therefore by change of some from secondary units onto prime one, the original prime unit is been changed onto secondary unit at the same time. To the new chosen primary unit are then, accordingly the need, switched over blocks and units originally connected to the original primary unit. In case of bluetooth, ANT and further by SW controlled interconnections, the switch over of entry signals with advantage is controlled by SW, in metallic interlinks are the connected cables physically switched over, par example by plugging into the respective connectors. This enables whichever from central control units not only to change accordingly the need from secondary onto primary but advantageously to use it individually or connected with other blocks. It enables from the beginning to realize set of any central control unit and select it as primary one and accordingly the need to add other secondary units and later to select another central control unit as primary one. Primary unit differs from secondary unit mainly in such a way that into it the majority of data and signals from further blocks has been brought, as well as from central control units, modules and sensors, when communicates with other secondary units, which are subordinated to it, by means of SW.

Also into the secondary units is possible to bring data, accordingly the necessity, from some blocks, central control units, modules and sensors. Mutual control of communication of central control units is possible as in case of primary units as in case secondary ones. Primary units as well as secondary units are possible to be equipped by buttons, keyboards, displays communication module and other parts. Secondary units then in case that are equipped in such a way, with advantage are doubling control, handling, voice and mobile communication as well as imaging of remaining units.

With the advantage is possible to choose bigger basic central control unit which with the advantage enables larger display cooperating with standby central control unit, with advantage of smaller dimensions with possibility of its placement on bracelet. Standby central control unit can readily take care for current communication, manipulation and imaging on display and for such purposes it is not necessary to manipulate with bigger basic central control unit. It enables with the advantage to choose one or more of bigger basic units with larger dimensions than it could be purposely made during exclusive manipulation from this bigger basic central control unit without possibility of emergency control from smaller standby central control unit when the bigger basic central unit has to be taken out off pocket par example at every call. Advantage at using of set becomes evident also in case, that smaller standby central control unit is not fastened on wrist, but par example in pocket in such a way that the emergency control is possible as well as voice communication and imaging without necessity to manipulate with bigger basic central control unit. From pocket, purse or any other storage place is to advantageously taken out only smaller standby central control unit which is controlled by bigger basic central control unit or the mutual control is used with the advantage. Bigger unit is also to be used for control and communication, par example when larger display or keyboard is needed.

It is enabled by the fact that control, communication and imaging is doubled with the advantage both in case of bigger basic central control unit and also standby central control unit with advantage of smaller dimensions. As bigger basic central control unit can be chosen either primary unit or secondary one. It is valid also for standby central control unit whereas at least one unit is chosen as primary, with the advantage.

Parts for communication in the frame of network of mobile operator can be placed into one or with the advantage for doubling of communication channels into more units. In this case the central control units can be used individually for mobile communication. Every from central control units can take over call or par example SMS, MMS message, coming in the other unit and communicate. In set can be more blocks and central control units. At the beginning is possible to operate set with reduced number of central control units, par example with one and gradually to complete it. Therefore with the advantage, is secured the communication among the central control units and their mutual control.

Central control units can be mobile phones, PDA or computers, with the advantage the pocket ones. Also in this case the advantages of set are asserted, because the trend of development of mobiles gives the priority to dimensions of display and keyboard as large as possible. But these are limited by difficult manipulation, because mobile phone is used mainly for calls and SMS, therefore for frequent current manipulation and it is necessary to take it out off the pocket or purse in which it is usually kept. But from there it is difficult to take out the larger ones. In case of set the taking of bigger basic mobile phone out off pocket is not necessary because the handy mobile phone takes care for current communication.

During the use of set it is possible to use bigger dimensions of basic mobile phones or central control units or pocket computers, which are mutually controlled with smaller standby mobile phone or central control unit which is used for current voice and data communication, par example phone call or SMS messages as well as imaging on display, so that it is not necessary to manipulate with either bigger basic central control unit or PDA or computer during the current talk. They are used in case of more particular operation, or if the larger display or keyboard is needed.

The advantage will be increased, if smaller standby central control unit is advantageously fastened on wrist band where suits to the emergency manipulation at once, without to take it out of pocket. At the same time it can be mutually handled and controlled by bigger basic central control unit or mobile phone, in the pocket, without taking it out and use its computer capacity and memory, so the current operation is fully validated in such a way as it could be done directly from basic central control unit or mobile phone. From basic central control unit is possible to do programming of standby central control unit. These advantages may be used also when pocket computer is involved which is by using of cooperating standby or basic central control station enlarged for possibility of mobile communication not only for call but also for data exchange par example via suitable data network.

In case that into the standby central control unit advantageously placed on wrist is not inserted SMS card or when the standby unit does not contain parts for communication via network of mobile operator, operates as control of basic central control unit in which is inserted SMS card and contains block of communication. Standby central control unit has the possibility, at the same moment, not only to hand over incoming calls, SMS messages and other data incoming to basic central control unit accordingly the need and equipment for these services which are subject of choice.

For saving it is possible advantageously to realize standby control unit without parts for communication in the frame of network of mobile operator. In such a case they have only control function, imaging, voice and data communication as described above.

In case that both central operation units, standby and basic, contain parts for communication via network of mobile operator, with the advantage is possible to use both mobile lines and whichever from central control units can receive calls and SMS messages as well as data addressed to the second central control unit. With the advantage is possible to receive at the same moment calls from both lines on one of central control unit so that one of lies is placed in the position "hold" or use both central control units individually for receiving of calls incoming to them. One of the lines can be advantageously reserved for emergency calls, par example from surveillance centre, second one for current operation. Therefore they are in set the central control units and blocks mutually interconnected for communication, transport of data, signals and other pieces of information and can be controlled mutually by themselves. Interconnection in set brings advantages against use of individual central control unit. Par example advantage at use of two units instead of one is enabling of use of basic central control units of bigger dimensions because it is necessary to manipulate with it in normal space which will absorb smaller standby central control unit that is better manipulated especially when placed on wrist. At the use of more central control units of different kinds and sizes it is possible to apply them accordingly the need and connect to them optional modules and sensors, which are adapted for operation in set.

Further advantage is supervision of one unit above the other one, par example through warning signal and eventual alarm to surveillance centre in case of loss of communication with second central control unit when being caused by stealing or forgetting before leaving. With the advantage the loss of communication indicates itself by loss of signal in the range of sound spectrum, par example 5.5 kHz induced by magnetic field from transmitting coil on receiving one, which has adjustable coverage approx. 1 m. Transmitting coil with generator can be placed advantageously in another central control unit by sound warning signal and in case that is not reset by alarm, sent by central control unit to surveillance centre. Alternative is the indication of cut of connection via bluetooth, with the advantage of third category, which has range approx. 1m between two units and evaluated by central control unit with the advantage.

For monitoring of persons in danger is important not only to observe actual heart pulse but also its regularity and level of eventual arrhythmia with possibility to screen it not only in surveillance centre, but also for monitored person with advantage on display of central control unit or on display placed on wrist band or with the advantage on both of them centre connected in the set together with other units. To imagine the level of arrhythmia also for monitored person is very important, for her to be able to regulate properly her activity eventually to do the respective measures, par example to adjust her activities, take the medicaments or call for help. At origination of arrhythmia the monitored person is exposed to higher risk.

The determination of level of arrhythmia aggravates changing heart pulse by change of physical strain, especially when in case of change of physical strain is necessary to determinate level of arrhythmia and take into the consideration whether heat pulse has been changed due to the increased physical strain or arrhythmia. With the advantage two different software systems can be used for the calculation of arrhythmia, making calculation of pulse by use of different methods, par example in such a way that from differently long time sections is calculated the average pulse. In case or irregular heart pulse each of both programs will indicate the different results. As higher it is difference in results as is higher the irregularity of pulse. The advantage of this method is that the change of heart pulse influenced by changed physical strain is not applied for appraisal of arrhythmia, because in case when pulse remains regular, results of calculation of pulse by both methods will not differ even in case of changed strain. From difference of both results can be calculated continuously by using of further SW program the average difference of pulse for the certain time section and imagine it. With the advantage it can serve as level of range of arrhythmia and with the advantage it can be screened together with one or two pulse frequencies calculated by different SW programs. The level of arrhythmia can be advantageously determined par example as level 1 from difference 5-10 pulses, 2 from difference 10-15 pulses, 3 from difference 15-20 pulses and further by always 5 pulses.

In such a way is possible to express the classification par example on the scale 1-5 when each degree is responding to certain range of differences of pulse frequency from both results. This data is possible to put also on display, with the advantage. The level of arrhythmia is possible to calculate by use of further method, par example from quantity of irregular pulses within certain time segment and this data to put on the display. The level of arrhythmia is possible to express also by percentage of irregular pulses from regular pulses within the certain time segment. With the advantage it is possible to imagine results from both methods. Also here is possible to evaluate arrhythmia by scale par example 1-5 whereas to every number or percentage of irregular pulses for time unit is allotted certain degree of scale.

All indicated data are stored in memory of block of central control and eventually in surveillance centre.

Memory enables to browse through history of record with advantage only by episodes with higher degree of arrhythmia that is degree destined by monitored person. For these episodes is advantage that it is possible to imagine detail current of heart pulse and other data, with the advantage also curve ECG, which is decisive for stipulation whether there is the case of presence of extra systoles, sinusoid arrhythmia of more dangerous fibrillation of auricles.

With advantage the curve of ECG can be scanned and screened by respective sensors not only continuously or in regular optional intervals but with advantage for episodes with arrhythmia above set degree. Scan of ECG with advantage is switched on by central control unit when the limit values are exceeded, par example pulse and arrhythmia. In such a way is saved the energy of batteries because imaging of ECG curve is transported from sensor mostly by bluetooth, which is energetically heavier than transmission by radio frequency by which is possible to transfer the heart pulse. Also the record becomes more transparent and saves the computer memory. ECG record, with the advantage, has possibility to be switched on by respective control element also by monitored person at the moment of sense of indisposition.

The monitoring of degree of arrhythmia of monitored person is important not only for sick persons but also for healthy beings especially during the sport activity when the continuing of activity with arrhythmia can be not only deteriorating for health but dangerous for life. Therefore, with the advantage for sportsmen is displayed the degree of arrhythmia beside current actual heart pulse, either in actual value or as curve or average degree of arrhythmia, as described above.

With the advantage are screened the curves in dependence on time axe of all indicated values, i.e. not only pulse frequency, but also degree of arrhythmia calculated by methods eventually from two different SW programs. With the advantage is possible these values and curves to place for better overview on more displays, which the monitored person can select accordingly needs.

With the advantage the indicated results especially degree of arrhythmia are shown not only on central control units stored in pocket but also on standby central control unit, par example on wrist band of monitored person, maybe even independently, but it would be possible to control them operatively.

They are transported to the surveillance centre, with advantage at alarm caused by exceeding of limits or in regular settable intervals where they can be assessed in the keeping with need.

In case of deviation from the set limits of pulse and arrhythmia values is with the advantage activated sound or vibration signal of warning of monitored persons, which one when not reset, raises alarm on surveillance centre. Majority of monitored persons will be able to learn to distinguish sinusoid arrhythmia from the more dangerous fibrillation of auricles or tachycardia where one of the main significant attributes is non presence of wave P. Central control unit can be programmed in such a way that this arrhythmia is recognized and in case when occurs, can raise alarm reset by monitored person. When arrhythmia is discovered with the advantage, central control unit automatically or manually, through monitored person, activates record of ECG, which is screened to monitored person at the same moment, who can restrict by reset its transmission to surveillance centre, if it is considered as unimportant or in the limit. The possibility of reset can be switched off during programming of central control unit. With advantage all important data about health condition are screened to monitored person who can select to display some of them from the offered ones, some of them she has with her and are smoothly assessable without interruption with the advantage, or at activation. This has such an advantage that the monitored person has permanent overview about her condition and on the top of it, is warned by warning signal in case that some of them turn aside the set limits.

She can reset the warning accordingly her consideration or let the mobile control unit to inform surveillance centre about her condition. In such a way the monitored person can prevent the glutting of surveillance centre pieces of information which monitored person may evaluate as unimportant. Data about imagined condition can be advantageously heart pulse, level of arrhythmia with curve, ECG diagnostic, pulse degree, variability, temperature of body, oxygen in blood, pressure etc. For monitoring of respective person it is important for to have readily available display of important functions and information either of health condition or for evidence of locations where she founds, serving for search in case of kidnapping, further about physical incapability witnessing par example about immobility, mental non-competency causing retarded or wrong reaction etc.

By means of this display and information the monitored person can decide if is necessary to send the information or imagined status to the surveillance centre or not, par example by reset of warning signal produced by central control unit in case that the monitored person evaluates information as unsubstantial.

Due to it, the glutting of surveillance centre of the pieces of unsubstantial information is prevented but the monitored person can respectively react. In case that the surveillance centre assesses monitored person as incapable to do such decisions can block possibilities of reset in case of certain lumps of information.

Such a display of important functions can be placed on one unit or at the same moment on more units connected in set, when the selected central units can present the same imaging on their displays as the other central control units. These ones have the chance to be controlled mutually so the set imaging is possible advantageously realize on one of them for all of others. With the advantage some of them can have larger display for detail imaging of curves, par example another can be smaller, standby ones placed on wrist, par example, for easy manipulation and immediate glimpse on display. Central control units can be formed advantageously par example by mobile phones or pocket computers. With the advantage the opening display is selected in such a way for to imagine the most important functions necessary for monitoring of health functions and personal safety. Transfer to next important imaging is enabled advantageously by pressing of only one button on this opening display. The opening button has advantageously the unchangeable part which not only imagines the most important functions, par example link to the bluetooth connection, functional GPS, reason for transmission of warning signal as par example disconnection of some of electrodes of pulse measuring or ECG and enables immediate one-button transfer on selected important pieces of imaging, as par example function of phone of transmitting of locations to surveillance centre and back to the opening display. Further, constant opening display gives the possibility of reset of warning signal and SOS call. The important advantage is the possibility to leave out one-button receiving of phone call or SMS without switching over on another imaging it means the possibility of uninterrupted monitoring of vitally important data on display. In constant part of display there is a line of buttons forming the set where is possible to exchange this set for another one, by which the capacity of optional one-button display is increased. In optional part of display there are, in upper part, imagined vitally important pieces of information such as pulse, arrhythmia, reactions, variability of pulse and level of stress. This part of display is not, with the advantage, changing in case of imaging of curves in the middle part of display, what means uninterrupted control of vitally important functions. With the advantage, is on the display possible by one button to go over to the detail imaging and setting in case of these functions. In the mentioned middle part is possible advantageously by using of one button par example to change following curves: pulses, arrhythmia, simplified ECG of the first curve, 12 leads ECG of curve I.-III. On every imagined curve, by pressing of edit button, is facilitated display of control of edition imagined in upper part of display by replacement of there placed displays with preserving of monitored curve. With the advantage it is possible to place imaging of 2 curves on opening display during the simplified view on important vital functions. With advantage imaging enables by means of touch buttons on opening display to fix limits of functions for transmitting of warning signal. Unique advantage is imaging of degree of arrhythmia which is important for checking of arrhythmia of monitored persons. The substantial advantage is edition of curves where is unique possibility to browse in history of current of curves, especially pulse and arrhythmia, with possibility to mark automatically or manually parts of curves for next imaging. It enables uninterrupted long-term evidence for one or more years. It is not possible, under the condition of actual status of technology, in case of curves of pulse, when the evidence is stored for maximum weeks and curves and values of arrhythmia are not imagined at all.

On the top of it the monitored person has no chance to follow "life" curves and possibility of reset, therefore prevention of their transmission to the surveillance centre, in case that they are out of limit.

In case of the first ECG curve is the advantage the possibility of imaging only of an sector deviating from normal stage, par example with missing wave "P", which is decisive for determination of sinusoid rhythm.

No less important advantage is possibility of setting of vertical measure of curves, vertical shift of them and increase of selected part of curve around the axe of zoom by which it is possible to set the observed curve onto the observed range and increase the important sector. It is not available at devices produced in the accordance of existing level of technology. It is important, par example in case of ECG curves, where during the feeble tension of heart signals the important parts of curve are not often visible, as par example wave "P", which is possible to increase by described way. Also the advantage is possibility of one button imaging of localizations, where the monitored person can, by simple manipulation, send to surveillance centre name of location where she just founds for tracing the route in case that she is disappeared from the preset group of locations. The advantage is also the easy edit of change of locations. The described advantages of imaging are not enabled by the existing level of technology. These are solved in the invention containing the description of unique way of imaging which substantively ameliorates the current status of technology.

With the advantage there is converter placed in set of devices which changes the received data and signals on various communication media and protocols to another ones and advantageously by means of intern microprocessor control units can process them and in such a way enables connection into set of devices communicating on various media and protocols as described on the figures, in several examples. Converter can be placed, with the advantage, in central control unit or in ECG control unit or be as independent unit advantageously placed on chest belt. With the advantage converter enables monitoring of par example heart pulse and arrhythmia, not only on the display of measuring watch adapted to such a purpose, but at the same moment on central control units equipped even for more detail imaging of data.

One type of converter, designated for this function, changes the signal transmitted from chest belt, from wireless transmitter on the principle of induction magnetic field of coil for measuring watch, on bluetooth, which can be received by advantageously formed by mobile phone. By this advantageously the transmission of data can be enabled not only to the receiver with display placed on the bracelet, par example in the form of measuring watch, but at he same moment to the mentioned central control unit. The advantage is that it is possible to imagine synchronously data and eventually the curves, which are at the same moment imagined at the central control unit. On the wrist watch the monitored person can operatively follow the progresses and data without taking out the central control unit, par example of pocket. With the advantage the synchronous imaging is possible on more central control units, mutually controlling each other. It has the advantage that on the measuring watch there are, though also simplified data easily accessible and it is not necessary to manipulate with larger central unit, what is effected in case of monitoring of more detail pieces of information. That is something what is not enabled ob devices produced under the conditions of current status of technology.

Alternative way how to transmit at the same moment the signal of heart pulse to the measuring watch working, par example on 5.5 kHz, 2.4 GHz or ANT and central control units working par example on bluetooth, advantageously formed by mobile phone, is to place, with the advantage, two or more sensors of heart pulse, with transmitters of respective frequencies, on chest belt. With the advantage it is possible to use not only the common contacts on chest belt for more sensors of heart pulse, but also the separate sensors for each sensor especially from the reason to prevent mutual influence. The further advantage is to place some of sensors on belt, accordingly the need temporarily, par example by means of clasp and contact temporarily to stick conductively on existing contacts of chest belt or outside it. In such a case there is each pair of contacts, independent on every sensor. Advantage of indicated adjustment is the possibility of parallel monitoring of heart pulse operatively, with simple manipulation on measuring watch and, par example, mobile phone, which is used to be taken out of pocket only sometimes, for detail data, which the products manufactured at the existing level of technology do not enable. The further advantage is the possibility to use external supply for increase of capacity of chest belt working on bluetooth form current 7-12 by using internal batteries to sensor of heart pulse on approx. 40-100 hours, accordingly the capacity of external battery. External supply is advantageously fastened to the belt in a removable way and on its place it is possible to put just fed standby supply and to feed up the original. It is possible to do during operation because it will keep the internal batteries of sensor.

Electrodes without sticking: for possibility of scanning of ECG curves with advantage without necessity to stick electrodes to the pad, or use of clasps, which are not suitable for long term monitoring, it is possible, with the advantage, to place electrodes on crosswise bands fastened to the chest belt, which by keeping the relatively narrow chest belt, are enabling placement of electrodes out of axe of chest belt on curve which is prescribed for scanning of ECG. Electrodes for arms and legs are advantageously fastened on bands which are encircling them. For to reach the permanent contact the electrodes can advantageously be manufactured from gelatine material and can be exchangeable. In the description of figures there is described the range of systems without necessity of sticking of contacts on skin, which enable advantageously uninterrupted monitoring of respective person for a long time. It can be used with the advantage also for short term use and replace suckers, which are difficult to be fastened, but they jump away and are loosing the contact.

A LIST OF PICTURES ON DRAWINGS

Figure 1:
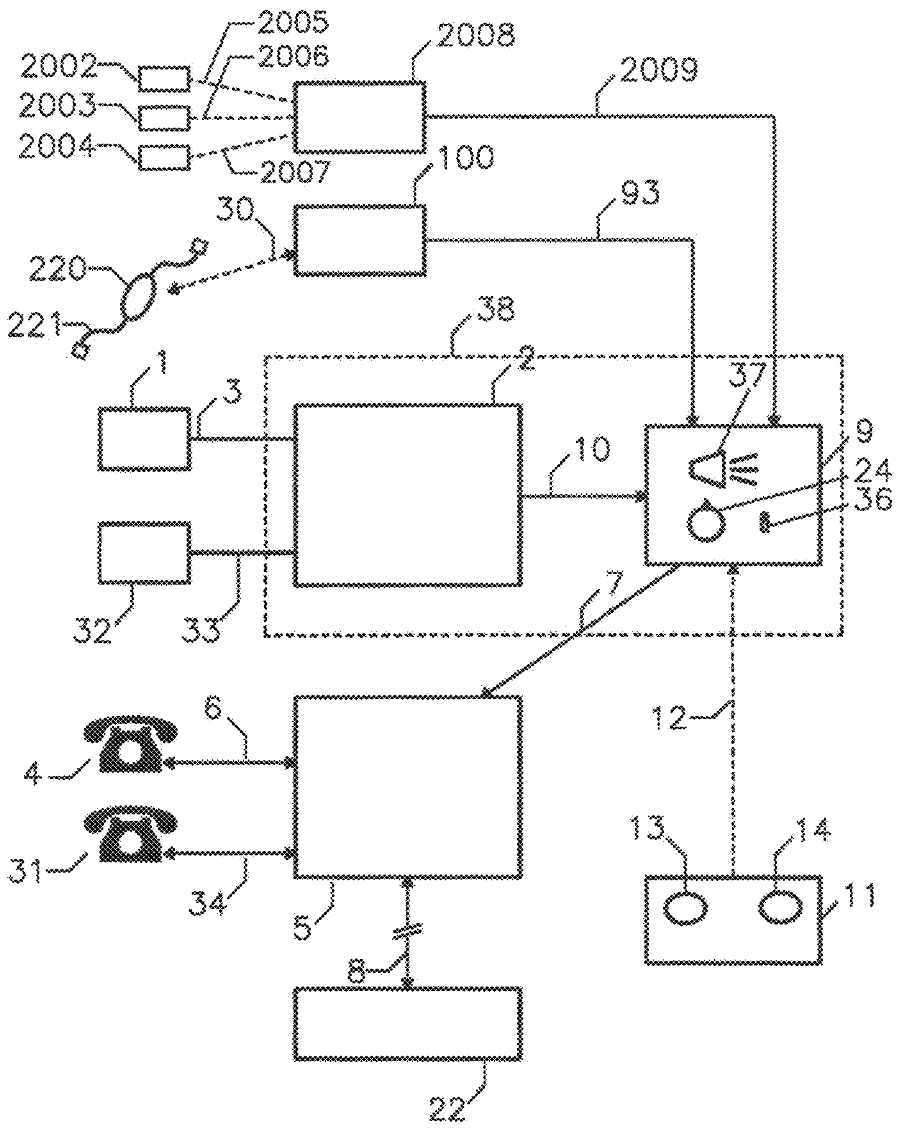

FIG. 1: Personal emergency alarm device with a reset option by the monitored person within the alarm delay in the monitored room.

Figure 2:
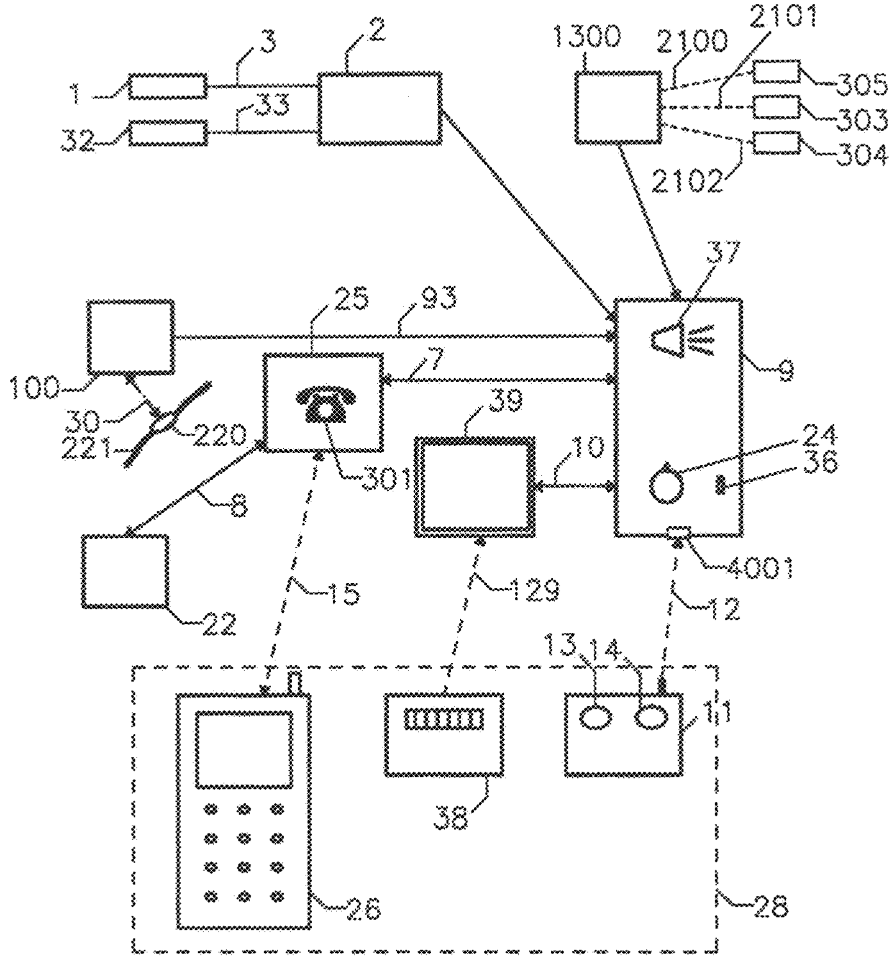

FIG. 2: Alarm activation device with a wireless detected and a phone in the monitored premises.

Figure 3:
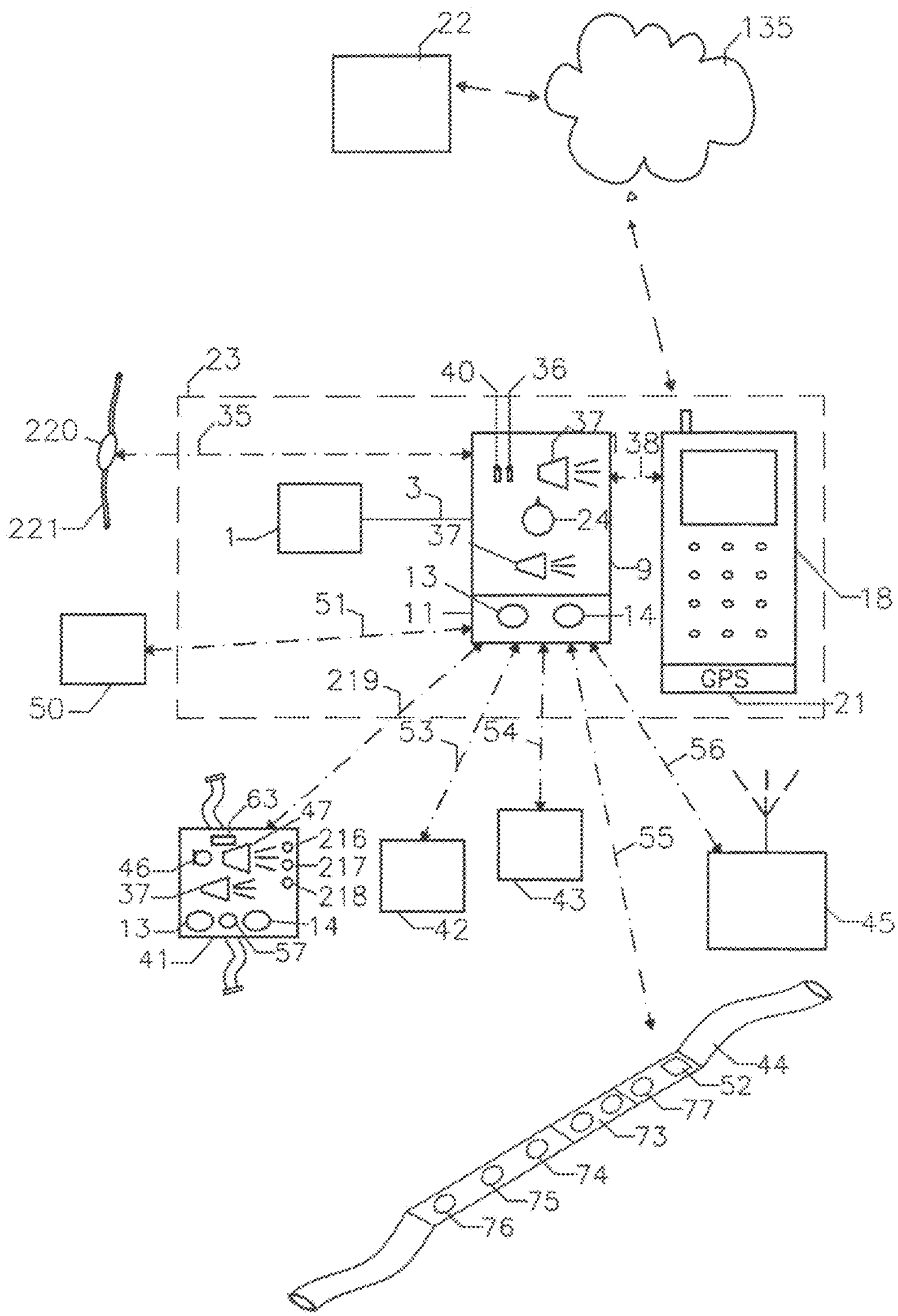

FIG. 3: Personal emergency alarm device with a mobile phone for areas covered with a GSM network.

Figure 4:
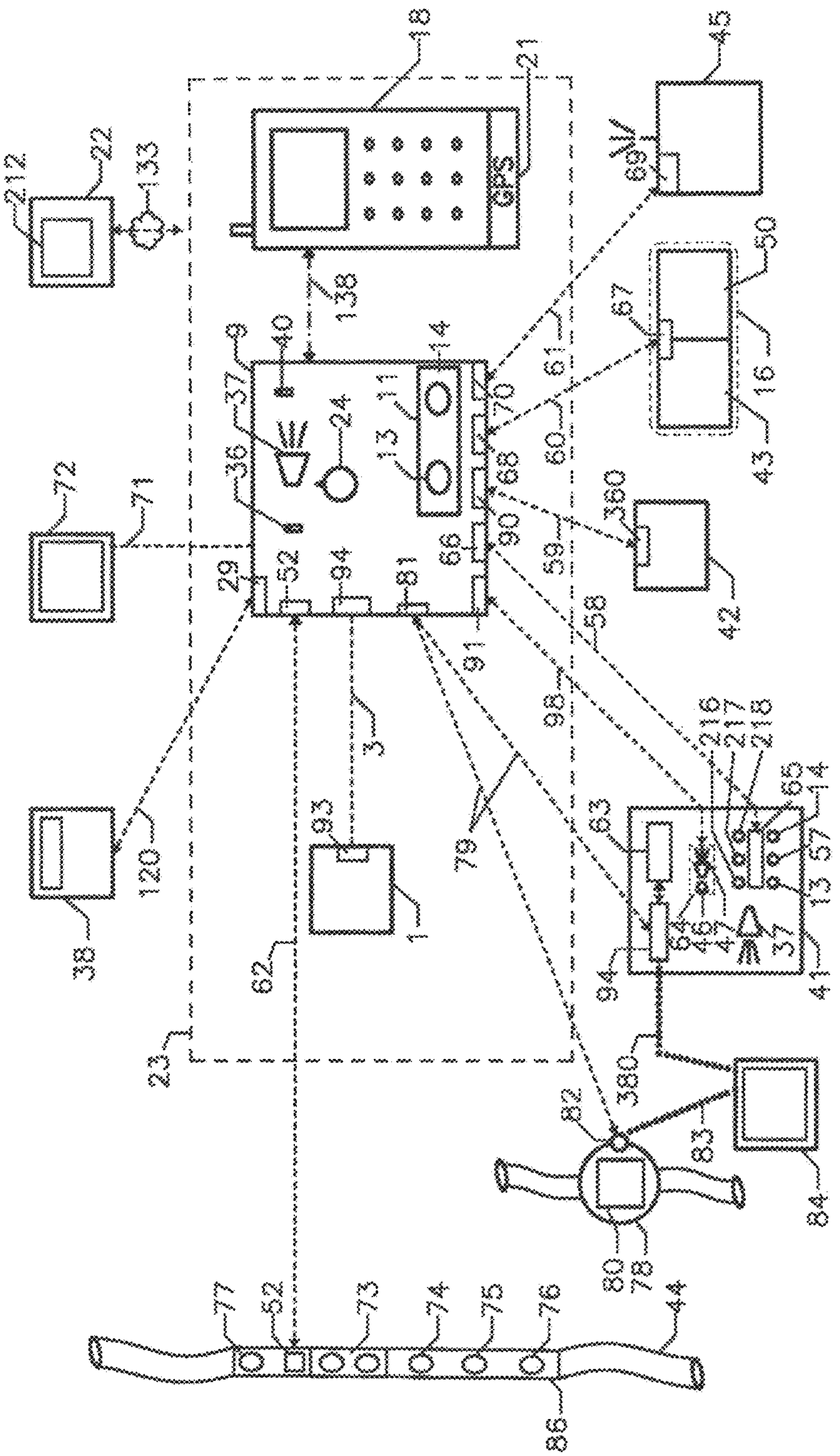

FIG. 4: Personal emergency alarm device with communication via Bluetooth.

Figure 5:
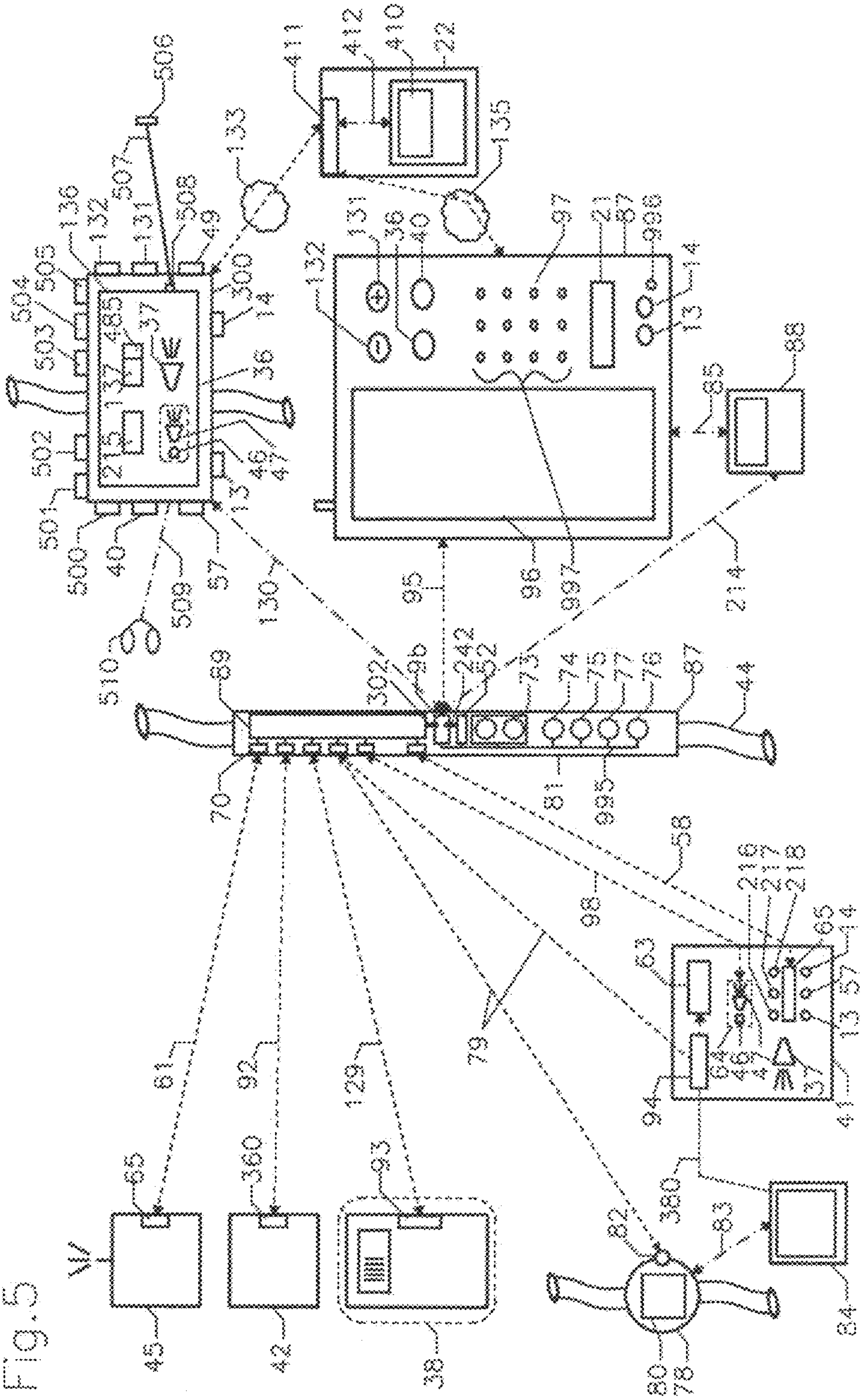

FIG. 5: Personal emergency alarm device with communication partially via radio waves.

Figure 6:
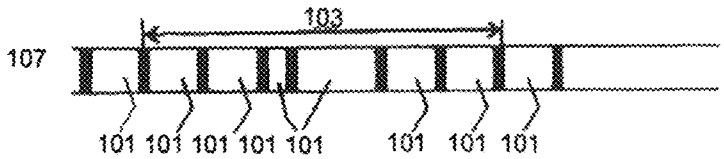

FIG. 6: Personal emergency alarm device with a heartbeat curve and heartbeat for the calculation of over-limit condition.

Figure 7:
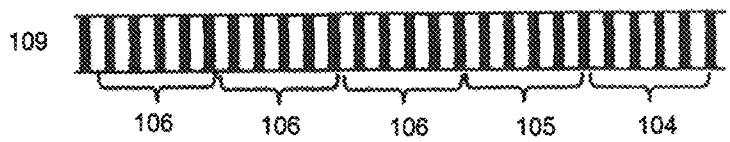

FIG. 7: Personal emergency alarm device with a heartbeat curve with designated sections.

Figure 8:
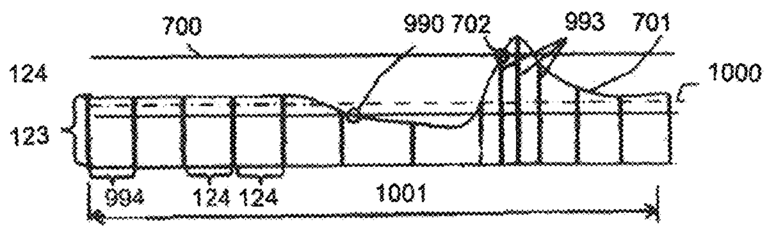

FIG. 8: Personal emergency alarm device with a curve of irregular heartbeat with limits.

Figure 9:
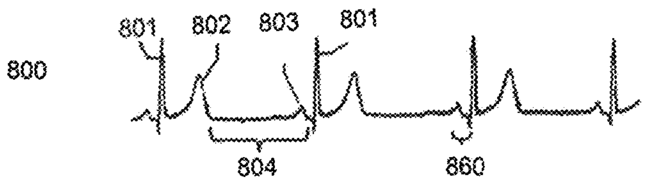

FIG. 9: Personal emergency alarm device with a curve of normal ECG.

Figure 10:

FIG. 10: Personal emergency alarm device with a tachycardia curve.

Figure 11:
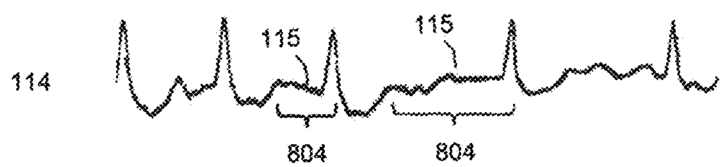

FIG. 11: Personal emergency alarm device with an atrium fibrillation curve.

Figure 12:
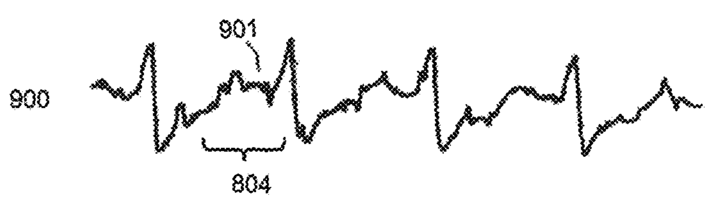

FIG. 12: Personal emergency alarm device with a flutter curve.

Figure 13:
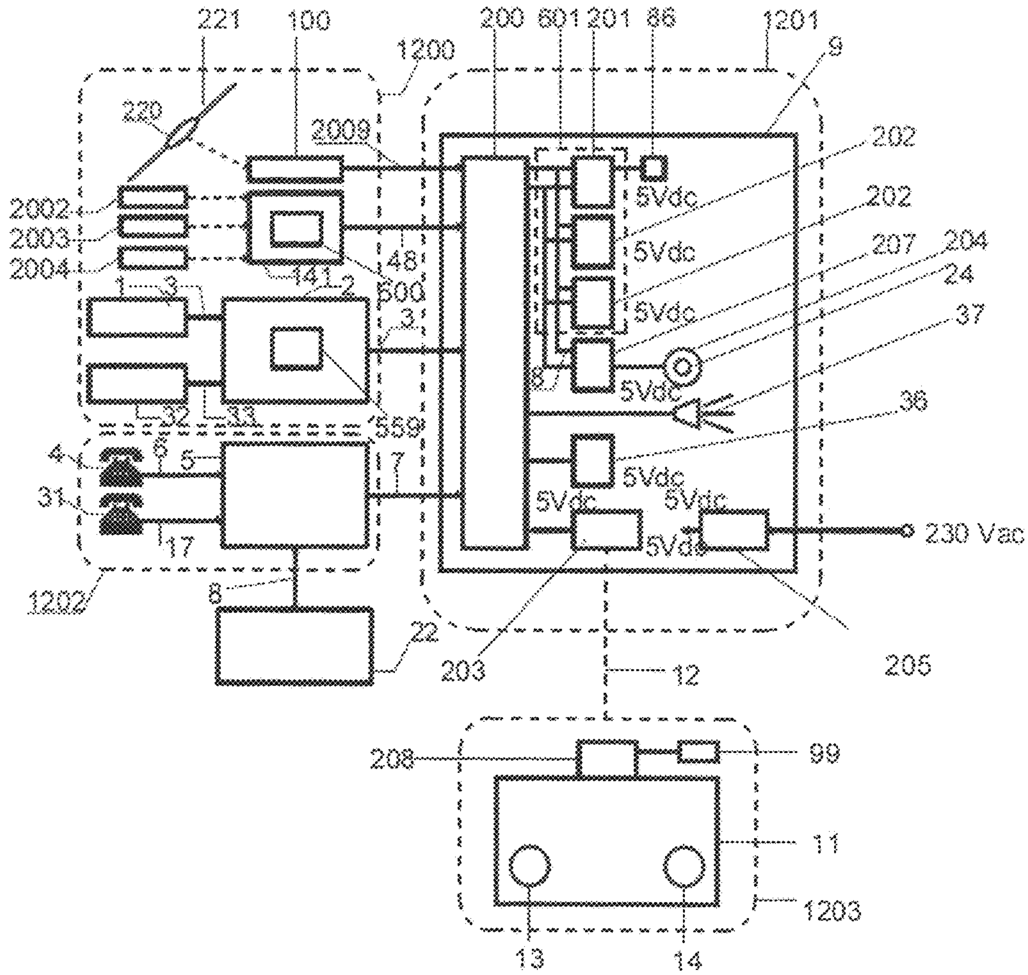

FIG. 13: Personal emergency alarm device with a stationary design divided into units.

Figure 14:
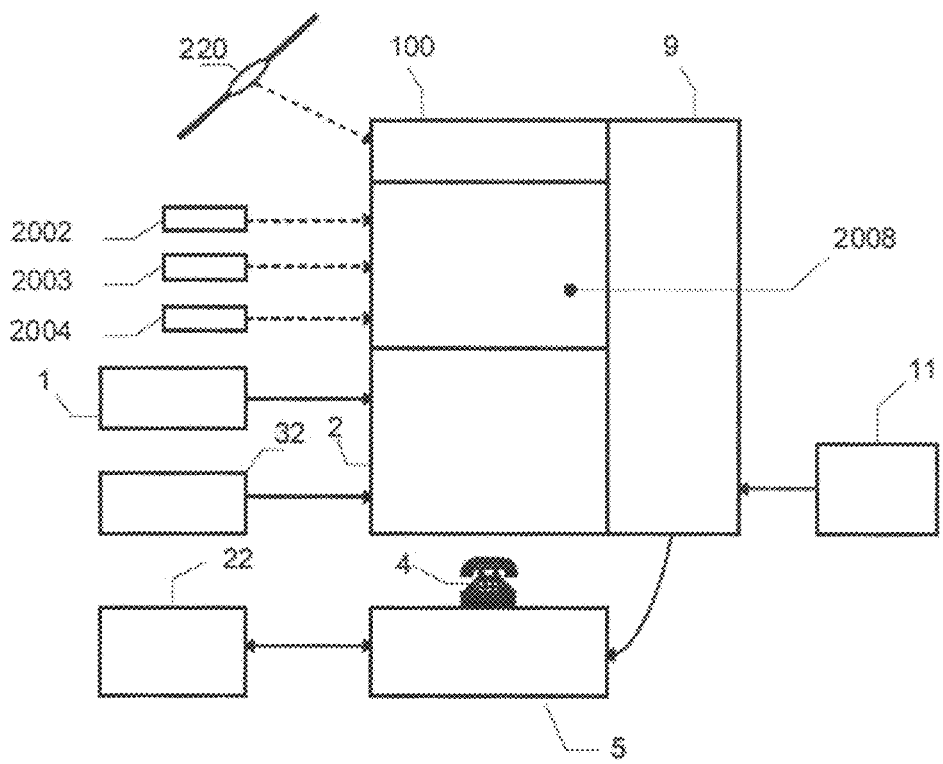

FIG. 14: Personal emergency alarm device with the movement sensor evaluation unit, the heart rate sensor evaluation unit and the sensor evaluation unit are combined in one box with the central control unit, and the communication unit is combined with the stationary phone in a common box.

Figure 15:
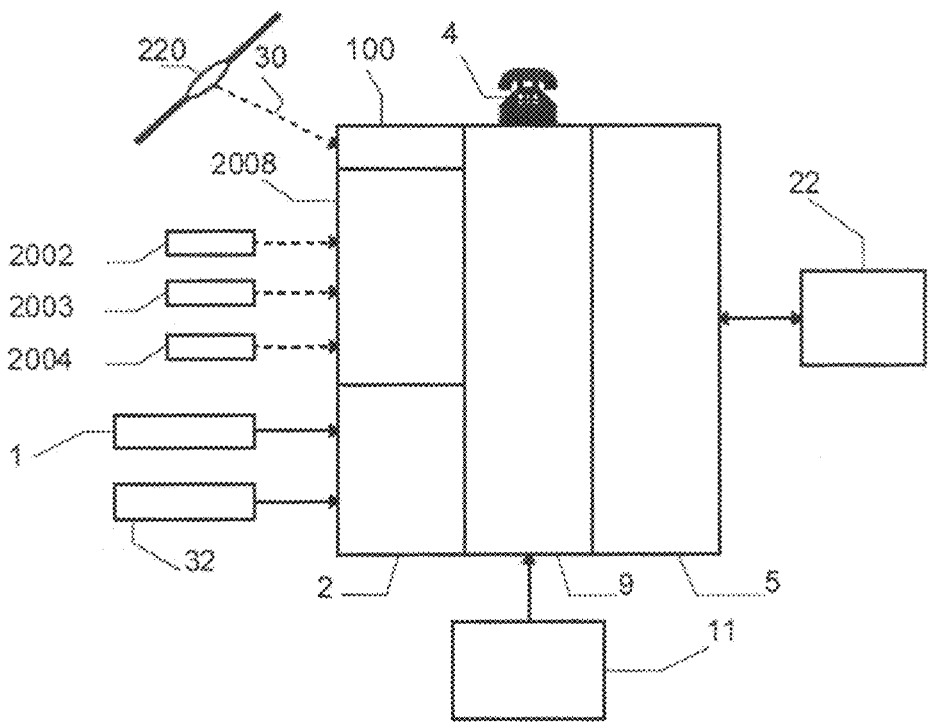

FIG. 15: Personal emergency alarm device the illustration of the combination of the movement sensor evaluation unit with the central control unit, the sensor evaluation unit, the heart rate sensor evaluation unit, the communication unit and the stationary phone apparatus, in which it is located.

Figure 16:
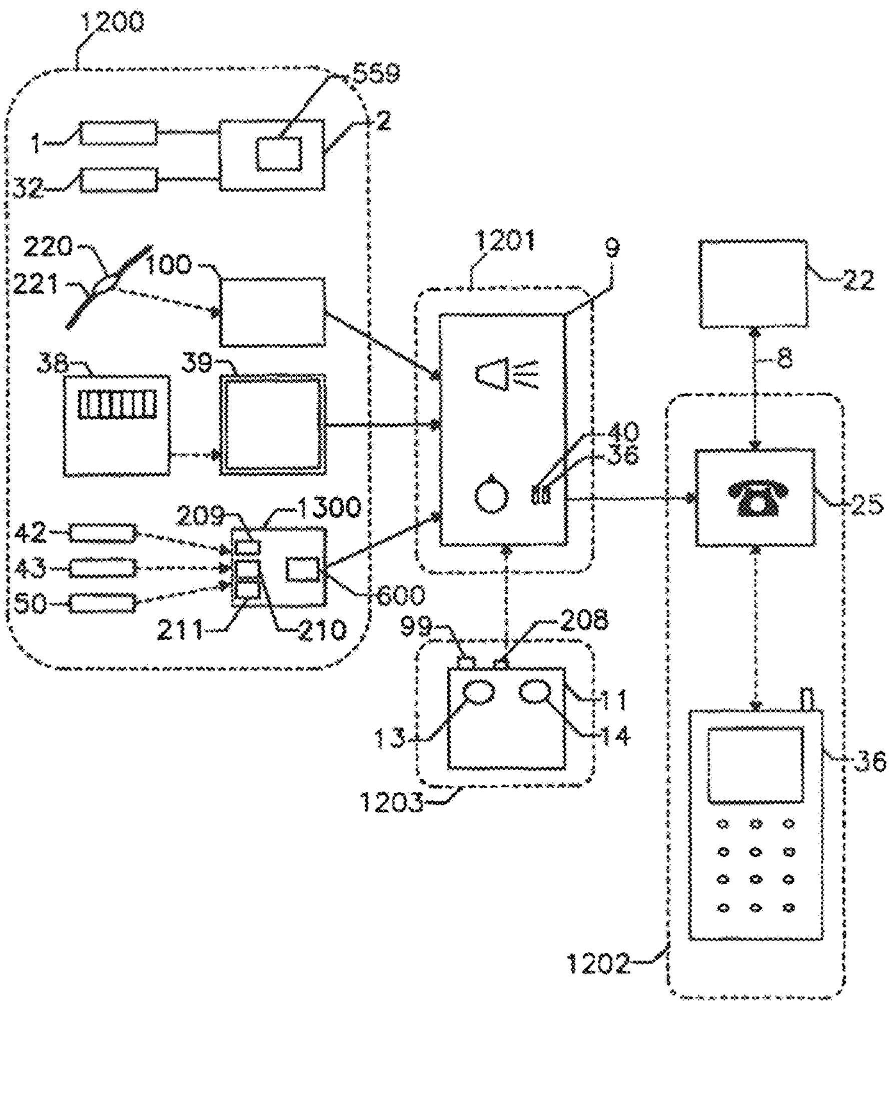

FIG. 16: Personal emergency alarm device where parts of the equipment are grouped into sensor units, central control units, the reset unit and the communication unit.

Figure 17:
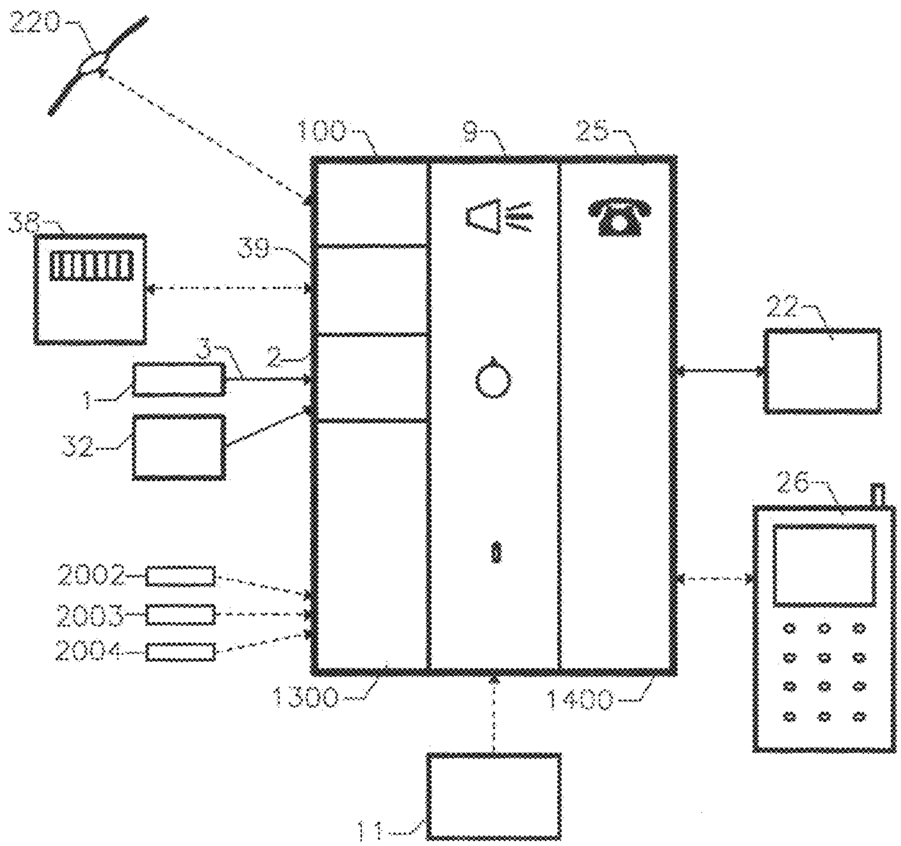

FIG. 17: Personal emergency alarm device with an illustration of the merger of the movement sensor evaluation unit, the wireless movement sensor evaluation unit, the sensor evaluation unit, the heart rate sensor evaluation unit, the central control unit and the wireless phone unit into a single common multifunctional unit.

Figure 18:
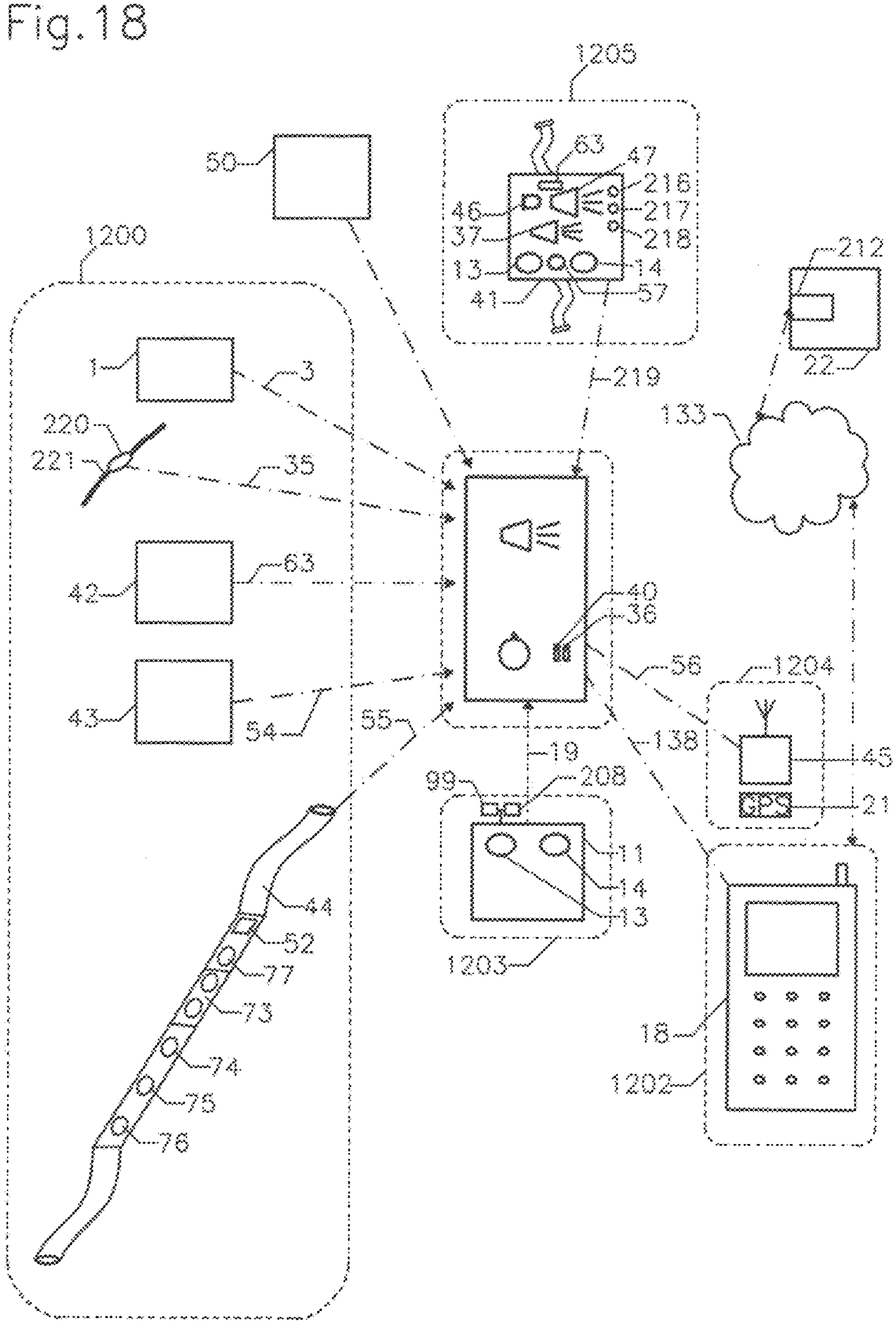

FIG. 18: Personal emergency alarm device with a block scheme of the mobile phone.

Figure 19:
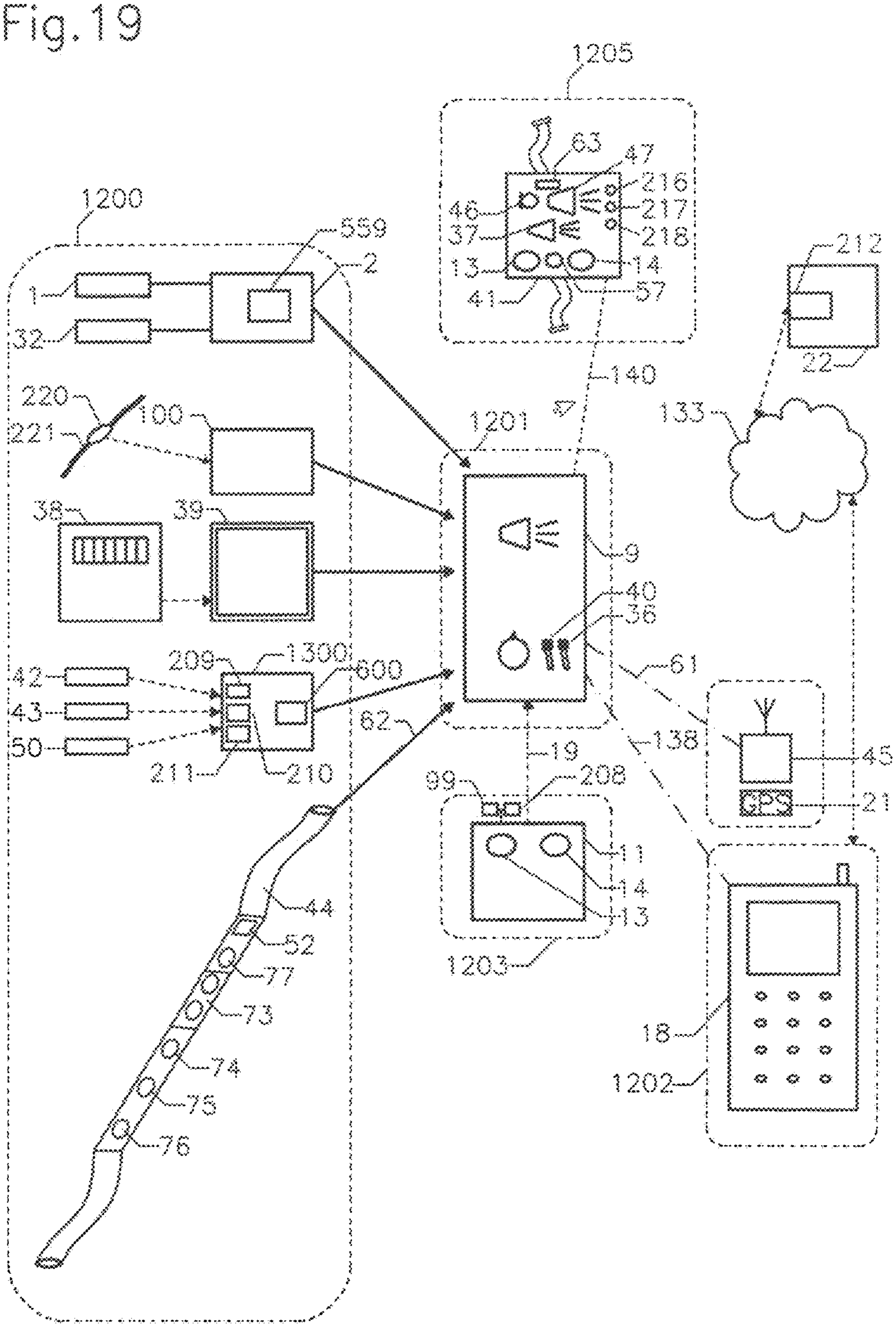

FIG. 19: Personal emergency alarm device grouped into the sensor unit, the central control unit, the communication unit, the reset unit, the location unit and the control and display unit.

Figure 20:
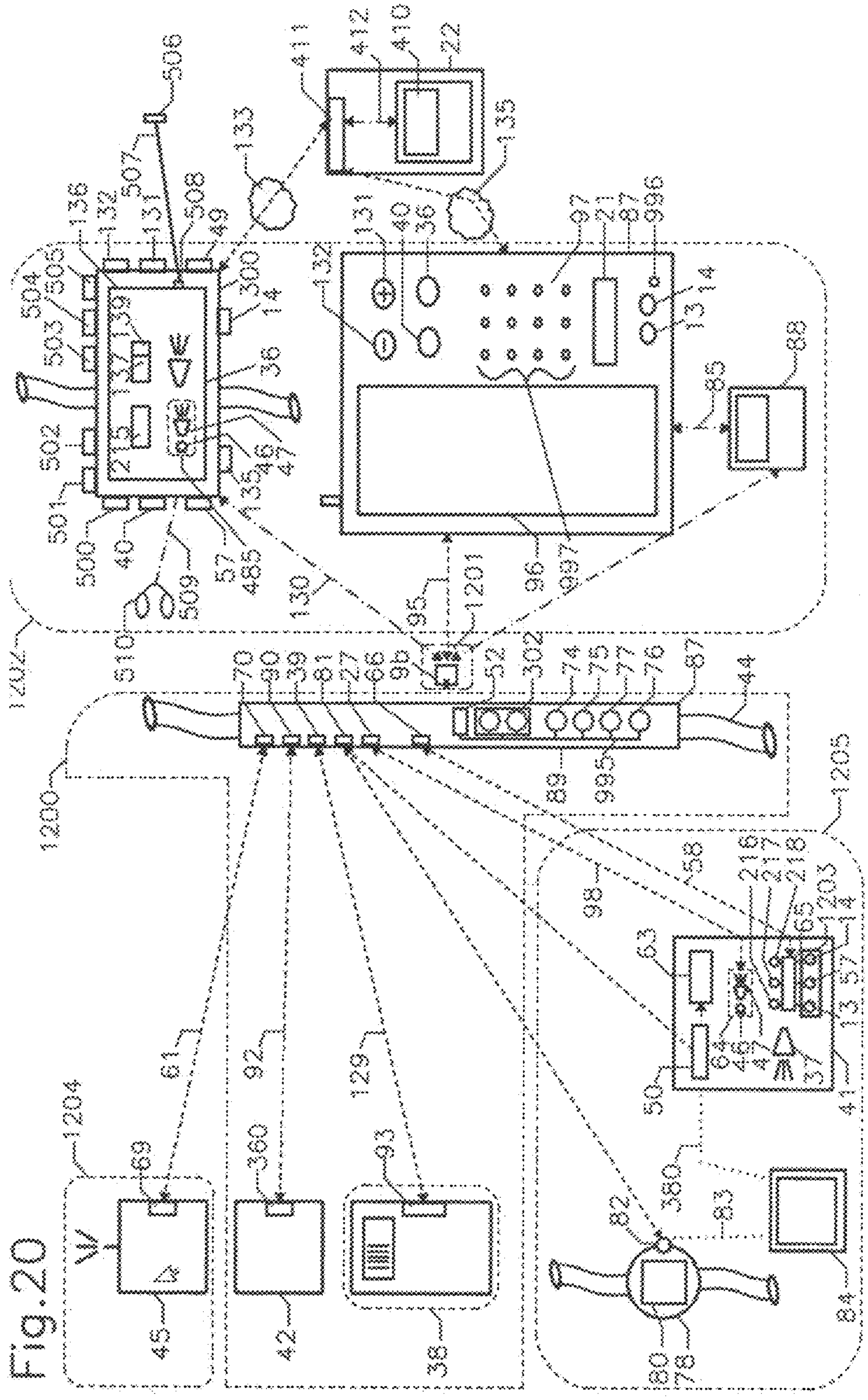

FIG. 20: Personal emergency alarm device consisting of the sensor unit, the control unit, the communication unit, the reset unit and the display unit.

Figure 21:
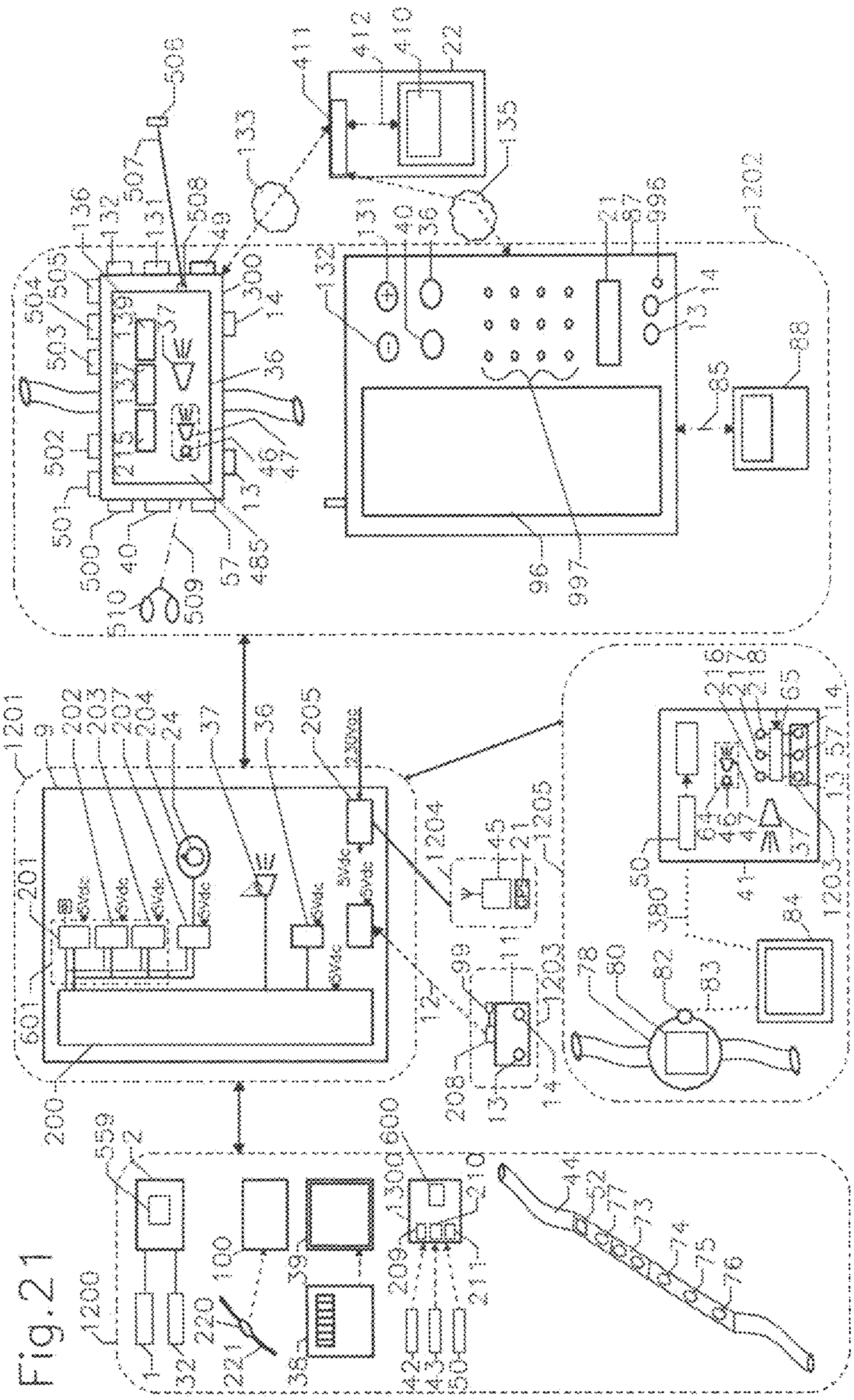

FIG. 21: Personal emergency alarm device conveniently consisting of the sensor unit, the central control unit, the location unit, and the display unit, which conveniently comprises a remote controller and a voice communication feature.

Figure 22:
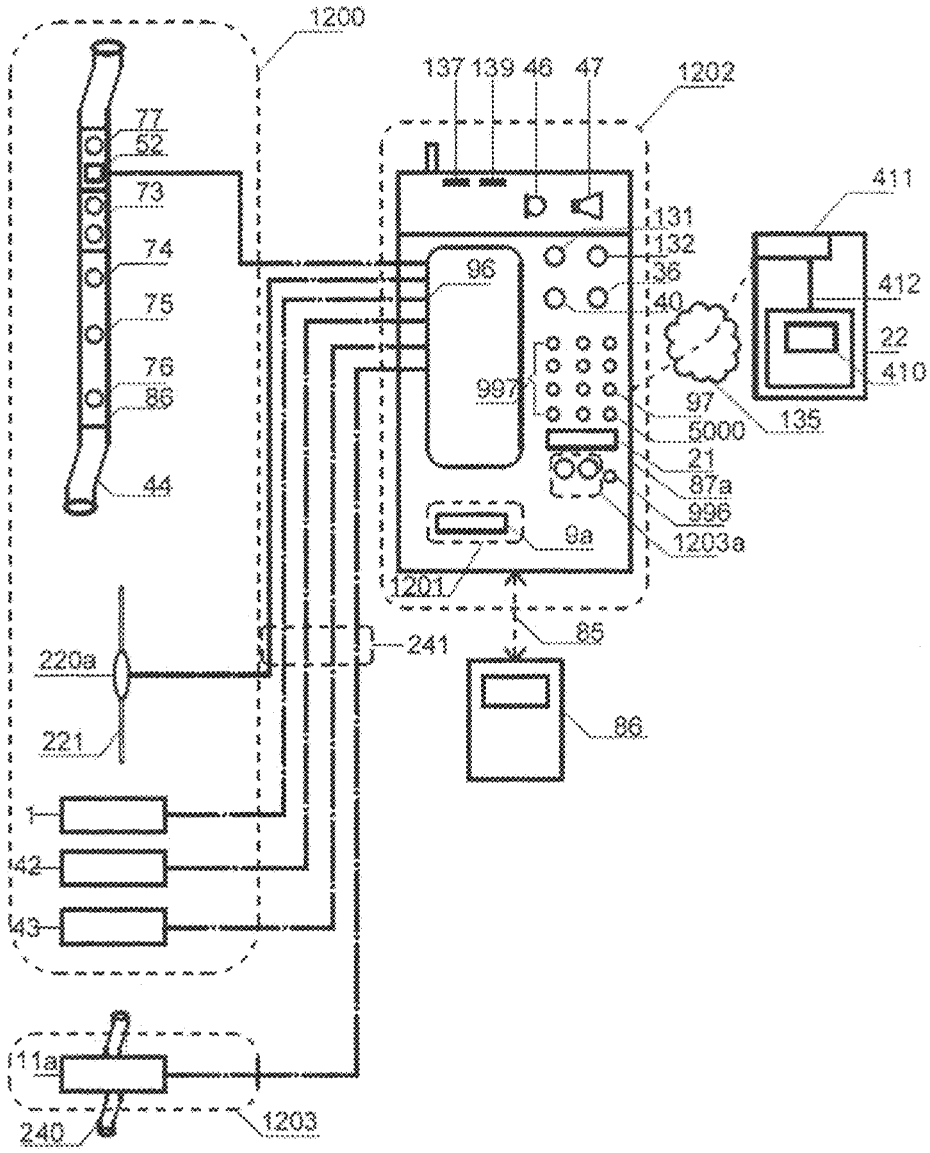

FIG. 22: Use of the described principles of the invention of the personal emergency alarm device. The central control unit is included in the mobile phone, which is connected to the sensors and the reset unit in the wristband via Bluetooth, represented by dot-and-dash.

Figure 23:
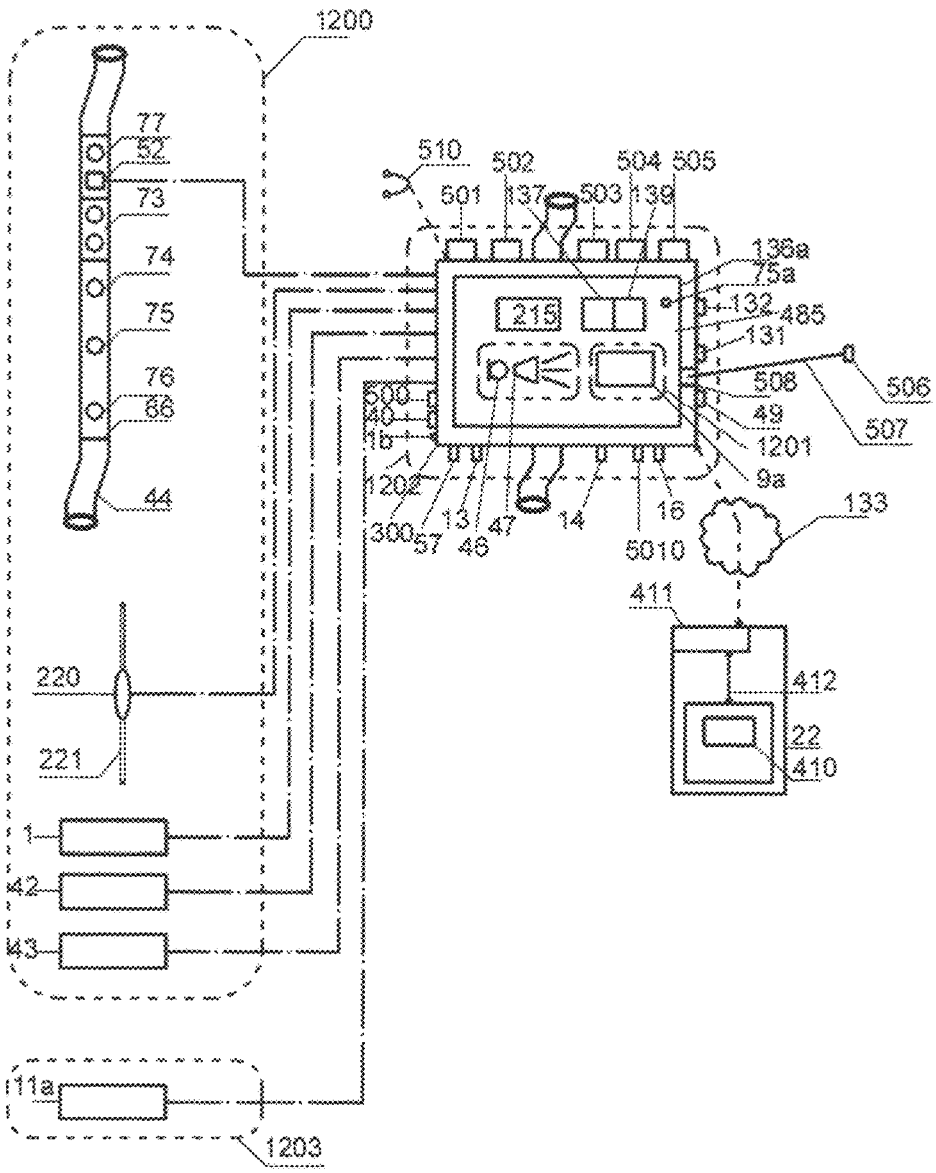

FIG. 23: Personal emergency alarm device with a mobile phone in wristband used for the communication unit instead of a mobile phone.

Figure 24:
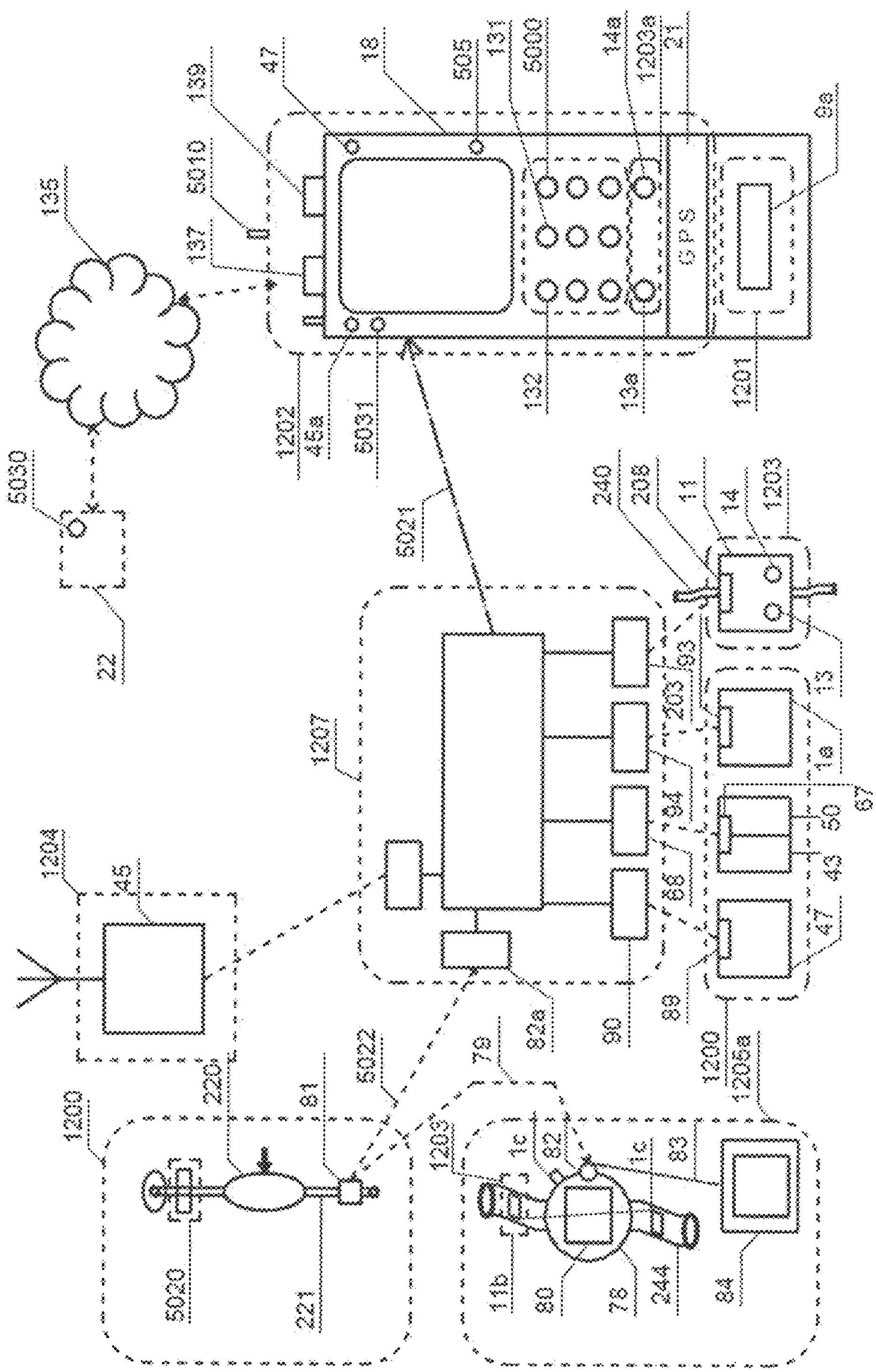

FIG. 24: Personal emergency alarm device with the option to easily and directly monitor heart rate on the display in the wristwatch, where there is also the reset unit. The central control unit is located in the mobile phone.

Figure 25:
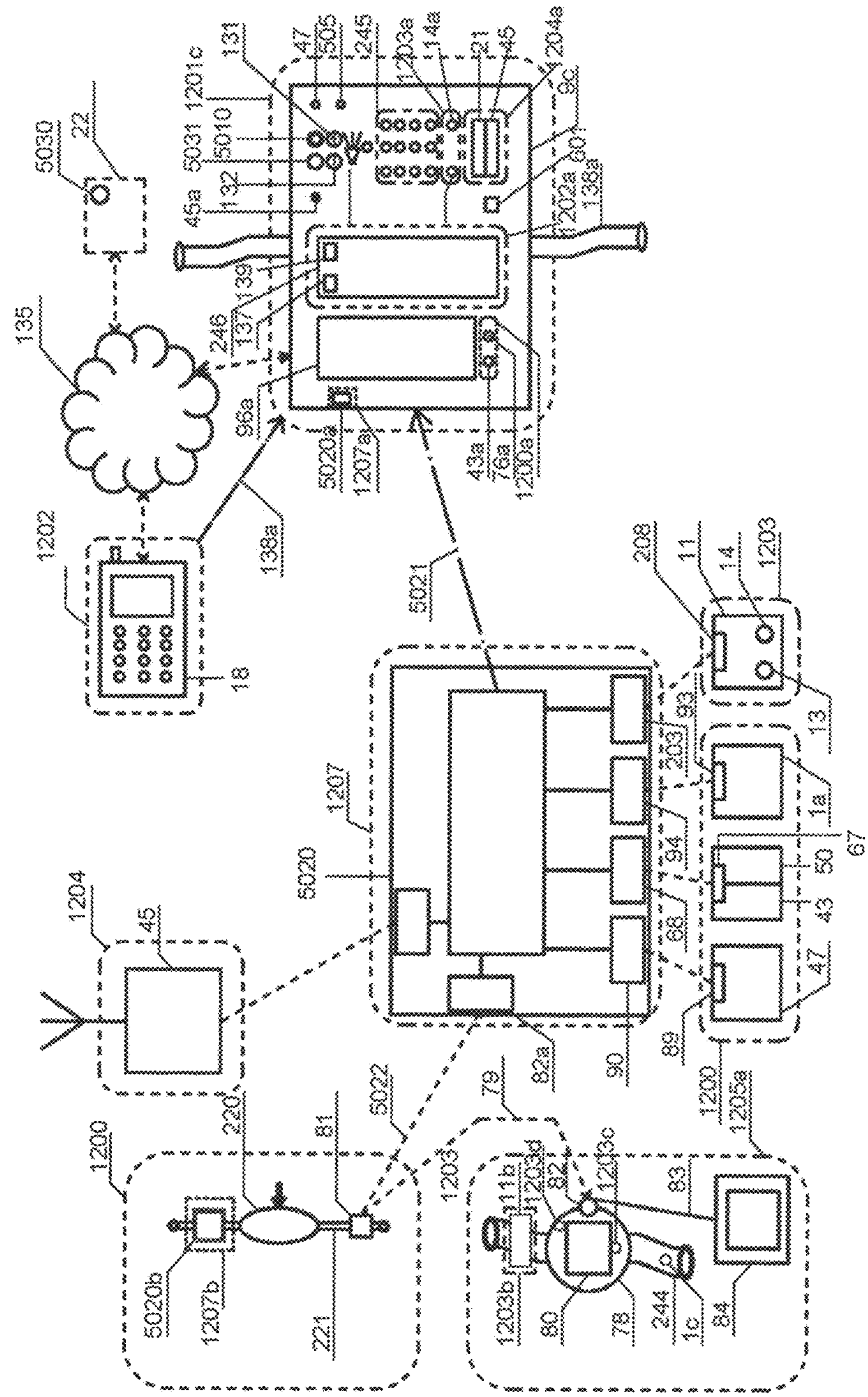

FIG. 25: Solution of converter transmitting various types of signals into bluetooth and through it communicates with central control unit.

Figure 26:
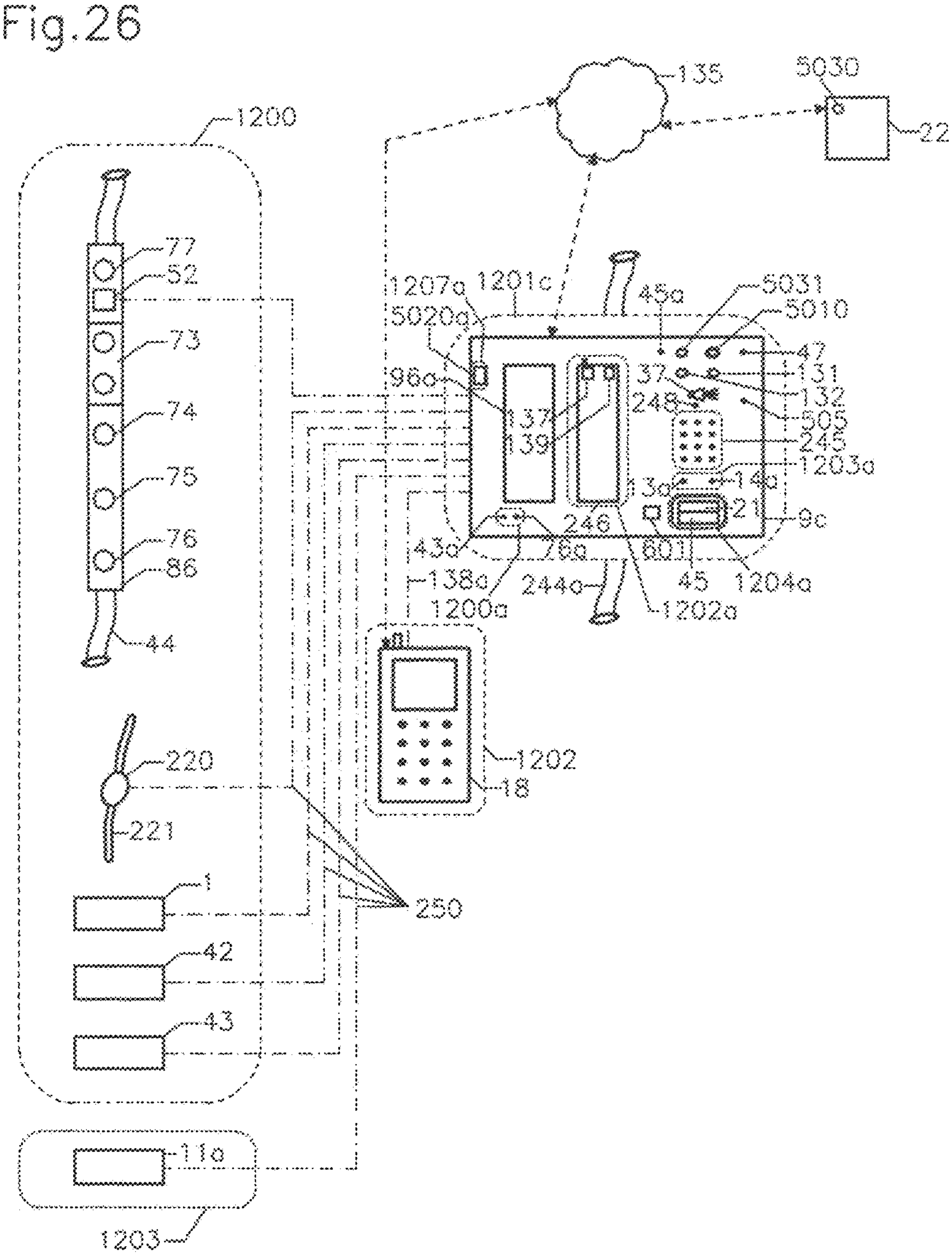

FIG. 26: Solution of communication of sensors united v block of sensors by means of bluetooth.

Figure 27:
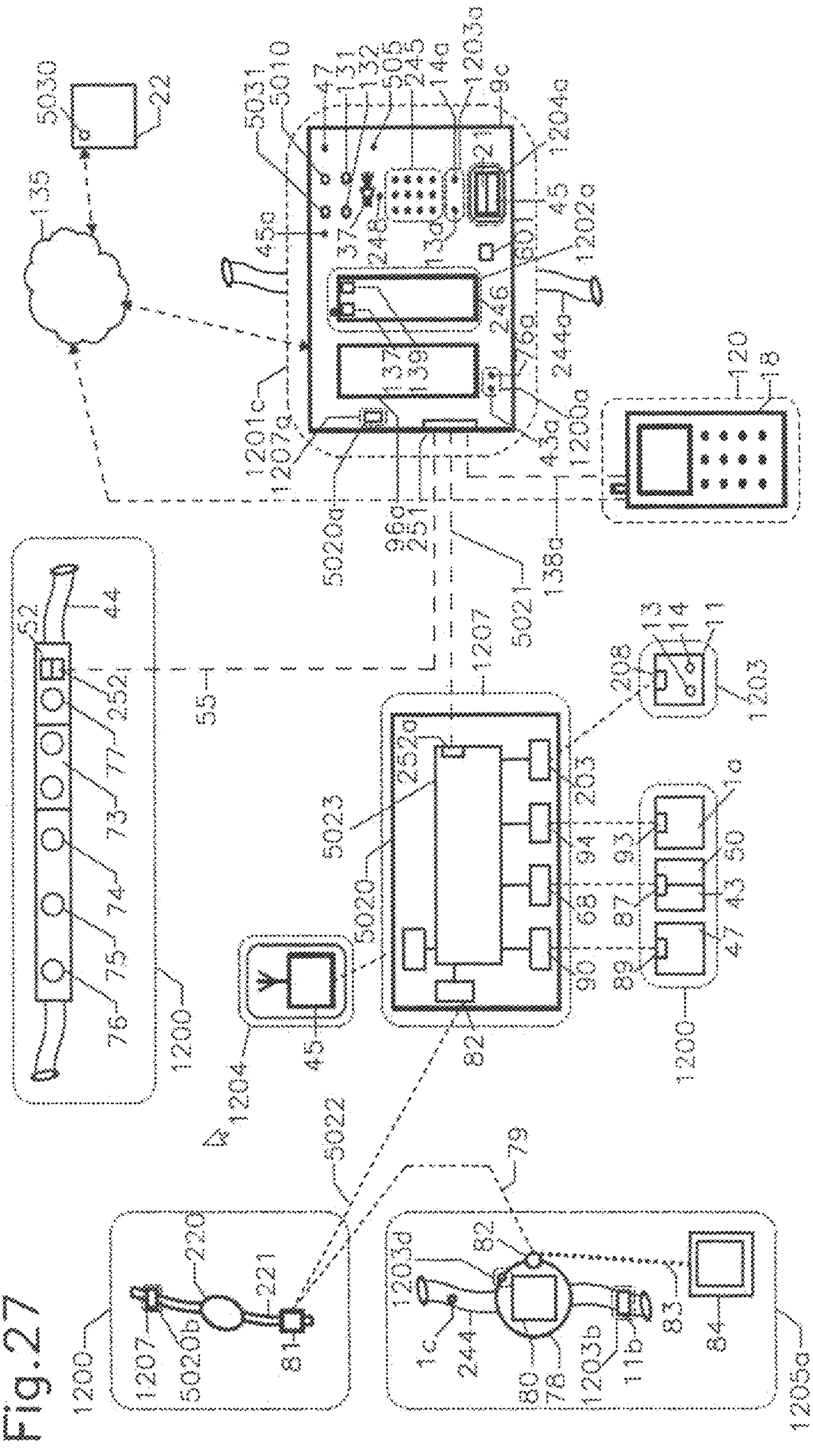

FIG. 27: Solution when signal from chest belt is simultaneously received, evaluated and shown both in watch and central control units for them converter transmits signal.

Figure 28:
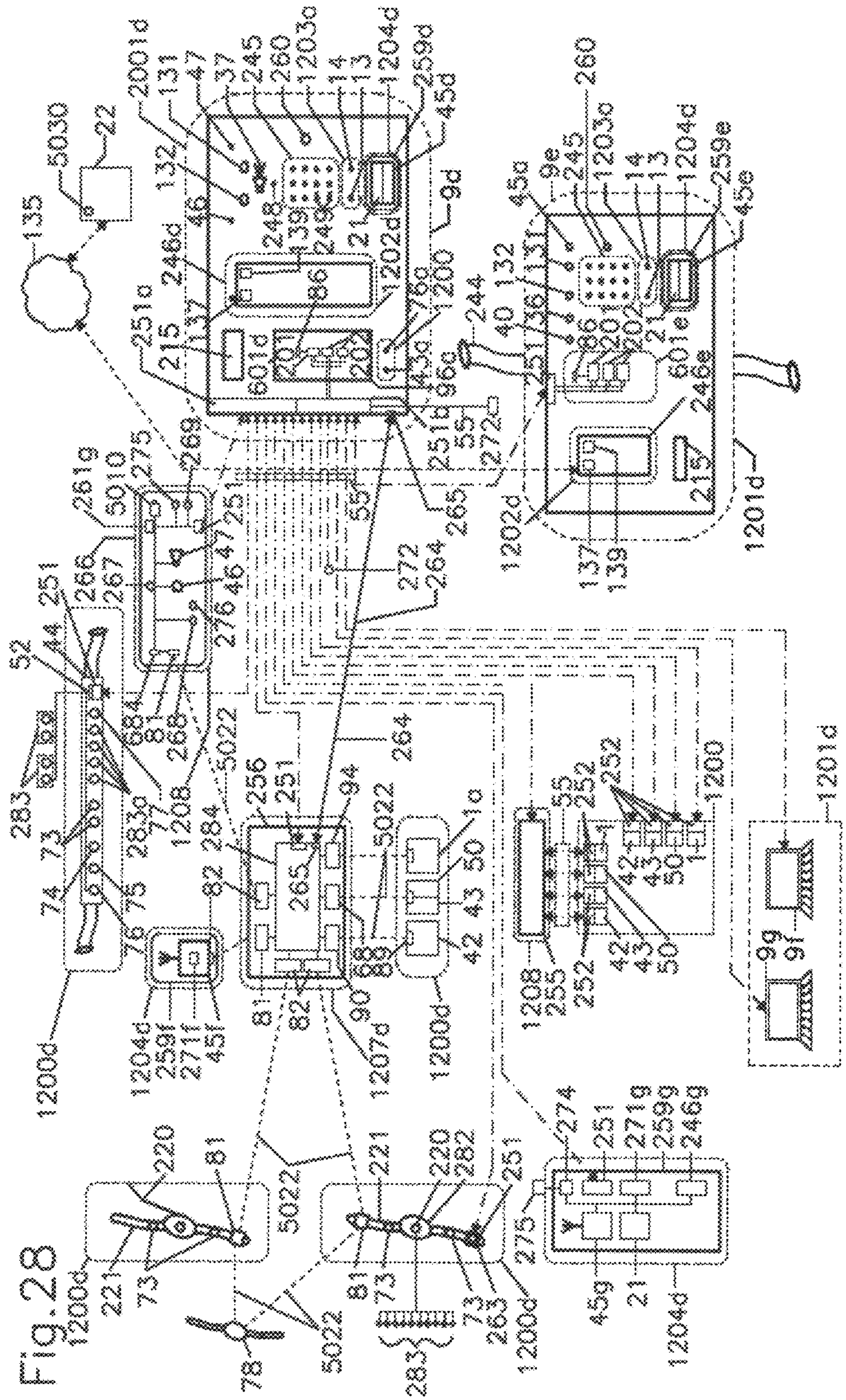

FIG. 28: Detail scheme of set of central control units, sensors, modules and parts united in blocks.

Figure 29:
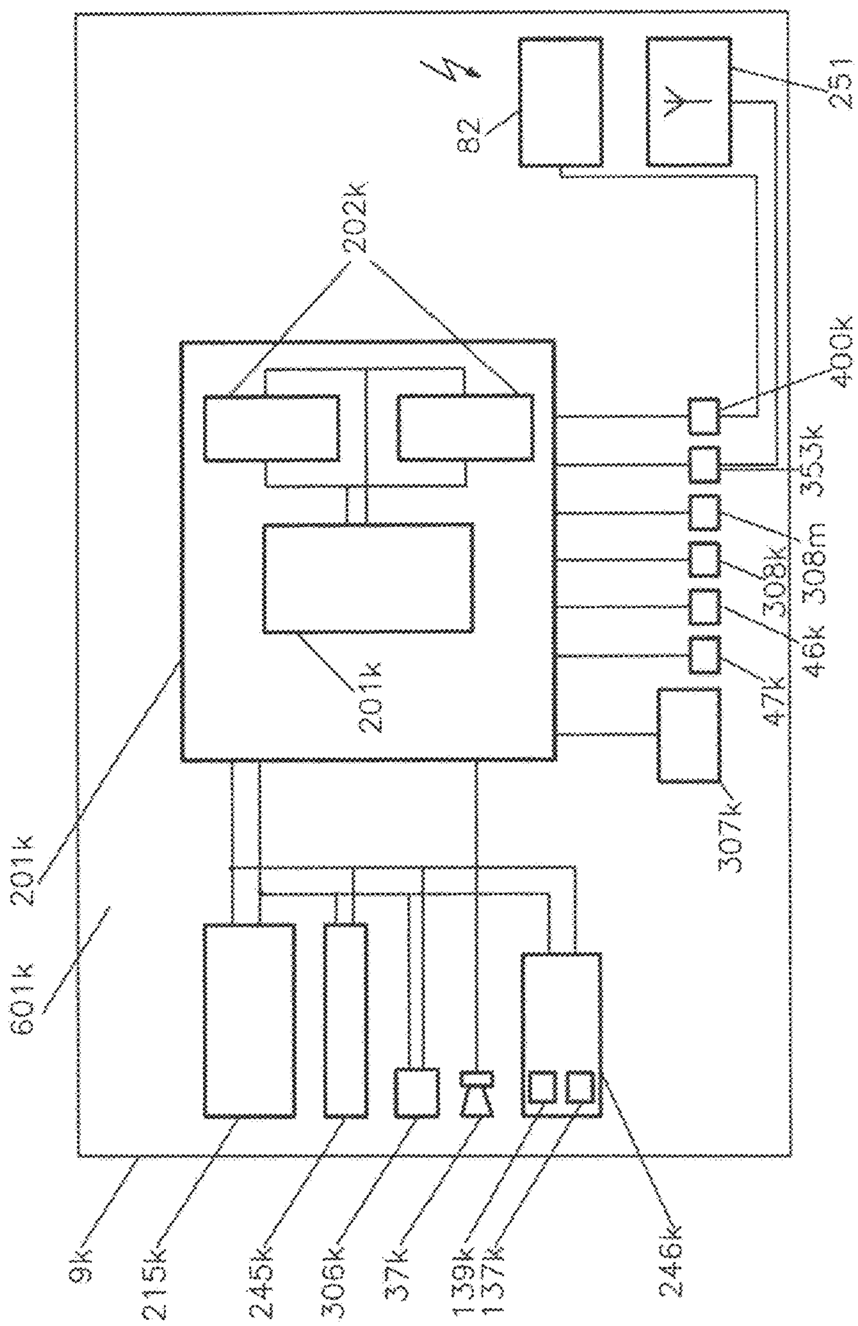

FIG. 29: Block scheme of example of central control unit.

Figure 30:
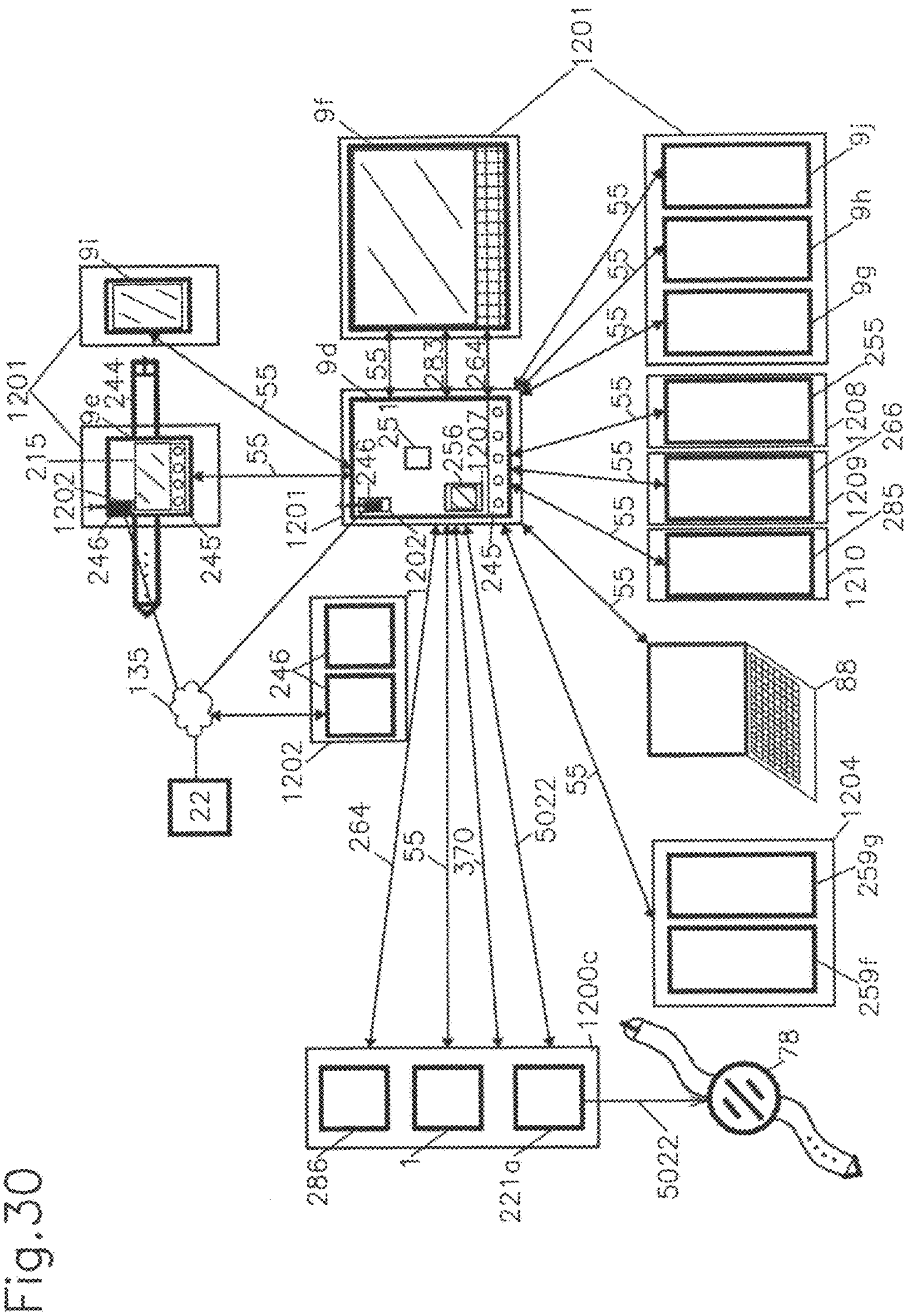

FIG. 30: Block scheme of set of central control units, sensors, modules and parts united in blocks.

Figure 31:
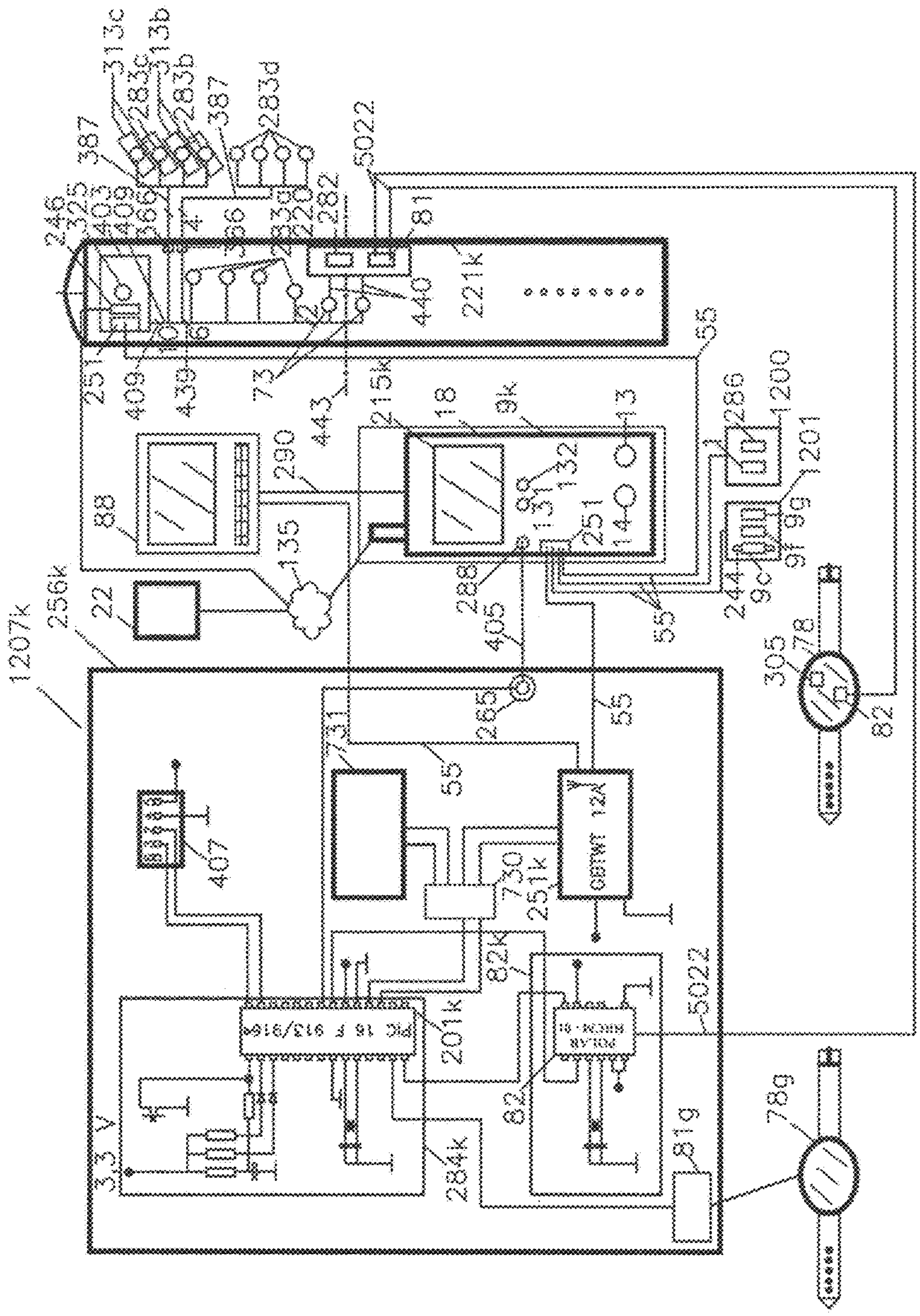

FIG. 31: Detail scheme of converter with control unit of ECG placed on chest belt.

Figure 32:
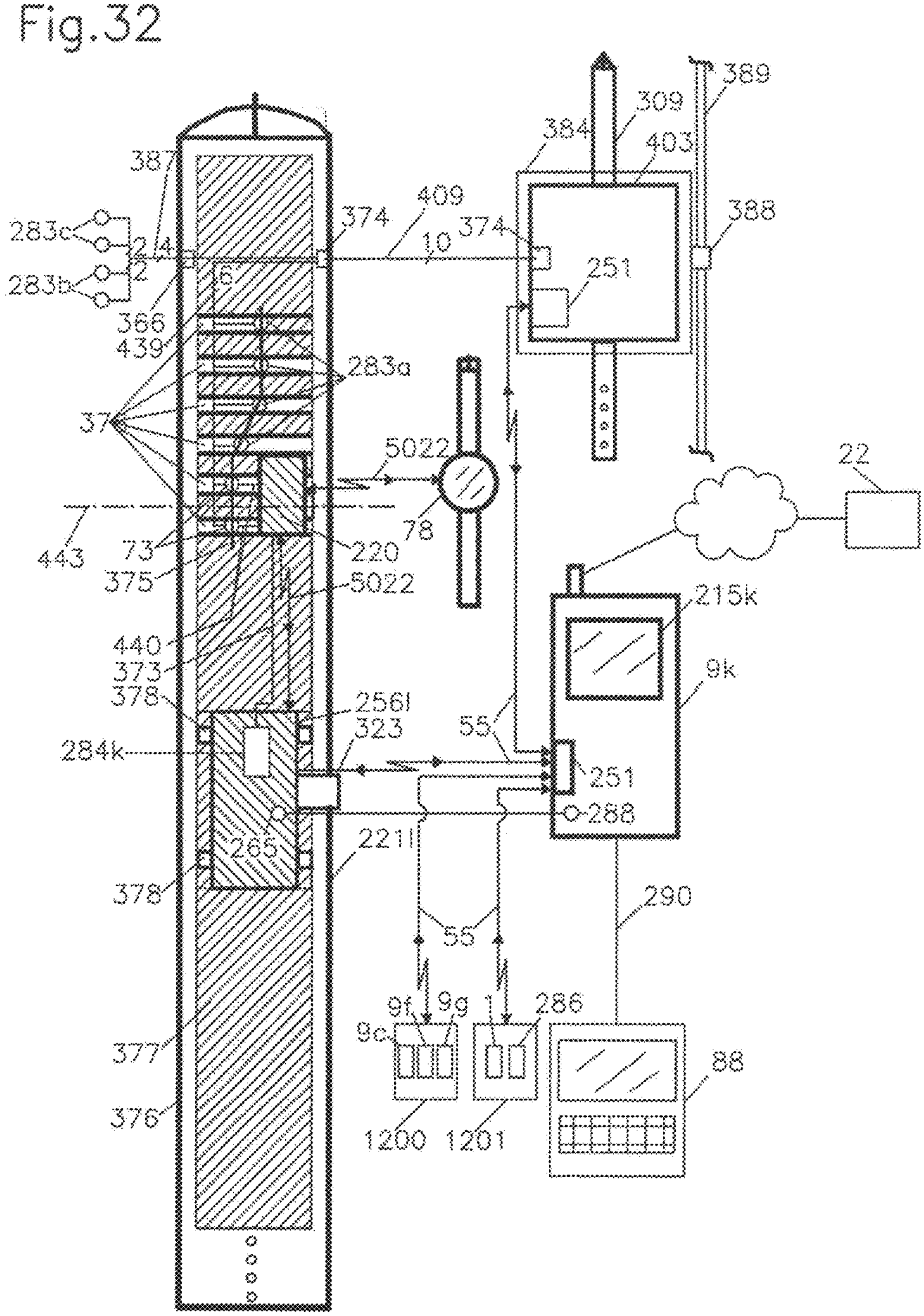

FIG. 32: Block scheme of converter with control unit of ECG placed out of chest belt.

Figure 33:
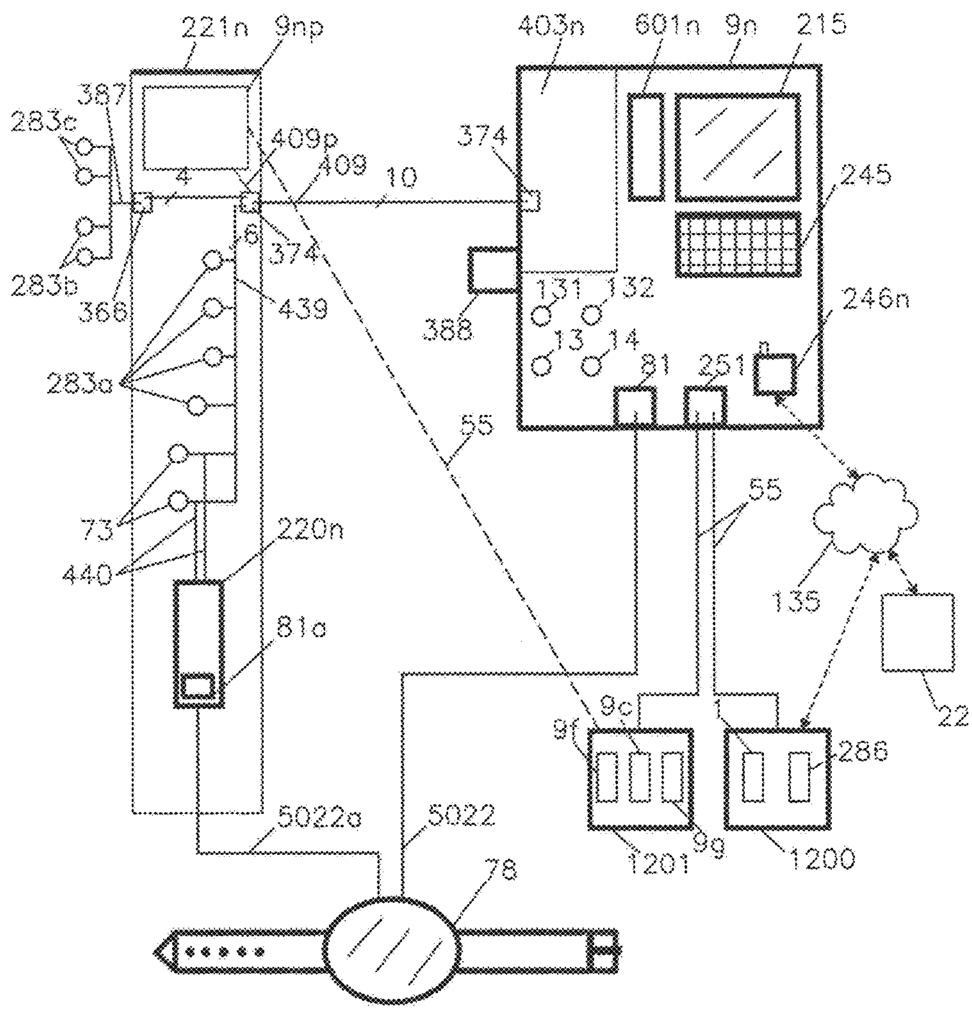

FIG. 33: Block scheme of control unit of ECG placed in central control unit.

Figure 34:
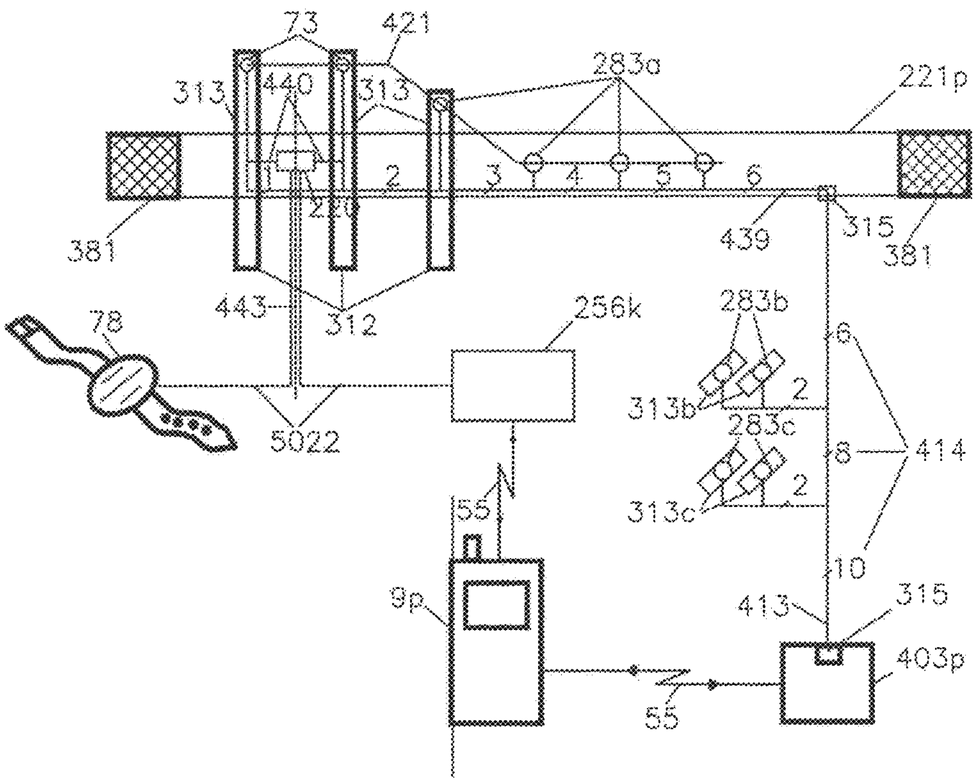

FIG. 34: System of electrodes of ECG applied to chest without sticking in the specially adapted chest belt.

Figure 35:
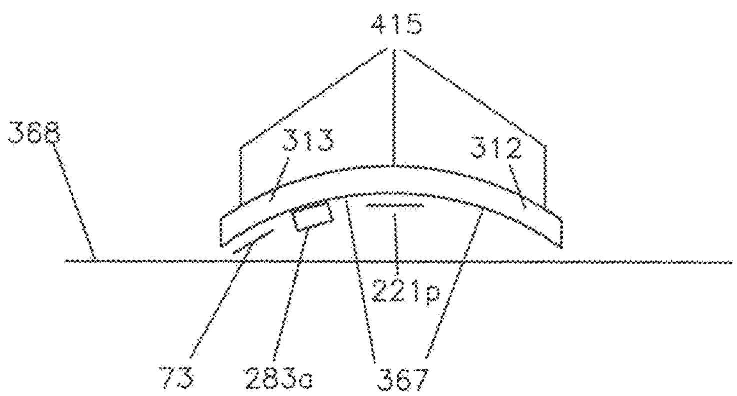

FIG. 35: Side view on specially adapted chest belt.

Figure 36:
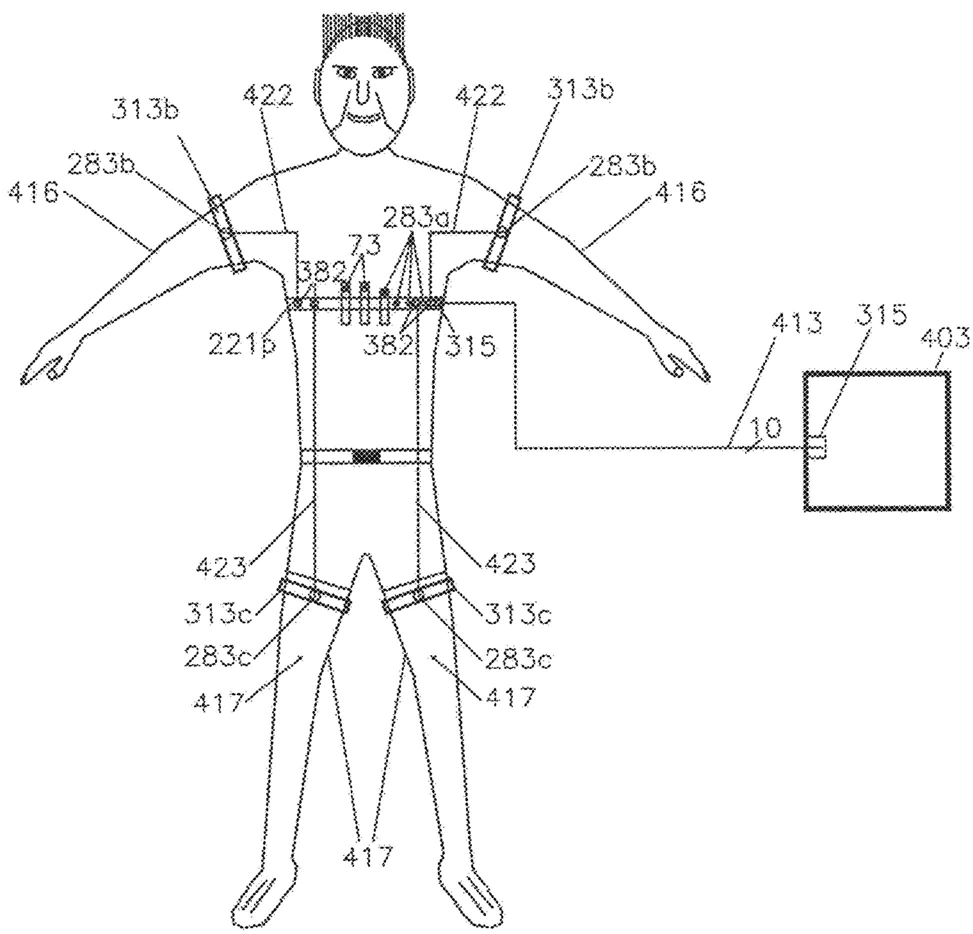

FIG. 36: Fastening of ECG electrodes on chest belt in the combination with fastening of electrodes on bands on arms and buttocks.

Figure 37:
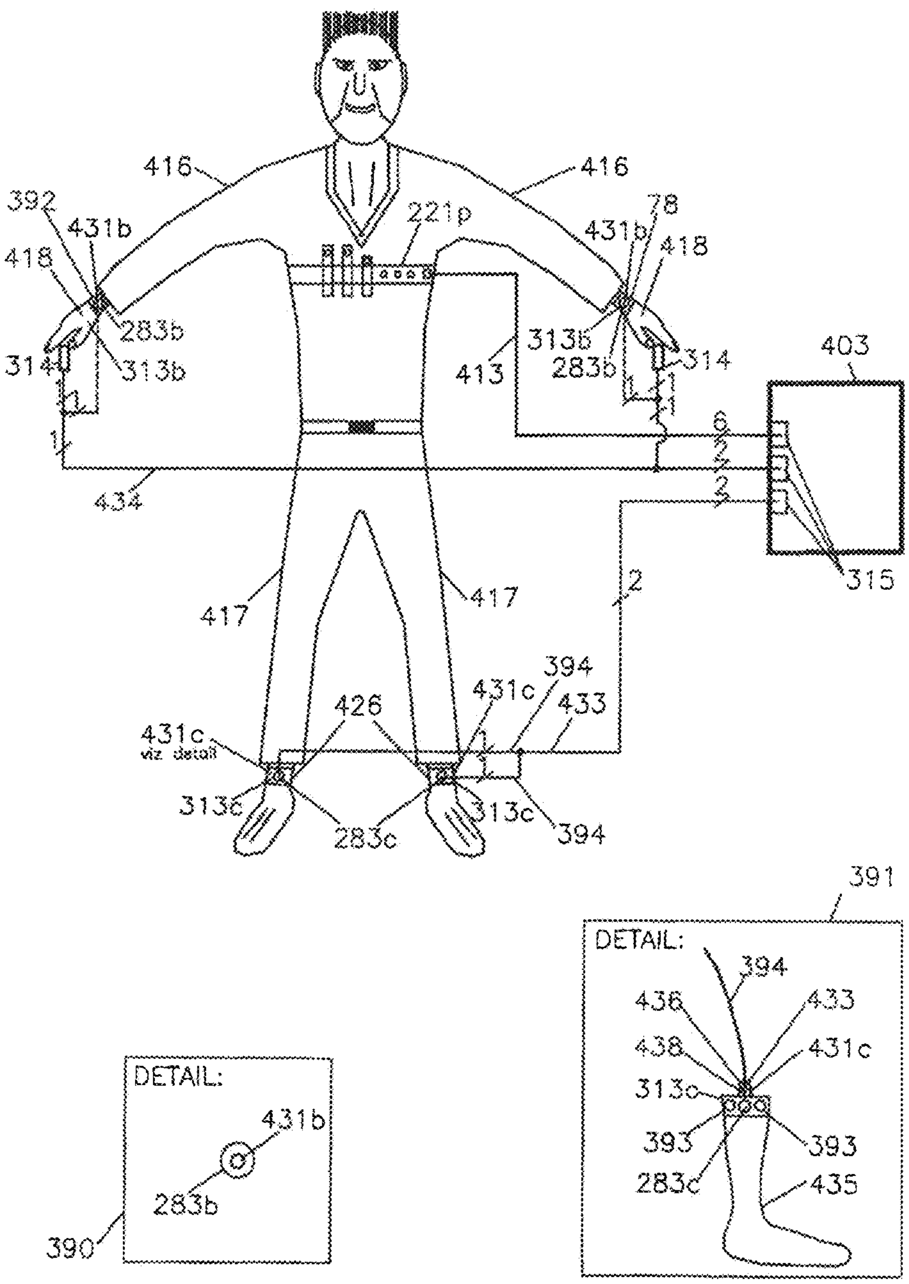

FIG. 37: Fastening of ECG electrodes on chest belt in combination with fastening on wrist bands and ankle bands.

Figure 38:
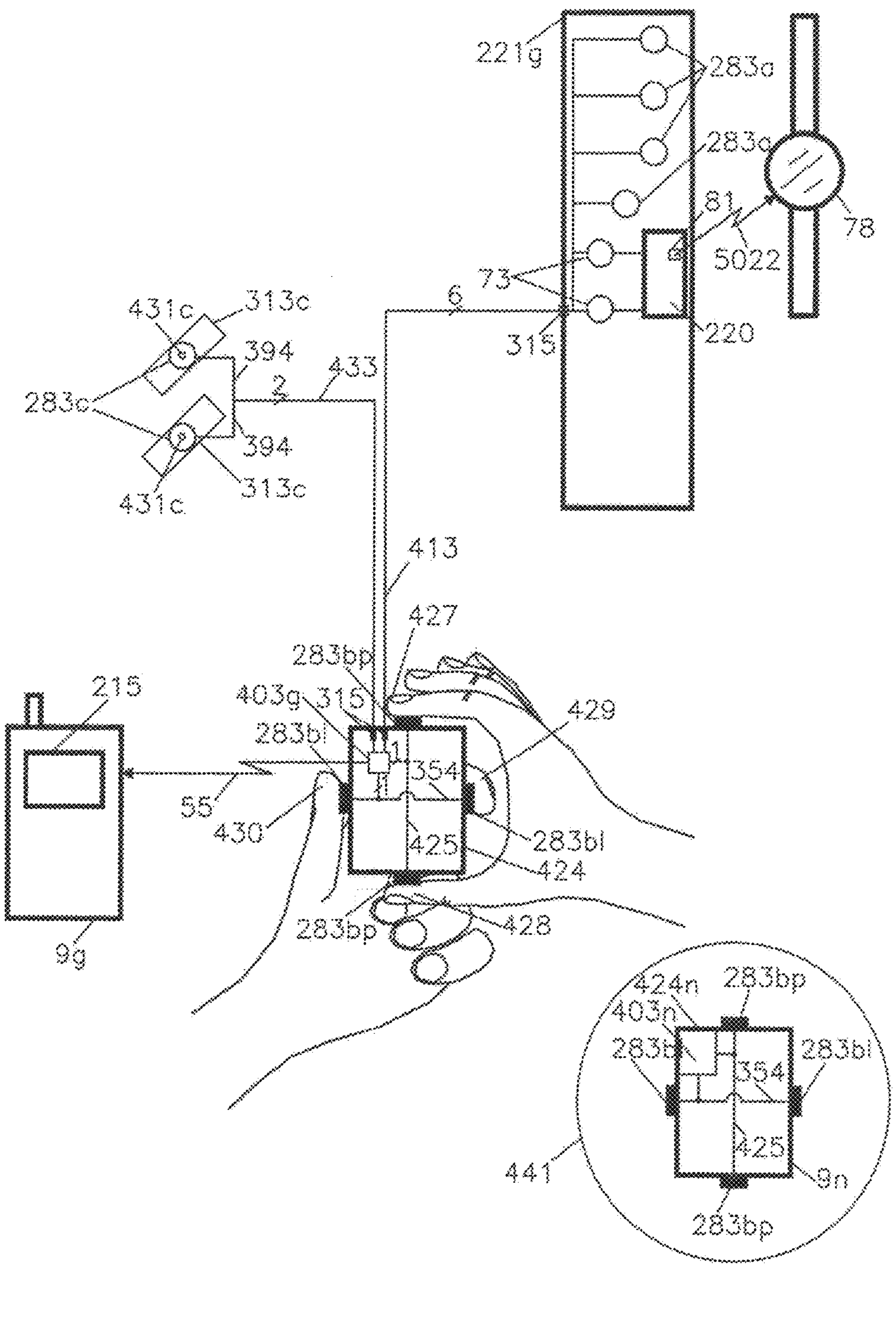

FIG. 38: Placement of ECG electrodes on control unit of ECG and central control unit.

Figure 39:
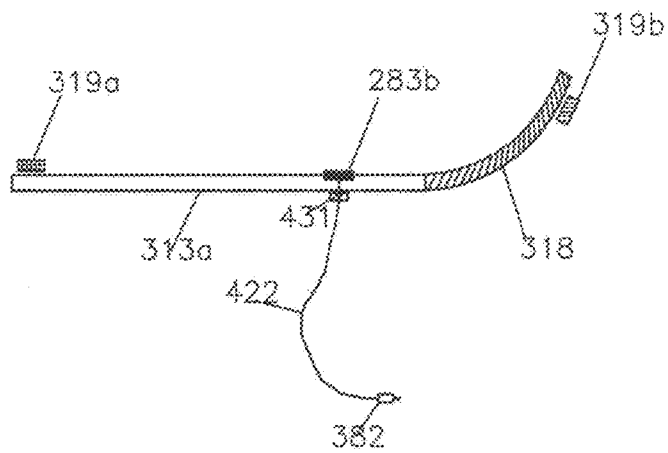

FIG. 39: Detail view on open band with electrode of ECG for fastening on arm.

Figure 40:
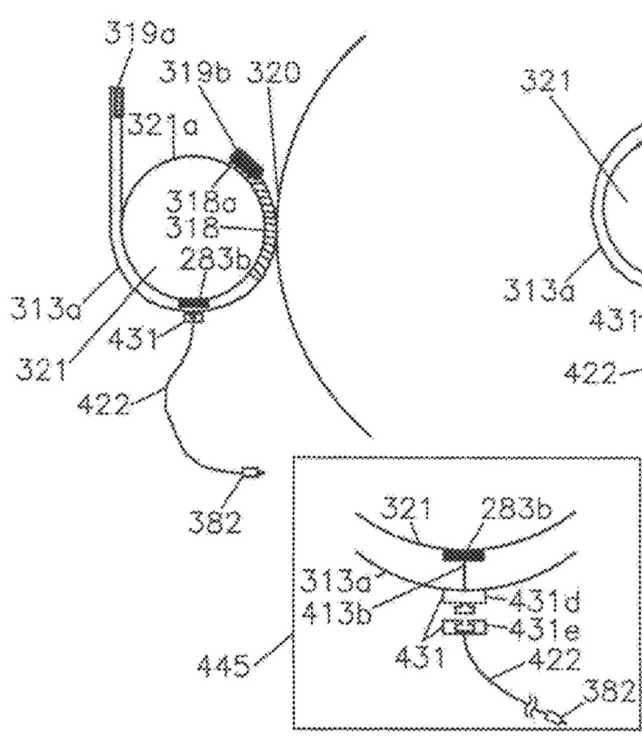

FIG. 40: Detail view on band with ECG electrode before fastening on arm.

Figure 41:
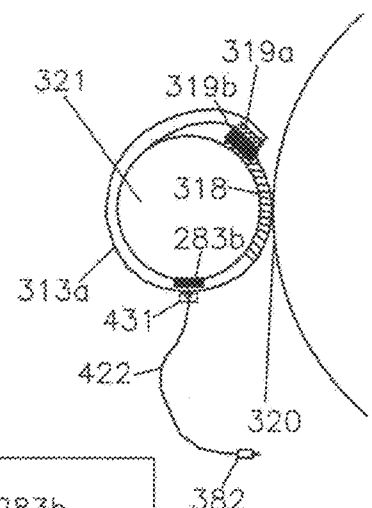

FIG. 41: Detail view on band with ECG electrode fastened on arm.

Figure 42:
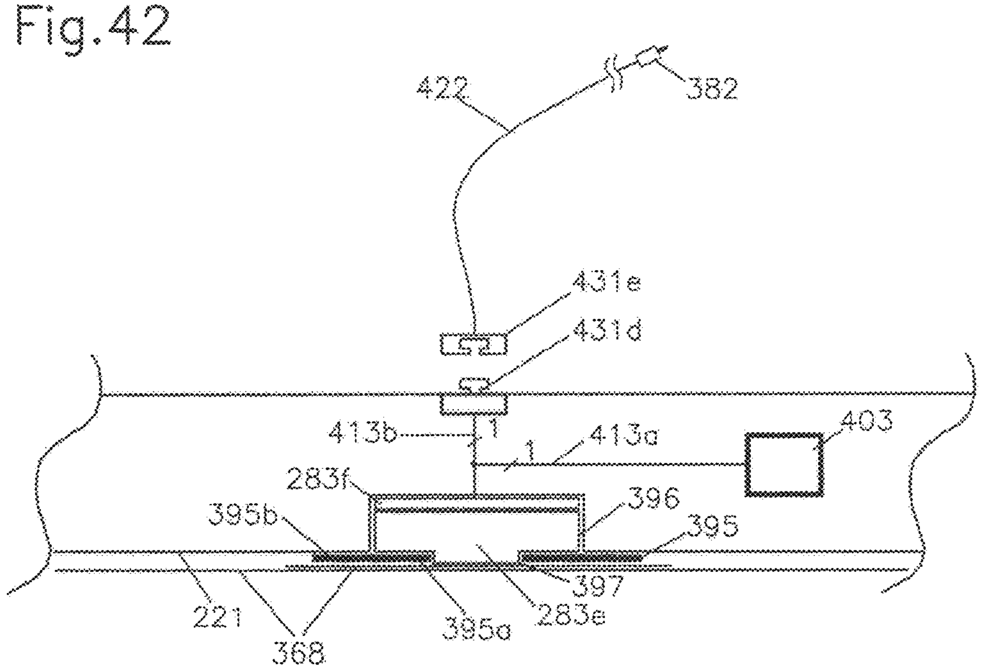

FIG. 42: Exchangeable gelatinous ECG electrodes.

Figure 43:
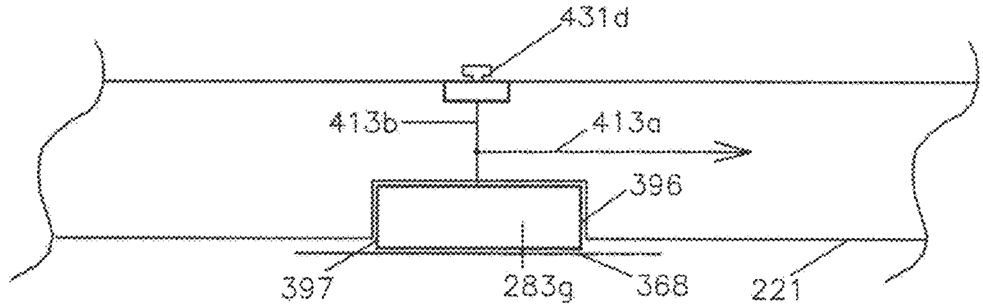

FIG. 43: Firm gelatinous ECG electrodes.

Figure 44:
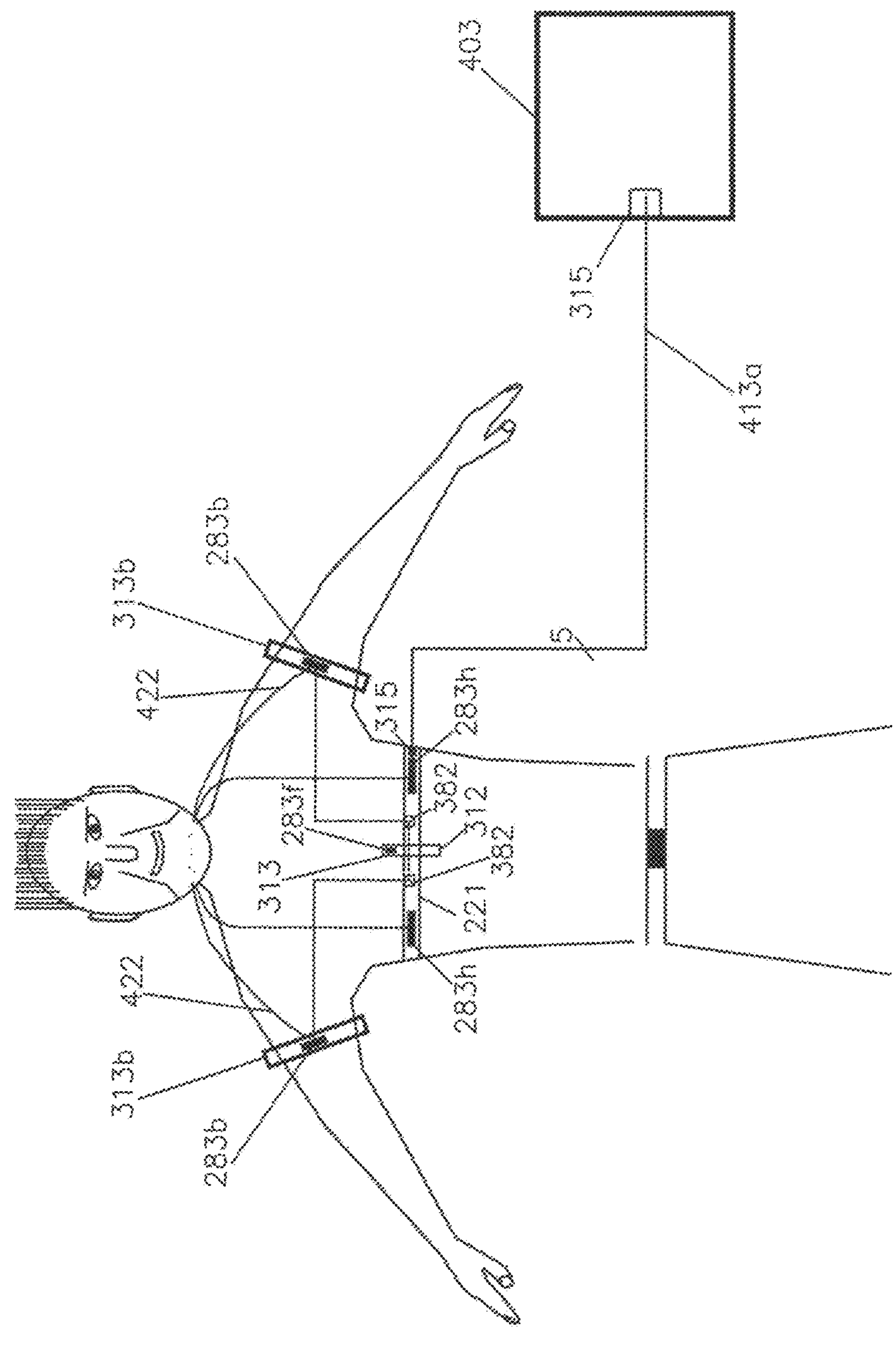

FIG. 44: Fastening of electrodes of ECG on chest belt and bands for 5 electrodes monitoring system.

FIG. 45 part A: Opening display of health functions and curves.

FIG. 45 part B: Detail illustration and edit of display

FIG. 45 part C: Display of ECG I.-III. curves and edit of curve of pulse.

Figure 46:
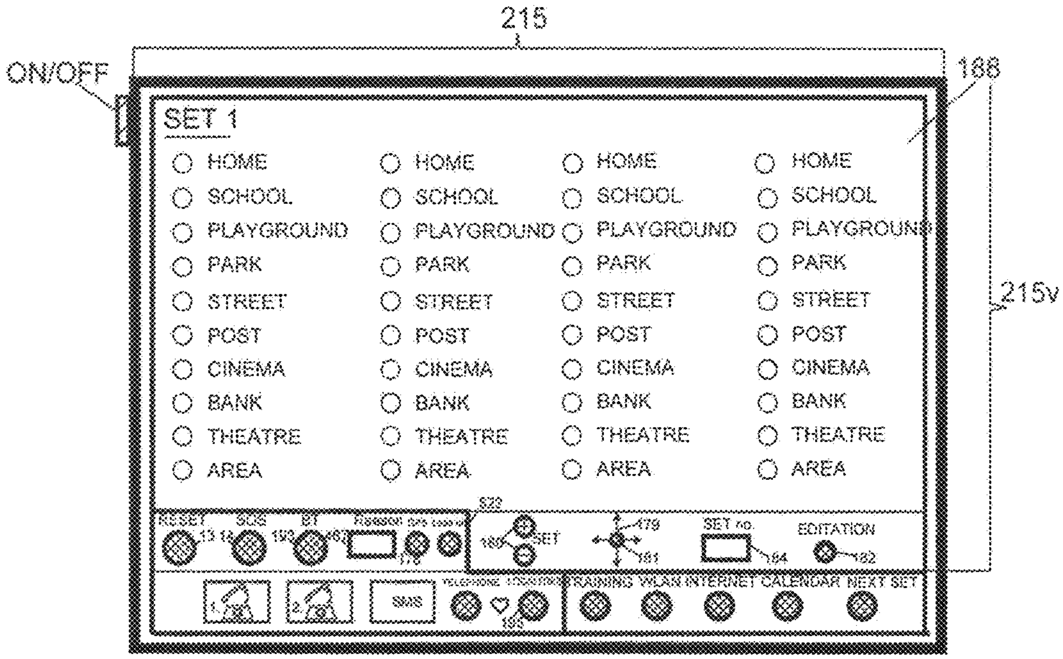
Figure 46:
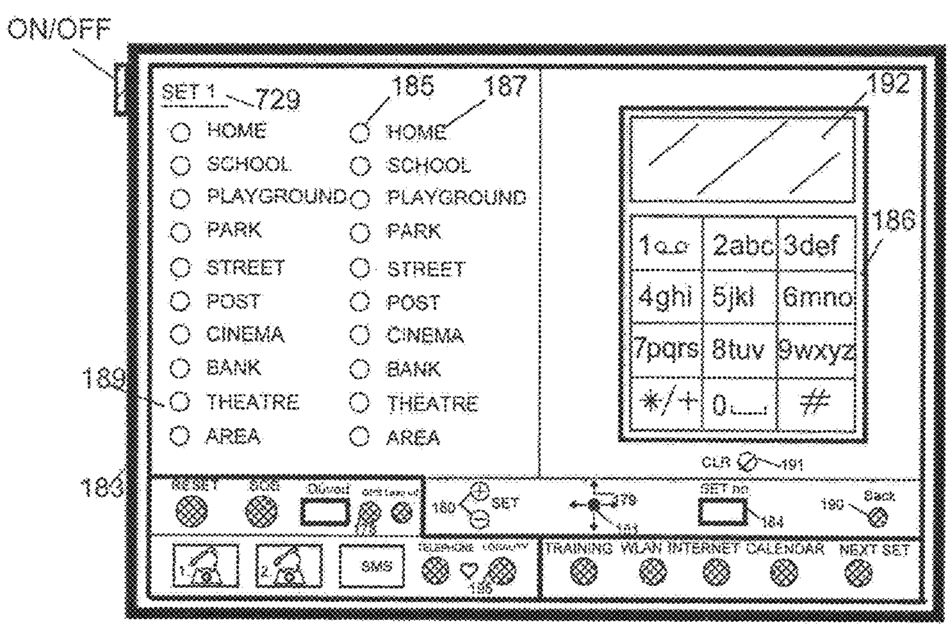

FIG. 46: Display of locations for sending to panel of central control and its edit.

Figure 47:
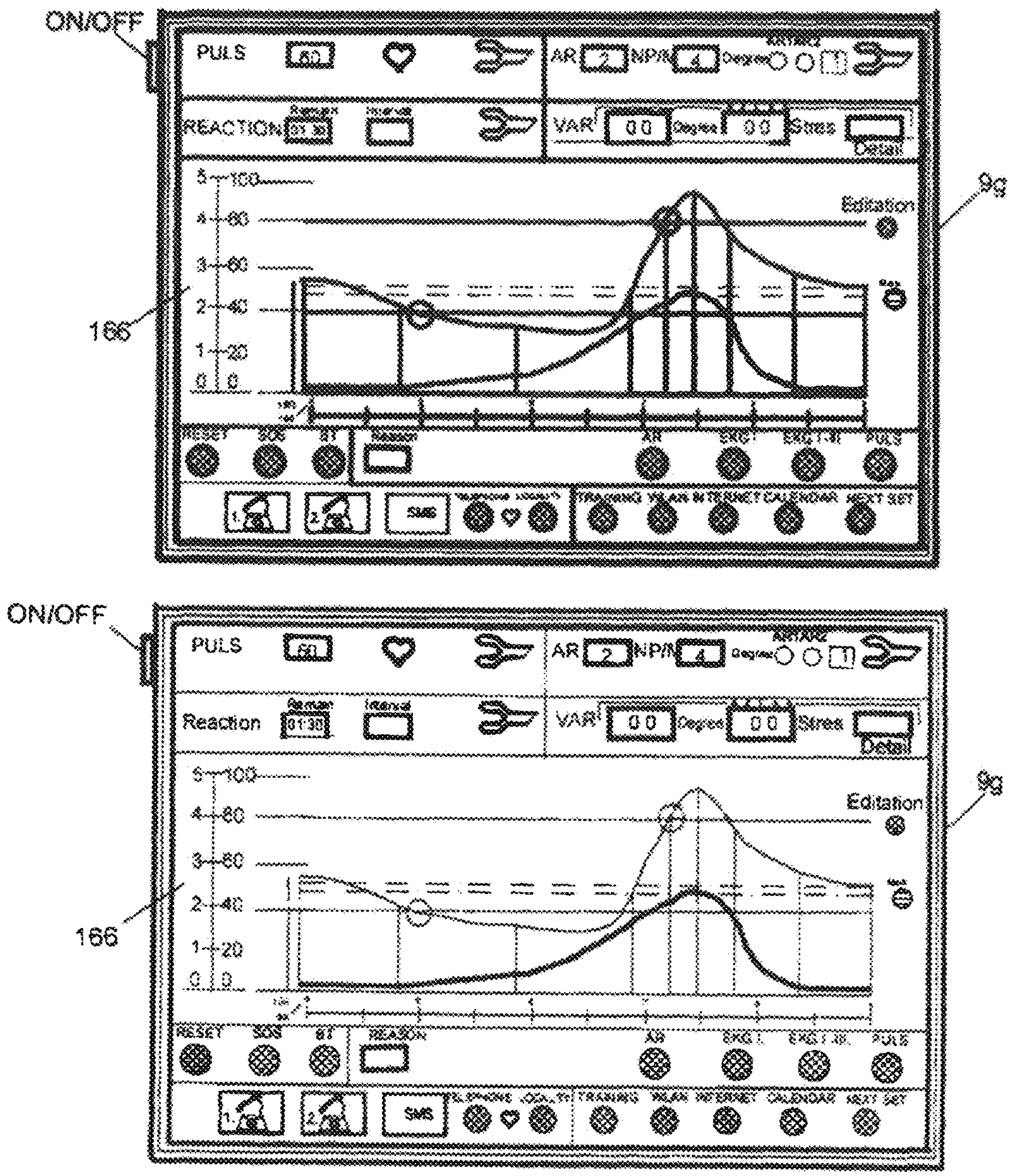

FIG. 47: View on opening display in real size at base and handy central control unit.

Figure 48:
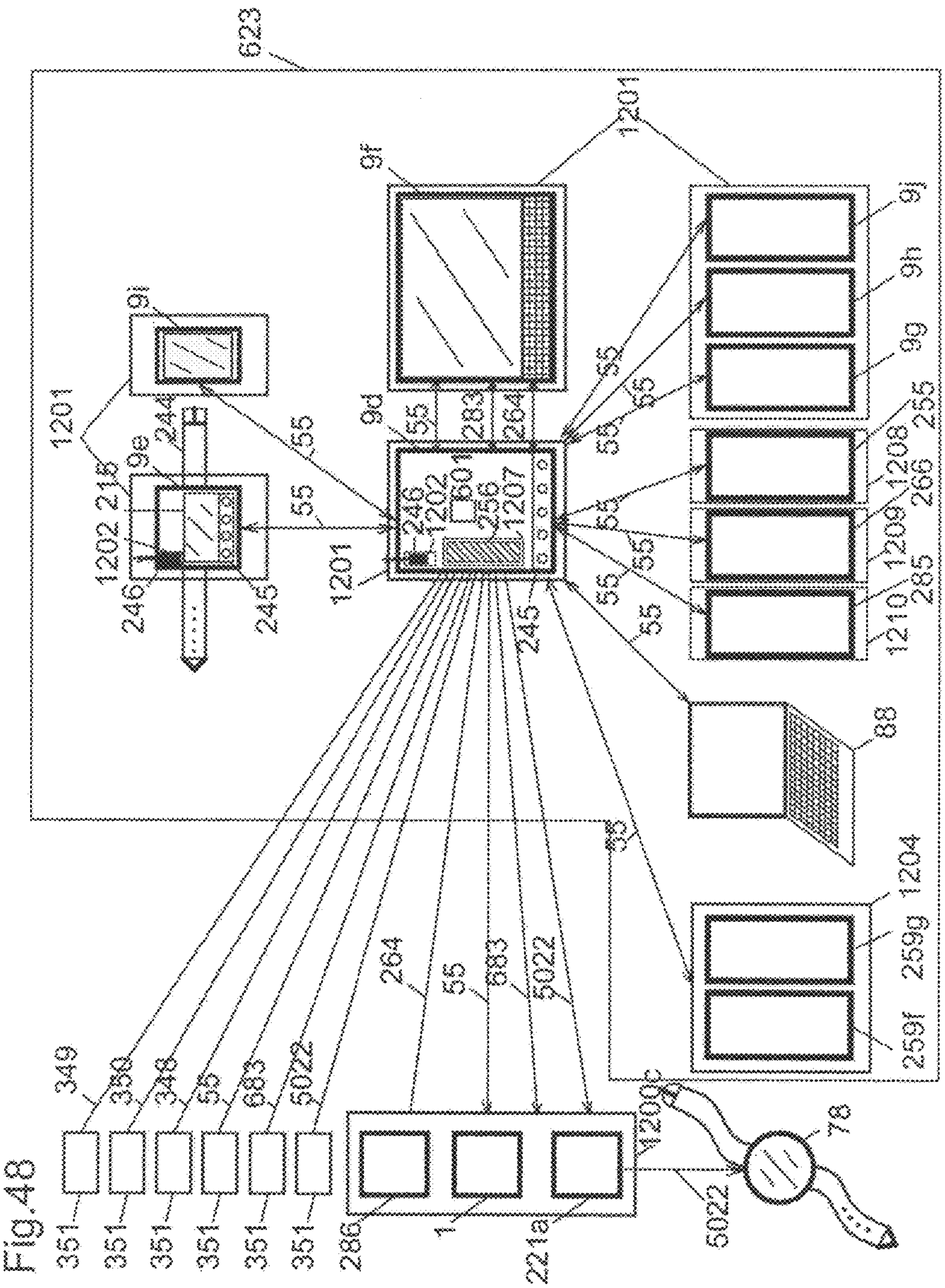

FIG. 48: Block scheme of enlarged set of equipment with converter in central control unit.

Figure 49:
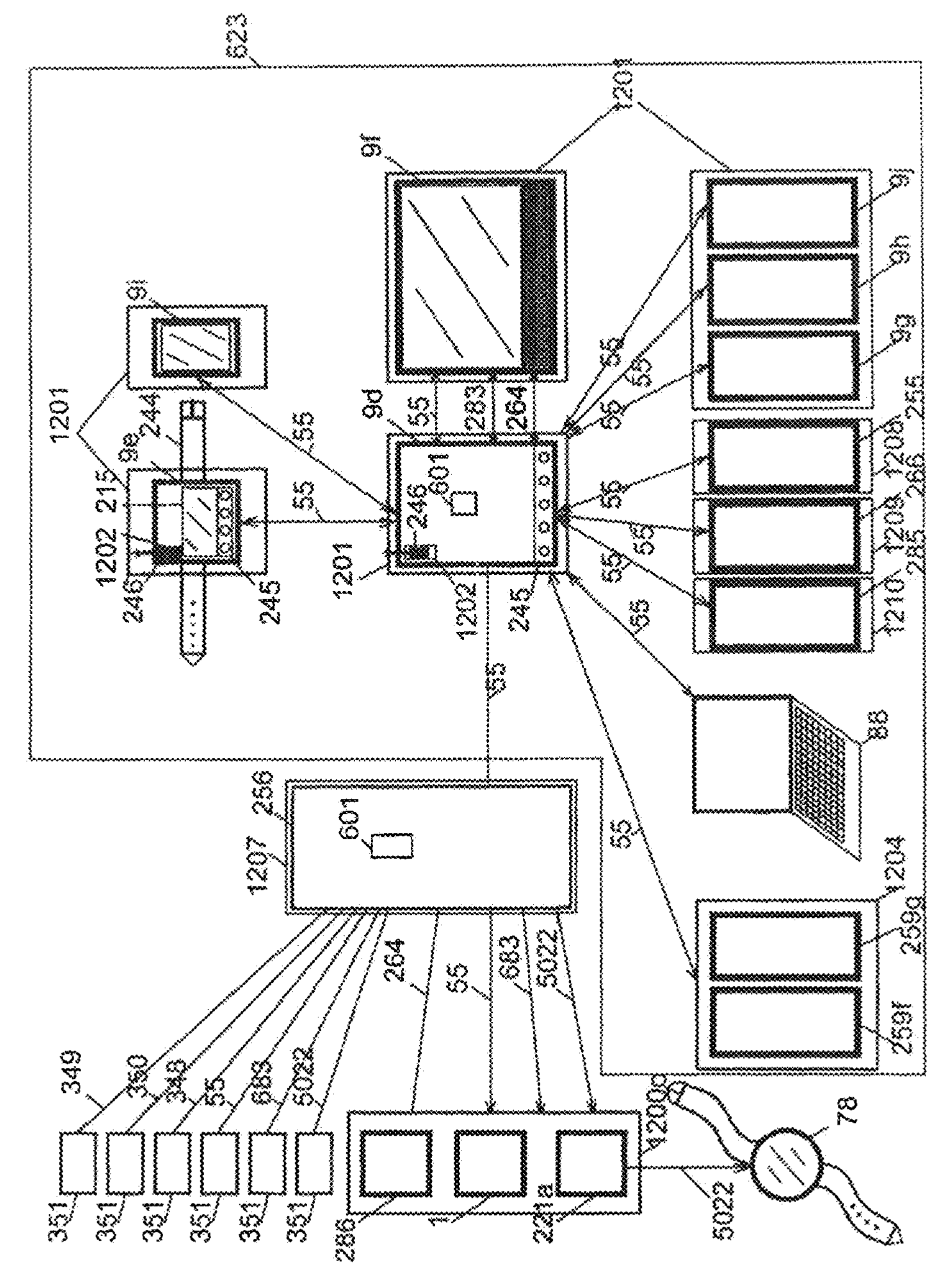

FIG. 49: Block scheme of enlarged set of equipment with converter out of central unit.

Figure 50:
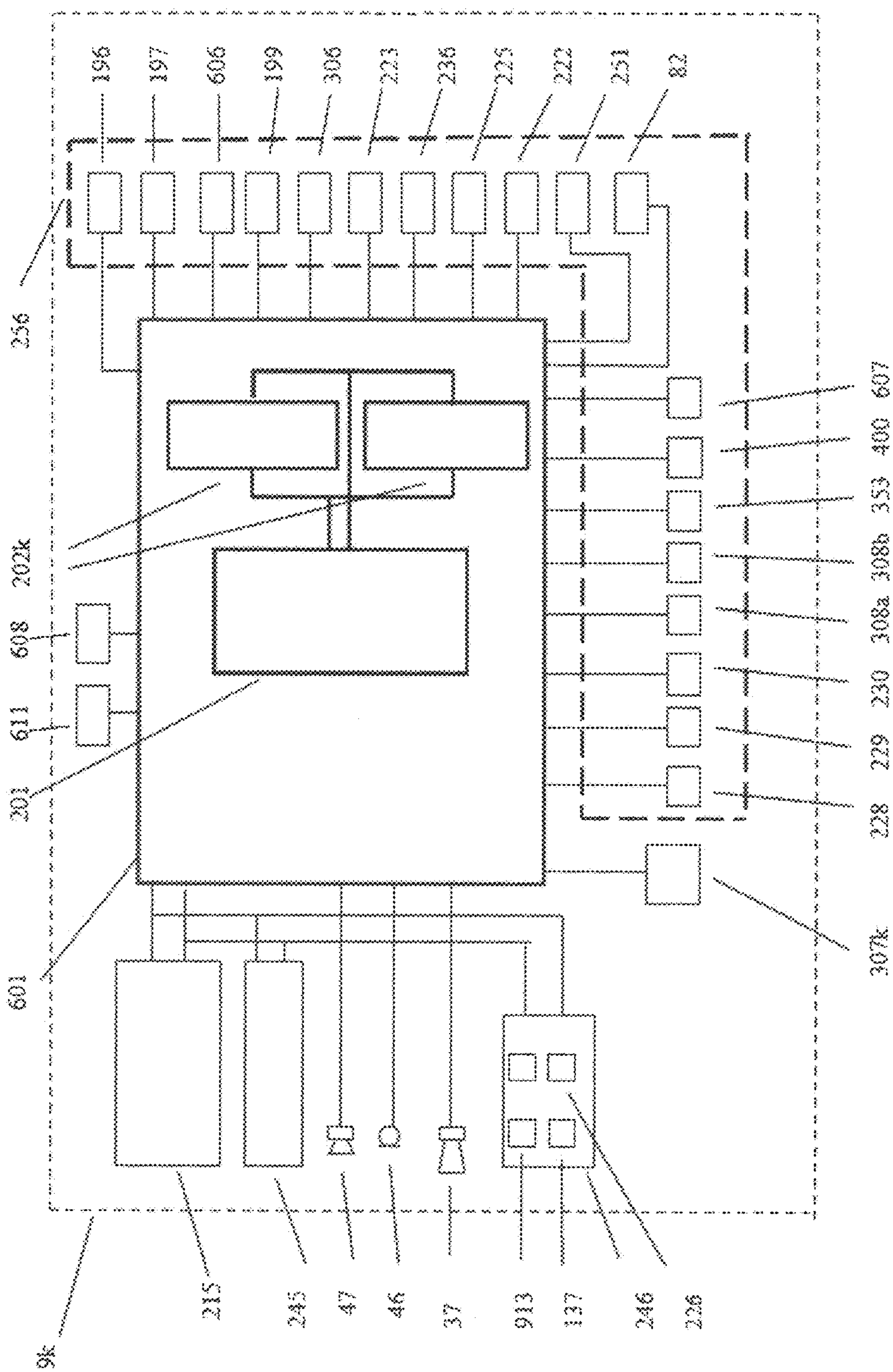

FIG. 50: Detail block scheme of central control unit with enlarged converter for different communication media.

Figure 51:
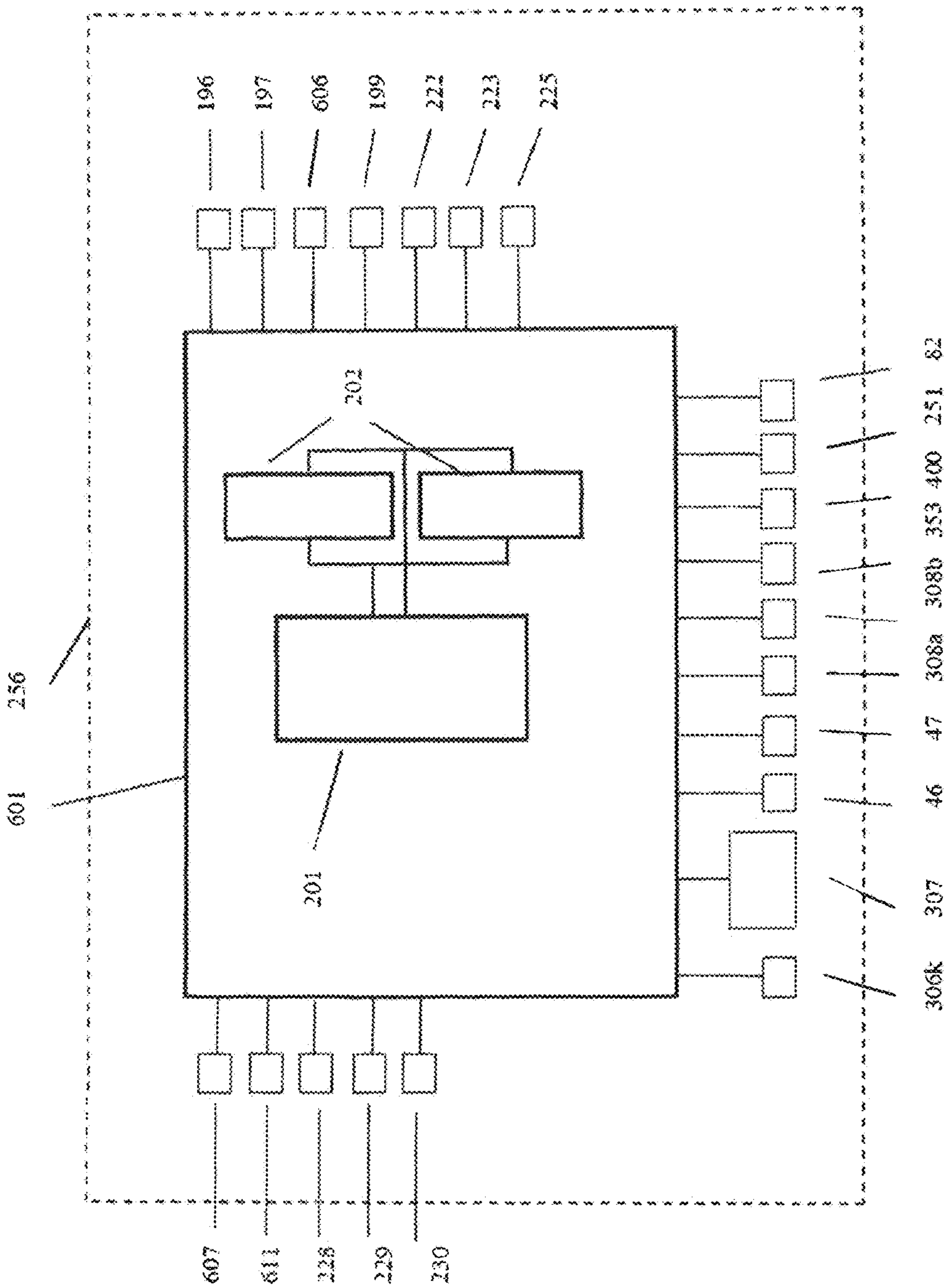

FIG. 51: Detail block scheme of external converter enlarged for different communication media.

Figure 52:
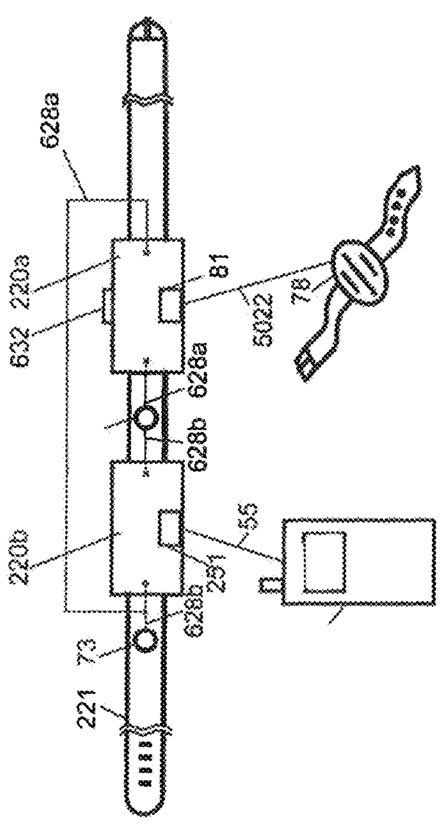

FIG. 52: Two sensors of heart pulse working in different frequencies and placed on chest belt.

Figure 53:
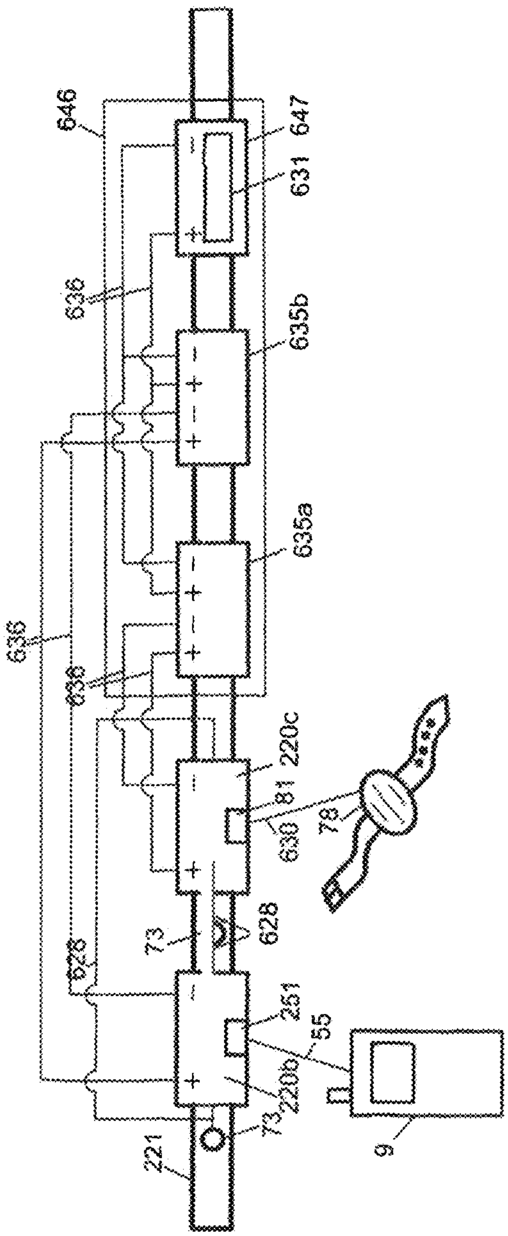

FIG. 53: Two sensors of heart pulse working on different frequencies placed on chest belt and powered from external supply.

Figure 54:
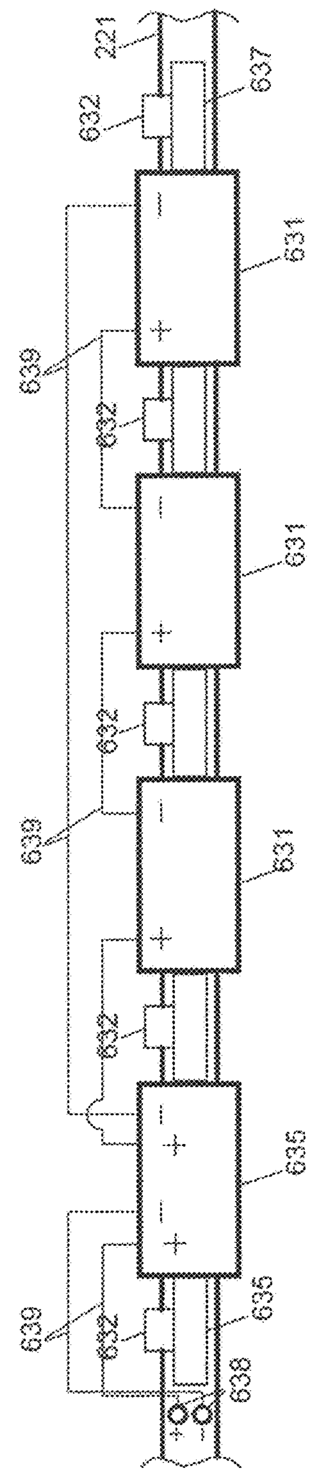

FIG. 54: Removable external supply on chest belt.

Figure 55:
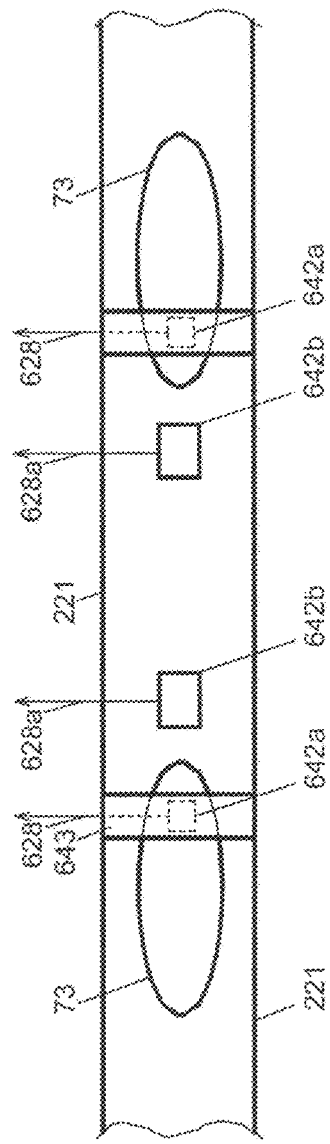

FIG. 55: Contacts for imaging of heart pulse in chest belt for two sensors of heart pulse connected parallel or alternatively doubled and connected separately.

Figure 56:
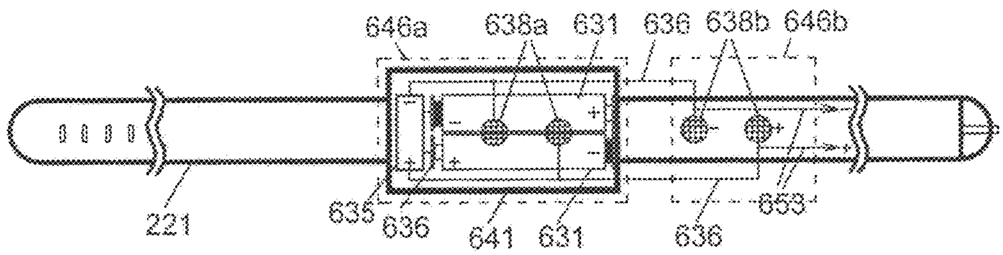

FIG. 56: Detail of external supply for connection of sensor of heart pulse.

Figure 57:
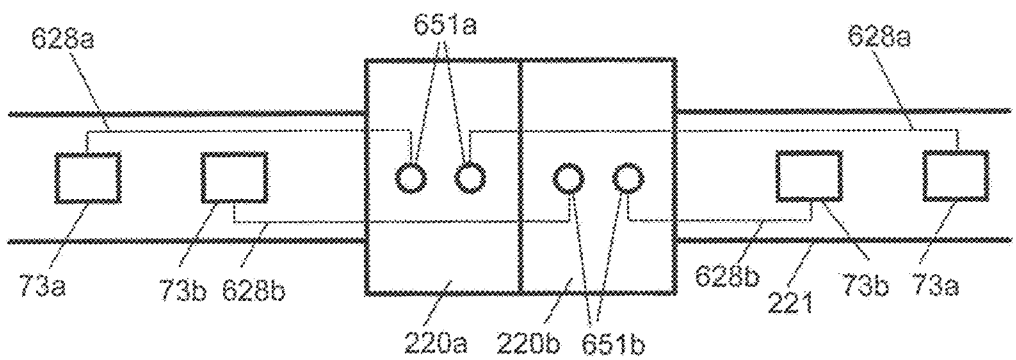

FIG. 57: Two sensors of heart pulse connected each of them to separate contacts for imaging of heart pulse.

Figure 58:
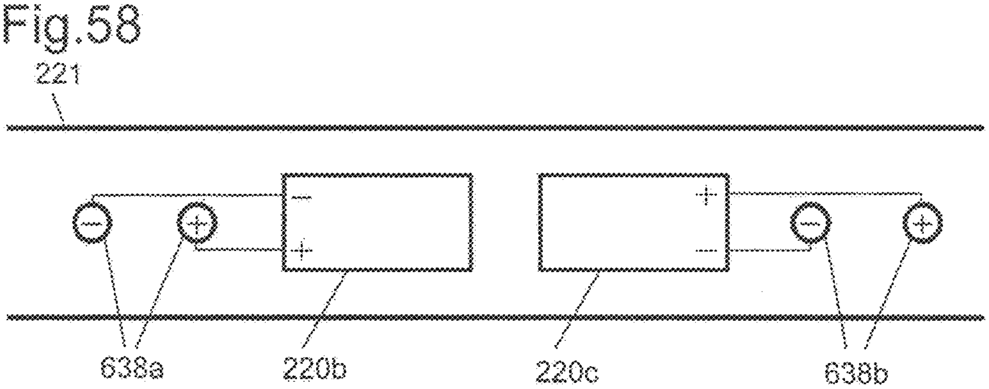

FIG. 58: Two sensors of heart pulse powered separately from two independent external supplies.

Figure 59:
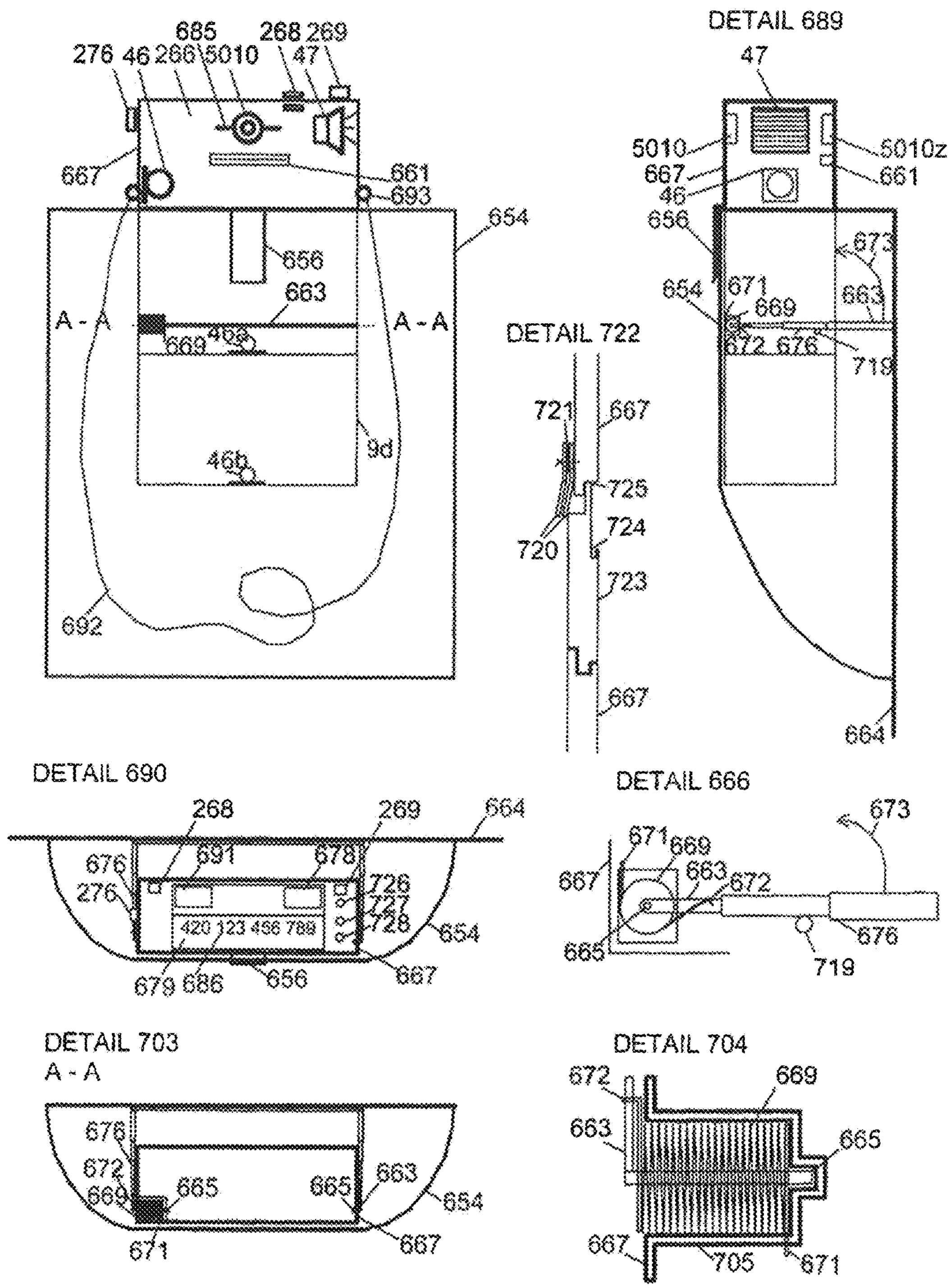

FIG. 59: Mechanical ordering of voice module.

Figure 60:
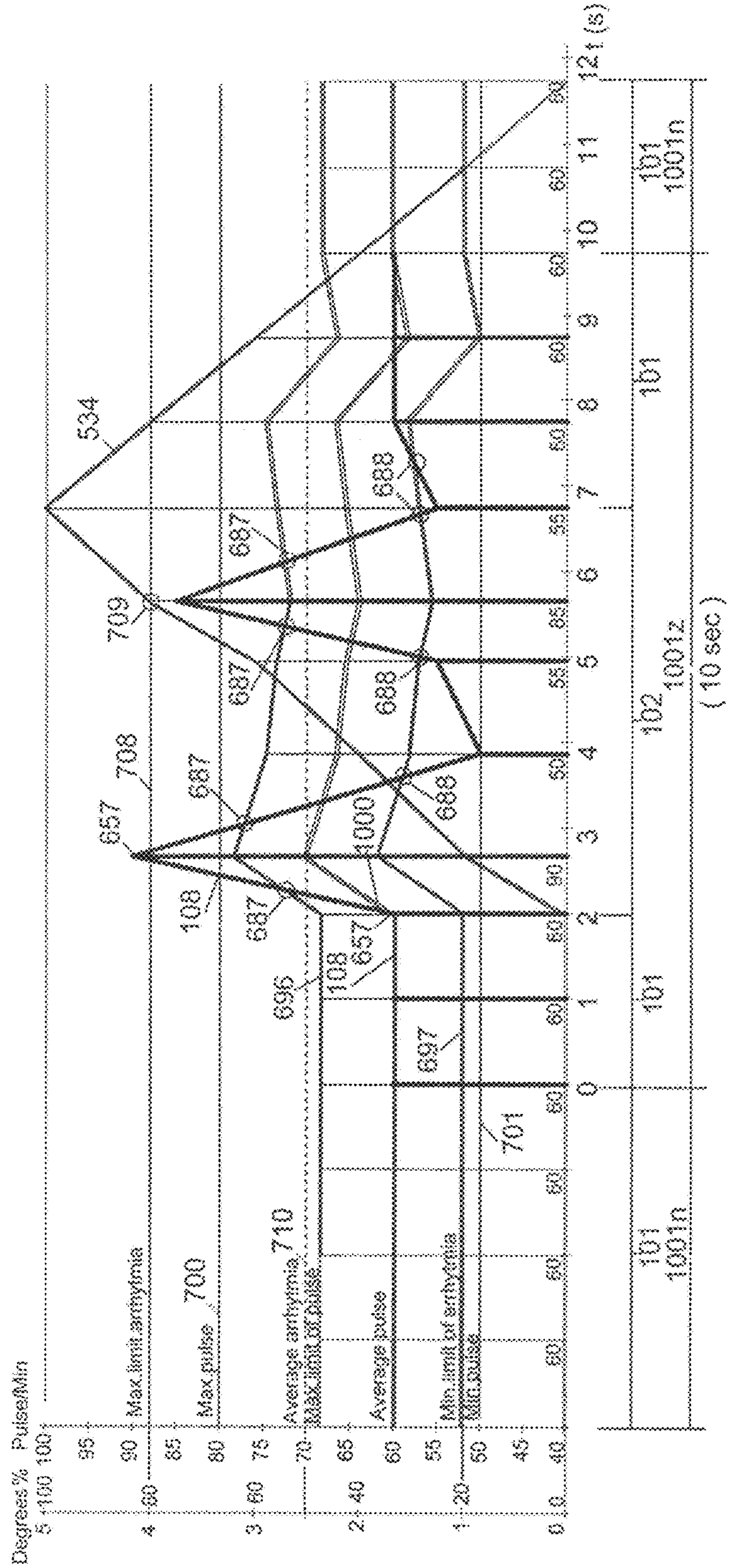

FIG. 60: Curve of heart pulse in case of arrhythmia.

Figure 61:
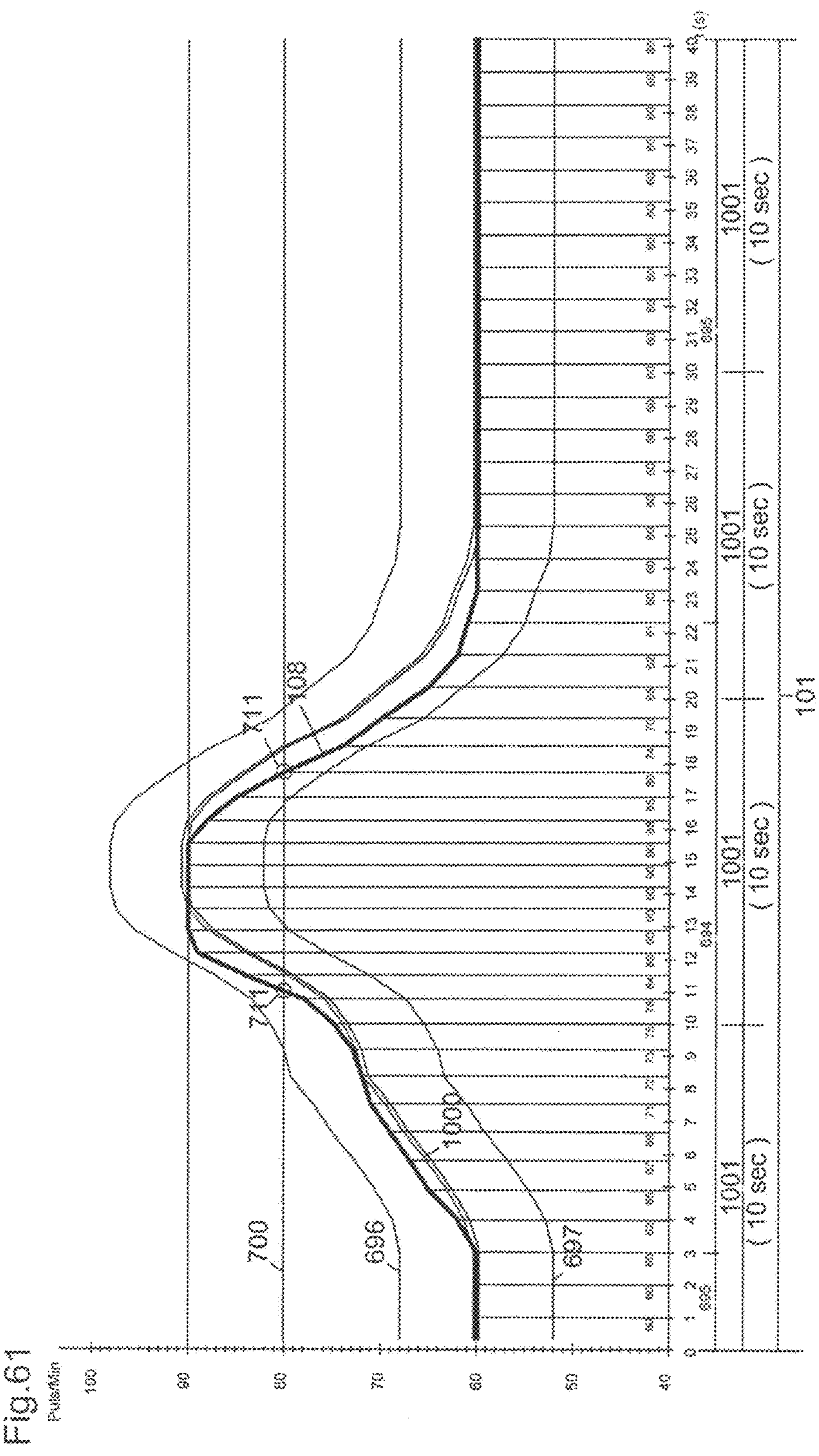

FIG. 61: Curve of heart pulse in case of sinusoid rhythm and acceleration during the physical load.

DETAILED DESCRIPTION

FIG. 1 shows a stationary device for personal emergency alarm, consisting of the movement sensor 1 communicating with the movement sensor evaluation unit 2, to which it is connected via connection 3. The unit records movement data and sends it via the wired connection 10 to the central control unit 9, which sets off the acoustic warning signal from siren 37, unless the movement sensor detects movement during a preset time interval. The time interval may be set by the used—the monitored person using the button 24 with a time scale. The monitored person carries the reset unit 11, which may be used to send the reset signal to the central control unit 9 via the wireless connection 12 by pressing the reset button 13, while the central control unit 9 is sending a warning signal. The warning signal means that unless the reset signal is sent, the central control unit 9 will set off the alarm. Unless the monitored person is incapacitated, he/she will press the reset button 13 during the warning signal, which resets the alarm delay to zero and the next warning signal comes again after the preset time interval. The delay will also be reset by the movement sensor 1, which will reset the delay to zero with every movement it reports via the connection 3 to the movement sensor evaluation unit 2 and then via the wired connection 10 to the central control unit 9. This means that the warning signal is activated in the event that the movement sensor 1 does not detect any movement during the preset time and the alarm is set off if the monitored person does not respond with a reset during the warning signal. The device conveniently allows for using also other detectors, such as the heart rate monitor 220 placed in the chest belt 221, which is linked to the heart rate monitor evaluation unit 100 via the wireless connection 30 and to the central control unit 9 via connection 93. Other possible sensors include the sensors 2002, 2003 and 2004, which control other health functions, such as breath, body position and body temperature. Such sensors are worn by the monitored person in the chest belt and connected to the sensor evaluation unit 2008 via the wireless connections 2005, 2006 and 2007 and then via wire connections 2009 to the central control unit 9. If necessary, the monitored person may use the reset unit 11 to send a call for help by pressing the emergency call button 14. The call is sent via wireless connection 12 to the central control unit 9, which sends the signal via line 7 to the communication unit 5. The communication unit will send the voice alarm via the phone line 8 to the surveillance centre 22 by automatically dialling the number and passing the voice message. In this way, the central control unit 9 will send an alarm in the event that no movement of the monitored person is detected within a specified time period and the monitored person does not activate the reset. The surveillance centre 22 may use the phone line 8 to reach the monitored person via the communication unit 5 and line 6 at the stationary phone 4. The phone will automatically receive the incoming call and switch to speakerphone mode. In this way, the surveillance centre may communicate with the monitored person to check his/her condition, particularly in the event of an alarm, to prevent unnecessary interventions. The monitored person may cancel the speakerphone mode and switch to the phone by holding the reset button 13 for 2 seconds. If the monitored area consists of more rooms, it may be convenient to use more phones. For instance, if there are two rooms, and additional phone 31 may be used, connected via line 34, with more movement sensors, such as the movement sensor 32, connected via wired connection 33. In the central control unit 9, the monitored person may use the reset switch at the movement sensor 36 to switch off the reset of the preset time interval for setting the warning signal with the movement sensor 1 or the movement sensor 32. In this event, regardless of whether the monitored person is moving or not, he/she must, within the time period for sending the warning signal, manually reset the time by the reset button 13 to indicate normal reaction, i.e. that he/she is not in emergency, or else the central control unit 9 will set off alarm. The communication unit 5 may consist of a phone exchange, if more phones, such as the stationary phone 31, are connected. When using a single phone, the stationary phone 4 may take on the function of the communication unit. In this event, the phone is directly linked to line 7 and phone line 8 and is adjusted so that it can send acoustic alarm received via line 7 to the surveillance centre by dialling the centre and sending a voice message via phone line 8. It is also adjusted for automatically switching to the speakerphone mode after receiving an incoming call via phone line 8, which is received automatically during ringing.

FIG. 2 shows the personal emergency alarm device where a wireless movement sensor 38 with a wireless phone 26 and the reset unit 11 are carried by the monitored person, possibly in a case 28. The monitored person has the phone connection as well as the movement sensor signalization and the reset option with the reach of the wireless connection with the wireless phone base station 25, the wireless movement sensor evaluation unit 39 and the receiver 4001 of the reset unit 11 located in the central control unit 9. There is no need to conduct a costly installation of phones and movement sensors in all the rooms of the monitored space provided that the wireless connection has sufficient reach. The wireless movement sensor 38 is adapted for mobile use so that the monitored person may carry it with him/her, and is connected via the wireless connection 129 to the wireless movement sensor evaluation unit 39. Wireless phone 26, which can be removed from case 28, is connected via wireless connection 15 to the wireless phone base station 25, which communicates with the surveillance centre 22 via phone line 8. During a call, the surveillance centre 22 can remotely switch the monitored person's wireless phone 26 to the speakerphone mode. The described personal emergency alarm wireless device operates on the same principles as the stationary device described in FIG. 1 with the exception that it uses a wireless phone 26 instead of a stationary phones 4 and 31, and a wireless movement sensor 38 instead of movement sensors 1 and 32. Similarly to FIG. 1, there is a chest belt with the monitored person's heart rate sensor 220. The data from sensor is sent via wireless connection 30 in the form of acoustic pulses to the heart rate sensor evaluation unit 100, which, if either the minimum or the maximum limit preset by the monitored person is exceeded, immediately sends via connection 93 an alarm indication to the central control unit 9. The alarm indication is processed by the unit into a warning signal in the form of an acoustic signal or a message. If the monitored person fails to activate reset by pressing the reset button 13, the unit will send an alarm signal via line 7 through the wireless phone base station 25 to the surveillance centre 22 via phone line 8. The alarm signal conveniently carries data on the heart rate or the heartbeat for irregular pulse using a signal for each heartbeat, which expert medical staff is able evaluate. The medical staff can remotely discontinue the heartbeat transmission by sending a code via phone line 8, so that the line can be used for voice communication. The monitored person may conveniently reset the alarm before being set off with the reset button 13 on notification by the warning signal from the siren 37. If the over-limit condition persists, the warning signal is activated again after a delay preset by the monitored person with a button with scale 24, which should be pulled before setting. The button has a dual time-set function. Along with the function described above, it also serves to set the delay of the warning signal activation for failure to detect movement by the wireless movement sensor 38. Similarly to the procedure specified in the description of FIG. 1 for the movement sensor 1, the wireless movement sensor 38 transmits information on the movement of the monitored person via the wireless connection 129 to the wireless movement sensor evaluation unit 39 and then via wired connection 10 to the central control unit 9, which will send a warning signal using the siren 37, unless it detects any movement within a time interval preset by the monitored person. The monitored person can execute a reset by pressing the reset button 13, with the time running again from zero, or else the central control unit 9 will send an alarm signal similarly as described for the heart rate monitor sensor 220. The time will be reset to zero also by any movement detected by the wireless movement sensor 38. This sensor is conveniently worn by the monitored person in such a way that it aims at the monitored area and is able to detect movement against surrounding objects. If there is another moving person, animal or other object in the monitored person's area, or for other reasons, the monitored person can switch off the wireless movement sensor with the reset button from the movement sensor 36. In this case, the time interval is not reset by movement, but only by pressing the reset button 13 by the monitored person. During the warning signal, which will sound, the monitored person must execute the reset within the preset time interval to confirm normal reaction, or else the alarm is set off. The warning signal therefore serves as a test to check whether the monitored person is in emergency. By pressing the emergency call button 14, the monitored person may activate an emergency call. The wireless phone base station 25 may conveniently include a stationary phone 301, which may, among other things, serve to establish connection with a wireless phone 26 and the surveillance centre 22. A stationary phone 4 with a communication unit 5 may also be used instead of a wireless phone, as described in FIGS. 1, 14 and 15.

Movement sensors 1, 32 and others together with the movement sensor evaluation unit 2 may be used either in combination with a wireless movement sensor 38, or separately. The other sensors which may conveniently be used include a footstep sensor 305, a shock sensor 303 and other sensors 304 described in other figures. These sensors are connected via wireless connections 2100, 2101 and 2102 with the sensor evaluation unit 1300.

According to FIG. 3 and the necessary personal emergency alarm devices, which are illustrated there, the communication with the surveillance centre 22 is implemented using a mobile phone 18, which is stored in a case 23 that the monitored person carries with him/her. The mobile phone 18 can easily be taken out of the case for communication. This allows to extend the monitoring from the premises to areas covered with the signal of mobile operators. The movement sensor 1 sends data on the movement of the monitored person via connection 3 to the central control unit 9, in which there is the reset unit 11 with the timer, which can be set by the user using the button with time scale 24. If no movement of the monitored person is detected during the preset time interval, the control unit will send an acoustic warning signal using the siren 37. Should the monitored person fail to press the reset button 13 after the warning signal, the unit will send alarm via Bluetooth connection 138 to the mobile phone 18, which will forward the alarm to the surveillance centre 22 via a mobile operator's network 135 by automatically dialling the number by a message or a code. The timer is reset automatically, unless switched off by the reset switch on the movement sensor 36, also by each signal indicating movement from the movement sensor 1. The reset 11 unit is conveniently placed in the central control unit case and is wired to it. The movement sensor 1 is adapted for carrying in a case by the monitored person. The case is worn so that the monitoring rays are not prevented from entering the monitored area. For carrying the case in a way that prevents the monitoring rays from entering the monitored area, the case will be wired or connected wirelessly with the movement sensor 1 attached on apparel so that the operational range covers the free area. The monitored person may send a call for help by pressing the emergency call button 14 via the central control unit 9 and a mobile phone 18. The surveillance centre 22 may reach the monitored person via a mobile phone to check his/her condition in order to prevent unnecessary intervention. The mobile phone may be adapted to automatically receive calls from the surveillance centre 22. If, after evaluating the number, the phone establishes that it is the surveillance centre 22 calling, it switches to the speakerphone mode. For other callers, it makes and acoustic notification of the received incoming call.

In a state of emergency, and therefore alarm, or on request by the surveillance centre, the GPS device 21 in the mobile phone may automatically send the position of the monitored person. This and other features, which are not common in a mobile phone, are taken care of by dedicated software, which is set up in the memory of the mobile phone and runs in the background of the common software, which controls the mobile phone functions. The chest belt for monitoring heart rate 221 is connected via Bluetooth 35 to the central control unit 9, which evaluates the data and if either the minimum or the maximum limit is exceeded, it will set off a voice alarm indicating the value of heart rate via Bluetooth 138 to the mobile phone 18, which will immediately sent the alarm to the surveillance centre 22.

After adjusting for any deviations of the movement sensor 1, a footstep sensor 42 is used to record individual steps and providing information on the activity of the monitored person. The footstep sensor 42 is conveniently connected to the central control unit 9 via Bluetooth 53. A shock sensor 43 is also used and is connected to the central control unit 9 via Bluetooth 54. The sensor monitors shocks caused by the activity of the monitored person. The footstep sensor 42 and the shock sensor 43 reset alarm delay similarly to the movement sensor 1. These sensors may conveniently be complemented with a position sensor 50, connected via Bluetooth 51, to the control unit. The position sensor gives the position of the monitored person's body, from upright to recumbent. If there is a difference in position over time, and therefore an indication of the monitored person's activity, the position sensor 50 will also send the reset signal. If the monitored person rests in a horizontal position for a set period of time, the data from the position sensor 50 is evaluated in the central control unit 9 as a cause of alarm, which is activated. This means that if the monitored person wants to lie down, he/she must temporarily switch off the position sensor 50, or else it will set off alarm on the assumption that the monitored person has fallen down and is incapacitated. More sensors which monitor the monitored person's activity, as mentioned above, conveniently reduce the error rate of the system as compared to using only one sensor. Any additional sensors may be switched off with the additional movement sensor switch 40, while the movement sensors may be switched off with the reset switch from the movement sensor 36. This means that the sensors no more reset the delay to set off alarm. During the warning signal, the monitored person must therefore execute a manual reset to confirm normal reaction, i.e. to indicate he/she is not in a state of emergency, or else the alarm is set off.

If establishing the exact position of the monitored person using a GPS device 21 in the mobile phone 18 is not possible, a position-tracking transmitter 45 is available, which is activated either automatically on sending an alarm, or remotely from the surveillance centre via the central control unit 9 and Bluetooth 56. This radio signal may be located using receivers with a rotating directional antennas and EMF meters, when measured from various locations. The monitored person is located at the intersection of the directions of the strongest signal of both receivers. This location method may also be used indoors, when the direction of the strongest signal is detected when moving around the premises and used as a search direction. This makes the location using a mobile operator's network, which may also be used, more precise.

For easier control, a part of the functions may be located externally outside the central control unit 9, for instance on a wristband 41. The reset button 13 and the emergency call button 14 are placed there, duplicating the reset button 13 and the emergency call button 14 on the reset unit 11, placed on the control unit. Since the wristband may be placed on the part of the wrist where it is not covered with a sleeve, it can host the speaker 47 and the microphone 46 for the speakerphone mode of the phone communication via a mobile network. When activated with button 216, these elements take on the functions of the microphone and the speaker, respectively, in the mobile phone, while receiving the incoming call. To cancel a call, press button 217. The cable for an external in-the-ear earphone and a microphone may be connected via connector 218. The voice communication using a mobile phone adapted to such a purpose is transmitted via Bluetooth 138 to the central control unit 9, and from there via Bluetooth 219 to the wristband 41. The advantage is a good audibility as the sound in the speakerphone mode does not get muffled by clothing, which is particularly advantageous in the event that the monitored person is incapacitated to such an extent that he/she is unable to use a mobile phone or take it out from a pocket. For that reason, the wristband 41 also includes a siren 37, which duplicates the siren 37 in the central control unit 9. Pressing the siren control button 57 activates the siren 37 at a higher volume and the speaker, also at a higher volume, with a call for help, and these are automatically activated in an alternating way. Deactivation is conducted by pressing again the siren control button 57 or remotely from the surveillance centre. The surveillance centre may also raise the volume of the speaker 47 if there is no response to the call in order to try to call on other persons who find themselves in the monitored person's area to help. A multifunctional chest belt 44 may conveniently be connected via Bluetooth 55. The belt contains heart rate sensors and a two-lead heart rate sensor 73, a body temperature sensor 75, a breath rhythm and depth sensor 74, a body position sensor 76 and a shock sensor 77. The data from the sensors are evaluated in the central control unit of the chest belt 52 and transmitted together via Bluetooth 55 to the central control unit 9 for further processing.

Preferably, FIG. 4 shows connection using radio waves instead of Bluetooth used in FIG. 3. For instance, the wristband 41 in FIG. 4 is adapted to enable radio-frequency connection. Microphone 46 and speaker 47 are connected to the central control unit 9 via radio connection 98 using a wireless phone device, where the wireless phone base station 91 is placed in the central control unit 9, a part of the remote phone 64 in the wristband 41. Controls such as the reset button 13, the emergency call button 14 and siren 37 placed in the wristband 41, which duplicate the buttons of the central control unit 9 and are connected to the central control unit 9 via radio connection 58, with modulated signals for individual elements. A transceiver 65 in the wristband communicates with the transceiver 66 in the control unit to transmit appropriate commands. Heart beats are received by the receiver 94 as a radio signal transmitted by the radio transmitter 81 from the central control unit 9 to the display 63 of the microprocessor, where they are evaluated and displayed in a numerical form as instant values of heart beat and as curves of heart beat over time.

The shock sensor 43 and the position sensor 50 are connected to the central control unit 9 via a radio wave 60 receiver 68 and transmitted 67, located in the common case of these two sensors, which can conveniently be placed in the case 16. The movement sensor 1, connected to the central control unit 9 via connection 3, is also placed there. A wireless movement sensor 38 may be used as an alternative, connected via wireless connection 129 to the wireless movement sensor evaluation unit 29, which is place in the central control unit 9, which processed the data from it. The wireless movement sensor 38 may conveniently be worn on the monitored person's clothes to have a good view of the free space around him/her.

The position-tracking transmitter 45 may be switched on by the radio signal transmitter 70 with a command modulation, located in the central control unit 9 and connected via radio connection 61 to the receiver 69 in the position-tracking transmitter 45.

A multifunctional chest belt 44 may alternatively be used in the illustrated device. This multifunctional chest belt 44 has sensors that measure heart rate and a two-lead curve by the two-lead heart beat sensor 73, breathing rhythm with a breathing rhythm and depth sensor 74, body temperature with a body temperature sensor 75, body position activity with a body position sensor 76 and shocks with a shock sensor 77. The sensors are connected to the chest belt control unit 52. The data and the results are further evaluated in the central control unit 9, where they are send via connection 62. If any value exceeds a limit, alarm is sent via Bluetooth 138 by a mobile phone 18 to the surveillance centre 22, which can connect to data monitoring via the mobile phone 18 and request history from the memory of the central control unit 9. The data may automatically be sent in the event of alarm. It may also be displayed on the display of mobile phone 18 on a PC 212 of the surveillance centre 22 as curves and as instant numerical values. Displaying the data on a PC 72 at the location of the monitored person is possible via an infrared link 71. The central control unit 9 may conveniently produce a warning signal before setting off the alarm. During the signal, the monitored person may reset the alarm by pressing a button.

A wristwatch 78 with display 80 may be connected to the central control unit 9 via radio connection 79, radio transmitter 81 and receiver 82. The display may show the instant value of the heart rate, the heartbeat curve over a period of time, with the possibility of browsing through history and setting the time period with controls on the wristwatch. These values are calculated in hours by the processor based on the heartbeat pulses, sent via radio connection 79. The wristwatch may be switched to normal hour operation.

The central control unit 9 contains the radio transmitter 81, which modulates the radio connection 79 with pulses at the frequency of the heartbeat, received by receiver 82 and evaluated in wristwatch 78 using a microprocessor and special software. The wristwatch 78 may produce also other data, such as the length of the distanced covered by walking or running using received pulses for each step from the footstep sensor 42 through the transmitter 360, radio connection 59 and receiver 90. It is then transmitted by the central control unit 9 via radio connection 79, also for the wristband 41 via the receiver 94, which may similarly process the heart pulses and show them on display 63 using a local microprocessor.

The wristwatch may be connected to a PC 84 via an infrared link 83 for a detailed analysis of the measured data from the wristwatch memory. The PC may also serve to program functions. There is a similar infrared link 380 also for the wristband 41. The functions of the controls of the reset switch from the movement sensor 36 and the additional movement sensor switch 40 have been described above. There is a device for evaluating the GPS geographic coordinates 21 in the mobile phone 18, which establishes the position of the monitored person. The position may, upon the request of surveillance centre's 22, be sent via a mobile network 994.

FIG. 5 describes the multifunctional chest belt 44, which conveniently contains the chest belt control unit 52, wired 995 to the two-lead heart rate sensor 73, a breathing rhythm and depth sensor 74, a body temperature sensor 75, a body position sensor 76 and a shock sensor 77. The external sensor and unit evaluation unit 89 is connected to the footstep sensor 42 via transmitter 360, radio connection 92 and receiver 90, as well as the position-tracking transmitter 45 via transmitter 70, receiver 69 and radio connection 61; the wireless movement sensor 38 via connection 93, which is conveniently a radio frequency wireless connection 129 and receiver with a wireless movement sensor evaluation unit 39; the wristband 41 with display 63, radio connection 98; and the components of the wireless phone 27. In the wristband 41, there is also the transceiver 65 for the reset button 13 and the emergency call button 14, the siren control button 57 and the siren 37, which communicates with the transceiver 66 via radio connection 58. The data for display 63, for instance the heart rate, is transmitted via the radio transmitter 81, radio connection 79 and receiver 94, in which there is a microprocessor unit for the processing of data, such as heart rate. The data for wristwatch 78 is transmitted via the radio transmitter 81, radio connection 79 and receiver 82, in which there is a microprocessor unit for the processing of data, such as heart rate, for the display 80. Displays 63 and 80 may be used to display, for instance, the heart rate and other curves, similarly to the case illustrated in FIG. 4. These may also be displayed on a PC 84 via the infrared link 83 or the infrared link 380. It is possible to set the functions of the wristwatch 78 and the wristband 41 from the PC 84, as well as from the mobile phone 87 or the PC 88.

The external sensor and unit evaluation unit 89 is connected via connection 302 with the central control unit 9, which is connected via link 242 to the chest belt central control unit 52, transmitting the aggregate data via Bluetooth 95 to the mobile phone 87, which sends it to the surveillance centre 22 via a mobile operator's network 135. The mobile phone 87 processes the data from the chest belt control unit 52 and the central control unit 9*b*, and transmits it via a mobile operator's network 135 to the surveillance centre 22. It also sends commands to the central control unit 9*b*, received from the surveillance centre 22 or entered via an extensible keyboard 97. As the central control unit 9*b* is placed on the chest belt, it does not contain any controls. The controls are instead placed on the mobile phone 87. To get a sufficient number of buttons, the mobile phone 87 is conveniently programmed so that by pressing a particular button the common functions of the mobile phone buttons are replaced by functions which are necessary for controlling the personal emergency alarm device. This enables you to place the particularly important buttons, described in FIG. 1-4 on the mobile phone 87. The buttons include the reset button 13, the emergency call button 14, the plus button 131 and the minus button 132, which serve to set the alarm delay, replacing the button with the time scale 24 from FIG. 1-4. There is also the reset switch from the movement sensor 36, and the switches of additional movement sensors 40. The mobile phone 87 with an extensible keyboard 97 is used for its larger display 96 and the possibility to change the button functions 997 with a designated button 996. A touch screen display may be used as an alternative. It is large and makes it possible to program and change controls as needed. The curves and the data may conveniently be downloaded via Bluetooth 214 from the chest belt control unit 52 via the central control unit 9*b* to the PC 88 or viewed on the mobile phone display. The same is possible on the PC 410 in the surveillance centre 22 from the data sent there using the mobile phone 87 via a mobile operator's network 135 to the mobile GSM gate 411 and Bluetooth 412 on the surveillance centre's 22 request or automatically during alarm. The central control unit 9*b* processes data from the sensors, taking into account the time limit for showing activity. In the event that the data are beyond the preset limit, the central control unit dispatches alarm via the mobile phone 87 to the surveillance centre 22. Before that, sends a warning signal to notify the monitored person via the mobile phone 87 or the wristband 41 or the wristwatch 78. The monitored person may conveniently view the over-limit values or other data on the display of the mobile phone 87 or the wristband 41 or the wristwatch 78. If not in emergency, the monitored person may reset the alarm by the reset button 13. All functions described in FIGS. 1 to 4 remain applicable. The main difference is that the original control by the central control unit 9 in FIGS. 1-4 is not taken care of by the central control unit 9*b*, which is located in the chest belt. The mobile phone 87 may serve to finally process the data using special software, installed on the mobile phone 87 in addition to the usual software. This special software runs in the background of the common software for controlling the mobile phone. Along with the usual phone functions, the mobile phone 87 in this case fulfils the function of the final data processing for the personal emergency alarm device and may, to some extent, replace the central control unit 9*a*.

The mobile phone in the wristband 136 may alternatively be connected to the central control unit 9*b* via Bluetooth 130. The mobile phone in the wristband 136 may communicated via a mobile operator's network 133 with a GSM gate 411 of the surveillance centre 22 and with the PC 410 via Bluetooth 412. More space has been secured for display 215, with a SIM card 137 beneath it. The controls are located on the side of the case of the mobile phone in the wristband 300, which comprises mobile phone parts 485, a SIM card 37, a siren 37, a microphone 46 and a speaker 47. The controls on the side include, for instance, the reset button 13, the emergency call button 14, the plus 131 and the minus 132 buttons for setting time, a button to control the siren 57, a switch for the movement sensor reset 36, the additional movement sensor switch 40, and, if needed, more controls for controlling the data and the curves which should be viewed in the display 215. The following data and curves may conveniently be viewed on the displays of the mobile phone 87, the PC 88, the PC 410 in the surveillance centre 22, the mobile phone in wristband 136, connected via Bluetooth 130).

For heart rate the instant value and the curve of values over the latest time interval. It is possible to browse through previous time intervals, to increase or reduce the time interval, to automatically view only sections outside the optional limit, heart rate maximum or minimum, irregularities in heart rate, and extra-systoles. More over the ECG of the latest time period may be viewed It is possible to browse through the previous intervals, to increase or reduce the view time interval, to automatically view sections outside the optional limit, heart rate maximum and minimum, irregularities, extra-systoles and the sections with a considerable variation against the normal ECG. Instant value and curve for breath and temperature adjustable similarly to other heart functions—time intervals, history, limits. Instant value and curve for body position and shocks, with option of browsing in history and changing time intervals. These data and curves are calculated in the central control unit 9*b*, or alternatively in the mobile phone 87, which in this case takes on the role of the central control unit 9*b*, which then mediates sending the data to the external sensor and unit evaluation unit 89 and back from it. The control role in the mobile phone 87 is executed in the microprocessor unit, where it runs in the background of the main SW program processing using a dedicated dispatching SW program, which controls the functions of the mobile phone 87. The control make alternatively be taken over by the wristband mobile phone 136.

The wristband 41*a* and the wristwatch 78 allow monitor the instant value of heart rate, the heartbeat curve and the intervals of irregularity. These values and curves are conveniently calculated in the wristband 41 and the wristwatch 78 in their local microprocessors from the heart rate data transmitted using the modulated radio waves, as described above. The setting of the viewed information is done using special buttons on the units.

The alarm is set off if any of the monitored functions exceeds the limits. For the heart beat, the limits are not only a minimum and a maximum, but also the preset limits of heartbeat irregularities or extra-systoles for a given time interval, or when the ECG curve shows considerable changes; it is possible to apply reset, as described above. The wristband mobile phone 136 and the mobile phone 87 may conveniently communicate via Bluetooth 95 and 130 using the central control unit 9*b*, if both are used. This has the advantage of dedicated the wristband to receiving only emergency calls, which are not blocked by regular calls received by the mobile phone 87. Using the said connection, the calls directed to the mobile phone 87 may be receive by the wristband by pressing the 500 button. Button 501 serves to receive calls directed to the wristband, while button 502 is for cancelling calls. Button 503 serves to dial the preset surveillance centre 22, while button 504 serves to change the function of selected buttons, for instance display 63 and the viewed values and curves, or to dial preset numbers.

The functions of the wristband mobile phone 136 may conveniently be programmed from devices such as the mobile phone 87, the PC 410 in the surveillance centre 22, or the PC 88. The device may conveniently be operated using the wristband mobile phone 136 or the mobile phone 87 separately, without the other device, or without the wristband 41, wristwatch 78 for communication with the central control unit 9*b* and the surveillance centre 22. If the wristband mobile phone 136 is not used and the mobile phone is used separately, the use of the wristband 41 has the advantage of being able to receive incoming calls to the mobile phone 87 by pressing the button 216. The button sends a command via radio connection 58, the external sensor and unit evaluation unit 89, the chest belt control unit 52 and Bluetooth 95. The communication is executed using the speaker 47, the microphone 46, the radio connection 98, connection 302 and Bluetooth 95. Connector 218 may be used to connect the cable for an external in-the-ear earphone and a microphone, which may be alternatively connected via Bluetooth. Along with the abovementioned buttons and controls on the wristband 41, the wristband mobile phone 136, the mobile phone 87, which may conveniently be used, it is possible to use other controls, as needed. Calls may be cancelled by pressing button 217. The wristband mobile phone 136 is adapted to the speakerphone operation, which is activated automatically when receiving a call. Extra high volume may be switched on by pressing the button 505. The wristband is equipped with earphone 506 with wired connection via connector 507 to socket 508. Plugging in the connector will automatically cancel the speakerphone operation and will switch to earphone 506. It is possible to connect to the earphone with a microphone 510 via Bluetooth 509. The connection is activated by switching on the earphone with a microphone 510.

FIG. 6 in graph 107 illustrates regular heartbeat 101 as well as irregular heartbeat 102 conveniently transmitted by the chest belt 221 or the multifunctional chest belt 44. The time interval 103 for the calculation of arrhythmia can be set. It is also possible to set the minimum number of irregular heartbeats over a time interval which will set off the alarm.

FIG. 7 shows heartbeats on graph 109 for assessing the irregularities of heartbeat. Time intervals 104, 105 and 106 for displaying heartbeats may be set by the monitored person or from the surveillance centre. On instruction from the surveillance centre 22, it is possible to display the time interval 104 or browse through previous time intervals 105, 106, and other, if needed. The heartbeats within the above-mentioned intervals illustrated in graph 109 serve for information only and will in practice illustrate the actual behaviour of the monitored person's heartbeat. On request, it is possible to only display intervals with a specified deviation. The intervals that do not exceed the limit are not displayed. On alarm caused by irregular heartbeat exceeding the limit, the last time interval 104 in graph 109 may be sent automatically or on request by the surveillance centre via the communication path described above.

FIG. 8 shows the time interval 124 between the heartbeats on the "x" axis and the number of beats per minute on the "y" axis, expressing the heart rate value 123. Connecting the values of the number of beats per minute, i.e. the heart rate, will create the curve 108, which illustrates the behaviour of the heart rate over the time interval. It is possible to conveniently monitor heartbeat regularity on the distance between beats at the same time with the behaviour of curve 108, which represents the heart rate, where the highest and the lowest heart rates suggest the spots of possible arrhythmia, on which the arrhythmia analysis may concentrate. For the sake of clarity, it is possible to set the minimum 701 and the maximum 700 heart rate to display only the curve where the limit values are exceeded, for instance in the neighbourhood of points 990 and 702, over a time interval; it is possible to browse through the time intervals stored in memory. If no limits are exceeded within an interval, the program may be set to disable the display of the interval. It is possible to distinguish increased heart rate due to increased physical exercise on the one hand and due to arrhythmia on the other. For this purpose, a curve of the average heart rate 1000 over certain, adjustable time interval 1001 has been introduced. In this case, the limits are set as a percentage of the average value of heart rate or the minimum and maximum limits are expressed as the number of beats over and under the average heart rate 1000. The average value of heart rate 1000 is automatically calculated, for instance, for the set time interval 1001 and conveniently refreshed after the expiry of such interval. During physical exercise, the average heart rate is increasing, raising the lower and the upper limits, which are derived from it, as well as the set limits for normal heartbeat. The shorter is the selected time interval, the more precisely will the physical exercise be taken into account. It is possible to set the limits for the average heart rate and to monitor the heart rate values for exceeding the preset minimum and maximum, regardless of the fact that it may be a sinus heartbeat, in order to detect the heart function at maximum and minimum load. The central control unit 22 may set the heart rate minimum and maximum, as well as any other limits described in FIGS. 6, 7 and 8 via a GSM network. Alarm will be set off if any of the limits is exceeded. These limits may also be set by the monitored person to exclude alarms cause by an increased heart rate due to causes such as physical exercise. If a more intensive physical exercise is expected, the limit may be raise, if quiet is expected, it may be lowered. This enables to capture heart rate irregularities as compared to the situation where limits are set as fixed. The monitored person may reset the alarm with the reset button 13 during the warning signal if he/she evaluates that the alarm was false. FIG. 8 illustrates the example of a maximum 700 and minimum 701 heart rate limit. The alarm would be set off in points 702 or 990. The pulses for calculation are supplied from both the chest belt 221 and the multifunctional chest belt 44, which in addition supplies the ECG curve as the chest belt control unit 52 receives data from the two-lead heart beat sensor 73 in the chest belt and passes them on via Bluetooth to the central control unit 9. The chest belt 221 cannot provide the ECG curve as it only sends pulses in the rhythm of the heartbeat using a modulated radio signal.

FIG. 9 shows a normal ECG curve 800, which is evaluated in the central control unit 9, for instance in FIGS. 3 and 4. The ECG curve, such as the curve 113 in FIG. 10, is scanned from the monitored person and is compared with the normal curve of a healthy individual, such as the ECG curve 800 in FIG. 9. Serious deviations set off the alarm, which is sent to the surveillance centre 22. For this method of evaluation, there are several examples of abnormal curves, compared with the normal ECG curve 800 in FIG. 9, which shows "R" waves 801, "T" waves 802 and "P" waves 803. The "T" wave 802 is usually followed with the "U" wave, which may not always be visible on the displayed ECG curve 800, which is the case here. In order to detect arrhythmia, particularly the interval 804 is compared between the "T" wave 802 and the "R" wave 801. The curve is analysed for any pathogenic waves, which are absent in interval 804 in a healthy individual, as can be seen in the ECG curve 800. The "P" wave 803 is also absent. Either phenomenon would indicate arrhythmia.

If the "P" wave 803 is present, it is possible to measure the P-R interval 860. In the opposite case, it is probably arrhythmia, particularly atrium fibrillation, and the device will set off the alarm. If the P-R interval 860 is too long, it is the A-V block, which may be fatal.

If the P-R interval 860 is longer that the individually set maximum of the monitored person, the device will set off the alarm.

FIG. 10 shows an abnormal curve 113 typical of tachycardia with a regular rhythm, which is in the monitored interval 804 indicated by waves 116, which do not occur in an ECG curve 800 of a healthy individual in FIG. 9. The "P" wave 803 is missing.

In FIG. 11 on the atrium fibrillation curve 114 there are more waves 115 with larger amplitudes than with waves 116 in FIG. 10. Moreover, the heart rate is irregular and has a higher frequency, while the "P" wave is missing. After evaluating such deviations, the central control unit 9 would set off the alarm.

In FIG. 12 on the atrium flutter curve 900 in the interval 804, a lot of waves 901 are apparent, while the "P" wave 803 from FIG. 9 is missing.

The personal emergency alarm device searches the interval 804 for any abnormal waves or irregular heart rate as described in FIGS. 9 to 12. If they do occur or the "P" wave 803 is missing, the device will set off the alarm. The alarm may conveniently be deactivated if the monitored person has already had the condition of arrhythmia and for other reasons that would too often cause alarm. During occasional arrhythmia, the alarm may be deactivated individually by being reset by the monitored person. The last time interval 104 in FIG. 7 and the last interval beyond standard are automatically displayed from the ECG curve during alarm or upon request. The display of previous time intervals from the history memory may be requested.

The ECG graph in FIGS. 9-12 and the curves of temperature, position, activity, shocks and the relevant instant absolute values may conveniently be displayed on the mobile phone display 18 in FIG. 3, on the mobile phone 87 in FIG. 5, on the mobile phone in the wristband 136, on the wristband 41 and the mobile phone case in the wristband 300 in FIG. 5, which communicate via Bluetooth, as well as on a PC 72 in FIG. 4, PC 88 in FIG. 5 and PC 410 in FIG. 5 in the surveillance centre. The data received from the sensors may be processed, for instance, in the control unit. The wristband 41 in FIG. 4 and FIG. 5 and the wristwatch 78, which communicated using radio waves, may display the graph 107 in FIG. 6, the graph 109 in FIG. 7 and the curve 108 in FIG. 8, which are calculated and processed in their microprocessors from the receive data and their absolute value.

FIG. 13 shows a simplified bloc scheme of the stationary device for personal emergency alarm device, which has been described in detail in FIG. 1. The movement sensors 1 and 32 are common sensors used, for instance, in security devices. They may be in any number placed around the monitored premises. Each of detections of movement is led via connection 3 and wired connection 33 to the movement sensor evaluation unit 2. The unit aggregates the reports from all sensors and if movement is detected, it sends an impulse or a signal to the central control unit 9. The movement sensor evaluation unit 2 works on the principle of EZS safety exchanges and uses the logical part of the unit to evaluate sensor data with a microprocessor unit for evaluating movement sensors 559 or the TTL logic or using a relay system. The central control unit 9 is the main unit of the device. It is designed to meet the objective of the invention using a central microprocessor unit 601, and to evaluate movement signals and compare them with the time interval set by the monitored person using button with a time scale 24. If no movement is detected during the interval, it will send a warning signal of a preset length, within which the monitored person may execute a reset using the reset unit 11.

In principle, the described alarm activation device consists of the sensor block 1200, the central control block 1201, the communication block 1202 and the reset block 1203, which are shown in dot-and-dash. The sensor block 1200 consists of various sensors, such as the movement sensor 1, the heart rate sensor 220, which is conveniently place in the chest belt 221, as well as other sensors. The other components include the sensor evaluation units, such as the movement sensor evaluation unit 2, the heart rate sensor evaluation unit 100 and the evaluation units for various sensors 141, which process data from sensors 2002, 2003 and 2004 using a sensor evaluation microprocessor unit 600. The resulting data are sent from the sensor block via, for instance, connections 48 and 3 to the central control block 1201, which is designed to meet the principles of the described patent and controls other blocks. In this example, it consists of a central control unit 9, which receives data from the radio frequency receiver 203, which receives the data via a wireless connection 12 from the reset block 1203 and there located radio frequency transmitter 208, powered with battery 99. In the event of a reset, the relay in the radio frequency 203 will engage, sending a 5V impulse to the I/O circuit 200. The central control unit further consists of a potentiometer 204, controlled using a button with a time scale 24, the switch of reset from the movement sensor 36 and the 5V voltage source 205. It supplies voltage to the switch of reset from the movement sensor 36, which sends voltage to the I/O circuit 200 when engaged. It also supplies voltage to the potentiometer 204, which leads regulated voltage to the A/D converter 207 and from there to the central microprocessor unit circuit 601, which evaluates the impulse against the preset time interval. The central microprocessor unit consists of a crystal 86 for the internal clock, the microprocessor 201 and the memory 202. The central microprocessor unit 601, cooperates with the IN and OUT (I/O) circuit 200, from which it receives input data in a digital form. Based on that data, as well as the data from the A/D converter 207, it evaluates data and information in compliance with the principles of the described alarm activation device and sends a warning signal, if needed, via the I/O circuit 200 to the siren 37. Unless a reset is received from the reset block 1203, the alarm command is activated via line 7 to the communication block 1202, which sends it via the phone line 8 to the surveillance centre 22. The control block executes the function using a SW program stored in memories 202, which is designed for this purpose to meet the objectives of the described alarm activation invention. The communication block consists of a communication unit 5, which controls the stationary phone 4 and the stationary phone 31 along the principles of a telephone exchange. On receiving a call automatically, it will switch the stationary phone 4 to the speakerphone mode and communicates with the surveillance centre 22 via a mobile operator's network. The surveillance centre may request sending data from sensors through the communication unit using a signal via phone line 8 after dialling he communication unit's 5 telephone number, and further on using a signal via line 7 to the central control unit.

The stationary phone 4 and the stationary phone 31, or other phones, are standard telephones adapted for the automatic speakerphone operation on receiving an incoming call and connected via lines 6 and 17 to the communication unit 5. The reset block 1203 consists of a radio frequency transmitter 208, which will send an impulse or an emergency call signal activated with the emergency call button 14, or in the event of a reset 13 activated with the reset button 13, placed in the reset unit 11, which is the main part of the reset block 1203. If a single stationary phone 4 is used, the communication block may conveniently be contained in the stationary phone 4. The movement sensor evaluation unit 2 may conveniently be comprised within the central control unit 9, which may itself be contained in the stationary phone 4.

As described in FIG. 14, which is a simplified illustration of the personal emergency alarm device described in FIG. 1, where the movement sensor evaluation unit 2, the heart rate sensor evaluation unit 100 and the sensor evaluation unit 2008 are contained in the same case with the central control unit 9, and the communication unit 5 is merged with the stationary phone 4, which is placed in the common case.

FIG. 15 is a simplified illustration of the personal emergency alarm device described in FIG. 1, with the combined movement sensor evaluation unit 2 with the central control unit 9, the sensor control unit 2008, the heart rate sensor evaluation unit 100, the communication unit 5 and the stationary phone 4, in which it is placed.

FIG. 16 shows the personal emergency alarm device described in FIG. 2, where parts of the device are grouped into the sensor block 1200, the central control block 1201, the reset block 1203 and the communication block 1202. The actual construction of the sensor, reset and communication uses parts available in the market, which are appropriately adapted or developed to meet the requirements of the device. The wireless movement sensor 38 is appropriately adapted for wearing by the monitored person. The wireless movement sensor evaluation unit 39 and the sensor evaluation unit 1300 contain radio frequency transmitters 209, 210 and 211 for the respective sensors. The outputs of the transmitters are led to the central control unit 9. The wireless phone base station 25 is conveniently adapted to receive the alarm signal from the central control unit 9 and to send it via phone line 8 to the surveillance centre 22. The central control block 1201, which consists of the central control unit 9 and is designed to meet the objectives of the invention, has already been described in FIG. 13. The task of the sensor block 1200 is to collect data on the health condition of the monitored person. This task is discharged by sensors described in FIG. 2. The data from the sensors are processed in the detector unit and passed on to the central control block 1201. There the data is evaluated by the central control unit 9 and compared to the preset limits. In compliance with the principles of the invention, if the limits are exceeded the central control block 1201 sends the alarm signal to the communication block 1202, unless the reset block 1203 sends a reset signal during the warning signal, which is generated by the central control block before actually setting off the alarm. The communication block sends the alarm signal to the surveillance centre 22, which may communicate with the monitored person via the communication block 1202. The reset block 1203 which is one of the main parts of the described patent, consists, in the current design, of a reset unit 11 and a radio frequency transmitter 208, which sends signals by when the reset button 13 or the emergency call 14 buttons are pressed. It also consists of a battery 99. It is designed so that the monitored person may easily reach it and is placed in a wristband worn by the monitored person.

FIG. 17 shows the personal emergency alarm device, already described in FIG. 2, with an illustration of the merger of the movement sensor evaluation unit ?, the wireless movement sensor evaluation unit 39, the sensor evaluation unit 1300, the heart rate sensor evaluation unit 100, the central control unit 9 and the wireless phone base station 25 into a single common multifunctional unit 1400.

FIG. 18 shows a simplified bloc scheme of the mobile personal emergency alarm device, which has been described in detail in FIG. 3. The principles are the same as in FIGS. 1, 2, 13 and 16, with the exception consisting of using a mobile phone 18 for communication with the surveillance centre 22. FIG. 18 shows the sensor block 1200, the central control block 1201, the communication block 1202 and the reset block 1203. The reset block 1203 is comprised of the reset unit 11, which may, in this example, be conveniently placed in the central control unit 9 case and wired to its via connection 19. As it may be inconvenient and lengthy to control the reset button 13 on the central control unit 9 case, which may, for instance, be placed in a pocket, in the example in FIG. 18 the reset button 13 is conveniently placed in a wristband 41 for easy access. The wristband is worn on a wrist and therefore the reset button 13, which functionally duplicates the reset button 13 on the central control unit 9 case, as well as other controls placed there, is easily accessible. The wristband 41 thus creates another remote control and display block 1205. The wristband 41 comprises the display 63, which shows values from sensors and curves composed of such values. There is also the position-tracking block 1204, which consists of a position-tracking transmitter 45. The transmitter is designed to transmit radio frequency waves at an assigned frequency and with permitted power based on the standard principles of existing technology. Units in the described blocks, if designed in accordance with FIG. 18, are conveniently connected mostly via Bluetooth, and partly via wired or radio frequency connection. In contrast to the designs described above, the sensor block now contains a multifunctional chest belt, which monitors heart rate using the heart rate sensor 220, as well as the ECG curve and other health functions described above.

It is designed so as to comprise individual sensors attached to the chest belt in a way that they are in contact with skin and monitor the respective values. The sensors are connected to the chest belt control unit, which is connected via Bluetooth 55 to the central control block 1201 and to the central control unit 9.

The Bluetooth connection allows not only transmit heart rate data, but also the ECG curve. The central control block 1201 with the central control unit 9 is described in detail in FIG. 13, together with the sensor unit and the reset block. The communication block 1202 differs from that in FIGS. 1,2, 13 and 16 by using a mobile phone 18 and communication with a mobile operator's network. The mobile phone 18 is designed to communicate via Bluetooth 138 with the central control unit 9, to have integrated GPS and to allow the addition of an operating system SW, which would control the personal emergency alarm device in cooperation with the central control unit 9 and work in the background of the SW for controlling the communication part of the mobile phone 18.

FIG. 19 is a simplified illustration of the personal emergency alarm device described in FIG. 4, grouped into the sensor block 1200, the central control block 1201, the communication block 1202 and the reset block 1203, the position-tracking block 1204 and the control and display block. This grouping has been described in FIG. 18 analogous to FIG. 3. The difference against FIG. 19 consists in that the solution in FIG. 19 predominantly uses radio wave or wired connection instead of Bluetooth, described in FIG. 18. An example is the connection of the central control unit 9 with the multifunctional chest belt 44 via connection 62, with the wristband 41 via radio connection 140 and with the position-tracking transmitter 45 via radio connection 61. The central control block 1201 controls the other blocks, is designed to meet the objectives of the patent and has been described in FIG. 13. The other blocks have been described in previous pictures, particularly FIG. 13 and FIG. 18.

FIG. 20 shows the personal emergency alarm device consisting of the sensor block 1200, the central control block 1201, the communication block 1202, the rest block 1203, and the remote control and display block 1205. The reset block 1203 is located in the remote control and display block 1205 and includes the reset button 13. The reset button is duplicated as reset can be executed also from the mobile phone 87 or the wristband mobile phone 136 by the eponymous reset button 13, which works in parallel. The central control block 1201, composed mainly of the central control unit 9*b*, is conveniently place on the chest belt. A part of the function of the block may be taken over by the mobile phone 87 or the wristband mobile phone 136, which uses a dedicated SW working in the background of the SW that controls the standard functions of the mobile phone.

FIG. 21 provides a clear picture of the principle of the personal emergency alarm device, which consists of the sensor block 1200, the central control block 1201, the communication block 1202, the reset block 1203, the position-tracking block 1204 and the remote control and display block 1205, which provides the remote control and voice communication features. The functions of these blocks have been described in the specification of the invention and previous pictures. The central control block 1201 has the central function, controlling all the other blocks. The implementation is possible using a TTL or a microprocessor design, illustrated in FIG. 21. This has already been described in FIG. 13. The difference between examples in FIG. 13 and FIG. 21 lies in the communication block 1202, where the connection is implemented using phone lines in FIG. 13, i.e. the device is stationary, while it is implemented using a mobile phone in the communication block 1202 in FIG. 21, i.e. the device is mobile. The communication block is designed so as to include the controls necessary for controlling the alarm activation device, for instance the reset button 13*a*, which is duplicated with the reset button 13 on other units for easy operation. It is also designed to conveniently allow communication with the central control block 1201 via Bluetooth. This is implemented using a dedicated SW program, which operates in the background of the main SW program of the mobile phone, which controls the standard operation of the mobile phone. The central control block 1201 communicates with the sensor block 1200, where more sensors may be added to the displayed sensors. The communication block 1202 conveniently offers the option of choosing the mobile phone 87 or the wristband mobile phone 136. The latter has the advantage of easy operation and communication from the wristband mobile phone 136 on the wrist, without the need to take the phone out of pocket, which is the case with the mobile phone 87. The phone has a touchscreen or a flip-up keypad and buttons on the case. For easy communication, it is equipped with a speakerphone and an additional earphone 506 with wired connection via connector 507 or an earphone with a microphone (a headset) 510 with Bluetooth 509 connection. It houses two SIM cards 137 and 139 which allow connection using two independent phone numbers, of which one is reserved for emergency calls, alarm and communication with the surveillance centre 22, and the second one for standard calling, and is not blocked by common phone traffic. An incoming call on the emergency connection line is automatically received and switched to the speakerphone mode for immediate communication with the monitored person. Either the wristband mobile phone 136, or the mobile phone 87 may be used. The wristband mobile phone 136 is used for emergency display control and emergency communication, while the mobile phone 87 is used to detailed viewing, programming and other standard communication to prevent fast discharge of a relatively low-capacity battery of the wristband mobile phone 136. The remote control and display block 1205 consists of the wristwatch 78 with a display which serves to display data on health functions, such as heart rate and the relevant time-series curves calculated in the microprocessor in the wristwatch 78. In addition, the wristband 41 allows easy remote control and voice communication. The sensor block is designed with various sensors, which may be connected according to individual needs of the monitored person. The reset block 1203 and the position-tracking block 1204 have been described in previous pictures. Individual blocks may communicate with one another conveniently via Bluetooth, radio frequency waves, wired connection or any other suitable connection, or any combination of them. In the event of a failure of connection between blocks, the device will try to use reset and an initialization process in the SW program to renew the connection. If the attempts fail after a specified number of repetitions, the device will send a warning signal to the monitored person to notify him/her that he/she is not monitored any more.

FIG. 22 shows the use of the described principles of the invention for a simplified economic execution of the personal emergency alarm device, where there central control unit 9*a* is conveniently located in the mobile phone 87, connected to sensors, such as the heart rate sensor 220*a*, and the reset unit 11*a* conveniently placed in the wristband 240 via Bluetooth 241, depicted in dash-and-dot. A multifunctional chest belt 44 may alternatively be used instead of the chest belt 221. Some of the sensors may conveniently be placed in the mobile phone 87. The central control unit 9*a* operates in the microprocessor unit of the mobile phone 87 using a dedicated SW program in the background of the main operating system which controls the functions of the mobile phone 87. The functions of the mobile phone have been described in FIG. 5. There is an additional possibility to design one of the keypad buttons, for instance, the button 5000. Pressing and holding the button for two seconds will change the functions of the control buttons of the mobile phone 87 to the selected functions necessary for controlling the personal emergency alarm device, and back. This applies to the plus button 131 and the minus button 132, used to set the time interval for setting off the warning signal. It is possible to insert 2 SIM cards 137 and 139 into the mobile phone. They allow calls to two independent phone numbers, where one can be used for regular phone communication, while the other one will exclusively be dedicated to emergency communication, for instance with the surveillance centre 22. When an incoming emergency call is not received by the monitored person, it may automatically be received by the mobile phone 87 after the mobile phones has rung for the preset number of times, with switching to the speakerphone mode via the speaker 47, which may switch to extra high volume though an acoustic command of the caller to capture the attention of the monitored person or its neighbourhood, if the monitored person does not respond. The described device consists of individual blocks, the sensor block 1200 and the reset block 1203, described in previous pictures. The reset block 1203 reduplicates the reset block 1203*a* in the mobile phone 87*a* body, offering emergency control. External devices, such as the chest belt 221, complement the mobile phone 87*a* and may fulfil the basic functions of the personal emergency alarm device, regardless of whether, and if so, how many and what external devices are used, as specified in detail in FIG. 24.

FIG. 23 illustrates a similar example to the one described in FIG. 22, where the personal emergency alarm device uses the wristband mobile phone 136*a* instead of the mobile phone 87*a* for the communication block 1202. The speaker 47 conveniently takes over the function of the siren 37*a* and, in addition, ensures the intermediation of acoustic communication. On the case of the wristband mobile phone 300 there is a camera 5010, which is directed to the space in the direction of the wristband as the clothing may be rolled up there not to block the view. If the incoming call has automatically been received, the surveillance centre 22 may use acoustic commands over the mobile line to switch on the camera for monitoring the neighbourhood of the monitored person and its activity, if the image in the camera is moving. This may conveniently be used also for resetting the time interval for setting off the warning signal. In that case, the camera is left switched on and if the image changes, i.e. if the monitored person moves, the time interval will be reset. The described sensors and external units may be deployed as needed, i.e. some, or in an extreme case even all, of the sensors may not be used. The wristband mobile phone 136*a* or the mobile phone 87 may still serve some important functions of the described invention. For details, see FIG. 24. A body temperature sensor 75*a* may easily be placed in the wristband mobile phone 136*a* under the case of the wristband mobile phone 300 to touch the skin. There may also be the movement sensor 1*b*, which is placed on the right side of the wristband mobile phone case 300 directed to the space across the wrist, to which the wristband may be moved to prevent the sleeve from blocking the view. On the same spot, there is also the camera 5010, which may serves as a movement sensor, from which the central control unit 9*a* evaluates whether the image is moving, which would indicate a movement of the monitored person.

FIG. 24 draws an economical example of a personal emergency alarm device solution with the possibility to easily and immediately monitor heart rate on display 80 in wristwatch 78, which may also include the reset unit 11*b*, located in the wristband 244 or in the wristwatch 78 as the lid reset unit. This is made possible by the central control unit 9*a* placed in the mobile phone 18. The central control unit works in the background of the main operating SW program of the mobile phone 18 with the help of a dedicated SW program designed to meet the principles of the presented invention, as described in the previous pictures. This brings savings as compared to the device with a separate central control unit 9. More considerable savings are effected thanks to the conversion block 1207, which covers the radio frequency connection to Bluetooth connection 5021, for instance from the chest belt 221, in particular from the radio transmitter 81, the radio frequency connection 5022 and the receiver 82 and other sensors. For instance, from the movement sensor 1*a*, which may be used as the movement sensor 1 for a free view of the neighbourhood of the wristband 244, or from the reset unit 11, which may be placed on the wristband 240 (*xxx*). The radio transmitter 81 transmits data from the heart rate sensor 220 simultaneously to the receiver 82 in the wrist watch 78 and the conversion block 1207. The conversion block 1207 may be placed on the chest belt 221. The heart rate sensor 220 may be wired directly to the conversion block 1207. The conversion block 1207 consists of the conversion unit 5020 together with radio frequency receivers, such as the receiver 82. The conversion unit 5020 cooperates with the other blocks via radio frequency connection 5022 and Bluetooth 5021. All the sensors in the FIG. 24 and other pictures, such as FIG. 22 and FIG. 23, including the movement sensor la and the external units placed outside the body of the mobile phone 18, such as wristwatch 78, are optional and may be worn as needed. If no sensors or external units are used, the mobile phone 18 or the mobile phone 87 from FIG. 22 or the wristband mobile phone 136 from FIG. 23 still take care of the essential functions of the personal emergency alarm device, particularly the confirmation of normal response by resetting with the reset button 13, or the reset button 13*b*, during the warning signal from the speaker 47 in the mobile phone, where the time interval for setting off the warning signal may be set by the plus button 131*a* and the minus button 132. Emergency call is activated by pressing the emergency call button 14. On an incoming call, after the ringing has been repeated the set number of times, the mobile phone 18 will automatically receive the call in the hands-free mode, i.e. in the speakerphone mode and the surveillance centre 22 may communicated with the monitored person regardless of whether he/she can control the buttons. The surveillance centre may further use a coded signal from the coder/decoder 5030 send an acoustic or data command, decoded in the coder/decoder 5031, which will switch the hands-free operation to higher volume to capture the attention of the monitored person, if it does not respond to normal volume, or to call on the neighbourhood to call help. In this way, the surveillance centre may remotely control also other functions, such as switching on the camera 5010 for monitoring the neighbourhood, which is relevant mainly in the wristband mobile phone 136 in FIG. 4, where the camera 5010 has a free view thanks to being placed on the wrist. It may also switch on the position-tracking transmitter 45, which may be placed in the mobile phone 18 as the position-tracking transmitter 45 *a*, and it may also switch on the siren in the central control unit 9.*a* to generate an acoustic signal from the speaker 47 for calling for help, with which it can communicate ater switching off the siren.

The described remote control and connection using a coded signal or data via a modem, or a data connection, may serve the surveillance centre 22 to download data from sensors, images from the camera, and other information, via a mobile operator's network. Two SIM cards 137 and 139 may be used. One is used for normal phone operation, while the other is dedicated for emergency calls, monitoring, the transmission of health and other functions, and their remote control using a mobile phone connection. Sensors, such as a shock sensor 43 or a position sensor 50, may conveniently be placed in the mobile phone 18 and 87 and the wristband mobile phone 136 in FIG. 5 and FIG. 23. The implementation of this and other functions is enabled by the above mentioned central control unit 9*a*, controlled by a dedicated SW program, which works in the background of the main SW program that controls the common functions of the mobile phone 18.

FIG. 25 shows the personal emergency alarm device which uses the conversion block 1207 to convert the radio frequency connection from external units, for instance the radio frequency connection 5022 from the chest belt 221, to Bluetooth 5021 for connection with the central control unit block 1201*c*, which includes the central control unit 9*c*. The central control block 1201*c* may contain optional internal blocks and units, such as the reset block 1203*a*, the position-tracking block 1204*a*, the communication block 1202*a* and the sensor block 1200*a*. The sensor block may include sensors such as a shock sensor 43*a*, a body position sensor 76*a*, and others. These blocks and sensors may alternatively be external, such as the shock sensor 43, the heart rate sensors 220 and other sensors. The communication block 1202*a* has all the necessary components for communication with a mobile operator's network 246. Along with the SIM card 137 it also has the optional SIM card 139 for other telephone line. The central control block 1201*c* with the central control unit 9*c* has all the necessary controls, such as the plus button 131, the minus button 132, to set the time interval to set off the warning signal. It is also possible to set the point in time at which the warning signal is set off. This is used instead of the time interval particularly when setting a longer period of time if a longer period of inactivity, such as sleep, is expected, during which the monitored person does not want to be disturbed. If the monitored person does not respond at the set time, the central control block 1201*c* will send an alarm to the surveillance centre 22, which will check whether the monitored person is in emergency in the following way: After dialling the monitored person's number and unless the monitored person receives the call, the surveillance centre 22 will let the phone ring for a preset number of times and then receive the call automatically, via the central control unit 9*c*. With automatic coded acoustic signals using the coder/decoder 5030 and the coder/decoder 5031, it may control the blocks and units in the device at the monitored person through the central control unit 9*c*. For instance, it may check the data from the sensors which it may request by coded acoustic commands to be sent via the phone line, or request sending images from the camera, which the monitored person can conveniently aimed at himself/herself before sleep. It may also activate the siren 37 for capturing the attention of the monitored person before the decision on intervention is taken. The coder/decoder 5030 and 5031 may be implemented using modems. For emergency connection with the surveillance centre 22, two SDV1 cards are used with separate phone numbers. One of the SDV1 cards with a separate phone line is exclusively used by the surveillance centre 22. Regular calls may conveniently be handled through the second line in order not to block the emergency line. If there are two SIM cards, one line may be used to transmit the commands of the central control block 1201*c*, while the other may be used by the surveillance centre 22 to send requested data, such as health information or images from the camera 5010. This may be implemented using coded acoustic signals or SMS, or via data streams along the other mobile phone line, which is initiated by the central control unit 9*c* on the surveillance centre's 22 request via the first line using a coder/decoder, as described above. The described data transmission may be conducted using a single line, if needed. In that case, after sending the commands for data or image transmission any conversation must be interrupted to free the line for transmitting the requested data. The described data transmission may also be mediated by the central control unit 9*a*, for instance in the mobile phone 87*a* in FIG. 22, or the wristband mobile phone 136*a* in FIG. 23, which in these examples operates in the background of the main SW program, as illustrated. There is an option between an external communication unit 1202 with a mobile phone 18 connected via Bluetooth 138*a* on the one hand, and an internal communication unit 1202*a* with components for communication via a mobile operator's network 246 placed in the central control unit 9*c* on the other, which conveniently uses the central microprocessor unit 601 from the central control unit 9*c* which controls it. The central control unit 9*c* may alternatively be placed in a wristband 244 for quick control and communication. In the case, it is not necessary to wear wristwatch 78. In this case, the central control unit 9*c* is smaller than the pocket or the case unit. In those two cases, it has a larger sliding or flip-up display 96.*a*, or a touch screen to achieve maximum dimensions without the need of enlarging the whole central control unit, which would be necessary if the display was mounted next to the keyboard. The central control unit 9*c* may conveniently contain the conversion block 1207*a* with the conversion unit 5020*a*. This may be placed also on the chest belt 221 as the conversion block 1207*b* or may be a separate unit—the conversion block 1207. The picture also shows the position-tracking block 1204 as an external unit, or the position tracking unit 1204*a* included in the central control unit 9*c*. There is also the main control keypad 245, the button for switching the function of keypad buttons 248 for more functions without the need to enlarge the control area, to achieve an economical control of all the necessary functions for the purposes of the described invention. The reset block 1203, placed in the central control unit 9*c* may alternatively be included in the wristband 244 as the reset block 1203*b* or in the wristwatch 78 as the reset block 1203*d*, or in the central control unit 9*c* as the reset block 1203*c*. The position-tracking unit 1204*a* may conveniently be contained in the central control unit 9*c*, or it may be placed independently as a position-tracking unit 1204.

FIG. 26 shows the connection of external units, such as the sensor unit 1200, via Bluetooth 250. It is possible choose between an external mobile phone 18 and internal parts for communication via a mobile operator's network 246.

FIG. 27 shows a combined connection of external units to the central control unit 9*c* using radio frequency waves, for instance the radio frequency connection 5022 from the chest belt 221, or Bluetooth, for instance the Bluetooth connection 55 from the multifunctional chest belt 44. There is also the automatic restart after the connection between units or blocks have been interrupted, i.e. an attempt to renew the connection. If the connection fails to restart, the warning signal is initiated. If the warning signal is not reset by the monitored person, the alarm is set off.

This activity is controlled by the central control unit 9*c*, which monitors the fluency of data traffic, evaluating data for viewing, passing on to the surveillance centre 22 or setting of the alarm. If data from any sensor stop streaming, for instance from the two-lead heartbeat sensor 73 or the multifunctional chest belt 44, the central control unit 9*c* will restart the Bluetooth connections and attempts to re-establish the Bluetooth-protocol connection via the "master" Bluetooth unit 251, located in the central control unit 9*c*, cooperating with the "slave" Bluetooth unit 252, located in the chest belt control unit 52. If it fails, it will execute a preset number of attempts at restart, for instance 3 attempts. If the connection fails to restart, a specific warning signal is set off to notify the monitored person of the failure data stream from the sensor. This may be followed by an attempt at manual restart, or, if unsuccessful, a repair of the relevant components to establish connection. The same procedure would apply accordingly to the chest belt 221, where the central control unit 9*c* would initiate the restart of the receiver 82 via the conversion block 1207 and the "slave" Bluetooth unit 252*a* located there, and further via the conversion unit 5020. If there is a defect on the radio transmitter 81 or the chest belt 221, the chest belt cannot be restarted using this procedure. In such a case, the central control unit would initiate the warning signal and the monitoring person could try to reset of the chest belt with the radio transmitter 81 manually. If an automatic reset is requested, the solution would consist in, for instance, using transceivers instead of the radio transmitter 81 and receiver 82, so that the central control unit 9*c* may wirelessly send a restart command to the chest belt 221. The reset would be executed similarly for the other sensors. The described example of restart is only one of several options and restart could be executed otherwise so as to meet its purpose, i.e. to renew the data traffic, particularly from the sensors, and to send a warning signal if this is unsuccessful.

FIG. 28 shows a device used to locate and activate alarms in the case of people at risk, as data from external sensor blocks 1200 are preferably fed through various communication links, for example via Bluetooth 55, or via the Bluetooth module 251, to the primary central control unit 9*d*, which forms part of the central control block 1201-*d*. Thus a direct link from the sensors is ensured, e.g. motion sensor 1, step sensor 42, shock sensor 43, position number 50 and multifunctional chest belt 44. Conveniently, to increase the connection capacity to the Bluetooth module 251, which is limited to a certain number of connections, these sensors may alternatively, instead of the above-mentioned direct connection, be connected via Bluetooth using the expansion unit 255. In this manner, the above-specified external sensors in the sensor block 1200 as well as other units and blocks can also be conveniently connected. The characteristic feature of primary units is especially the fact that most of external sensors and modules are linked thereto, as well as other central control units. The Bluetooth module 251 has a limited number of Bluetooth 55 channels for communication. Preferably, the capacity of the incoming number of Bluetooth ST channels can be increased by splitting the module into two or more Bluetooth modules 251, for example, two Bluetooth modules 251*a* and 251*b*. These blocks and sensors and also the secondary central control unit 9*e*, which also forms part of the central control unit block 1201*d*, feature Bluetooth modules 251 that communicate with Bluetooth modules 251*a* and 251*b* in the primary central control unit 9*d*. Data transfer can take place by means of other communication media allowing data transfer, such as ANT. All external blocks, sensors and units are optional and can be connected as required to the primary central control unit 9*d* in the central control block 1201*d*, which can also function without them. The more units are connected, the more functions are available. PC 88, can be connected via a USB connection. The primary central control unit 9*d* in the central control block 1201*d* can be preferably formed by a mobile phone or PDA or a pocket PC. Everyday communication and manipulation does not require the central control unit 9*d*, and thus also the above-listed devices, which it may consist of, to be taken out of the pocket or a bag, where it is usually kept, because its control, as well as display and voice communication, can be provided by the secondary central control unit 9*e*. The central control unit 9*d* is taken out of the pocket preferably only when required, for example for a detailed display, or for the use of more complex computer and Internet functions. It is therefore possible, as an advantage, to choose a larger size of the central control unit 9*d*, and thus also the above-mentioned parts, of which it consists—for example, a larger display 215 ensuring better image, larger buttons and the main control keyboard 245 for easier manipulation, or even a miniature computer keyboard. The central control unit 9*d* can be described as basic, due to its larger size. The use of a central control unit 9*d* with larger dimensions in the case that it would not be controlled by a central control unit 9*e* with the advantage of smaller dimensions, would be rather problematic and it would have to be smaller, as the control and display could only be provided through this unit and it would need to be taken out of the pocket each time it is regularly used, for example for telephone calls and text messages, which would be impractical. Due to its small dimensions, the central control unit 9*e* can be described as portable. The secondary central control unit 9*e* can be conveniently worn on the wrist as a wristband 244 for easy and quick control and display. It can preferably consist for example of a mobile phone, which can be attached to a wristband. Also the central control units 9*d*, 9*f* and 9*g* and preferably also other units that form a part of the central control block 1201*d* can consist of mobile phones, PDA or pocket PCs. Control, display and voice and mobile communication elements and other elements, such as the display 215, components for communication via mobile operator's network 246*d*, 246*e*, main keyboard control 245 are contained in individual central control units 9*d*, 9*e*, and others as required, and they are optional. In the event that some of the elements are not used in one of the central control units, some of the functions, that are therefore not available in these units, such as display, mobile communication, voice communication, control and other functions, are provided from central control units, that include these functions and that contain the required elements and that are interconnected in terms of data transfer with the above-specified units, for which they implement these functions, so that they can control each other. The central control unit 9*d* contains a primary central microprocessor unit 601*d*, consisting of a microprocessor 201, a memory 202 and a crystal 86. The components cooperating with the central microprocessor unit 601*d* such as memories 202 are described in FIG. 13 The central microprocessor unit 601*d* is controlled from a central control unit 9*d* by the main control keyboard 245 or automatically using a software program developed for this purpose. Similarly, the central control unit 9*e* contains a secondary central microprocessor unit 601*e*. The control of the above-specified as well as further described functions takes place by means of a central microprocessor unit 601*d*, 601*e*. Similar microprocessor units are also used in other blocks and units, which require microprocessor control. If the central control unit 9*d* or a central control unit 9*e* and possibly other control units consist of mobile phones, the central microprocessor unit 601*d*, 601*e* can consist of a microprocessor unit located in these mobile phones. In this case, the software aimed at achieving the invention can conveniently be programmed on the background of the main software programme that controls the mobile phone. It is also possible to use the main programme of the mobile phone, which in this case, controls not only the mobile phone but also the central control unit 9*d*, or possibly the central control unit 9*e*. The same applies if you use a PDA or a pocket computer to implement the central control unit 9*e*. The blocks, sensors and units can preferably be alternatively connected to the central control unit 9*d* in the central control block 1201*d* instead of the described Bluetooth connection 55, using a different connection method, such as radio-frequency connection of an analogue or digital or ANT type, preferably through a conversion block 1207*d*. Therefore, for example, the chest belt 221 and other sensors and units are connected through a wireless connection 5022. The control unit in the converter 284 and converter 256 of the conversion block 1207*d* converts the wireless connection 5022 to Bluetooth 55 and communicates via Bluetooth module 251 and with Bluetooth module 251 in the central control unit 9*d* of the primary central control block 1201*d*. The connection may also be provided by means of a wired connection 264 transferring e.g. USB or RS 232 data. The conversion block 1207*d* preferably converts certain types of communication connections for data or signal transfer to other types to enable the communication of units and blocks with various types of communication connections. The example in FIG. 28 shows a wireless connection 5022 to Bluetooth 55. The chest belt 221*a* includes a manual switch of ECG measurement 263, which activates the monitoring of the ECG curve in the heart rate sensor 220 on the combined chest belt 221*a*, which contains the control unit 282 that can preferably activate other electrodes 283 located outside the chest belt, the number of which varies between two and eight and which, along with a two-lead heart rate sensor using electrodes 73, monitor the ECG curve. As an advantage, they can be attached to the skin using adhesive discs. The monitored person can use the manual switch of ECG measurement 263 to activate the measurement of ECG for a routine test or, for example, when feeling unwell. This also actives the transfer of the ECG curve via the Bluetooth module 251 to the central control unit 9*d*, which evaluates the curve and in case of deviation, passes it to the surveillance centre 22, where an alarm is activated, which the monitored person can reset using the reset button 13. The monitored person can use the main control keyboard 245 to transmit the curve, even if it is normal. The advantage of the transmission of the ECG curve only if it deviates from the norm consists in the time savings of the operators of the surveillance centre 22. The occasional measurement of the curve, as opposed to continuous measurement, saves the battery power, since the transmission via Bluetooth 55 requires more power than the wireless connection 5022. It can be formed by a magnetic field induced from coil to coil, of a frequency of e.g. 5.5 kHz. The measurement of the ECG curve can also be activated by the central control unit 9*d* via the Bluetooth module 251 and also by the surveillance centre 22, or by the monitored person through the main control keyboard 245. In the event that the central control unit 9*e* located on the wristband 244 is not used, a watch 78 can be used for the display. Multifunctional chest belt 44 has electrodes 283*a* conveniently located on the chest belt and according to the number of leads, other four to eight electrodes 283 positioned externally conveniently on adhesive discs. ECG measurement is activated by the central control unit via Bluetooth 55, Bluetooth module 251 and the chest belt control unit 52 in adjustable intervals or as instructed by the monitored person using the main control keyboard 245 or the surveillance centre, preferably through data networks. To facilitate voice communication, an external voice unit 266 can be used, included in block 1208 attached for example to the clothing so that the sound is transmitted without being muffled by the clothes, i.e. close to the head of the monitored person in free space, for example, in the pocket of a jacket or a shirt or on a lapel. Even a camera 5010, which can conveniently be located therein, can monitor the surrounding area without any disturbance. The voice unit is controlled by the control unit 26*g* and communicates preferably via Bluetooth 55. The external voice unit 266 can preferably contain a temperature sensor 268, which responds to a blow and thus the sudden increase in temperature, in the case of an answered call to the central control unit 9*d* or central control unit 9*e* or another unit in the set, and activate hands-free mode. The switch 269 can be used to switch an on-going call from the hands-free mode to the silent mode with the phone close to the ear or vice versa. Button 276 on the external voice unit 266 can also be used to answer a telephone call in silent mode. These elements are controlled by the control unit 261*g*. Camera 5010 transmits video or images through the control unit 261*g* and Bluetooth module 251. The movement of the external voice unit 266 away from the central control unit 9*d* is indicated by transmitter 81 operating on an induction principle on the frequency of 5.5 kHz transmitting pulses from the generator 684 received by the receiver 82 with a range of about 1 m. When the external voice unit 266 moves away by more than 1 m from the receiver 82 located in the converter 256, which can preferably be located in the central control unit 9*d* or in another set, which is kept by the monitored person, the connection is interrupted. The unit registers the interruption and generates a warning signal that, unless reset, sends an alert to the surveillance centre. This prevents losses of the central control unit 9*d* or the external voice unit 266 caused either by leaving the unit behind or by theft. An alternative is the use of the Bluetooth module 251, with the advantage of low output with a range of about 1 m, where the central control unit 9*d* indicates the movement of the external voice unit by more than 1 m by registering a connection loss. Similarly, you can also monitor other units in the set. The primary central control unit 9*d* and preferably also the secondary central control unit 9*e* include an embedded position-tracking block 1204*d* with position-tracking units 259*d* and 259*e* that contain a GPS module 21, which at regular adjustable intervals reports the location that is stored in the memory, to the surveillance centre 22 through primary communication components via mobile operator's network 246*d*, or secondary communication components via mobile operator's network 246*e*. Therefore, the route followed by the monitored person can be traced back. This is an advantage especially when the connection with the monitored person is lost. Data regarding the GPS coordinates are sent from the communication block 1202*d* preferably in data form through data networks, so the mobile phone line remains available for independent communication. During the alternative use of a modem for data communication with the surveillance centre the line is blocked. The position-tracking block 1204*d* can also contain a position-tracking transmitter 45 located in the position-tracking units 259*d*, 259*e* and external position-tracking units 259*f* and 259*g*. The transmission of GPS coordinates can be controlled manually by the monitored person using the main control keyboard 245 or by voice through microphone 46, where the central control block 1201*d* in the central microprocessor unit 601*d* or the central microprocessor unit 601*e* detects the numerical code or voice password instructing the transmission of coordinates. The transmission of coordinates can also be activated by the surveillance centre 22 for example through a data network and communication block 1202*d*. The monitored person or the surveillance centre 22 can adjust the interval for the automatic transmission of coordinates. The central microprocessor unit 601 can preferably evaluate the numerical code entered by means of the main control keyboard 245 or a voice password saved, for example, using a microphone 46, in order to send an emergency call to the surveillance centre 22. To ensure the transmission of the location via GPS as well as the possibility of the tracking of the monitored person by the mobile operator, even after removal and disabling of the central control unit 9*d* or central control unit 9*e*, where the position-tracking block 1204*d* can be located for surveying, the external position-tracking unit 259*g* is connected through Bluetooth 55, preferably of miniature dimensions, or hidden in the clothes of the monitored person so that it cannot be easily located by a potential kidnapper or a thief. Alternatively, it can be attached to the wristband 244. It can be switched from standby mode to full functionality in case of disconnection from the central control block 1201*d* or 1201*e* or from some other of the employed central control units, for example in case they are removed or deactivated, signalling an alarm and reporting coordinates generated by the GPS module 21 to the surveillance centre 22, sent by means of components for communication via mobile operator's network 246*g*, which are preferably located therein, for example via a data network. It exchanges data on functionality in regular intervals with the central control block 1201*d*. In the event of disabling or removal of external position-tracking units 259*g* the central control block 1201*d* will send an alert and coordinates generated by the position-tracking unit 259*d* and report its disabling in case of loss of connection e.g. via Bluetooth or in case of removal. The removal can preferably be detected by a magnetic sensor 267 one part of which is attached thereto, and the second part is attached to the clothing. When attached to the wristband 244, the external position-tracking unit 259*g* or the central control block 1201*d* can report the opening of the wristband to the surveillance centre, for example, in case the conductive connection between the two ends of the wristband 244, preferably made of conductive material or including an inserted wire, is interrupted. There can be more external position-tracking units 259*f*, if necessary. They are controlled by the control unit of the transmitter 271.*g*. Disabling or removal can be performed in the case of any unit of the set as described, or alternatively using the generator 684, transmitter 81 and receiver 82 as detailed in FIG. 59. The central control units 9*d*, 9*e* and possibly other units, sensors, blocks and modules such as the sensor block 1200*d*, the position-tracking block 1204*d* and others are grouped into a set, where they can communicate with each other, or control each other. The set can then preferably include basic, larger central control unit 9*d* mutually controlled using the smaller portable central control unit 9*e*. The advantage of display and control on the central control unit 9*e*, preferably a portable unit of smaller dimensions, and preferably located on a wristband 244, is the quick display and immediate control of the basic central control unit 9*d* of larger dimensions. If a detailed monitoring and control is required, a larger basic central control unit 9*d* can be used. The hardware and software of the above-mentioned blocks and units is modified so that they can cooperate and control each other. Control, displaying and voice communications can be preferably doubled, i.e. containing elements allowing these functions on multiple units. Units such as the central control unit 9*d*, 9*e* (hereinafter the Unit) and possibly other elements as well as other blocks and sensors form a set, from which units can be chosen for a special purpose. The advantage is that they do not need to be used at once, and only a part of the set can be used for a given purpose, and the rest may be in reserve. Another advantage is that the set can provide means gradually and as required, which is economical and brings savings. The advantage is that the set may include various Units, for example of various dimensions and with various functions and only the units that are most suitable for the purpose concerned can be used. Therefore, if the dimensions and the functions of for example a smaller unit with fewer functions are sufficient, a larger unit does not have to be used. Preferably, the external blocks and units, for example a sensor block 1200, which can preferably be connected to the central control unit 9*d* via Bluetooth, radiofrequency, wire or other medium, for example ANT, and are adapted for this purpose, can be selected as required. Thus it is possible to initially choose a smaller set that is less expensive, and it can gradually be retrofitted. In the event that there is a larger set, you can use different components for different applications. If, for example, a large display is not required, it is possible to only use a central control unit 9 attached to a wristband without a central control unit 9*d*, which is usually larger in size and kept in a pocket or a sleeve. On the contrary, this unit can be used when a larger display is required and it can preferably be formed of a mobile phone, or when a particularly large display or computer operations are required, the central control unit 9*d* can consist of a PDA or a pocket PC. If using a mobile phone for implementing a central control unit 9*d* they can also be used for mobile communication. When using components for communication through a mobile operator's network 246*e* in the central control unit 9*e* or when implemented as a mobile phone, no components for communication through a mobile operator network 246*d* are required and thus it is possible for the central control unit 9*d* to use e.g. a pocket PC without these components, i.e. without the connection via the network of a mobile operator. When using components for communication over a mobile operator's network 246*d*, 246*e* in the two central control units, the central control unit 9*d* and the central control unit 9*e*, when the mobile communication is duplicated, some of the components can preferably be used for a mobile line for everyday communication, the other can be reserved for the purpose of communication with the surveillance centre 22. Preferably, data communication can take place, for example through mobile data networks together with voice communications while using only one mobile line of a mobile operator. In the event of disabling or deactivation of the primary central control unit 9*d* or if not used, or when required even during its use, automatically or by manual switch, the function of the primary unit can be preferably taken over by the secondary central control unit 9*e*. Preferably, it is provided by means of software. The secondary central control unit 9*e* will thereby turn into a primary unit. This way you can conveniently choose at any time which central control unit in the set becomes a primary unit and which will become a secondary unit. The main advantage is in the situation when a particular unit is used separately or when it ceases to function. The device described in FIG. 28 forms a set to which other blocks units or modules are connected, as required, for example the central control unit 9*f*, which may consist for example of a pocket PC or a central control unit 9*g*, which may be formed e.g. of a PDA. The use of the device described can be documented by the choice of a central control unit 9*d* of larger dimensions, i.e. a basic unit, which preferably consists of a mobile phone. It is possible to connect most or all other units, blocks, sensors and modules thereto; therefore it serves as the primary unit. As a portable unit of a smaller type, you can choose central the control unit 9*e*, preferably consisting of a mobile phone, preferably attached to a wristband 244. The same portable unit controls the basic unit preferably by routine manipulation for example by answering a call or a text message instead of the basic unit so that the unit does not have to be taken out of the pocket. The central control unit 9*e* is not interconnected with any sensors or modules, i.e. it is a secondary unit. If GPS tracking is lost, the mobile operator automatically switches to tracking through mobile operator using components for communication through a mobile operator's network 246*d* or 246*e* in the communication block 1202*d*, which will emit regular signals and tracking requests. The mobile operator transmits position tracking information through data networks or other media, for example, fixed telephone lines to a surveillance centre 22. The tracking of the monitored person can also be performed by the reserve position-tracking transmitter 45 of radio waves in the position-tracking block 1204*d*, which is activated in the event of GPS failure. The position-tracking transmitter 45*d* can be conveniently located in the primary central control unit 9*d* and can be preferably duplicated by a position-tracking transmitter 45*e* located in the secondary central control unit 9*e*, which is used if the position-tracking transmitter 45*d* is not working, for example, if paralyzed by a kidnapper. For the same reasons, a position-tracking transmitter 45*f* can be kept in reserve, located externally outside the specified central control unit 9*d* and 9*e* in the external position-tracking unit 259*f*. Position-tracking transmitters 45 emit radio waves that can be measured by receivers with a directional antenna, preferably portable receivers. The intersection of the two directions gives the coordinates of the transmitter. In a building, we progress towards the strongest signal. The position-tracking transmitter 45 preferably operates as a pulse-type transmitter. The position-tracking transmitter 45*f* is activated by a transmitter control unit 271*f* through a wireless connection 5022 from the transmitter 81 to receiver 82 as instructed by the central control unit 9*d* via Bluetooth 55 and the converter control unit 284 or automatically in case of loss of the wireless connection 5022. The position-tracking transmitter 45*g* is activated via Bluetooth 55 similarly. Coding of the position-tracking transmitter 45*g* is preferably performed using the transmitter control unit 271.*g* in the position-tracking external unit 259*g*. A potential loss of external position-tracking unit 259*g* can preferably be checked by a contact magnetic sensor on the unit 274 attached thereto with one part, with the second part of the contact magnetic sensor attached to clothes 275, which when removed from the contact magnetic sensor on the unit 274 opens the closed contact, that is monitored by the control unit 261*g*, which through Bluetooth 55 transmits an alarm to the central control unit 9*d* and further to the surveillance centre 22. The instruction to transmit the voice identification of the location using the main control keypad 245 can preferably be emitted by the surveillance centre 22 for example when there is no GPS tracking signal using 3G or using a voice connection with the monitored person. If the person does not answer the call, the call is, preferably after a pre-set number of calls, using the components for communication through a network of a mobile operator 246*d* or 246*e*, automatically answered and switched into the loud "hands-free" mode. If there is no answer from the monitored person, an alarm is automatically activated, and the surveillance centre decides whether to announce an emergency. The monitored person can be requested to transmit data regarding his/her position automatically through the central control block 1201*d*, for example by a signal, voice message or a surveillance centre 22 when the GPS is not active. Passive loud voice communication or a monitoring of a microphone 46 by the surveillance centre 22 is activated by the monitored person, for example if kidnapped, using the main control keypad 245 or a voice password. Active or duplex communication is activated by the monitored person upon activation of the speaker 47 located in the central control block 1201*d*. These communication types may also be activated by the surveillance centre 22 similarly as described above with respect to the activation of the transmission of coordinates. The position can be specified in a text form by the monitored person also by means of the main control keyboard 245, for example through a data network, or chosen from a pre-programmed list of locations, which may appear for example on the display 215, preferably using arrow buttons to control the display 249 on the main control keyboard 245, or through relevant manipulation of the touch screen and the selected location can subsequently be sent, for example via data networks, to the surveillance centre. The instruction for the transmission of the coordinates can also be given as a voice instruction through the speaker 47 or by vibration through a vibrator 260, together with the instruction on the display 215. The central control unit 9*d* or central control unit 9*e* can preferably address the monitored person by means of a vibration or an audible signal at intervals, which can be set using the main control keyboard 245, to confirm a normal reaction, by pressing the reset button 13*a*. A confirmation requires a specified code sent by the main control keyboard 245, evaluated by the central control unit 9*d*. In the event that confirmation has not been made within the specified time limit, the central control unit 9*d* or central control unit 9*e* alerts the surveillance centre 22. Similarly, through the main control keyboard 245 the code is specified in the case that it is calculated by the monitored person according to a pre-specified formula, e.g. by multiplying the particular hour by a specified number, in order to achieve increased control of normal reactions and alcohol use. In the case of a wrong result an alarm is activated similarly. To calculate arrhythmia, the heart rate is monitored preferably by the heart rate sensor 220, and transmitted to the central control unit 9*d* via a wireless connection 5022, unit converter and Bluetooth 55. The calculation takes place in the central microprocessor unit 601*d*, which stores measured and calculated data in memory 202. Displaying takes place preferably on the display 215 in the central control unit 9*d* or the central control unit 9*e* or both. In case of deviation from the norm, a signal is transmitted using a siren 37 and, in the event that it is not reset by the monitored person, using button 13, the central control unit 9*d* sends an alarm to the surveillance centre 22. It is possible to browse through the recording history using the main keyboard 245.

FIG. 29 shows an example of implementation of the central control unit 9*k*, which includes a central microprocessor unit 601*k* to which a microprocessor 201*k* type ARM9 (specification 3SCG410) and memories 202*k* (type MDDR and flash) are attached. The central control unit 9*k* is also fitted with a removable SD memory card 307*k* and microphone 46*k*, speaker 47*k* and connectors USB1 308*m* and USB2 308*k*, connector RS232 353*k* and a connector for input/output I/O 400*k* fir the connection of external devices. The central control unit 9*k* is also equipped with a touch screen 215*k*, main control keyboard 245*k*, WiFi module 306*k*, siren 37*k* and components required for the communication via the mobile operator's network 246*k* including SIM cards 139*k* and 137*k*. This board also contains receiver 82, type Polar HRMC-01, and a Bluetooth module 251, type Blue Giga BGWT12. The function of the central control unit 9*k*, which may be supplemented with additional components described in the case of other central control units, is similar to the function of the central control unit 9*d* and described on FIG. 28.

FIG. 30 shows a simplified block diagram of an example of a set, where the central control unit 9*d* in the central control block 1201 is interconnected with various blocks, such as the sensor block 1200*c* with different sensors 286 and for example the chest belt 221*a* or a motion sensor using suitable connections, such as the wireless connection 5022, and for example by means of induction on the frequency 5.5 kHz or wired connections 264 such as Bluetooth 55 and other wireless connections 370, for example of a radiofrequency type or ANT. Central control unit 9*d* can preferably be quickly controlled by the central control unit 9*e* situated on the wrist and is preferably composed of a mobile phone. Alternatively, a portable central control unit 9*i* of smaller dimensions can be used as the control element. As an example representing the full range of central control units, mutually controlled by the central control unit which can be used, the central control unit 9*f* is shown, preferably consisting of a pocket PC, central control unit 2, preferably formed of a PDA. If necessary, other central control units can be connected, for example the central control unit 9*h*, 9*j* of various dimensions and functions. The specified set is functional even when using only the central control unit 9*d* and other control units can be connected as required. They have software and communication modules, such as the Bluetooth module 251 adapted for mutual communication and control. For the sake of clarity, these modules, as well as components, units and blocks included in the specified central control units are no longer shown in the block diagram in FIG. 29 in the individual central control units, and they are shown in detailed figures, such as FIG. 28. Other examples include other blocks in the set, such as the communication block 1202, which combines components required for the communication via the mobile operator's network 246 contained as necessary in the individual central control units, such as the central control unit 9*i*, 9*h*, 9*j*, and other units, and they are symbolically represented in the communication block and no longer in the central control units. The Figure also shows the position-tracking block 1204, conversion block 1207 with a converter 256 located in the central control unit 9*d*, the voice module block 1209, block of other units 1210 containing other units 285. The advantage of the set lies in the fact that individual units, modules and sensors are available and can be procured and employed gradually as needed. Another advantage consists primarily in the quick control of the basic larger units ranging from smaller portable units such as the central control unit 9*i* or the central control unit 9*e*, preferably located on the wrist. The basic units therefore need not be taken out of the pocket or handbag for normal handling, such as call answering, and it is possible to choose larger sizes, which offer advantages including a larger display and control elements as well as additional equipment. Another advantage is a quick display on smaller portable units, and the need to manipulate with larger basic units only when necessary for a detailed view on a larger display. The current technical version of the devices does not provide these advantages because the units, sensors, modules and components available on the market cannot communicate with each other and control each other or display events occurring on other units or accept calls and text messages from other units, as described above, since they do not have suitable software and other necessary components. On the contrary, units in the set described above contain software that is designed for mutual communication, control, display and forwarded calls and text messages.

FIG. 31 shows an example of a detailed diagram of the converter 256*k* included in the conversion block 1207*k*, which shows the converter control unit 284*k* with a microprocessor 201*k* formed for example of the chip PIC 16F913/916. The transmitter 81 of the chest belt 221*k* transmits pulses in the rhythm of a heart beat using a coil with ferrite core and its magnetic field over the wireless connection 5022 intercepted by the receiver 82, formed for example of the chip POLARHRCM-01, which forwards the signal to the microprocessor 201*k*. The transmitter 81 may alternatively be formed of a transmitter operating on the frequency 2.4 G, in this case also the receiver 82 consists of a receiver, operating at 2.4G. The transmitter 81 and receiver 82 may alternatively operate on the Bluetooth principle. In that case, the transmitter 81, can communicate directly with the central control unit 9*k*. In the event that the chest belt 221*k* also features the control unit ECG 403, as an alternative, transmitter 81 can be replaced with a Bluetooth module 251. The processor 201*k* may alternatively be interconnected with the transmitter 81*g*, operating on the frequency 2.4G and communicating with 78*g* on this frequency. Microprocessor 201*k* processes and sends data to the Bluetooth module 251, comprising for example Blue Giga chip GBTWT12A, from which the data is sent via Bluetooth 55 to the central control unit 9*k*, preferably consisting of a mobile phone. Alternatively, the signal from the receiver 82 can also be transmitted via microprocessor 201*k* and a switch 730 of the serial communication line to the Ant module 731 for the communication on this medium. On the background of the main software of the central control unit 9*k*, preferably consisting of a mobile phone, the data is processed by special software and shown on the display 215*k*. Data from the central control unit 9*k* can be also be transmitted to PC 8 for example through the USB connection 290. Signals can be transmitted to the PC also through Bluetooth 55. The central control unit 9*k* can be fed with acoustic signals in the rhythm of a heart beat also through the headphone connector 288 via a cable 405 from connector 265 generated in the microprocessor 201*k*. The signals from the chest belt 221*k* are received via the wireless connection 5022 also in the watch 78, which are also processed in a separate control unit of the watch 305 and displayed in a similar way as in the central control unit 9*k*. The advantage is that the monitored person can immediately follow the data on the watch 78 without the need to manipulate with the central control unit 9*k*, where detailed information that can be sent to the surveillance centre 22 as instructed, periodically or as required by the monitored person, are displayed only when necessary. In the event that some data fall outside the specified limit the central control unit 9*k* and possibly also the watch 78 issues a warning signal. If it is not reset by the monitored person by pressing the reset button 13, the data is automatically sent to the surveillance centre 22, for example via the mobile operator's network 135 through a data network. The advantage is that the monitored person can view and reset the data so that the surveillance centre is not overloaded with data classified by the monitored person as incorrect or irrelevant. The reset option can also be turned off. The advantage of tracking the necessary data both on the central control unit 9*k* and on the watch 78 is provided by special software which is loaded both into the watch 78 and the central control unit 9*k*, and allows for a synchronous monitoring of the selected displayed information on both accessory components in the set described, while the watch 78 displays data immediately without the need to take the central control unit 9*k* for example out of the pocket. This advantage can also be achieved by displaying data on the central control unit 9*c* preferably placed on the wristband 244, which also allows the operative synchronous monitoring of data also displayed on the central control unit 9*k*. For mutual control and synchronous data monitoring Bluetooth 55 allows connecting the central control unit 9*f*, 9*g* and others as appropriate, included in the central control block 1201 and sensors included in the sensor block 1200. These units and sensors are grouped in the set, where they can be mutually controlled and forward calls and displayed information and communicate to each other. A set of devices produced according to the current technology does not provide this advantage. Programming of 407 enables programming of the microprocessor 201*k*. The advantage of monitoring of the heart rate transmitted by the magnetic field of the wireless connection 5022 on the watch 78 is low battery consumption in the ECG control unit 403, since the ECG is transmitted via Bluetooth 55 preferably only when needed. Power consumption of a wireless connection 5022 is much lower than that of the Bluetooth 55. For example, the transmission of heart rate via Bluetooth 55 under the current state of the art has the capacity of only few hours, due to the relatively small battery of the control unit located on the chest belt, and therefore it is not suitable for long-term monitoring. The battery capacity of a wireless connection 5022 as well as watch 78 in the chest belt 221*k* is approximately 1 year. The advantage is also that time capacity of the battery during transmission via Bluetooth 55 from the converter 256*k* is about 100 hours, i.e. much higher than the stated number of hours of battery capacity of chest belts available on the market for Bluetooth 55 transmission, because the converter that is not attached to a chest belt 221*k* can have much bigger battery or accumulator than chest belts thanks to its larger dimensions. Preferably, battery saving of the control unit ECG 403 will be achieved when the ECG signal is not transmitted to the central control unit 9*k* continuously, but only under certain specified conditions, such as during the initialization by means of button 325 for ECG transmission or ECG curve outside the limit preferably evaluated by the control unit ECG 403. The central control unit 9*k* provides transmission of ECG upon request from the surveillance centre 22, by the monitored person, in case of deviations of the ECG or periodically. Another advantage is the possibility of sending the ECG records not only to the surveillance centre 22 via data networks, but also by means of text messages on the PC to any selected participant, for example directly to doctors, even though they are not connected to the surveillance centre. The advantage is also the possibility to watch a full 12-lead ECG continuously for a long time and continuously, as needed for a number of months or years, which is impossible due to the current state of the art. Double-electrode leads do not capture full quality ECG. Preferably, in addition to electrodes 73 located in the centre of the chest 443, led by cables 440 to heart rate sensor 220, it is possible to fit the chest belt 221*k* with additional electrodes 283, led along with electrodes 73 by cable 439 and 409 to ECG control unit 403, for better display of the ECG. The advantage is that these electrodes do not need to be stuck to the chest and they are pressed to the chest by means of the chest belt 221*k*. The practical implementation is shown in FIGS. 32 and 34. As an alternative, the electrodes 283*a* can be placed outside the chest belt 221*k*, shown as electrodes 283*d*, attached to the chest using adhesive discs. These can be preferably complemented with two electrodes 283*b* for arms and two electrodes 283*c* for legs that can be attached to the skin using adhesive discs or, preferably a straps 313*b*, 313*c* described in detail in FIGS. 39 and 40. In this case, the advantage is that they are not stuck and can easily be used only when necessary. The entire system of 10 electrodes thus preferably with the use of electrodes 283*a, b, c* and straps 313*b*, 313*c* can be attached otherwise than by sticking, suction cups or clamps that are the only possible solution in the current state of the art not only in the case of 12-lead ECG, and it is especially unsuitable for long-term monitoring. The example shows 10 electrodes, which allow 12-lead ECG, but may use a different number for ECG with fewer leads. Four-wire cables 387 are led through the connectors 366 to cable 409, in this case a ten-wire cable, and to the control unit ECG 403 where they are processed and sent back via Bluetooth 55 to the central control unit 9*k*, for example, periodically or by pressing the button 325 for ECG transmission. Preferably, the ECG control unit 403 contains components for communication over the mobile operator's network 246, through which it is possible to send an ECG, pulse or arrhythmia curve directly to the surveillance centre 22 and eliminate the possibility of errors during connection via Bluetooth 55 when sending data over the central control unit 9*d* or another unit. There they can be displayed on the display 215*k* and then sent via data network to the surveillance centre 22 when instructed or when instructed by the monitored person. In the event that the ECG control unit 403 records the deviation from a norm on the ECG, the ECG is preferably displayed on the central control unit 9*k* which emits a warning signal that can be reset by the monitored person using the reset button 13, otherwise it sends the ECG curve, along with a warning regarding the problem to the surveillance centre 22. The advantage is that the monitored person decides whether the displayed record is regular or incorrect and then can reset the warning signal and the surveillance centre 22 is not unnecessarily overloaded. There is no such option in the case of products designed according to the current technological state of the art. Reset can be disabled and in the case of deviation from the norm ECG can always be sent to the surveillance centre 22. Resetting is possible thanks to emergency ECG display that can be evaluated by the monitored person in the central control unit 9*k* and possibly on other units, with which it may be interconnected. The display informs the monitored person immediately about their health condition. Another advantage is the instantaneous and continuous display of heart rate for example on a watch 78, which during deviation from the specified limits activates an acoustic warning signal, upon which the monitored person can activate the display of ECG on the central control unit 9*k* using button 325 and from there it can be sent to the surveillance centre 22 together with the recording of the heart rate, which, in detail and synchronously with the watch 78, is shown on the display 215*k* of the central control unit 9*k*, which in case of a deviation also activates the warning signal. Another advantage is also the possibility of simultaneous transmission of data from the ECG control unit 403 through the components for communication via the mobile operator 246 directly to the surveillance centre 22 and thus the elimination of the possibility of failure of Bluetooth connection 55. Devices manufactured under the current state of the art do not provide the advantages of synchronous display.

FIG. 32 shows the chest belt 221*l*, where the ECG control unit 403 is located outside the chest belt, connected via a cable 409, in this case with a 10-wire cable, preferably through connectors 374. This can preferably be placed in a bag 384 attached with a strap 309 to the waist or with a clip 388 to a trouser belt. The advantage is that it does not place unnecessary load on the chest belt 221*l* since it is located outside the belt and can therefore also be conveniently equipped with a 215*k* display of larger dimensions and higher battery capacity. It illustrates the possibility to attach the converter 256*l* on a clip 323 to the chest belt 221*l*, which has the advantage that it is not necessary to be kept in a pocket or a bag. In the event that the converter 256*l* is attached permanently to the chest belt 221*l*, the wireless connection 5022 can be replaced with a wired connection 373 leading from the heart rate sensor 22) to the converter control unit 284*k*. Other principles are identical as in FIG. 31. Electrodes 73 and electrodes 283*a* are located on the curve 375 so that they ideally detect ECG V1-V6 signals. This requires a broader chest belt 221*l*. To avoid sweating it is preferably made of mesh 377, to which electrodes 73, 283*a*, can be attached, which can conveniently be lined with a plastic strip 376, that can have attachment straps 378 across for the attachment of electrodes 73, 283*a*, heart rate sensor 220 and other components. In case of application of straps 378 it is not necessary to apply the net 377, since the straps suffice to attach the above-specified components. The ECG control unit 403 may be attached to a strap 309, which can be used to attach the unit to the waist of the monitored person or which can contain a clip 388 for the attachment to a trouser belt 389.

FIG. 33 shows the central control unit 9*n* connected preferably with the chest belt 221*n* via cable 409, in this example, a 10-wire cable, through connectors 374. The advantage is a trouble-free cable connection and energy savings, unlike connection via Bluetooth 55, as it would be the case when the ECG control unit 403*n* was not included in the central control unit 9*n* and communicated therewith only through Bluetooth 55, as it was for example shown in FIG. 32, when the central control unit 9*k* and ECG control unit 403 communicates via Bluetooth 55. In the example in FIG. 33 the central control unit 9*n* also processes data by means of the ECG control unit 403*n*, which is preferably contained therein. The central microprocessor unit 601*n* can preferably be used not only for the central control unit 9*n*, but also for the ECG control unit 403*n*. The advantage is that the central control unit 9*n* can send the received data directly through the components for communication through a mobile operator's network 246*n* to the surveillance centre 22 for example over a data network, without having to send them through another unit, for example via Bluetooth, which would be necessary, for example in the case that ECG control unit 403*n* is located outside the central control unit 9*n*, as shown in FIG. 32, where data was transmitted by central control unit 9*k*. Thus any possible future defects and connection failures are prevented. At the same time, for example, the voice and text message communication with the surveillance centre 22 and other participants can take place using external central units, such as using the external central unit 9*c*, or via external central units 9*f*, 9*g* in the central control block 1201, which are not connected via cable, but via Bluetooth 55 and therefore allowing easy manipulation remotely from the central control unit 9*n* or central control unit 9*np*, alternatively attached to the chest belt 221*n*, which cannot only be controlled, but it is also possible to display data and curves generated thereby, which is advantageous particularly in the central control unit 9*np* attached to the chest belt 221*n*, that are hardly available through clothing. In this alternative location on the chest belt 221*n* the central control unit 9*np* is connected to connector 374 using an alternative cable 409. Preferably, the central control unit 9*n* can include transmitter 81 and transmit data to the watch 78 through a wireless connection 5022. It can instead be alternatively attached to the chest belt 221*n* shown as transmitter 81*a* in the heart rate sensor 220*n* and alternatively transmit signals via wireless connection 5022*a*. This brings the advantage of emergency monitoring of data on the watch with a very low energy consumption compared with Bluetooth 55. The central control unit 9*n* may contain, preferably, for example, the main control keyboard 245, display 215, reset button 13 and other components, modules and units of your choice, specified for example on the central control unit 9*d* described in FIG. 28. The central control unit also has attached a number of mutually communicating units, blocks and modules preferably in a set described in FIG. 28 or 30 as an example of another central control unit located in the central control block 1201 or other sensors located in the sensor block 1200. This brings the advantages of quick control described on FIG. 30 for example by portable central control units 9*e*, preferably consisting of a mobile phone, with the possibility of attachment to the wrist or control from a central control unit 9*f* with a large display and the possibility of a detailed display and other benefits of selection of units in the set as required.

FIG. 34 shows the chest belt 122*j* to be worn attached to the chest and secured for example with Velcro fastener 381 against loosening, which provides the advantage to attach 6 chest electrodes 73, 283*a*, required together with the electrodes for arms and legs for full 12-lead detection of ECG, with its relatively small width, to which in case that it is complemented with elastic cross straps 313, could not locate these electrodes according to normal practice with ECG. Electrodes are attached to the chest not linearly, but in a curve 421, which runs down below the nipple. This could only be achieved by a relatively wide belt, which however would involve sweating during long-term wear, larger dimensions and greater weight. The use of a relatively narrower belt can help preferably achieve by means of elastic cross straps 313, which protrude from the chest belt 22 on one side and allow the attachment of electrodes 73 and one of the electrodes 283*a* so that the electrodes 73 and 283*a* follow a curve 421, which is usual for successful monitoring of ECG. In order to ensure that straps 313, made for example of elastic plastic and attached to the chest belt 221*p* were sufficiently pressed against the chest to achieve good contact of electrodes 73, and 283*a* attached thereto, they are extended to the other side of the chest belt 221*p*, as a compensatory belt 312, which relies on the chest and holds the straps 313, to remain pressed to the chest. In order to increase the pressure on the chest, it is possible to conveniently use curved straps 313, which, when pressed to the chest with a chest belt 221*p*, also put pressure on electrodes 73 and 283*a* due to the elasticity of the plastic material, which is levelled up from the curved shape by pressure, as shown in the side view in FIG. 35. Three of the electrodes 283*a* are preferably placed on the axis of the chest belt 221*p*, by which they are pressed to the chest 368, as shown in side view in FIG. 35. As described above, it is possible to press all the electrodes to the chest 368 so as to provide good contact with the advantage that they do not have to be stuck. The electrodes 283*a* in the example are led together with the electrodes 73 via a cable 439 to connector 315. From here they are led together with the electrodes 283*b* for arms and electrodes 283*c* for legs with a cable 413, in the example by a 10-wire cable, while a different number of wires 414 is specified, changing over the length of the cable 439 via connector 315, to the ECG control unit 403. It can be attached to the chest belt 221*p* as shown in FIG. 31, or outside the belt, as shown in FIG. 34, while Bluetooth 55 leads to the central control unit 9*p*, consisting preferably of a mobile phone; the ECG control unit 403*p* can also be contained in the central control unit 9*n*, as shown in FIG. 33. Electrodes 283*b* and 283*c* on arms and legs can be located in a standard manner, for example with clamps or an attached disc, or preferably on straps 313*b* and 313*c* as described in the following FIG. 36, 37 without the need of sticking or clamping the electrodes to the chest. The attachment of electrodes using adhesive discs is not desirable because they must often, sometimes painfully, be changed; moreover it is costly and uncomfortable. Electrodes attached by clamps to arms or legs or by suction cups to the chest, which is the standard of the current state of the art for the monitoring of 12-lead ECG, are not mobile and are unsuitable for long-term monitoring. The described solutions are complemented with a description in FIG. 36 to 39, these disadvantages are removed by allowing the attachment of electrodes, without clamps, suction cups or adhesive discs.

FIG. 35 shows a side view of the cross strap 313, which shows a curving 367, that cause that when the chest belt 221*p* is pressed to the chest 368, the cross strap 313 presses electrodes 73, 283*a* to the chest 368 due to the elasticity of the material of the cross strap 313, made preferably of plastic, by the operation of the compensation strap 312 leaning also against the chest 368 on the other side of the chest belt 211*p* from the part of the cross strap 313. Arrows 415 show the direction of the force caused by pressing the chest belt 221*p* tightly attached to the chest 368 and secured for example by Velcro fastener 381 shown in FIG. 39 or by other suitable means from loosening.

FIG. 36 illustrates an alternative attachment of electrodes 283*b*, instead of sticking, preferably by placing the strap 313*b* around the arm 416 and electrodes 283*c* to straps 313*c* around the thigh 417, for example, secured against loosening by a Velcro fastener. Electrodes 283*b* are connected with the chest belt 221*p* via a cable 422 and an electrode 283*c* through a cable 423 leading preferably to the connector 382 and from here via a multi-wire cable 413 through the connector 315 to the control unit ECG 403.

FIG. 37 shows an alternative attachment of straps 313*b* instead of an attachment to an arm 416, as shown in FIG. 36, preferably to the wrist 418, and of straps 313*c* instead of to the thigh 417 preferably to the ankles 426. Alternatively, electrodes 283*b* can be placed for example on hand-held rollers 314. The advantage is that the straps 313*b* and 313*c* may not be permanently attached to the arms or legs, for example stuck to the body, where they are not easily accessible. Attachment to the wrists 418 or ankles 426 has the advantage that the connection of electrodes 283*b*, 283*c*, can be made operatively, only for the monitoring of the ECG curve, as these places on the legs are easily accessible without the need to take off the clothing. Another advantage also consists in the fact that straps 313*b* and 313*c* can be left on the limbs and wires 433 and 434 leading thereto can be disconnected through connector 431*b* preferably on electrodes 283*b*, as shown in detail 390, or on the connector 431*c* or on electrodes 283*c*, as shown in detail 39). Connectors 431*b* and 431*c* can be preferably of a press stud type. In order to hide the strap 313*b* so that it is not visible, it is preferably located for example on a watch strap 78 on the left hand and on a decorative wristband 392 on the right hand. The detail 391 shows how it is possible to disguise the strap on ankles 313*c* hiding the strap under a sock 435, which can preferably be attached to the sock 435 e.g. with a Velcro fastener 393 located on the top of a strap 313*c*. From there, its tip 436 can be led outside the sock to which the connector 431*c* is attached, for example in the form of a press stud, to which a counter-part, attached in a conductive manner to a cable 394 connected with a cable 433 leading to the control unit EKG 403, can be attached. Electrode 283*c* is attached to the inside of the strap 313*c*, which is tightly attached around the leg just above the ankle 426 and led by the conductor 438 to the connector 431*c*.

FIG. 38 illustrates an alternative placement of electrodes 283*b*, shown e.g. in FIG. 37, this time on the ECG control unit 403*g* and where the pair of interconnected electrodes 283*bp* for the right arm with the connection 425 and connection 354 of electrodes 283*bl* for the left arm is attached to the perimeter of the box 424. Connections 425 and 354 in the example lead to the control unit ECG 403*g*. Data from the control unit ECG 403*g* are exchanged via Bluetooth 55 with the externally located central control unit 9*g*. The control unit ECG 400*g* is connected with other electrodes as needed, for example from the chest belt 221*g* via multi-wire cable 413 or attachment straps, 313*c* from ankles via cable 433. The advantage of this product consists in the fact that for the monitoring of ECG it is only necessary to hold the ECG control unit 403*g* between the index finger 427 and the thumb 428 of the right hand and the index finger 429 and the thumb 430 of the left hand, and when the electrodes 73, 283*a*, the chest belt 221*g* and electrodes 283*c* on attachment straps 313*c* are connected, 10 electrodes for a full 12-lead ECG are led to the ECG control unit 403*g*. In fact, none of the electrodes needs to be stuck to the skin, the chest belt 221*g* is loosely placed around the chest and the attachment straps 313*c* on ankles can be operatively attached without the need to take off any clothes. Connectors 431*c* allow quick removal of cable 394 from the ankles so that the attachment straps 313*c* can be worn permanently on the ankles, and cable 394 can operatively be connected only when necessary for ECG monitoring, for which it is only sufficient to hold the box 424, provided that the chest belt is worn continuously. A different number of electrodes can be used for a simplified monitoring of ECG. For example, if the chest belt is not connected and neither are the electrodes 283*c* on the ankles, it is only necessary to take the box 424 to capture ECG curves of type I. If electrodes 283*c* are connected, it is also possible to capture ECG curves of type II and III. When some other electrodes 283*a*, 73 and another curve are connected, and when all the electrodes 73, 283*a* on the chest belt are connected, by holding the box 424 in the hand and by connecting electrodes 283*c* it is possible to monitor 12-lead ECG. The advantage is that even though no cables are connected to box 424, you can monitor the basic ECG curve of type I and by gradually plugging in other electrodes as required, as described above, to monitor other ECG curves. At the same time it is possible to flexibly monitor the ECG values on the display 215 of the central control unit 9*g*, fed with data via Bluetooth 55. ECG is preferably monitored only when the values or the regularity of the pulse or ECG curve are outside the norm, as described above. Curves and pulse values can preferably be monitored continuously on the watch 78 that receive an independent signal from the transmitter 81 from the chest belt 221*g* from electrodes 73 through the wireless connection 5022.

If the ECG control unit 403*n* is located in the central control unit 9*n*, electrodes 283*bp*, 283*bl* are located on the box 424*n*, as shown in detail 441.

FIG. 39 shows a detail of an open strap 313*a* to be worn around the arm, made of an elastic flexible material, preferably rubber or fabric, at the end of which a harder strip 318 is attached, preferably made of plastic. After the attachment to the arm, the strap 313*a* is secured against opening by Velcro fasteners 319*a, b*.

FIG. 40 shows a detail of the strap 313*a* before fastening by means of Velcro fasteners 319*a, b* where the harder strip 318 holds a slightly curved shape approximately in the radius of the arm 321 it is fixed to the underarm 320 so that the end of the harder strip 318*a* is freely accessible from the front of the arm 321*a*, ready to be easily attached around the arm 321 by strap 313*a* and secured using Velcro fasteners 319*a* and 319*b*. That would be difficult without the application of the harder strip 318 at the end of the strap 313*a* because if the end of the strap 313*a* did not consist of a harder strap 318, but of elastic material, it could move freely and would tend to come loose or slide even if held by pressing the arm against the body 320 and it would thus be difficult to secure the strap with a zipper. The advantage is that the end of the harder strip 318*a* before closing remains attached to the front of the arm 321*a* for easy application of the Velcro fastener 319*a*, as shown in the example. Detail 445 shows how the electrode 283*b* is pressed to the arm 321 using the strap 313*a* and is connected by a cable 413*b* with connector 431 is preferably in the form of a press stud where the connector 431*d*, i.e. its fixed part, is attached to the connector 431*e*, which forms its detachable, part from where the signal is transmitted via cable 422 to connector 382.

FIG. 41 shows a detail of the strap 313*a*, wrapped around the arm 321, while secured with Velcro fasteners 319*a, b*. Electrode 283*b* is placed on the arm 321 and the potential is led from the connected connector 431, preferably in the from of a press stud, through cable 422 and connector 382 for further processing.

FIG. 42 shows an example of an exchangeable electrode 283*e*, preferably of a round shape, attached by means of an adhesive tape 395 in a circular recess 396 for example to the chest belt 221, made e.g. of rubber, where a firmly attached part of the electrode 283*f*, made e.g. of metal, is connected to the cable 413*a* leading through the chest belt 221 to the ECG control unit 403, or alternatively connected to a cable 413*b* leading to connector 431*d*. The replaceable part of the electrode 283*e* is preferably made of electrical conductive gelatine material which will adhere tightly both to the chest 368, and to the fixed part of electrode 283*f* the edge of which is fitted with adhesive tape 395 preferably shaped as a circular ring that holds the electrode in the inside part of the ring 395*a*, while the outside part of the ring 395*b* is stuck to the chest belt 221. The replaceable electrode 283*e* slightly overlapping 397 the chest belt 221 preferably protrudes so it is pressed by the chest belt that is wrapped around chest both to the chest 368 and, with the other end, to the fixed part of the electrode 283*f*. The replaceable electrode 283*e* can be replaced by removing the adhesive tape 395. In a similar manner as described above regarding the application to the chest belt 221, the exchangeable electrode can be applied e.g. on straps 313*a, b, c* shown for example in FIG. 37, 39, or to similar electrode carriers. The advantage is that the replaceable electrode 283*e* is not stuck to the chest, as required by the current state of the art, but to the chest belt 221 or the straps 313*b, c*, which is not painful and can be performed before the application and removed after the application of the chest belt 221 to the monitor person's body, which does not place any demands thereon. The electrode 283*e*, made for example of conductive gelatine, ensures permanent contact with the skin without the need to moisturize the skin.

FIG. 43 shows an example of a firmly attached electrode 283*g* made of conductive material such as metal, in a circular recess 396 of the chest belt 221, preferably made of elastic rubber, with a slight overlapping 397, which ensures good contact with the chest 368 when pressed by the harness of the chest belt 221. The advantage of this design is the possibility to wash the chest belt 221 without the need to exchange electrodes. This method of attachment of the electrodes can also be applied in the case of straps 313*b, c* from FIG. 36.

FIG. 44 shows an example of a design of a typical 5-electrode system used for monitoring of monitored persons in acute care in hospitals where electrodes are routinely stuck to the skin. Instead of sticking, the above example preferably applies pressing of electrodes 283*b* with straps 313*b*, electrodes 283*f* with a cross strap 312 and electrodes 283*e* with a chest belt 221 to ensure conductive contact with the skin. In this example, the electrodes 283*f*, 283*b* and 283*h* are preferably made of metal, plastic, rubber or other conductive materials of an elongated shape extended at the axis of the straps to provide a larger contact area with the skin and are firmly attached to the chest belt 221, straps 313*b* and the cross strap 312 and they are made of non-conductive materials such as plastic or rubber. The electrodes 283*h* in this example are placed on the side of the chest approximately below the nipples, the electrode 283*f* above their level at the centre of the chest. The advantage of this design is that it is not necessary to stick the electrodes and together with the straps 313*b* and the chest belt 221 they are easy to wash and disinfect. They offer the possibility of long-term wear also in the mobile application. Alternatively, it is possible to use a replaceable electrode 283*e* from FIG. 42 or electrodes 283*f* shown in FIG. 43, or other. Cables 422 are led preferably around the neck so that they are kept fixed and they are led to the connectors 382, so that they form a whole, which is preferably connected to the control unit ECG via only one cable 413*a* and connector 315. It is the advantage as opposed to the existing systems where the incoming cable is divided into individual cables leading to electrodes stuck to the skin.

FIG. 45 is shown on part A, which also contains, in addition to the basic FIG. 45 on detail 626 also detail 151 showing two curves, detail 152 of the editing display, detail 148 of the pulse curve, detail 149 of the arrhythmia curve, detail 150 of the ECG curve, also part B, which contains the details: detail 142 of the response, detail 143 of the pulse, detail 144 AR I, detail 145 AR2, detail 146 relax, detail 147 editing and part C showing detail 169 of curve EKG I-III, detail 158 of the full-scale pulse curve, detail 159 of the reduced-scale pulse curve, detail 161 of the shifted display, detail 164 of the zoom of the arrhythmic part of the curve, and detail 613. 45 shows the display 215, preferably a touch-screen type, for example of the central control unit 9*d* shown e.g. in FIGS. 28 and 30 or others in the set, where the lower part of the display 215*s* preferably remains constant and when another display is selected 215 only the optional part of the display 215*v* changes. When you first turn on the appropriate central unit, for example the central control unit 9*d* shown e.g. in FIGS. 28 and 30, using the ON/OFF button 355, the initial display is shown as pre-set during manufacture as shown in FIG. 45 of detail 626. This can be changed by the user as further described and subsequently, the last settings are always displayed after activation. Buttons are situated on the left side of the display 487, with the advantage of constant lower part of the display 215*s* separated by line 522, e.g. button 1st Call 357, button 2nd Call 358, the SMS button 359, the Phone button 356, the Pulse button 486, the Location button 195. The right side of the display 488 features permanent buttons 491 related to the display, that perform common tasks of the appropriate functions and remain in place when selecting any of the other buttons, but can be changed by pressing the button of another set 492, where at each pressing the permanent buttons 491 switch to another set until the display returns to the original set. When you press any of the permanent buttons 491 the relevant functions are displayed in the optional part of the display 215*v*. When holding one of the permanent buttons 491, the Pulse button 486, or the Phone button 356 for 2 seconds the particular display becomes the initial display. This will preferably be displayed after switching on any of the central control units included in the set, such as the central control unit 9*d* shown for example in FIGS. 28 and 30. The advantage of permanent buttons 491 at the bottom of the display 215*s* is that they remain on all displays, and therefore there is a possibility of immediate display of the selected screen by using only one button, which is technically impossible on the existing devices manufactured under the current state of the art. The following displays and touch buttons with the following functions are situated in the permanent part of the display 487 of the lower part of the display 215*s*: The reset button 13, the red button Emergency Call 14, which starts flashing when the alarm is manually, by pressing, or automatically activated. When touched, the Bluetooth button 193, which is green during connection and red in the case of disconnection, resets the connection. The display GPS 178, green when functioning and red when not functioning. Display showing the reason of the warning signal 467 that specifies the reason of the warning signal. In addition, the Lead off display, indicating that one of the contact sensors monitoring e.g. the pulse or ECG is disconnected. The detailed information about what contact is disconnected is displayed on the lead off display 617. Button 1st call 357 enables the reception of a phone call. After answering the call its green colour turns to red and by repeatedly pressing the button you can terminate the call, and the button will turn green again. Another call can be answered by pressing the button 2nd call 358, while the first call is switched to "Hold". You switch between the calls by pressing the button 1st call 357 and the button 2nd call 358. In the case of 2 concurrent calls you can end one of the calls by pressing and holding the appropriate button for 2 seconds. You can display an incoming text message in the third section 119 of the display 215*v* instead of the displayed curve by pressing the button for text message 359. Press again to display another message if received. Each time you press the SMS button 359, another message appears, when there is none, the first message reappears, followed by the second message etc. until it switches back to the first message. Upon the receipt of a new message, this message appears first. By holding the SMS button 359 the displayed message is stored in memory and it will no longer be displayed by pressing the SMS button 359. By pressing this button twice, the SMS message disappears and the display returns to its original layout. The button 1st call 357, the button 2nd call 358, the button SMS 359 are also intended as displays on which the name of the communicating participant is shown, or, if not stored in the memory, the number of the participant. 357, the button 2nd call 358, the button SMS 359 are also intended as displays on which the name of the communicating participant is shown, or, if not stored in the memory, the number of the participant. This system has the advantage that it is possible to use only two buttons to serve 2 calls and one button to display multiple text messages without significantly changing the substantial parts of the display where you can easily see important data. This is impossible on devices produced under the current state of technology. More functions, such as phone calls or writing and editing of text messages are available using the button Telephone 356, when entire sections of the display 215*v* change. This display shows the layout and buttons usual for this choice, including the keyboard for the normal calling function, and they are not included in this invention description. The left side of the display 487 also features the pulse button 486 with a symbolic sign of heart enabling the display of heart functions in the optional part of the display 215*v*, which is the initial display shown in FIG. 45, which you can return to by pressing this button for 2 seconds from a different initial display. This initial display of heart functions in the optional part of the display area on the display 215*v* features the section of Pulse 316, with the display of the current pulse 462, which flashes when the pulse is outside the specified limit and changes colour from green to red, together with an image of a heart 333 that flashes in the rhythm of the pulse. There is also the button for settings 334, the pressing of which shows in the section Pulse 316 and Arrhythmia 331 in the entire section 117 the detailed pulse section 336 shown on the detail 143, which also contains the display of the current Pulse 462, the display of the Minimum pulse 463 with buttons + and – 465 for the setting of the values of the minimum pulse, display of the Maximum pulse 464 with buttons + and – 466 for the setting of the values of the maximum pulse. The detailed pulse section as well as in all other detailed displays, includes the button Back 512, which can be used to return to the default display. Furthermore, the 1st section 117 featured the zone Arrhythmia 331, with the display of the current level of Arrhythmia 457, the display of the set level of Arrhythmia 459, together with buttons 523 switching between method of calculating arrhythmia from AR1 for the number of irregular pulses per minute to AR2 for the difference between two programmes. The display 515 shows the selected program for calculating arrhythmia: 1 for AR1, 2 for AR2. Use the button 513 for settings to switch to the detailed zone of Arrhythmia 514, shown in details 144 AR1, which appears in the entire first section 117. The screen showing the number of irregular pulses per minute is located here under numbers 625, display of the number of irregular pulses per minute in % 458 compared with the regular pulses, the display of the pre-set level of arrhythmia 459 preferably expressed on the scale 1-5, where 0 is a regular rhythm, 1 is arrhythmia up to 20% of irregular pulses per minute of the total number of pulses, 2-4 for each additional 20% of irregular pulses, 5 for 80-100% irregular pulses per minute. There is also the display of the set degree of arrhythmia for warning 460, during which a warning signal is activated, which, if not reset by the monitored person, changes into an alarm transmitted along with data regarding arrhythmia and possibly ECG to the surveillance centre 22, as described in previous figures. Furthermore, the buttons + and – 470 are used to adjust the level of arrhythmia illustrated by the display of the set level of arrhythmia for warning 460. The display 515 shows the selected arrhythmia method AR1 or AR2. The Back button 512 can be used to switch back to the zone of arrhythmia 331. If AR2 is selected using the button 523, i.e. the second method of calculation of the arrhythmia by means of the difference of the 2 programmes, when the button 513 for settings is pressed, the zone of the detailed display 524 is shown in detail 145 AR2, which shows the display 525 of the pulse calculated in the 1st programme and display 526 of the 2nd programme for calculating arrhythmia and their difference on the display 527, which is crucial for the calculation of the level of arrhythmia based on this method, shown on the display 528. Use the buttons + and – 529 to set the maximum allowable level of arrhythmia, displayed on the display 530, above which the warning signal is activated. The degree of arrhythmia can preferably be determined as the 1st degree for the difference up to 5, 2nd up to 10, 3rd up to 15, 4th up to 20, 5th up to 25 pulses and 0 for the sinus rhythm within the difference of 5 pulses. The 2nd Section 118 contains the response zone 326, where the display is shown indicating the remaining time 624 of the set interval, which can be returned to the initial time of the set interval using the Reset button 13 located at the bottom of the display 215*s*. The display of the reason of the warning signal 467 is located in the 4th section 120. When activated together with the reset button 13, the permanent green colour changes into flashing orange, which changes into flashing red if the warning is not reset by the monitored person using the button Reset 13, and the last 10 seconds there is therefore the possibility of resetting, before the alarm is sent to the surveillance centre 22 shown in the previous figures, when the flashing red colour becomes permanent. The button Settings 328 instead of the zone Relax 339 and Response 326 displays in the entire 2nd section 118 a detailed display of the zone Response 329 as shown in detail 142 of the response, where the following buttons are situated: the button plus 131 and the button minus 132 for the adjustment of the time for the activation of the warning signal, then the display of the time set until the emission of the warning signal, or the interval 455, the display of the remaining time 624 until the warning signal, during the activation of which this display and the green reset button 13 change colour to orange after the period elapses and just before issuing the alarm when the reset is required after the pre-set time interval elapses up to 10 seconds to flashing red, which means that the display of the remaining time 624 until the warning signal indicates 0. When it is not reset during this period, the central control unit 9*d* shown for example in FIGS. 28 and 30, or another one in the set alerts the surveillance centre 22, as shown e.g. in FIG. 30. The same display procedure is followed by the specification of the remaining time 624 on a detailed display of the Response zone 329. The display of the reason of the warning signal 467 or alarm is located in the 4th section 120 and is displayed in all displays of the initial screen activated by the Pulse button 486. In addition to the elapsed interval e.g. this also includes the heart rate exceeding the limit, or other health functions. The advantage of the display on the detailed screen of the zone Response 329 by pressing the button 328 for settings, which contains for example the elements of settings and other elements, consists in the fact that the display of the simplified zone Response 326 need not include these elements and therefore it can be displayed in a smaller area and it is easier to arrange a better organized view in section 118. This applies to all displayed areas of detailed zones. Furthermore, the optional part of the display 215*v* in the 2nd section 118 shows the zone Relax 339, containing the display of the Level of variability 340 calculated on the basis of fluctuations in heart rate and the display of the Level of stress 341 calculated preferably from the fluctuation of the ECG curve. The greater the fluctuation, the greater the index, ideally, the smallest possible index should be obtained, i.e. the smallest possible stress. Both calculations are preferably performed for example in the central control unit 9*d* shown in previous figures, for example in FIG. 30 and others. When pressing the button Detail 342 the entire 2nd section 118 will show the detailed Relax zone 343 with the display of variability in pulses 471, indicating how much the pulse changes by means of the variability display in % 472. It also contains the display of the degree of variability 340 and the display of the degree of stress 474. The 3rd section 119 of the screen contains pulse, arrhythmia or ECG I curves which can be displayed by touching the appropriate button in the 4th section 120, which remains unchanged when displaying the heart function activated by the button 486 for pulse. By pressing the pulse curve 517 in the 4th section 120 the 3rd section 119 displays the pulse curve 108 shown in detail 148 of the pulse curve. It also shows regular heart pulses 101 and irregular heart pulses 102, as well as the heart frequency curve 108 with the line indicating the pre-set maximum frequency 519 and a line indicating the minimum frequency 520. In case of exceeding the defined limits, for example in point 521, the central control unit, for example the central control unit 9*d* from FIG. 28 activates a warning signal. By pressing the button for the arrhythmia curve 531 the section 545 shows, in addition to the pulse curve 108 also the arrhythmia curve 534 for the course of arrhythmia shown in detail 149 of the arrhythmia curve. Line 535 defines the level of arrhythmia, which will activate the warning signal. The size of the settings of the maximum level of arrhythmia can be read from the scale of arrhythmia 536, the value of the settings of the limit of the minimum and maximum pulse is shown on the pulse scale 537. By exceeding these limits, for example the central control unit 9 shown in previous pictures, or another selected unit, will activate a warning signal. The maximum value of arrhythmia in a given segment is indicated by means of a line 612. These curves are only provided as an example for a particular display. A detailed description of the pulse and arrhythmia curve is shown in FIGS. 61 and 62. The button ECG I 538 in the 3rd section 119 shows the ECG curve 539 shown in detail 150 of the ECG curve with the display for the value P–R 540, display 541 for a brief Diagnosis and display 542 for a summary diagnosis, green for normal curve, or red for abnormal curve, accompanied with a warning signal. The warning signal can be reset using the reset button 13. A detailed diagnosis is displayed instead of the ECG curve 800 by holding the display for a brief diagnosis 541 for 2 seconds. By pressing the pulse curve button 517, the arrhythmia curve button 531 or the button ECG I 538, you will replace the curve shown in the 3rd section 119 with a newly selected curve. When holding one of these buttons for 2 seconds as shown in Detail 151, the newly selected curve is added to the existing curve in the section 545, while the size of the selected curve display is automatically adjusted to fit into the particular area. The section 682 on the bar 543 in this case shows a simplified display of the current pulse 462, the display of the pre-set level of arrhythmia 459, the display of the level of stress 474 and the display of the level of variability 340. By holding the appropriate button such as the button of the pulse curve 517 repeatedly the added curve is removed. The Editing button 547 shows the Editing display in section 194 shown in detail 147 of Editing. On this display it is possible by means of buttons + and – 548 to set the pulse scale 537 in the displayed section 157 for example from the default scale of 0-100 pulses, shown in the detail 158 of the full-scale pulse curve, where a part of the curve 614 in the non-displayed section 160, to 0-200 pulses shown in detail 159 of the full-scale pulse curve, according to the physical strain, i.e. the range in which the pulse is to be monitored. It is possible to show the entire pulse curve 108 in the displayed section 157. Use buttons 549 of the vertical shift to move the entire display without changing the scale and including curve 108 up or down so that the displayed section 157 shows the curve in the monitored range, e.g. within the reference range 0-200 pulses up to the range of 50 to 250 pulses as shown in detail 161 of the shifted display. This enables the display of the complete pulse curve 108 also in the event that the heart rate does not increase during increased physical strain. By touching the zoom button 156 it is possible to initialize the increase or decrease of the pulse scale 537 on both sides of the zoom axis 162, which is in its default position in the middle of the displayed section 157, as shown in detail 159 of the reduced-scale pulse curve 108, on 100 pulses. Using the buttons 549 of the vertical shift the part of the curve 108, which is to be monitored in detail, for example, the arrhythmia part of the curve 615 can be centred on the zoom axis 162. It is also possible to move the zoom axis 162 by means of the procedure described below to the required section of the curve 108, as shown in the example in detail 161 of the shifted display where the zoom axis 162 was shifted from the initial position in the middle of the displayed section 157 of 125 pulses to the position of 150 pulses. By means of the zoom buttons 156 the curve 108 can be zoomed in or out as appropriate. You can then view the zoomed in part of the curve, which is to be closely monitored, such as the arrhythmic part of the curve 615 characterized by arrhythmia during increased physical strain of the monitored person on the detail 161 of the shifted display, where the zoom axis was shifted to the centre of the monitored arrhythmic part of the curve 615 150 pulses. In this example, the arrhythmic part of the curve 615 on detail 161 of the shifted display, oscillating between 130 and 170 pulses, is on the zoomed detail 164 of the arrhythmic part of the curve magnified twice. When pressing the zoom button 156 once, it shows the sign “manus” with the zoom axis set in the initial position in the middle of the displayed section 157, as shown in the detail 159 of the zoomed out pulse curve. Then you can use the vertical shift buttons 549 to shift and the buttons + and – 548 to magnify or shrink the curve. When pressed again, the sign “auto” appears, when the axis of the zoom moves into the position in the middle of the curve and the buttons + and – 548 adjust the zoom. This position is calculated by the central control unit 9*d* shown e.g. in FIGS. 28 and 30 or another curve chosen from the set, for example on the principle of the identical curve area on both sides of the zoom axis 162, or the arrhythmic average of the minimum and the maximum curve pulse. By pressing the button once again, you will deactivate the zoom function. The buttons 550 of the horizontal shift can shift the curves along a timeline 165 that can be equipped with a second scale which can also be supported in the form of e.g. horizontal and vertical millimetre grid on the background of the curves. With each press, it is possible to shift back by one time segment 1001 from the current state, for example in the case of the arrhythmia curve 534 on the detail 149 of the arrhythmia curve and vice versa up to the current situation. The default time period 1001 for example lasts 10 seconds and its length is set so that it is displayed on the entire screen 215 of the chosen central control unit in the set, such as the central control unit 9*d* shown for example in FIGS. 28 and 30. By holding the button 550 of the horizontal shift the shift is gradually accelerated. The section number is displayed on the screen of the section number 153. The number of time segments 1001, that are displayed and that occupy the entire screen 552, can be adjusted by buttons 551 + and –, which also appropriately changes the time scale in seconds on the timeline 165. The default time segment 1001 may be for example 10 seconds, which is about 10 pulses that appear in the entire length of the display in the 3rd section 119. By pressing the button 550 of the horizontal shift +, i.e. to zoom in, a half of the time segment is displayed, when pressed repeatedly, a quarter of the time segment 1001 is displayed along the entire length of the screen in the 3rd section 119 from the end of time segment 1001. When you press the button –, i.e. to zoom out, 2 segments are displayed, the next time 4 segments are displayed and so on. When you press the button 550 of the horizontal shift back, instead of the currently displayed section for example with number 30, the previous segment, i.e. 29, then 28, etc. and similarly forward is displayed. If zooming in the horizontal shift takes place in halves, or quarters of the time segment 1001, when reduced in two or more time segments 1001 according to the pre-set reduction specification. Time segments 1001 shown for example in detail 149 of the arrhythmia curve are numbered from 1 in the beginning of the monitoring started by pressing the green button Start 557. When pressed, if no recording is made, the recording is activated and the number of the activated recording appears on the screen 155 as the recording number. By holding the red stop button 619 for 2 seconds it is possible to stop the recording, while the last section with the note "stop" is displayed. Each time segment 1001 is assigned not only a number but also the date shown on the display 553 of the date and time of the start of the time segment shown on the display 554 of the time when the record was made, based on the time measured preferably in the chosen central control unit of the set, for example, in the central control unit 9*d* shown for example in FIGS. 28 and 30. You can browse through the time segments by touching the buttons 550 of the horizontal shift. By tapping the mark button 555 you can mark points on the curve that can be displayed in the future. By holding the button for two seconds during the shift using buttons 550 of the horizontal shift in the editing mode you will display only the marked time segments. The display of marked segments can again be cancelled by holding the mark button 555. The numbers of the marks, shown on the display 558 for a particular recording start with 1 and increase each time you press the mark button 555. The mark number also appears when you play the marked segments. When you touch the display of the recording number 155 you can use the horizontal shift buttons 550 to set the required number of the saved recording, i.e. you can browse, also according to the date on the display of the date and time 553 on the display of the time 554 at the beginning of the recording. By touching the button Home 620 you will display the first recording. By touching the button End 621 you will display the most recent recording, i.e. the latest time segment. By touching the display of the recording number 155 again the mode returns to the browsing mode in time segments 1001 using buttons 550 of the horizontal shift. The button Home 620 and the button End 621 in this mode display the first and the last time period 1001. The button Default 648 is used to adjust the initial display set as the factory setting or by the technician. During continuous recording initialized using the start button 557 a record of pulses is displayed on the left, and on the right, the newly recorded pulses are always displayed. Tap the stop button 619 to stop the display of the recording while showing the status at the moment when you press the stop button 619. Each time segment 1001 is marked at the beginning by a boundary line 713 and at the end by the boundary line 718 with the number 714 of the time segment and the date. When you stop recording the current end 717 of the time segment is marked. The segment 716 stays till the end of the display to the boundary line 718. If you press button 550 of horizontal shift backwards, i.e. to the left, the current end of the time segment 1001 moves to the end of the display to the boundary line 718. When pressed again, the previous segment is displayed. Similarly, when button of horizontal shift forward 550 is pressed, the more recent time segment 1001 is always displayed until the latest completed time segment 1001. When holding the button of the horizontal shift forward 550 the latest completed time segments 1001 are always shown automatically in sequence when completed. The function is cancelled by holding this button again. The current recording of the latest pulses is displayed again by the Start button 557. When tapping the button for the min/max pulse 627 or the button for maximum arrhythmia 560 you will display gradually only the time segments that exceed the pre-set limits, and their colour will be green. The repeated tap will deactivate the function and the colour turns red. Detail 152 of the editing display shows its display in section 194 on the display 215*v* after touching the button for editing 547 when viewing the arrhythmia curve shown in detail 149 of the arrhythmia curves. By touching the button ECG I-III 609 in the 4th section 120 of the display 215*v* the section 175 shows the curves ECG I-III 170 12-lead ECG or ECG with less leads, as shown in detail 169 of the ECG curves I-III. By touching the buttons aVR-aVF 171, these curves are shown instead of the above-specified curves and similarly when touching the buttons V1-V3 172, or buttons V4-V6 173. Depending on the number of the ECG leads, some of the curves might be impossible to display. By touching the button for diagnosis 174 the ECG diagnosis is displayed instead of the ECG curves in section 175. The button Editing 176 in the section 175 of the display 215*v* will show the display for editing shown in detail 147 for editing. When browsing using buttons 550 of the horizontal shift by touching the button "P" 618 only the segments with the missing wave "P" 803 will be displayed. When touching the button "P" 618 again the function is cancelled. The button Auto 622 will be used to display all the time segments 1001 diagnosed by the control unit ECG 403, identified in the previous images as abnormal. The repeated tapping on the button will gradually show only the selected abnormalities such as suspected heart attack, tachycardia and bradycardia, A-V blocking, and the like. Holding the button for 2 seconds will cancel the function and when browsing using the buttons 550 of the horizontal shift all time segments 1001 will be again displayed.

FIG. 46 shows the optional display 215*v* showing the locations 188 when selecting the button of the locations 195, which displays locations from which the monitored person can choose locations for the transmission of information to the surveillance centre 22 displayed for example in FIG. 30, about their current location. This is particularly suitable when the GPS display 178 indicates the colour red implying that the GPS does not work. The location can be selected using arrows 179 and then sent to the surveillance centre 22 by touching the central button 181 for example via the central control unit 9*d* illustrated for example by FIG. 28 or 30. More display sets can be in stock, which are selected using the buttons +– 180 and they are indicated by the display of the number of the set 184. By pressing the button for editing 182 you will change the display to the editing environment 189 shown in detail 183. Here, by selecting the set 729 and position 185 using buttons +– 180 and arrows 179 it is possible to change the current name of the location 187 to a new name, which can be entered using the keyboard 186, which is displayed on the keyboard 192 and during the activation of the central button 181 it is transferred to the name of the location 187. By pressing the button CLR 191, you can delete the individual letters on the display of the keyboard 192 or by holding the whole name. To go back to the original display of the locations 188 touch the button back 190.

FIG. 47 on the detail 166 shows the image on a larger display on the central control unit 9*g* in the set described in FIG. 30 preferably consisting for example of a pocket PC. Detail 167 shows the same image on a smaller display on the portable central control unit 9*r* in the same set on FIG. 30, preferably consisting of a mobile phone.

FIG. 48 shows the extension of the set of devices shown in FIG. 30, where the central control unit 9*d* processes data from each sensor included in the sensor block 1200*c* and communication of the central control unit 9*d* with other external devices 351, which may be more central control units preferably consisting of mobile phones, other sensors, sport testers, appliances, computers or other devices. Converter 256 contained in the central control unit 9*d* is operated by the central microprocessor unit 601, used also by the central control unit 9*d*. It communicates with all these external devices 351 and sensors on various media and enables their mutual control, transmission of information and displays, as already shown partly illustrated on the example of communication with the sensors in FIG. 30 and can preferably be incorporated in set 623. This communication is further complemented by examples described in FIG. 50. It takes place with sensors in the sensor block 1200*c*, preferably by wireless means for example via a wireless connection 5022, protocol Ant 683, Bluetooth 55, or via another connection or wired connection 264 on various protocols. It can also take place on other communication media and in protocols specified for example in detailed FIG. 50, 51. Using an external device 351, also including sensors, the converter 256 may communicate through various protocols, such as a wireless connection, e.g. wireless connection 5022, Ant 683, Bluetooth 55, WiFi 348 or other wireless connections 350, such as radio-frequency communication links of various frequencies and protocols, or via wired connections 349 working on various common protocols and other connections, such as light and communication media and protocols. Thereby the converter allows communication between all the devices that require or allow communication on all possible media and protocols used, for example, it can interconnect systems operating in the Bluetooth protocol with systems working on the ANT protocol. This will preferably allow for the extension of the set of devices described in FIG. 28 or 30 and any other devices regardless of the protocol on which it operates. The current state of technology does not support such a possibility.

FIG. 49 shows the converter 256 as a single unit, physically separated from the central control unit 9*d*. In this example, the converter, similarly as in FIG. 48, is able to communicate through its respective peripheral devices with sensors included in the sensor block 1200*c* and with external devices used on any communication media, and preferably, they may be included, for example through Bluetooth 55 in the set 623 of devices working in this case mainly via the wireless Bluetooth connection 55. The converter can also evaluate, process, display, save etc. the transmitted data as needed. Here, the converter 256, which operates separately from the central control unit 9*d*, contains a separate central microprocessor unit 601.

FIG. 50 shows an example of the design of the central control unit 9*k*, which includes preferably both the components and modules described on FIG. 28 in the case of the central control unit 9*d*, as well as other components and converter 256*q* to which the following modules and connectors for communication, e.g. for optical communication—a laser link module 196, IR links 197, optical fibre module 606, also for voice communication—module for ultrasound communication 199, also for RF wireless communication, such as the Bluetooth module 251, WiFi module 306, Ant module 222, Wireless USB module 223, WiMAX module 225, chip Heart Rate Receiver 607 operating in the 2.4 GHz band, module for different devices 61 operating in the 2.4 GHz band and receiver 82 operating on the induction transmission 5.5 kHz, as well as wired communication—connector RS-232 353, connector RS-422 228, connector RS-485 229, connector Ethernet TCP/IP 230. USB 1 connector 308*a* and USB 2 connector 308*b*, in/out I/O 400, ISDN 236 and modules 608 for communication in other systems such as those described for the converter 256*q* in FIG. 51. These modules and connectors for wireless and wired communication may use various protocols such as PPP, PPE, SLIP, SDLC, X.25, HDLC, Ethernet II, etc. With those and other modules for communication, which can be applied, the central control unit 9*k* can provide all types of communication and preferably combine them in a set devices operating using various media, such as the communication system Ant with the system Bluetooth or GSM systems with CDMA. The central control unit 9*k* together with the converter 256*q* are controlled by the central microprocessor unit 601, which also controls the touch screen, the main control keyboard 245*z*, the speaker 47, the siren 37 and the components for communication via the mobile operator's network containing a SIM card 139 and SIM card 137 for GSM connections and a SIM card 226 for connection via CDMA and other connections, and can control other necessary parts and modules.

FIG. 51 shows an example of a separate converter 256*q*, which is controlled by a separate control unit, such as the central microprocessor unit 601 and which, besides the described components and modules may contain required additional components and modules. Similarly to the central control unit 9*r*, shown in FIG. 50, which contains converter 256*g*, it can associate in one set a number of devices operating via various communication media and protocols used with the help of the central control unit 9*k* or another unit, with which it communicates.

FIG. 52 shows the chest belt 221 with electrodes 73, which are preferably common for several sensors and they are connected to the heart rate sensor 220*a*, working on the sound frequency 5.5 kHz, transmitted by the coil of the transmitter 81. The connection is provided via wired connections 628*a* and 628*b*. The heart rate sensor 220*b* operating via Bluetooth 55 with a Bluetooth module 251, or alternatively with a module for Ant or other module is also connected using wired connections 628*a* to the mentioned common electrodes 73. The clip 632, for example, of the type "clip on", preferably allows the attaching of the heart rate sensor 220*a* to the belt temporarily, as needed. If necessary, the chest belt 221 can feature more than two attached sensors, working on various communication protocols, connected to the electrodes 73. Preferably, the pulses are transmitted simultaneously to the central control unit 9, preferably made of a mobile phone and a measuring watch 78, which is not enabled by belts produced according to the current state of technology.

FIG. 53 shows the heart rate sensor 220*b*, working on Bluetooth 55 and heart rate sensor 220*c*, working on the frequency 2.4 GHz 630 with a transmitter 831 and the measuring watch 78 on the same frequency. Similarly, more sensors can be placed on the chest belt 221, interconnected via wired connections 628 in parallel with electrodes 73, working on various communication media and protocols, which is impossible with devices manufactured on the basis of the current state of technology. It is also shown that it is preferably possible in addition to the sensors, e.g. to the heart rate sensor 220*b* and the heart rate sensor 220*c*, to connect the external power supply 646 consisting of batteries 631, connected to voltage converters 635*a* and 635*b*, which are separately connected to the sensor in parallel to their internal batteries with wired connections 636. In this example, both sensors are attached to the belt permanently, but it is possible to use removable attachment elements. Preferably, each is powered separately from a single external voltage converter 635*a* and 635*b*, so that the parallel connection to internal batteries in the heart rate sensor 220*b* and the heart rate sensor 220*c* do not affect each other. The connection of the external power supply 646 ensures both a longer operation, approx. 50-100 hours without the need to change the battery, as compared to battery supply located in the sensors lasting for approx. 6-12 hours, especially when using Bluetooth connection, because under the current state of the technology, it contains batteries with very little capacity so that they can fit into the sensor. First, it brings the advantage that the battery 631 can be changed for a newly charged battery during operation ensured by internal battery in the heart rate sensor 220*b* and heart rate sensor 220*c*. You can also see the battery 631 and voltage converters 635*a* and 635*b* attached to the chest belt 221 and located apart to allow for flexibility of the belt. The battery 631 is removable from the cover 647. Batteries are connected via wired connections 636, which can preferably lead through the chest belt 221 and its schematic diagram outside the chest belt 221 is only informative. In a similar way it is possible to connect more than two sensors from an external power supply.

FIG. 54 shows the serial connection of batteries, preferably formed of batteries 631, preferably using a voltage converter 65, to adjust the battery voltage to the voltage of the sensor. The battery pack 631 and voltage transformer 635 can be attached to the chest belt 221 and wire connections can be led through this chest belt 221, and can be preferably attached to the external chest belt 637, through which wire connections can be led 639 and which can be attached, for example, using clips 632, to the chest belt 221, from which it can also be removed. This opens the possibility to attach an external battery only when needed to increase the capacity of the sensors and the ability to charge the batteries, instead of taking out individual batteries, or replacing the entire external chest belt 637 with a charged belt. In this case, the external chest belt 637 can preferably be attached to the chest belt 221 via connectors 638, preferably of the press stud type. To supply power to more than one sensor, each sensor will preferably be equipped with a separate voltage converter 635.

FIG. 55 shows an example of removable electrodes 642*a*, preferably made of conductive rubber or other conductive material, attached by means of an adhesive tape 643 to electrode 73, so that they are electrically connected thereto, which will be built in the chest belt 221 and led out using a wired connection 628. The advantage is the temporary attachment of removable electrodes 642*a*, applicable as needed, without permanent changes to the chest belt. You can also see alternative removable electrodes 642*b*, attached using a two-sided adhesive tape to the chest belt 221, so that they are exposed towards the chest, in addition to the electrodes 73 allowing the connection of two sensors to a separate set of electrodes that are not electrically interconnected.

FIG. 56 shows the external power supply 646*a* preferably used to supply power to the sensors, such as the heart rate sensor 220, as shown e.g. in FIG. 52, connected via wired connections 653 as well as voltage transformer 635 connected to two removable batteries 631 connected in a series via wired connections 636, located in an opening case 641, preferably attached to the chest belt 221 and removable for example, via connectors 638*a* formed preferably of press studs, which is connected to the voltage transformer 635 via cable 636, which further lead to the sensor that is to be powered. The advantage of this external power supply consists in the fact that the operating time of the sensors increases especially when operating via Bluetooth, from approximately 12 hours, which is the condition of sensors manufactured on the existing technological principles, to approximately 100 hours, allowing continuous monitoring of the heart rate for several days, which is not allowed in the case of chest belts manufactured on the basis of the existing technological principles. Connectors 638*a* are connected in parallel to connectors 638*b* that enable the connection of the specified newly charged external power supply 646*b* and to disconnect the discharged external power supply 646*a* for charging without the need to interrupt the operation. Other connectors 638*b* can also be used to increase the capacity of the power supply by using both external power supplies 646*a* and 646*b* simultaneously. Preferably, it is also possible to use both connectors 638*a* and 638*b* separately so that each of them is connected to another sensor and the two sensors are powered separately by means of two external power supplies 646*a* and 646*b*. Preferably, the external power supply 646*a* can contain two or more voltage transformers 635, which could supply power to more heart rate sensors 220 similarly, as shown in FIG. 53.

FIG. 57 shows separate connection of sensors with electrodes, where the heart rate sensor 220*a* and the heart rate sensor 220*b* are separately connected to the electrodes 73*a* and 73*b* of the via wired connections 628*a* and 628*b* and are attached to the chest belt 221, from which they can be removed, by means of connectors 651*a* and 651*b* preferably made of press studs.

FIG. 58 shows the separate power supply of the two sensors, the heart rate sensor 220*b* and the heart rate sensor 220*c* from separate connectors 638*a* and 638*b*, preferably featuring press studs to which external power supplies can be attached, such as the external power supplies 646*a* and 646*b*, shown in FIG. 56.

FIG. 59 shows the external voice unit 266, inserted in the pocket 654, for example of a jacket 664 or a shirt where it is fixed using a clip 656 at a certain height, so that the camera 5010 is situated above the edge of the pocket 654 and has the surrounding area in its field of vision. The external voice unit 266 is held in a vertical position using a yoke 663, which compensates for the greater distance of the top edge of the pocket 654 and the possible reduced distance of the bottom part of the pocket 654 from the body of the jacket 66, or for example, a shirt. The detail 689 shows a side view of the yoke 663, preferably rotating around a bearing made of a blind hole 665 in a case 667, in which the end of the yoke 663 is inserted and held perpendicular to the case 667 by means of a spring 669 with a twisted elastic part leaning with one straight end 671 against a recess for the spring 705, and with a second bent end 672 against the yoke 663, which is pressed against a stop 719. The yoke can be turned against the pressure of the spring as indicated by the arrow 673, which facilitates the insertion of the external voice unit 266 into the pocket 654, where after insertion, the spring 669 returns the yoke 663 back into position perpendicular to the casing 667 of the voice module. In case that it is not used, the yoke 663 can be removed. The yoke 663 has a telescopic part 676, which allows to set the distance of the case 667 so that the external voice unit 266 is fixed in the pocket 654 in a vertical position parallel to the body of the monitored person. Detail 666 shows an enlarged detail of the yoke 663 and a detail of the cross-section of the yoke 703 A-A. An alternative way to direct the camera to monitor the area in front of the monitored person is to preferably turn the camera for example on a rotating pivot 685. The earphone 661 for phone calls is placed preferably on the side of the external voice unit 266, close to the monitored person to allow easy manipulation for application to the ear without the need to turn the external voice unit 266. Detail 704 shows the yoke 663 inserted in a bearing made of a blind hole 665 formed of a spring 669. Detail 690 shows how the upper side of the housing 667 preferably contains a temperature sensor 263, which is monitored by the control unit 261*g*, as described in the block diagram of the external voice unit 266 in FIG. 28 and preferably responding to a blow when a call is answered, with "hands-free" operation mode. The call is terminated upon a repeated blow. Other functions can be added to the temperature sensor, for example, a double blow will switch on the camera, which is indicated by LED 726, repeated double blow will switch the camera off, a triple blow activates passive listening indicated by LED 727, and a repeated triple blow deactivates this mode. Camera images and sound are stored in memory for example by the central control unit 9*d*, to which the voice module is connected, and are periodically, or after four blows, indicated by LED 728 forwarded to the surveillance centre 22, shown e.g. in FIG. 28 while an SOS signal is simultaneously emitted. When removing the external voice unit 266 out of the pocket 654 for example with the left hand, there is an alternative possibility to answer the phone call to the telephone mode, by pressing the button 276 with a thumb. The same can be performed by the right index finger. When pressed again, the call is terminated. Multiple pressing of the button enables similar functions of button 276 as blows detected by the temperature sensor. The index finger can switch the call to "hands-free" mode by pressing switch 269, located on the top of the case 667, and to the earphone mode when pressed again. Instead of the switch 269 you can choose the "touch screen" button 678 on the display 679, located on the top of the external voice unit 266 instead of the switch 269. Similarly, you can use the "touch screen" button 691 instead of the mechanical button 276. Preferably, the upper display 679 allows the monitored person to obtain information about the number 686 of the caller, or the sender of the text message, by looking at the external voice unit 266 inserted in the pocket from the top without the need to remove it. The external voice unit 266 has a detachable string 692, connected using clamps 693, used for the hanging of the external voice unit 266 around the neck as an alternative location, for example when no pocket is available. The external voice unit 266 may preferably be placed for example in the central control unit 9*d*, or in another unit preferably consisting of a mobile phone, which in that case will contain all the functions and benefits specified above. The central control unit 9*d* is shown in FIG. 59, as an extension of the external voice unit 266. The external voice unit 266, preferably forms part of the set controlled e.g. by the central control unit 9*d* or another unit, as shown in FIG. 28, or 30. It preferably allows easy answering of an incoming call to another part of the set, such as the central control unit 9*d*, or another, without having to manipulate therewith and during the "hands-free" mode the external voice unit 266 does not have to be removed from the pocket. The temperature sensor preferably allows for a discrete activation of the camera 5010, or passive listening and transmission to the surveillance centre 22 with LED indication, suitable especially in stressful and dangerous situations. It is easy to answer the call by blowing into the sensor and without using hands. The camera scans the area to evaluate the situation and identify the surroundings of the monitored person. Images are sent periodically at adjustable intervals to the surveillance centre 22, where they are stored. In the case of an SOS, or an instruction from the monitored person or the surveillance centre 22 they are sent continuously. Camera 501*c* can preferably act as a motion sensor 1, or another sensor, which, when recording motion, resets the remaining time until the warning signal, back to the default time set by the monitored person. The external voice unit 266 has a microphone 46 on the side of the case 667, above the pocket 654, to be used when inserted into the pocket 654, so that the sound during the hands-free mode is not muffled, and preferably with a second microphone 46*a* at the bottom of the external voice unit 266 to be used when removing the external voice unit 266 from the pocket 654. The speaker 47 is preferably located at the top of the case 667, in order to broadcast into the free area during the "hands-free" mode. The external voice unit 266 can preferably be used to test whether the monitored person walks straight especially when the monitored person failed to pass the normal response test by not sending the correct code. This test involves a live video transmission from the camera 5010 to the surveillance centre 22, which through a simultaneous connection requests the monitored person to walk straight, for example along the edge of a pavement. Based on the video transmission it is possible to evaluate whether the monitored person walks straight, and has passed the test. If the monitored person fails to pass the test, it is obvious that he/she does not fully control him/herself and the surveillance centre 22 can decide on further steps. To confirm that the test is performed by the monitored person the rear camera 5010*z* is preferably positioned on the opposite side of the external voice unit 266 than the camera 5010 and during the test of the straight walk, upon the request from the surveillance centre 22, the monitored person holds the external voice unit 266 before his/her face to be recorded by the camera 5010*z*, while the camera 5010 observes the surroundings to test whether the monitored person walks straight. The external voice unit 266, as well as every other unit working in the set of devices can be protected against malfunction, theft, or against the fact that it might be left behind, together with the central control unit 9*d* or another unit, with which it is interconnected. A warning signal is activated by the central control unit 9*d* as well as the external voice unit 266 when the Bluetooth connection is interrupted, or when another data medium via which they are interconnected and it can alert the surveillance centre 22 in the case that the warning signal is not reset by the password of the monitored person. The range of the common Bluetooth modules 251, shown in FIG. 28 is approximately 15 m, but you can preferably use the Bluetooth module 251 with a range of just 1 m, which activates the warning earlier. An alternative way of protecting the units, as shown in FIG. 28, is for example the placement of a transmitter 81 into an external voice unit 266, operating on the principle of 5.5 kHz signal induction and the receiver 82 in the external converter 256, which can preferably be located in the central control unit 9*d* or in another unit, or this unit can be complemented with the receiver 82 and the signal from the pulse generator 684 shown in FIG. 28, transmitted by the transmitter 8, can be monitored. If the reception is interrupted, if the receiver 82 stops receiving pulses, the central control unit 9*d*, or any other unit, will activate the warning signal. The range of the transmitter 81 is approximately 1 m. This means that the warning signal is activated when the units move away from each by more than 1 m. In the event that the alarm is not reset by the monitored person, the central control unit 9*d*, or another unit, sends the alarm to the surveillance centre indicating a possible intervention of a third person. It is possible to use the above-described procedure to safeguard any unit or sensor in a set of mutually communicating devices. The described advantages are extended when the location of the external voice unit 266 is located in the central control unit 9*d*, or in another unit. In that case, the microphone 46*a* preferably replaces microphone 46*b* on the bottom of the central control unit 9*d*, or another unit. Devices produced according to the current state of the art do not offer the described advantages. Detail 722 shows how the external voice unit 266 or any other unit such as the central control unit 9*d*, possibly formed of a mobile phone, can preferably be protected against the removal of the lid 723, held in position after snapping the hook 725 and removable after opening the hook 724. The protection can be implemented for example by contacts 720, separated by insulation 721 and connected to the control unit 261*g*, which emits a warning signal before removing the battery to the central control unit 9*d* or another unit with which it is connected and which sends an alarm to the surveillance centre in case the warning signal is not reset immediately by the monitored person in the right code. The warning signal or the alarm is activated in the case that the contacts open when the lid 723 is opened as they are no longer under the pressure of the lid. Preferably, before opening the lid the code is required, without which the central control unit 9*d* or another unit sends a warning signal when opened, or transmits the alarm directly to the surveillance centre 2. If the correct code is entered, the warning signal or alarm is not sent. The external voice unit 266, which is preferably located in the central control unit 9*d* or the central control unit 9*d* without the external voice unit 266 or another unit, preferably consisting of a mobile phone, preferably protected against dialling of phone numbers by an unauthorized person, because before releasing the locked keyboard, it is necessary to enter a numerical code, even a one- or two-digit code. For the purpose of entering the keyboard code 245, shown e.g. in FIG. 28, or other codes, the keyboard allows entering numbers, such as codes, which however do not activate the process of dialling phone numbers, i.e. they are not sent to the mobile operator. The keyboard 245 does not perform any other functions. This happens only if the password is correct. When entering numbers that do not match the code, the images preferably captured by the camera 5010 or the camera 5010*z* located on the opposite side are transmitted, because the unauthorized person, such as the kidnapper, during the manipulation, has the external voice unit 266 or the central control unit 9*d* or another unit on one side in front of his/her face and the camera can therefore transmit his/her picture. The protection functions specified above are not available under the current state of the art and they are greatly beneficial, not only when the phone is stolen, but also for example in the case of kidnapping. The central control unit 9, or another unit, sends the warning signal and if the correct password is not entered within a pre-specified time period, it alerts the central control unit 9*d*, indicating the current GPS position and the previous route generated by the memory, and sends camera images while passively monitoring the sound. The surveillance centre 22 can connect with the central control unit 9*d* using the "hands-free" function, which, in that case, is activated when the phone call is automatically answered.

FIG. 60 shows the pulse curve 108, which is preferably represented by a connection between two adjacent pulse values 657, so the irregular course of the curve is clearer than in the case of a curve with an averaged pulse. The average value of the heart rate 1000 is calculated within a very short period e.g. 2 to 4 pulses in the example provided above within 3 pulses so that it preferably also captures the rapidly changing average pulse. Different pulses, if not outside a certain tolerance range, here +/−8 pulses expressed by the curve 696 for +8 pulses and curve 697 for −8 pulses, will be evaluated as irregular heart rate 102. Regular heart pulses 101 do not exceed the average heart rate value 1000 by more than 8 pulses. Points 687 indicate exceeding of the maximum tolerance and points 688 indicate exceeding of the minimum tolerance. The curve 534 of the value of arrhythmia is preferably calculated in the example for each pulse again according to the number of irregular heart pulses 102 in the segment of the last five pulses i.e. regular heart pulses 101 and irregular heart pulses 102. The level of arrhythmia on a scale from 1 to 5 is calculated as follows: 1 irregular heart pulse 102 is the first level, 2 irregular pulses are the second level, etc. to 5 irregular heart pulses 102, i.e. the 5th level. During the percentage evaluation, each level of arrhythmia corresponds to 20%, i.e. for example the 1 st level is 20% and the 5th level is 100% arrhythmia. For example, the display 215*v* in FIG. 45 preferably shows a part of the curve in the time segment 1001*z* lasting 10 seconds, corresponding to the time segment 1001 in FIG. 45 and the part of the curve which is not displayed is in the time segment 1001*n*.

The calculation of the average rate value 1000 and the arrhythmia curve 534 takes place in the central control unit 9*d*, for example shown in FIG. 28 or 30, or other values also from the parts of the curve that are not displayed in the time segment 1001*n*, that are saved in the memory. If the curve 708 of the adjustable arrhythmia limit is exceeded, in the example set to level 4, point 709, it will preferably activate a warning signal produced by the central control unit 9*d*, or another control unit, which can preferably be reset by the monitored person, as previously described. If moving backwards through the time segments 1001, in the example shown as a time segment 1001*z*, only the display of sections where the arrhythmia limit has been exceeded can preferably be requested, using the button 560 of the maximum arrhythmia shown in FIG. 45, detail 147. This selective display only of selected sections can preferably be used to calculate the level of arrhythmia from a limited number of pulses, as described above, to mark sufficiently small sections for display. It is possible to choose the calculation of arrhythmia also for the entire time segment 1001*z*, or more segments. For example, one method would calculate the % of irregular heart pulses 102 of the total number of pulses in a given segment, where every 20% would be represented by 1 level of arrhythmia, i.e. 100% would correspond to the 5th level of average arrhythmia. For the time segment 10012 specified in the example, the average arrhythmia would be calculated from % of 5 irregular pulses of the total number of 10 pulses, resulting in 50%, i.e. 2.5 level of arrhythmia, rounded to the 2nd level represented by curve 710, of the average value of arrhythmia for that segment. The example of the calculation of the curve of the average rate 1000 and curve 534 of arrhythmia in FIGS. 60 and 61 complements the FIG. 45 and can preferably be calculated and displayed on the central control unit 9*d*, or another unit, shown e.g. in FIG. 28 or 30.

FIG. 61 shows in four time segments 1001 after 10 seconds, shown on display 215*v* on FIG. 45 or on another display in the set, regular heart pulses 101J throughout the entire course of the curve 108 and in segments 695, not affected by physical strain also in segment 64, affected by physical strain, in which case the pulse increases. Due to the regularity, the average pulse rate, calculated in this example from three pulses is not very different from the pulse curve 108, and thus the pulses do not exceed the limit of the minimum or maximum pulse, which in this example is defined as a deviation from the average rate curve 1000+/−8 pulses and it is shown as a curve 696 of the maximum pulse and the curve 697 of the minimum pulse limit. There is an obvious advantage in determining the allowable tolerance from the average rate curve 1000, calculated from a low number of pulses, as opposed to determining the allowable tolerance on the basis of the maximum number of pulses in the absolute value by the curve 700. The advantage lies in the fact that the regular heart pulses in segment 694, of even higher frequencies, will be evaluated as within the tolerance, i.e. regular, while in the case of the curve 700 of the maximum pulse limit, specified as the absolute value of the certain number of pulses, here for example 80 pulses, would be outside the limit between points 711, i.e. irregular, although they are regular. However, If the maximum pulse curve 700 of more for example 95 pulses is selected so that regular pulses achieving 90 pulses, are not classified as out of tolerance, the irregular heart pulses 102 in FIG. 60 would be evaluated as within the tolerance, i.e. no arrhythmia would be revealed, which is a disadvantage. Preferably, the limits for evaluation of arrhythmia are therefore determined in deviation from the average value of the pulse calculated from a low number of pulses, but for the purposes of the evaluation of the maximum allowable pulse during a physical strain are determined in absolute pulse values. To calculate the level or percentage of arrhythmia the calculation preferably includes the number of pulses, which in a certain time segment exceeded the pre-set pulse limits deviating from the average number of pulses, as described in FIG. 60. This determination of the level of arrhythmia is an advantage for its prevention and treatment, and for the prevention of consequences, heart failure, for example, when performing strenuous tasks. Continuous monitoring of arrhythmia, on the basis of the specified principles that will preferably be allowed by the invention, is not possible using devices produced according to the current state of technology.

The invention claimed is:

1. A system for monitoring comprising:

a sensor block placed on a monitored person or carried by the monitored person comprising minimally 2 electrodes for sensing heart signals from the body of the monitored person and for processing the heart signals into data and subsequently transmitting the heart signals data locally to a central control block;

a communication block for local transmission, within reach of local transmitting modules, of the heart signals data from the sensor block to the central control block;

the central control block formed by at least one central control unit placed locally within reach of local transmission located at least one of: on the monitored person, in a pocket of the monitored person, on a wrist of the monitored person, near the monitored person, or a combination thereof;

wherein the central control block processes the heart signals data, wherein the heart signals data is at least one of: multiple electrocardiogram (ECG), pulse curve with curves of regular pulse limits, arrhythmia values, arrhythmia curve, variability value, variability curve, or a combination thereof, and the ECG is processed as a multiple ECG leads or as optionally chosen number of ECG leads, wherein the chosen number of leads is minimally 1 lead, and maximally 12 leads; and a display on the at least one local central control unit placed in the reach of local transmission for live displaying the processed heart signals locally.

2. The system for monitoring according to claim 1, wherein the sensor block further comprising 2 to 10 electrodes for sensing heart signals and the central control block or a surveillance centre processes the heart signals, with chosen number of ECG leads; wherein for processing 1 ECG lead, 2 electrodes are used, and by adding up to 8 electrodes up to 12 ECG leads can be processed and it is optional, on how many electrodes will be added to achieve the desired number of processed ECG leads.

3. The system for monitoring according to claim 1, wherein the display on central control unit is adapted for viewing by the monitored person for adjusting activities of the monitored person and/or medication according to a health condition seen on the display.

4. The system for monitoring according to claim 1, wherein the central control block is formed by the central control unit, further comprising at least one of: a keypad, buttons, a touch screen, or a combination thereof, and accessible by the monitored person to control the central control block, and/or the sensor block.

5. The system for monitoring according to claim 1, wherein the sensor block is sensing the heart signals and/or health functions and the sensor block is adapted for processing of the heart signals and/or health functions into data for local transmission to central control block placed locally and for remote transmission to surveillance centre placed remotely and if transmission was executed to central control block, the heart signals and/or health functions data are sent from the central control block remotely to the surveillance centre for evaluation and sending of data to surveillance centre is done on the bases of at least one of:

selected participants request, monitored person request, surveillance centre request, alarm activation, exceeding of set limits of health functions values, request for uninterrupted transmission, request for periodical transmission in predetermined intervals and durations, or a combination thereof.

6. The system for monitoring according to claim 1, wherein if the heart signals or health functions exceed a set health limits of the monitored person, the central control unit and/or surveillance centre activates an alarm or a warning signal for the monitored person and when monitored person or medical personnel doesn't reset the warning signal within a preset time interval from the beginning of the warning signal, alarm is activated, wherein if alarm is initiated in the central control unit, it is advantageously sent to the surveillance centre, whereby the limits for activation of the warning signal and/or the alarm are set by the monitored person and/or medical personnel.

7. The system for monitoring according to claim 1, further comprising:

a countdown timer for test of physical fitness adjustable by the monitored person or a qualified personnel, and when an adjusted time on the countdown timer expires, the timer produces a warning signal and the countdown timer has to be reset within preset time manually by the monitored person and/or automatically by movement of the monitored person detected by a movement sensor worn by the monitored person and/or placed in a monitored room where the person is being monitored, wherein the automatic reset can be deactivated and/or two timers are used where the first countdown timer is designed for manual and automatic reset and the second count down timer is designed for manual reset only to deactivate the warning signal, and when warning signal is not deactivated it changes into alarm.

8. The system for monitoring according to claim 1, wherein a movement sensor is placed in a monitoring room for automatic reset of a countdown timer and connected to a stationary central control unit and the reset may be executed by the monitored person using a remote reset unit or push button on the central control unit.

9. The system for monitoring according to claim 1, wherein for monitoring the health functions comprises at least one of: body temperature sensor, respiration sensor, blood oxygen content sensor, blood pressure sensor, heart pulse sensor, test on physical fitness by movement sensor, test on mental fitness, or a combination thereof.

10. The system for monitoring according to claim 1, wherein the communication block for local transmission is formed by locally transmitting means formed by at least one of: wired connection, wireless connection module, Bluetooth module, ANT module, radiofrequency connection module, or a combination thereof, and the communication block for long distant communication is for voice and/or data formed by parts for communication over a mobile network.

11. The system for monitoring according to claim 1, wherein the central control block is formed by at least one of central control unit, basic larger central control unit, smaller central control unit on a wristband, master central control unit, slave central control unit, primary central control unit, secondary central control unit, mobile phone, PDA, pocket computer, or a combination thereof.

12. The system for monitoring according to claim 1, wherein the sensor block is formed by central control unit with electrodes for sensing heart signals from both hands placed on the central control unit for sensing 1 lead ECG and advantageously up to 8 electrodes can be added for sensing up to 12 leads ECG.

13. The system for monitoring according to claim 1, wherein the central control unit is a first portable small central control unit adapted for placing on a wristband for right away view of processed heart signals and/or health functions on a smaller size display and the central control unit is adapted for voice and/or data communication with a second basic larger central control unit for detailed monitoring on a bigger display of processed heart signals or health functions, whereby the central control unit is master for one way communication or central control units communicate on two way communication, wherein the first portable central control unit and the second control unit are communicating with each other over wireless connection and advantageously images displayed on one central control unit can be displayed on the other central control unit.

14. The system for monitoring according to claim 1, wherein the sensor block is formed by a chest belt or a multifunctional chest belt placed on chest of monitored person for sensing heart signals by electrodes placed on the chest belt or multifunctional chest belt and/or placed externally to the chest belts on the body of monitored person, wherein by placing 2 electrodes on the chest belt, the central control block can process 1 lead ECG and by adding up to total maximum 10 electrodes on the chest belt or externally to the chest belt, the central control block can process up to 12 lead ECG and it is optional how many leads will be used and how many will be added and/or the sensor block is further formed by sensors for sensing health functions values detectable by sensors placed on the multifunctional chest belt or on the body of the monitored person and the chest belt or multifunctional chest belt is adapted for processing heart signals and/or health function values into data for local transmission to the central control block placed locally and/or for remote transmission to a surveillance centre placed remotely.

15. The system for monitoring according to claim 1, further comprising a chest belt for sensing of up to twelve leads ECG with six electrodes placed in a curve in positions corresponding with positions of six chest electrodes of standard ECG system for ECG monitoring leads V1-V6, wherein the electrodes are placed on the broader chest belt or on a narrow chest belt complemented with elastic cross straps which are pushing the electrodes for connection to the body of monitored person, wherein the remaining four electrodes for twelve leads ECG are placed externally and connected by wire.

16. The system for monitoring according to claim 1, wherein the communication block is adapted for voice and data communication between the central control unit of monitored person and a surveillance centre and/or medical personnel.

17. The system for monitoring according to claim 1, wherein the communication block is adapted for automatic answering a voice call by surveillance centre with hands free operation, when monitored person does not answer the call and/or the monitored person can initiate the call on central control unit to surveillance centre and/or pushes an alarm button to alert the surveillance centre or medical personnel in emergency.

18. The system for monitoring according to claim 1, wherein the electrodes are placed on self-holding straps placed around at least one of: a wrist, arm, leg, ankle, thigh, connected to a wire advantageously by a connector for connection to sensor block for processing the heart signals.

19. The system for monitoring according to claim 1, wherein the central control block comprises at least one of another central control unit, a mobile phone, PDA, pocket computer, PC.

20. The system for monitoring according to claim 1, wherein the central control unit is formed by a mobile phone, advantageously placed on the monitored person, on a bracelet, on a belt, or a handheld device.

21. The system for monitoring according to claim 1, wherein the sensor block sensing by means from the body of the monitored person, comprises at least one of a means for sensing cardiac electrical signals, a means for sensing health data detectable by sensor block, a means for sensing the data of the physical fitness of the monitored person, or a combination thereof; wherein the means for sensing cardiac electrical signals placed on a chest belt or multifunctional chest strap, comprise at least one of a heart rate sensor, a ECG control unit, a control unit of a chest belt, or a combination thereof, wherein the ECG control unit can be placed outside of the chest belt; wherein the means for sensing health data comprises at least one of a body temperature sensor, a sensor of the oxygen content in blood, a sensor for rhythm and depth of breathing, a blood pressure sensor, a device measuring heart pulse or a combination thereof; wherein the means for sensing data on physical fitness comprise at least one of a physical activity sensor, a movement motion sensor, a body position sensor, a shock sensor, a footstep sensor, or a combination thereof.

22. The system for monitoring according to claim 1, wherein the central control unit comprises an integrated storage medium and/or removable storage medium, advantageously formed by a (SD) card for storing a final data of the status of the monitored person and/or further comprises a transmission means for transmitting the final data to a surveillance centre and advantageously the central control unit is included in the sensor block.

23. The system for monitoring according to claim 1, further comprising:

a timer for tracking completion of a task by the monitored person; a surveillance centre for receiving the data; wherein the central control unit or the central surveillance centre are adjusted for verification if a timer has been reset by the monitored person within a preset period of time and/or for verification of completion of a given task by the monitored person, which are used for analysis of the mental fitness of the monitored person, wherein if the timer is not reset within the adjusted time period and/or if the given task is not fulfilled properly, a warning signal is activated.

24. The system for monitoring according to claim 21, wherein the chest belt for sensing the health data detectable by sensors from the body of the monitored person comprises at least one of a sensor for rhythm and depth of breathing, a body temperature sensor, a sensor of the oxygen content in blood, a blood pressure sensor, a body position sensor, a shock sensor, a movement motion sensor, a footstep sensor, a position sensor a device for sensing a heart pulse, or a combination thereof, and the sensor are placed on the chest belt and/or placed on the body of the monitored person.

25. The system for monitoring according to claim 21, wherein the chest belt for processing the cardiac electrical signals contains at least one of the central control unit of the chest belt, the heart rate sensor, the ECG control unit, or a combination thereof and the chest belt further comprises at least one of components for communication through a mobile operator network for remote communication with the surveillance centre, a communication means for local communication with the central control block a manual switch of ECG measurement, an audio source, a vibrator on ECG control unit, the central control unit, the communication block for remote communication, the communication means for local communication, a portable memory medium or a combination thereof, whereby the portable memory medium is advantageously formed by SD card for storage and transmitting the data wirelessly, or by moving the memory medium to another device.

26. A method of monitoring comprising:

sensing heart signals from the body of a monitored person by a sensor block placed on the monitored person or carried by the monitored person equipped with minimally 2 electrodes, processing the sensing heart signals into data and subsequently transmitting the heart signals data locally to a central control block;

local transmission by a communication block within reach of local transmitting modules of the heart signals data from the sensor block to the central control block;

processing the heart signals by a central control block formed by at least one central control unit placed locally within reach of local transmission located at least one of: on the monitored person, in a pocket of monitored person, on a wrist of monitored person, near the monitored person, or a combination thereof, wherein the heart signals are processed into at least one of: multiple electrocardiogram (ECG, pulse curve with curves of regular pulse limits, arrhythmia values, arrhythmia curve, variability value, variability curve, or a combination thereof, and the ECG is processed as a multiple leads ECG or as optionally chosen number of ECG leads, minimally 1 lead, and maximally 12 leads;

displaying the processed heart signals, live or from memory, locally on a display on at least one local central control unit placed in the reach of local transmission.

27. The method of monitoring according to claim 26, comprising sensing the heart signals by the sensor block, with 2 to 10 electrodes and processing heart signals by the central control block or a surveillance centre, with chosen number of ECG leads, wherein for processing 1 lead ECG 2 electrodes are used and by adding up to 8 electrodes up to 12 leads ECG can be processed and it is optional, when and how many electrodes will be added to achieve the desired number of processed ECG leads.

28. The method of monitoring according to claim 26, comprising displaying for the monitored person on the display on central control unit for adjusting activities of the monitored person and/or medication according to health condition seen on the display.

29. The method of monitoring according to claim 26, comprising sensing the heart signals and/or health functions by the sensor block which and processing of the heart signals and/or health functions into data for local transmission to central control block placed locally and for remote transmission to a surveillance centre placed remotely, and if transmission was executed to central control block, the heart signals and/or health functions data are sent from the central control block remotely to the surveillance centre for evaluation and sending of data to surveillance centre is done on the bases of at least one of: selected participants request, monitored person request, surveillance centre request, alarm activation, exceeding of set limits of health functions values, request for uninterrupted transmission, request for periodical transmission in predetermined intervals and durations, or a combination thereof.

30. The method of monitoring according to claim 26, comprising activation of an alarm or a warning signal for the monitored person by the central control unit and/or a surveillance centre if the heart signals or health functions exceed set health limits of the monitored person, and when monitored person or medical personnel doesn't reset the warning signal within a preset time interval from the beginning of the warning signal, alarm is activated, and wherein if alarm is initiated in the central control unit, it is advantageously sent to the surveillance centre, whereby the limits for activation of the warning signal and/or the alarm are set by the monitored person and/or medical personnel.

31. The method of monitoring according to claim 26, comprising activation of the warning signal by a countdown timer, when the time adjusted by monitored person or qualified personnel expires, for test of physical fitness of the monitored person, wherein the timer has to be reset within a preset time manually by monitored person and/or automatically by movement of the monitored person detected by a movement sensor worn by the monitored person and/or placed in monitored room where the person monitored is located, wherein the automatic reset can be deactivated, and/or two timers are used where the first countdown timer is designed for manual and automatic reset and the second count down timer is designed for manual reset only to deactivate the warning signal; and when warning signal is not deactivated then warning signal changes into alarm.

32. The method of monitoring according to claim 26, comprising automatic reset of a countdown timer by the movement sensor placed in monitoring room and connected to a stationary central control unit and/or the reset by the monitored person using a remote reset unit or push button on the central control unit.

33. The method of monitoring according to claim 26, comprising monitoring of health functions of the monitored person, wherein the health functions is at least one of: body temperature, respiration, blood oxygen content, blood pressure, heart pulse, test on physical fitness, test on mental fitness, or a combination thereof.

34. The method of monitoring according to claim 26, comprising local transmission by the communication block formed by locally transmitting means formed by at least one of: wired connection, wireless connection module, Bluetooth module, ANT module, radiofrequency connection module, or a combination thereof, and/or the communication block for long distant communication is for voice and/or data formed by parts for communication over a mobile network.

35. The method of monitoring according to claim 26, comprising sensing heart signals from both hands by the sensor block formed by the central control unit with electrodes placed on the central control unit for sensing 1 lead ECG and advantageously up to 8 electrodes can be added for sensing up to 12 leads ECG.

36. The method of monitoring according to claim 26, comprising displaying of processed heart signals or health functions on a first portable small central control unit adapted for placing on a wristband on a smaller size display, wherein the central control unit is adapted for voice and/or data communication with a second basic larger central control unit for detailed monitoring on a bigger display of processed heart signals or health functions, whereby which central control unit is master for one way communication or central control units communicate on two way communication, wherein the first central control unit and the second control unit are communicating with each other over wireless connection and advantageously images displayed on one central control unit can be displayed on the other central control unit.

37. The method of monitoring according to claim 26, comprising sensing heart signals by the sensor block formed by a chest belt or a multifunctional chest belt placed on chest of monitored person, wherein sensing is by electrodes placed on the chest belt or multifunctional chest belt and/or placed externally to the chest belts on the body of monitored person, wherein by placing 2 electrodes on the chest belt, the central control block can process 1 lead ECG and by adding up to total maximum 10 electrodes on the chest belt or externally to the chest belt, the central control block can process up to 12 lead ECG and it is optional how many leads will be used and how many will be added and/or the sensor block is further formed by sensors for sensing health functions values detectable by sensors placed on the multifunctional chest belt or on the body of the monitored person and the chest belt or multifunctional chest belt is adapted for processing heart signals and/or health function values into data for local transmission to the central control block placed locally and/or for remote transmission to a surveillance centre placed remotely.

38. The method of monitoring according to claim 26, comprising sensing of the up to twelve leads ECG by six electrodes placed on the chest belt in a curve in positions corresponding with positions of six chest electrodes of standard ECG system for ECG monitoring leads V1-V6, wherein the electrodes are placed on the broader chest belt or on a narrow chest belt complemented with elastic cross straps which are pushing the electrodes for connection to the body of monitored person, wherein the remaining four electrodes for twelve leads ECG are placed externally and connected by wire.

39. The method of monitoring according to claim 26, comprising voice and data communication between the central control unit of monitored person and a surveillance centre and/or medical personnel by the communication block.

40. The method of monitoring according to claim 26, comprising automatic answering a voice call by communication unit in surveillance centre with hands free operation, when monitored person does not answer the call and/or the monitored person can initiate the call on central control unit to a surveillance centre and/or pushes an alarm button to alert the surveillance centre or medical personnel in emergency.

41. The method of monitoring according to claim 26, comprising displaying arrhythmia numerically and/or graphically based on the percentage of arrhythmic cardiac pulses occurrence of the total number of pulses adjustable time period, or in the range given by the number of pulses, wherein the arrhythmia is expressed numerically in percentage or in degrees, and for calculation of an arrhythmia degree is percentage of irregular pulses is divided by one hundred and multiplied by the number of degrees of the scale and the figure is rounded off to the desired number of decimal places and arrhythmia curve arises by plotting the arrhythmia in percentage or degrees on the y axis for the time on x axis.

42. The method of monitoring according to claim 26, comprising calculating the value the arrhythmic cardiac pulses are defined by comparing the current heart rate of the present pulse and average heart rate for selected number of pulses, wherein arrhythmic cardiac pulse is defined as pulse whose current pulse rate deviates from the average pulse rate by more than a selectable value, advantageously 13 percent.

43. The method of monitoring according to claim 26, comprising displaying a heart rate curve formed by connecting two adjacent values of pulses, where the heart rate by minutes on the y axis calculated by dividing the minute by the time intervals on the x axis between two adjacent cardiac pulses;

displaying the curve of upper and lower limits of the regular sinus pulses calculated from the curve of average heart rate, by adding or deducting a certain heart rate value, advantageously 13% of the average heart rate: specifying the irregular pulses in the part of the heart rate curve going over curves of upper and lower limit;

creating and/or displaying a curve of the average heart rate calculated from a number of recent cardiac pulses, pulse by pulse, advantageously from 3-15 pulses.

* * * * *